United States Patent
Rumao et al.

(10) Patent No.: US 9,457,822 B2
(45) Date of Patent: Oct. 4, 2016

(54) PORTABLE GENERATORS

(71) Applicant: Kohler Co., Kohler, WI (US)

(72) Inventors: Manuel Rumao, Sheboygan, WI (US); Travis J. Andren, Sheboygan, WI (US); Christopher M. Mitchell, Cedarburg, WI (US)

(73) Assignee: KOHLER CO.

( * ) Notice: Subject to any disclaimer, the term of this patent is extended or adjusted under 35 U.S.C. 154(b) by 198 days.

(21) Appl. No.: 14/169,739

(22) Filed: Jan. 31, 2014

(65) Prior Publication Data

US 2014/0217689 A1  Aug. 7, 2014

Related U.S. Application Data

(60) Provisional application No. 61/760,054, filed on Feb. 2, 2013.

(51) Int. Cl.
*B62B 1/12* (2006.01)
*B62B 1/00* (2006.01)
*F02B 63/04* (2006.01)
*B62B 1/14* (2006.01)

(52) U.S. Cl.
CPC ............. *B62B 1/008* (2013.01); *F02B 63/044* (2013.01); *F02B 63/047* (2013.01); *B62B 1/14* (2013.01); *Y10T 29/49622* (2015.01)

(58) Field of Classification Search
CPC ........... B62B 1/008; B62B 1/12; B62B 1/14; F02B 63/04; Y10T 29/49622
USPC ...................... 280/47.16, 47.17, 47.34, 47.35
See application file for complete search history.

(56) References Cited

U.S. PATENT DOCUMENTS

| | | | |
|---|---|---|---|
| D278,425 S * | 4/1985 | Toshihiko | D13/116 |
| 4,662,551 A | 5/1987 | Dudley et al. | |
| 4,844,701 A * | 7/1989 | Wolford et al. | 417/234 |
| 4,992,669 A | 2/1991 | Parmley | |
| 6,047,942 A * | 4/2000 | Kennedy | 248/674 |
| 6,084,313 A * | 7/2000 | Frank | 290/40 C |
| 6,369,321 B1 | 4/2002 | Flegel | |
| 6,384,488 B1 * | 5/2002 | Bucharelli et al. | 307/9.1 |

(Continued)

FOREIGN PATENT DOCUMENTS

EP  2138685  12/2009

OTHER PUBLICATIONS

Corresponding European Search Report dated Apr. 22, 2014 (European Patent Application No. 141533877).

*Primary Examiner* — Jeffrey J Restifo
(74) *Attorney, Agent, or Firm* — The Belles Group, P.C.

(57) ABSTRACT

A customizable portable generator system and methods for assembling the same. In one example, the generator system generally includes a universal frame including a plurality of mounting interfaces configured for detachably attaching one of a plurality of different engines and a plurality of wheel assemblies and/or support legs. Optionally, at least one handlebar assembly may be detachably mounted on the frame in at least one of two possible positions. In one example, the handlebar may be pivotably mounted to the frame. The frame components may be assembled into a kit from which a user may select various options to custom configure the generator unit. Other appurtenances and accessories may be provided which interface with the generator unit and frame. A modular generator frame and compressed gas-fueled generators are also disclosed.

20 Claims, 109 Drawing Sheets

(56) References Cited

U.S. PATENT DOCUMENTS

| | | | |
|---|---|---|---|
| 6,489,690 B1 * | 12/2002 | Hatsugai et al. | 290/1 A |
| 6,541,718 B2 * | 4/2003 | Burkholder et al. | 200/50.28 |
| D489,327 S * | 5/2004 | Imai | D13/116 |
| 6,750,556 B2 | 6/2004 | Sodemann et al. | |
| D494,929 S * | 8/2004 | Imai | D13/116 |
| 6,935,642 B1 * | 8/2005 | Craig | B08B 3/026 280/47.24 |
| 6,952,056 B2 * | 10/2005 | Brandenburg et al. | 290/1 A |
| 7,140,449 B1 | 11/2006 | Ebner | |
| 7,148,580 B2 * | 12/2006 | Sodemann et al. | 290/1 A |
| 7,163,132 B2 | 1/2007 | Rundberg | |
| 7,318,608 B2 * | 1/2008 | Swartz et al. | 280/830 |
| D580,860 S * | 11/2008 | Xi-Ren | D13/122 |
| 7,520,029 B2 | 4/2009 | Jonsson | |
| 7,604,246 B2 * | 10/2009 | Sodemann | B08B 3/026 280/47.131 |
| 7,675,187 B2 * | 3/2010 | Woods et al. | 290/1 A |
| 7,703,777 B2 * | 4/2010 | Horn, Jr. | 280/47.35 |
| D629,748 S * | 12/2010 | van Deursen | D13/116 |
| 7,896,368 B2 * | 3/2011 | Craig | F02B 63/04 280/47.131 |
| 7,917,997 B2 | 4/2011 | Jonsson | |
| D644,993 S * | 9/2011 | van Deursen | D13/116 |
| 8,032,980 B2 | 10/2011 | Basenberg, Jr. et al. | |
| D655,467 S * | 3/2012 | Hawkins | D32/25 |
| D668,607 S | 10/2012 | Van Deursen | |
| 8,299,635 B2 * | 10/2012 | Bindhammer | 290/1 A |
| 8,328,207 B2 * | 12/2012 | Hirose | F02B 63/04 280/47.131 |
| D688,628 S * | 8/2013 | van Deursen | D13/116 |
| 8,601,772 B2 | 12/2013 | Turpin et al. | |
| 8,635,744 B2 | 1/2014 | Junk et al. | |
| D703,137 S * | 4/2014 | van Deursen | D13/116 |
| 2003/0030281 A1 | 2/2003 | Campion | |
| 2005/0000994 A1 | 1/2005 | Rundberg | |
| 2005/0109806 A1 | 5/2005 | Jonsson | |
| 2006/0006652 A1 | 1/2006 | Witten et al. | |
| 2006/0076779 A1 * | 4/2006 | Craig et al. | 290/1 A |
| 2006/0290084 A1 * | 12/2006 | Sodemann | B08B 3/026 280/47.17 |
| 2007/0108767 A1 * | 5/2007 | Hirose | F02B 63/04 290/1 A |
| 2007/0296276 A1 * | 12/2007 | Blackman | 307/64 |
| 2008/0079264 A1 * | 4/2008 | Serdynski et al. | 290/30 A |
| 2009/0230783 A1 | 9/2009 | Weed et al. | |
| 2009/0261133 A1 | 10/2009 | Jonsson | |
| 2010/0252594 A1 | 10/2010 | Basenberg, Jr. et al. | |
| 2011/0056443 A1 | 3/2011 | Schliemann | |
| 2011/0289718 A1 | 12/2011 | Basenberg, Jr. et al. | |
| 2012/0234616 A1 | 9/2012 | Jaskowiak et al. | |
| 2013/0168969 A1 | 7/2013 | Markoski | |
| 2013/0305851 A1 * | 11/2013 | Rees et al. | 74/15.8 |
| 2014/0334910 A1 | 11/2014 | Raasch | |
| 2015/0059662 A1 | 3/2015 | Lan et al. | |

\* cited by examiner

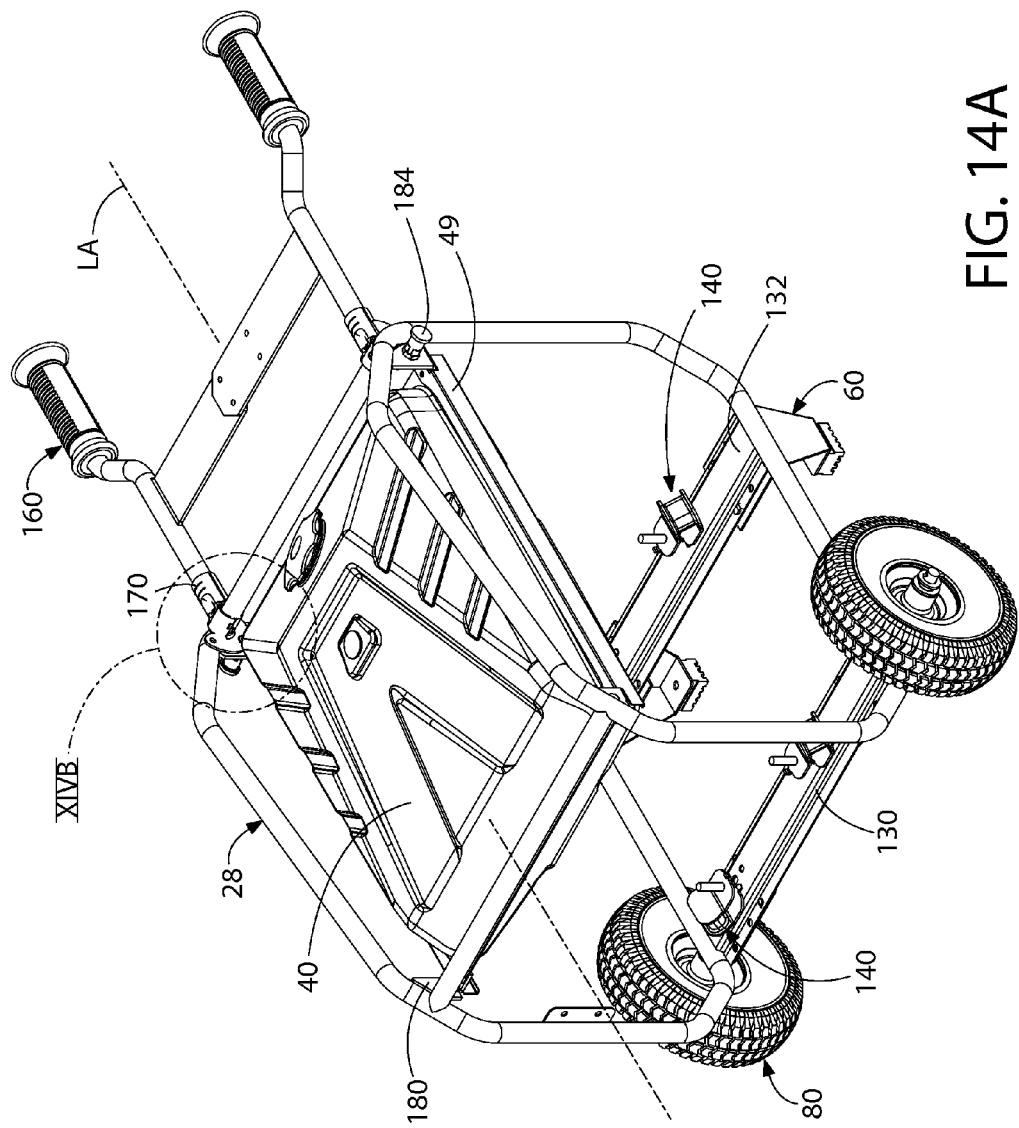

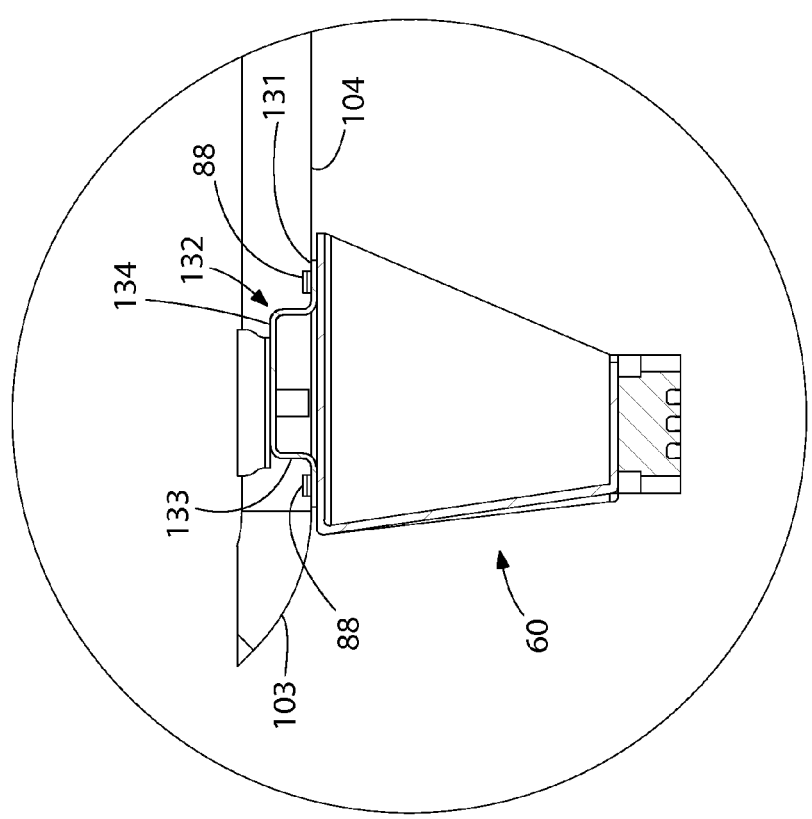

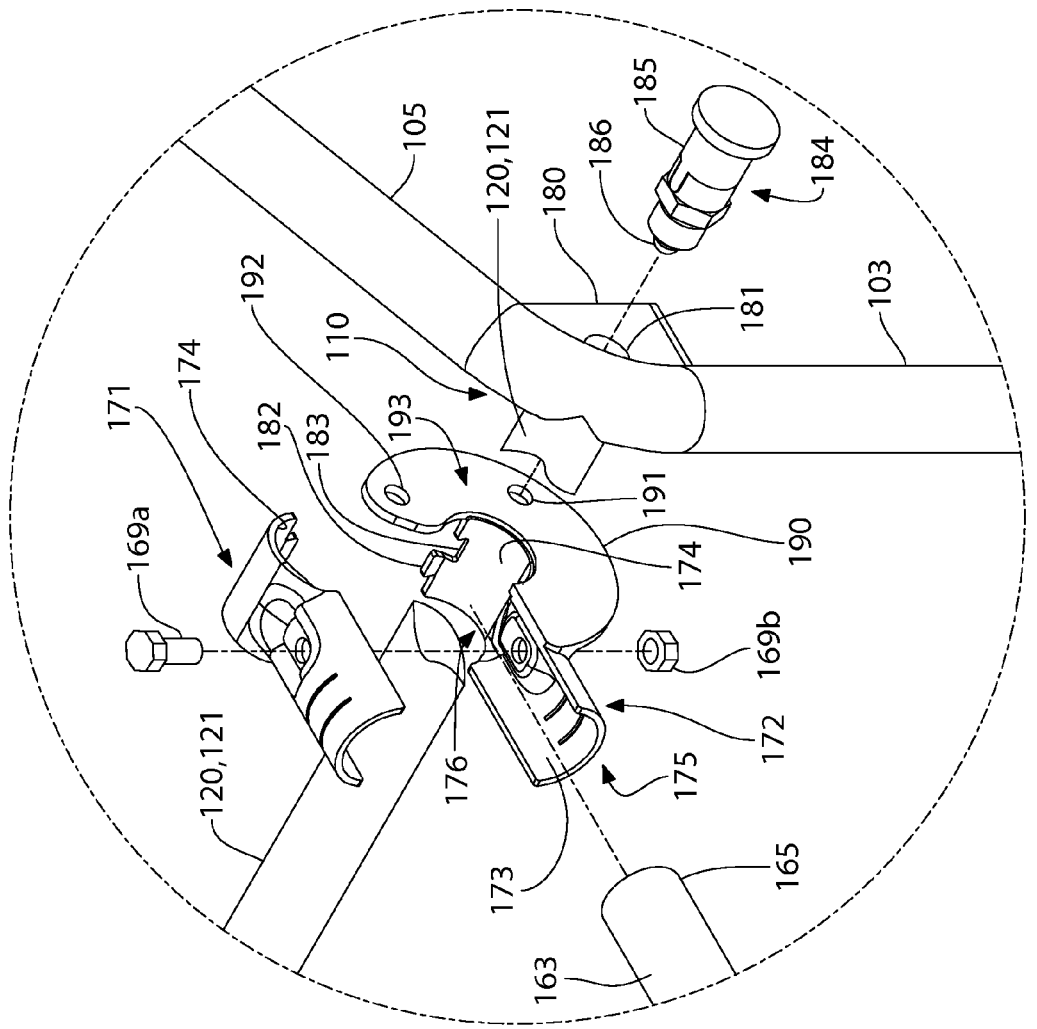

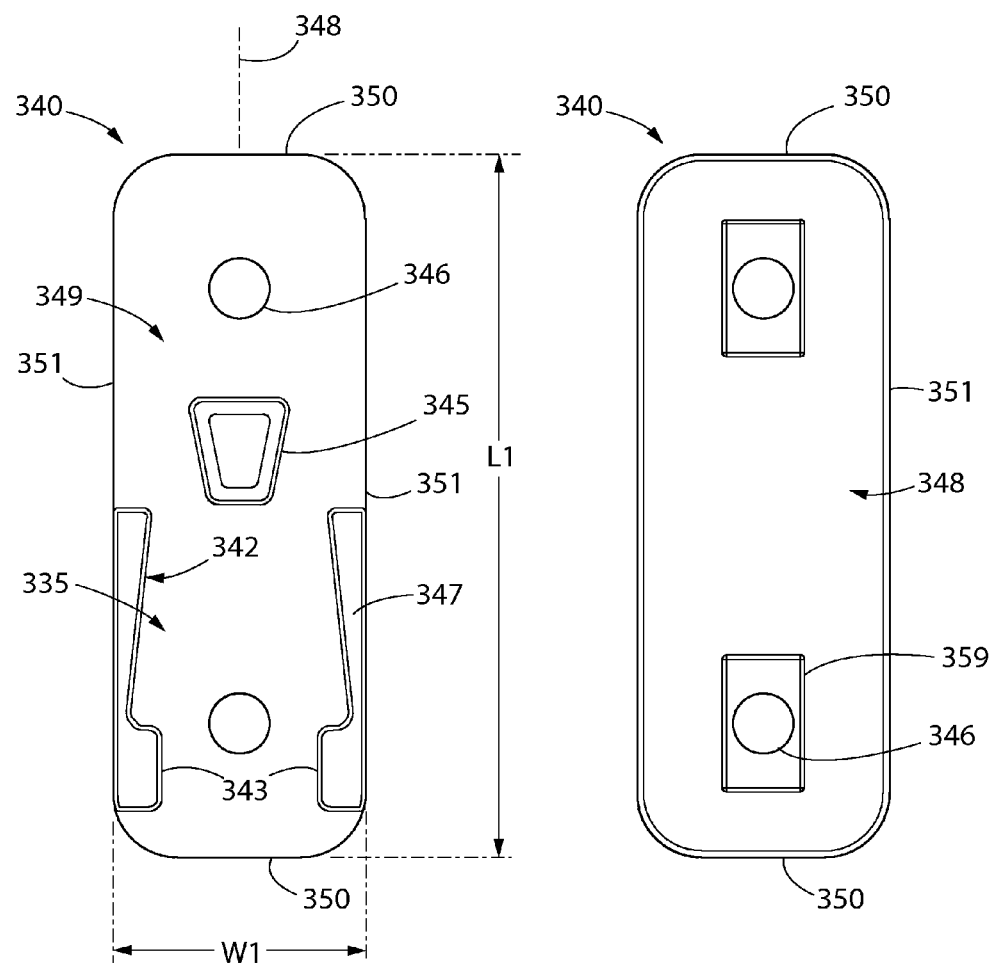

PORTABLE GENERATORS

CROSS-REFERENCE TO RELATED APPLICATIONS

The present application claims the benefit of U.S. Provisional Patent Application Ser. No. U.S. 61/760,054 filed Feb. 2, 2013, which is incorporated herein by reference in its entirety

BACKGROUND OF THE INVENTION

The invention generally relates to engine-generator sets, for producing electric power, and more particularly to a highly customizable portable electric generators.

Portable electric generators produce a ready source of electricity for use in a variety of situations where electricity may not be available from the conventional power grid. Such situations may include power outages, remote locations without access to a nearby source of power from an electric utility, constructions sites, and instances where temporary power hookups from the utility are not practical or convenient for short periods of time.

A customizable portable generator system is desirable.

SUMMARY OF THE INVENTION

A portable generator system is disclosed that is configurable by a user and which may be assembled at the point of sale or later reconfigured afterwards to address changing needs. The portable generator system may include a versatile universal support frame that provides an opportunity for a user to select different sizes/types of engines and accessories which are conveniently interchangeable with a single frame. This may be accomplished through a generator frame that provides common accessory equipment interfaces adapted to accept a variety of accessories and/or readily alter the mounting arrangement of such accessories to vary the functionality of the portable generator system created by the user's preferences.

A universal frame generator system may include a universal engine mounting system that allows a plurality of engines having at least one different characteristic (e.g. KW electrical output capacity, fuel type, auxiliary equipment/accessories, etc.) to be interchangeably mounted to a single configuration and size generator frame via a common engine mounting interface.

A universal frame generator system may further include floor support system configured to mount different type floor supports including pedestal type legs and/or wheel assemblies at different locations which are detachably mounted to the frame via a common mounting system interface.

A universal frame generator system may further include a handlebar mounting system that is configurable to mount different sizes and types of handlebars in a plurality of different orientations.

A universal frame generator system may further include a power cord management system that is configurable to provide a variety of cord support arrangements.

In some example systems, the foregoing frame, engines, accessories, and other appurtenances disclosed herein may be assembled into a kit which presents custom options selectable by a user to equip the generator unit as desired. The kit can be shipped to a distributor or retailer which includes all the components necessary to assemble and create a fully functional generator unit that has been customized at the point of sale to meet the user's preferences.

In one example, a generator unit assembly kit includes a universal frame, a plurality of engines having at least one different characteristic, a plurality of wheel assemblies, a plurality of frame support legs, and a plurality of handlebars.

An exemplary method for assembling a generator unit may include a user selecting an engine, at least two of a wheel assembly, pair of support legs, or combinations thereof from a generator kit, and mounting the foregoing components selected on the frame. The method may further include selecting at least one pair of handlebars and mounting the handlebars to the frame in at least one of two positions. In one example, the positions include a horizontal position and a vertical position.

The present application further discloses additional kits, accessories, and appurtenances which interface with and may be mountable on the generator and/or support frame disclosed herein.

The present application further discloses a portable generator with modular frame system. The frame system may generally include a plurality of corner members and connector plates which may be interconnected to collectively form an open space frame configured for supporting an internal combustion engine, related appurtenances, and accessories. The present application further discloses compact gaseous fuel power generators which may be operated from compressed liquid fuel canisters or cylinders. In one non-limiting example, the gaseous fuel may be propane.

BRIEF DESCRIPTION OF THE DRAWINGS

The features of some non-limiting examples will be described with reference to the following drawings, where like elements are labeled similarly, and in which:

FIGS. 8-14A show various views of the generator and frame of FIGS. 1-7 with essentially all engine-related components removed except for the fuel tank to clearly show the frame;

FIG. 16B is a transverse cross-sectional view from FIG. 16A;

FIG. 20B is an exploded detail view from FIG. 20A of the handlebar mounting clamp and position adjustment assembly and interface with the frame;

FIGS. 51-58 are various views showing a connector plate of the modular generator frame used to couple corner members together;

Figure 1:
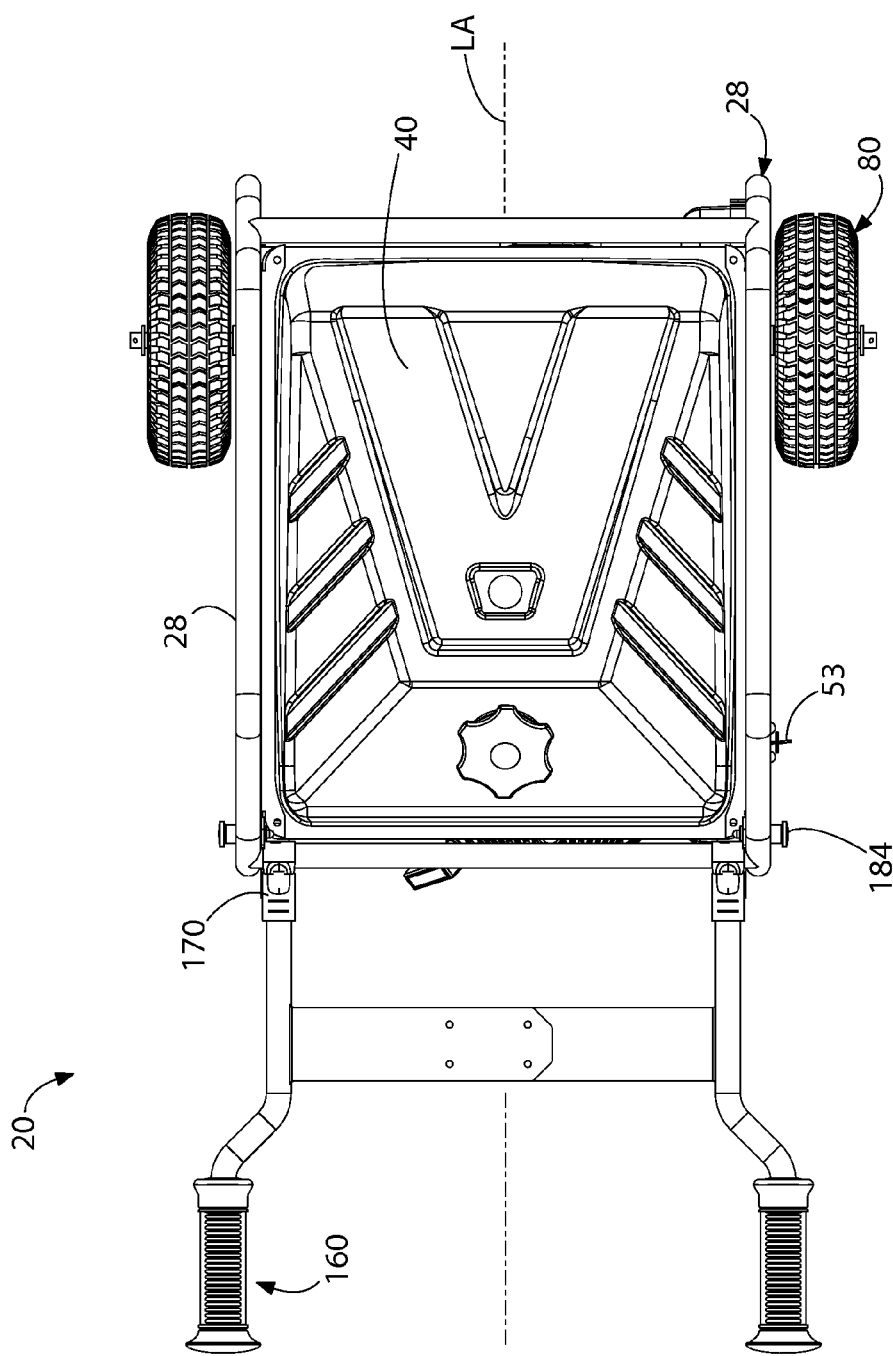
FIGS. 1-7 show various views of one example of a portable generator and support frame.
Figure 2:
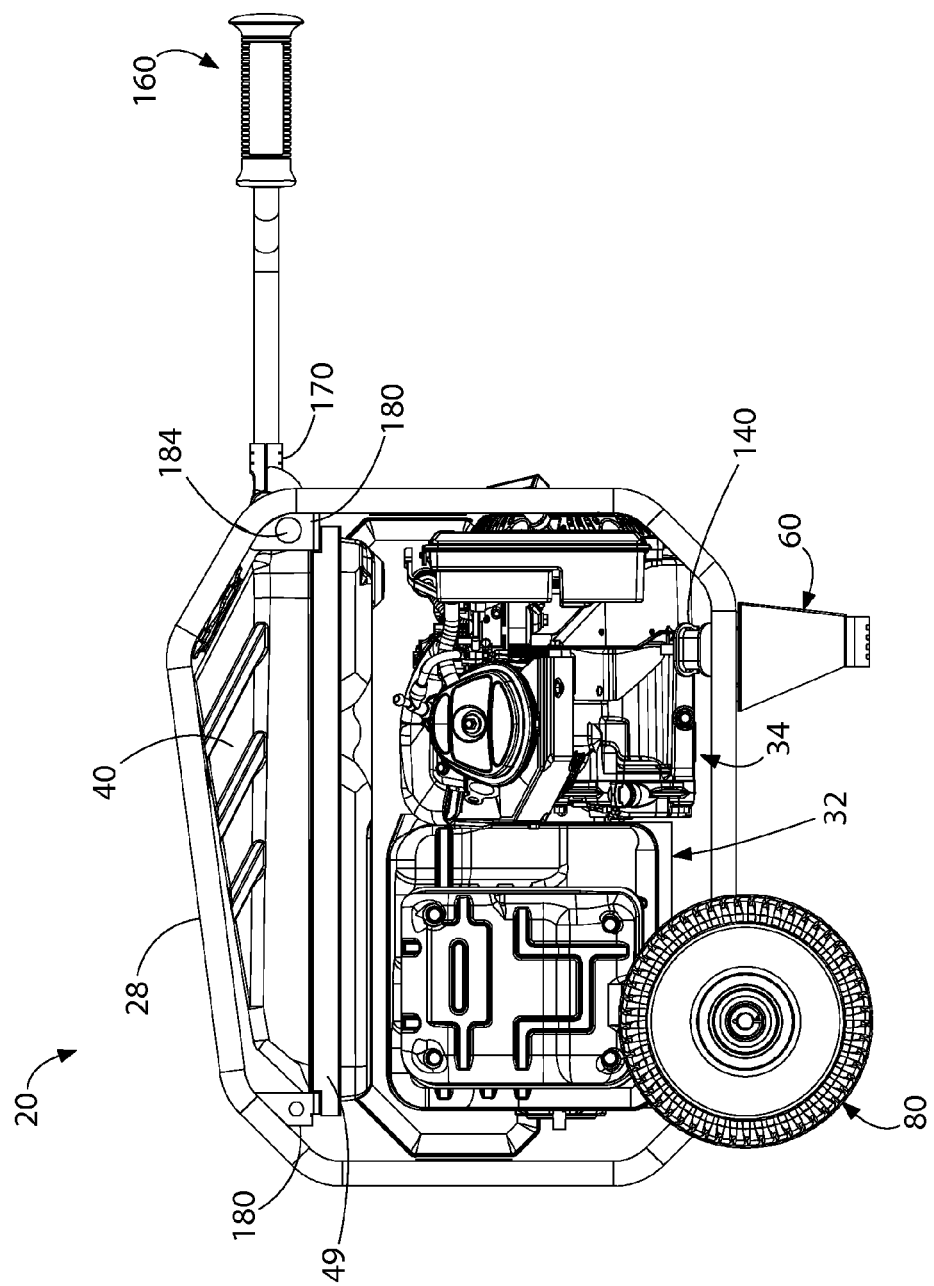
Figure 3:
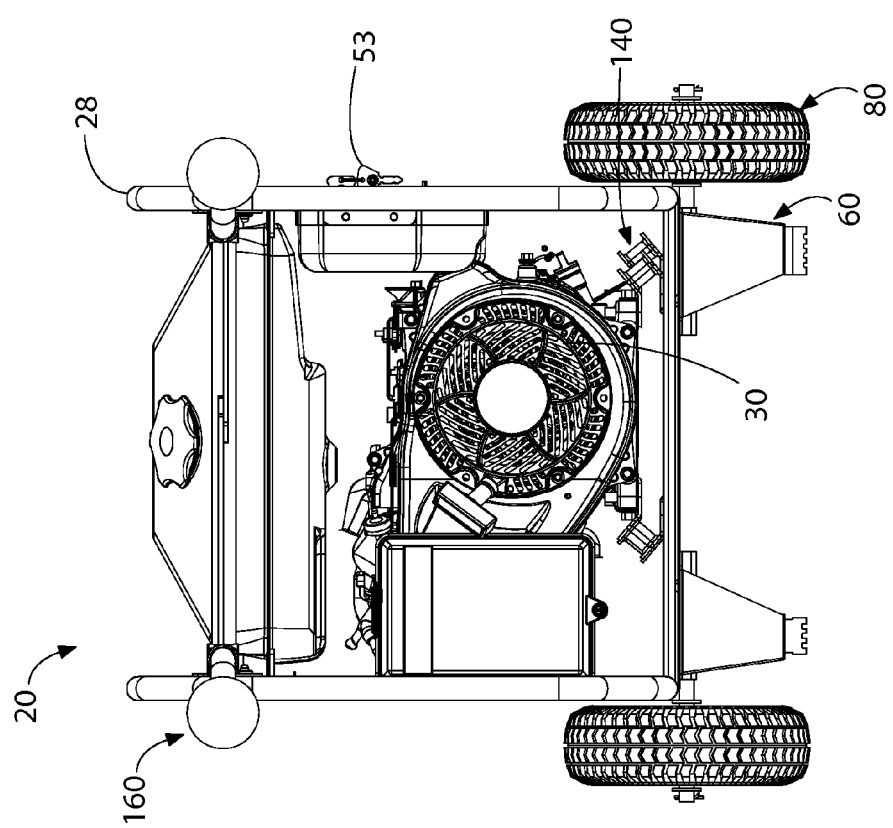
Figure 4:
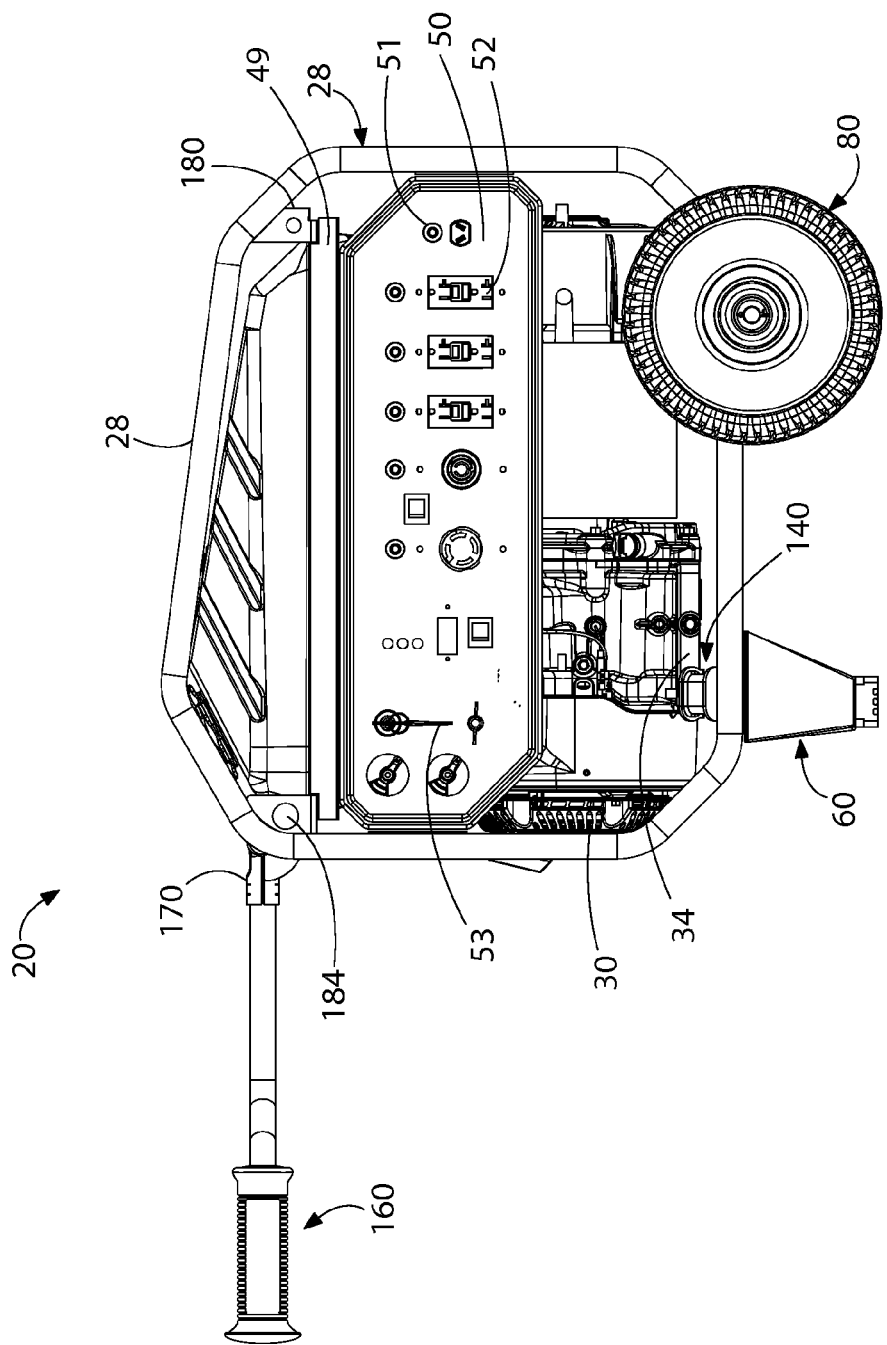
Figure 5:
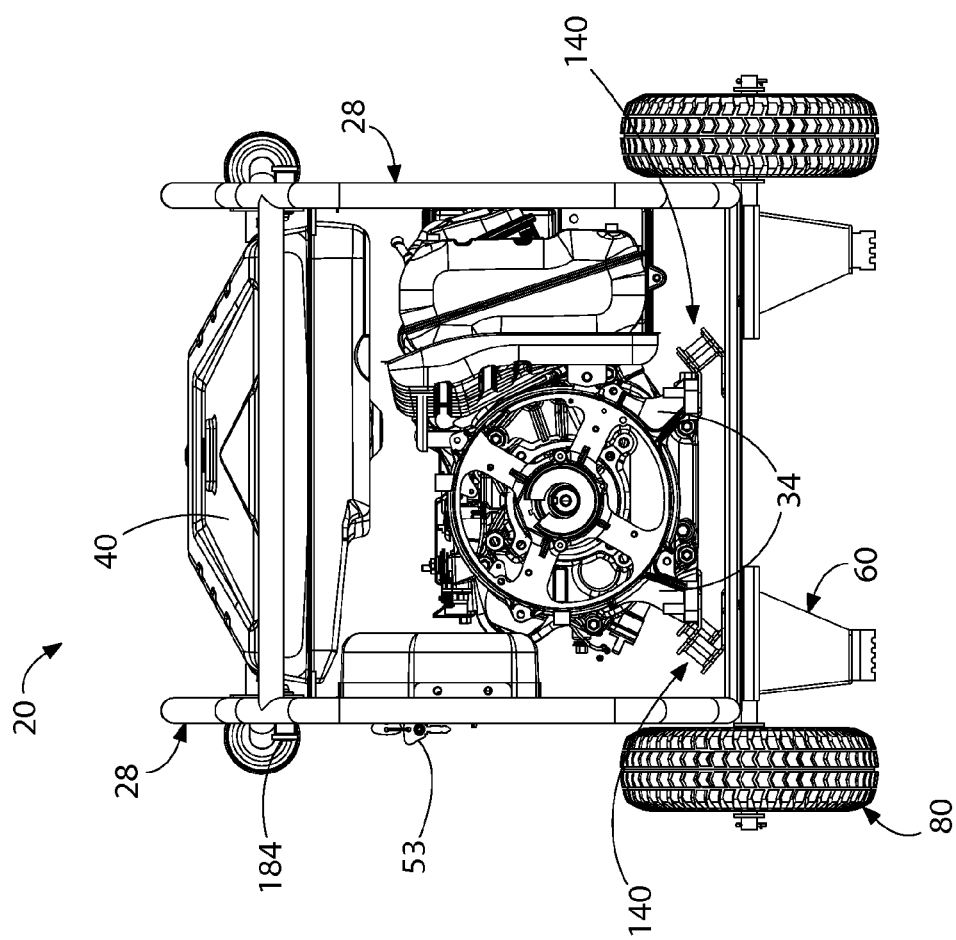
Figure 6:
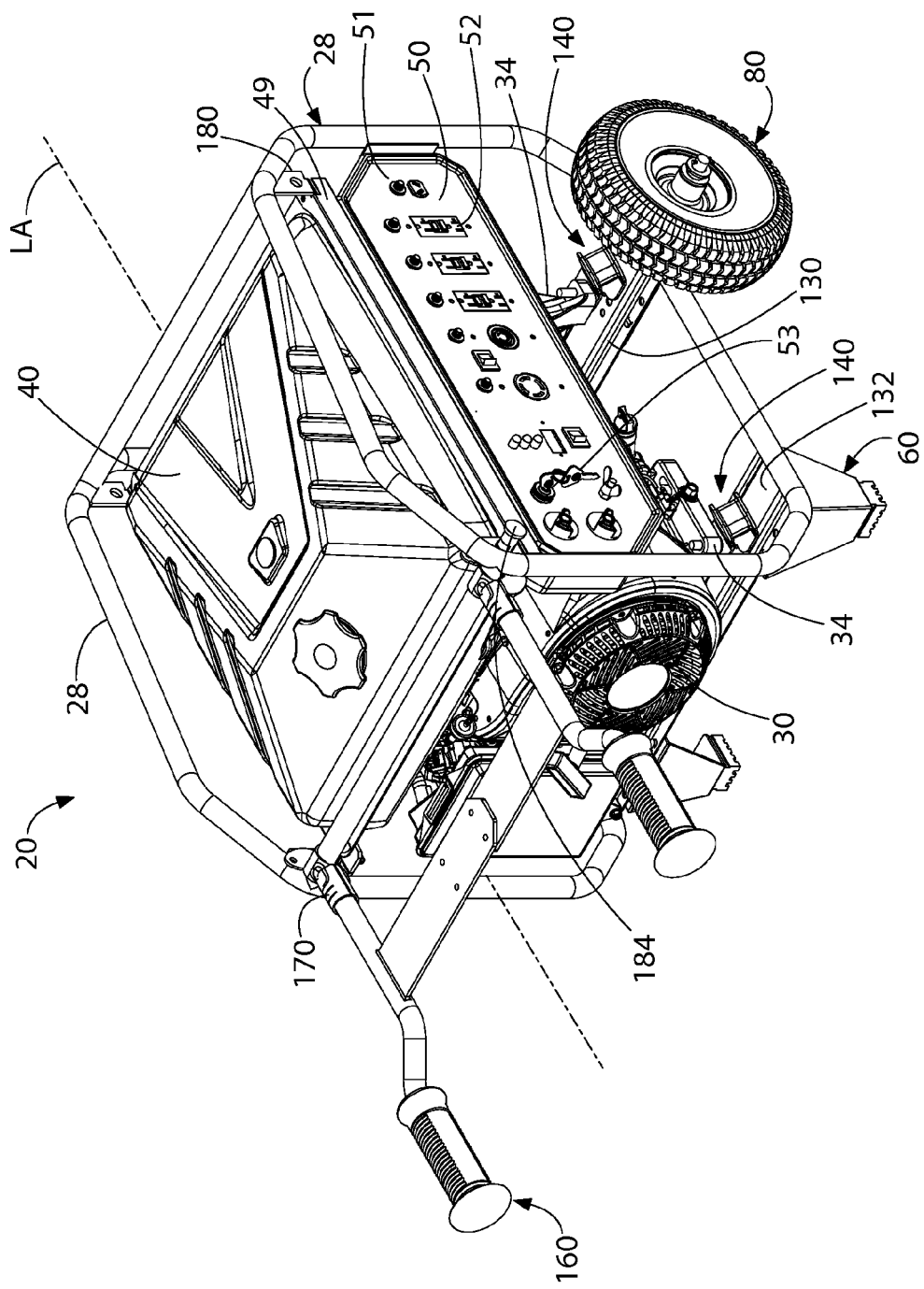
Figure 7:
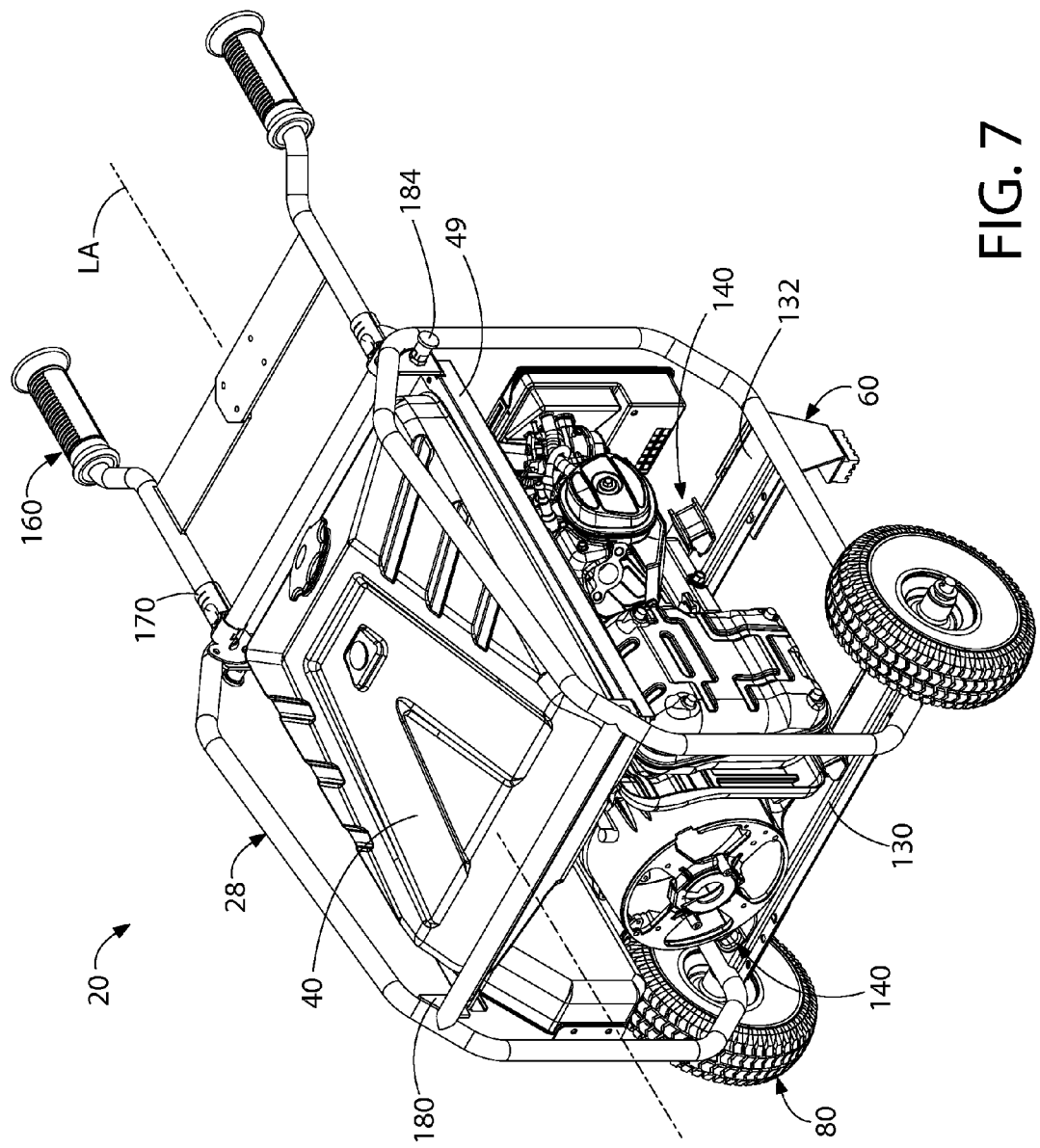
Figure 8:
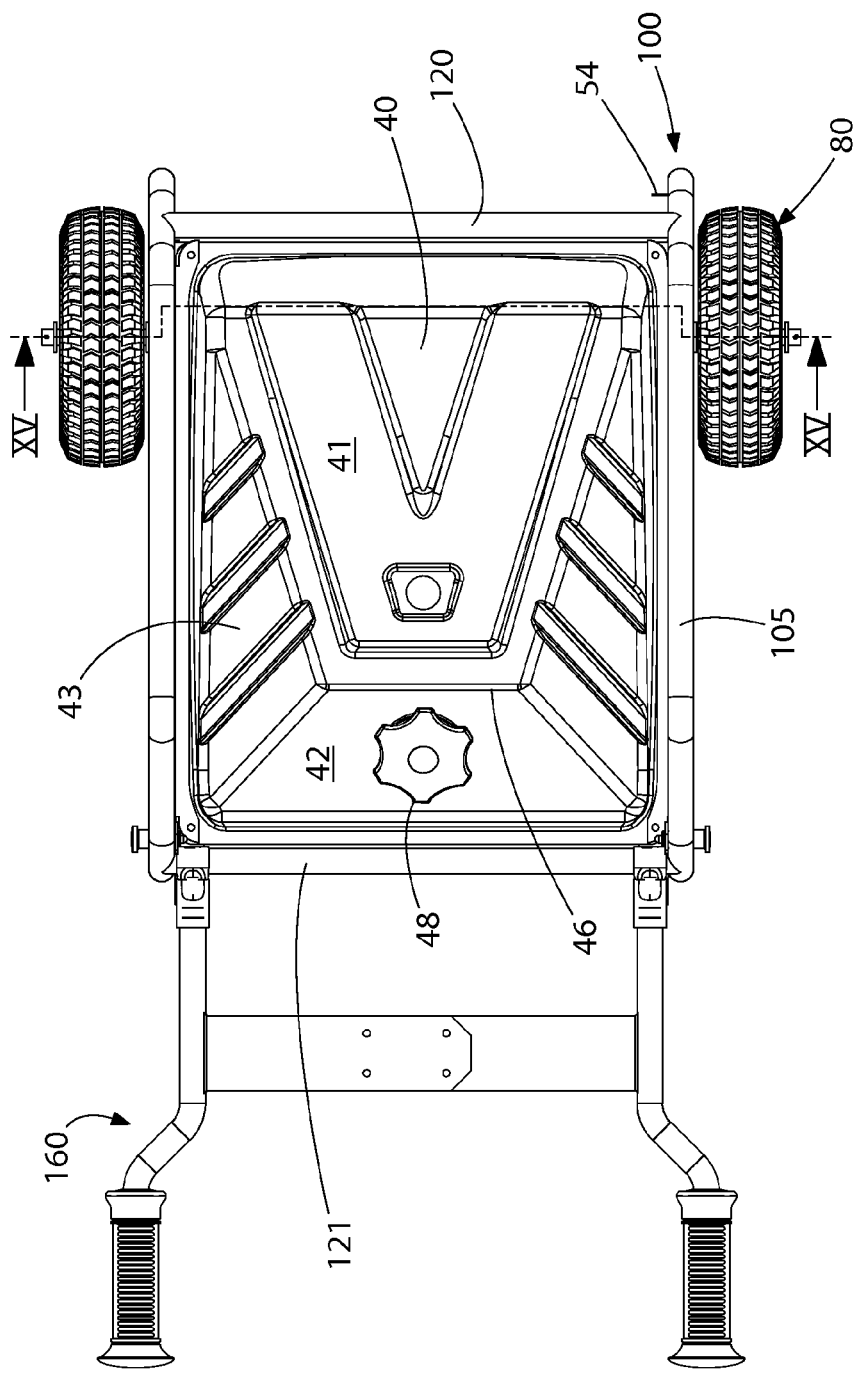
Figure 9:
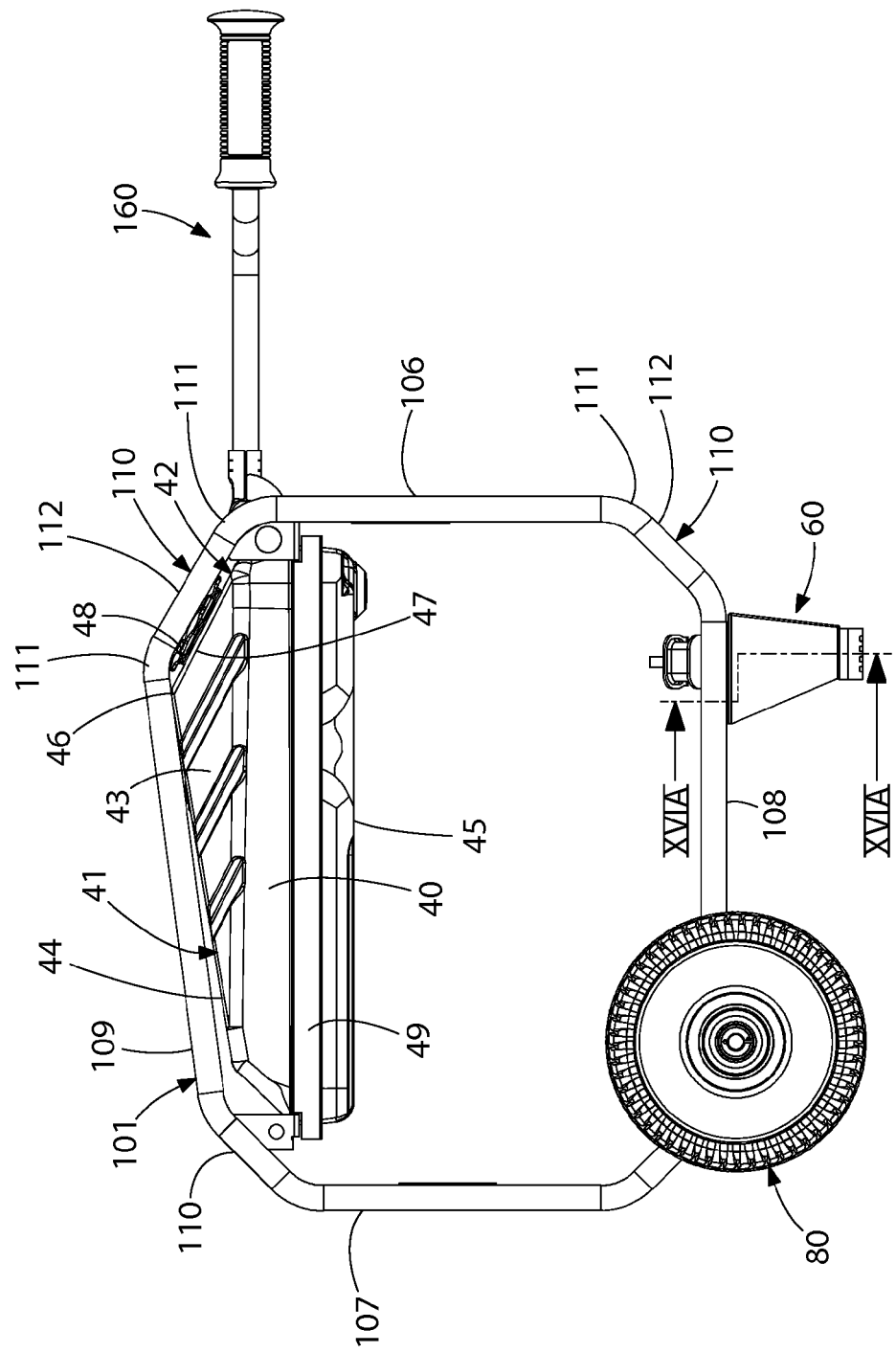
Figure 10:
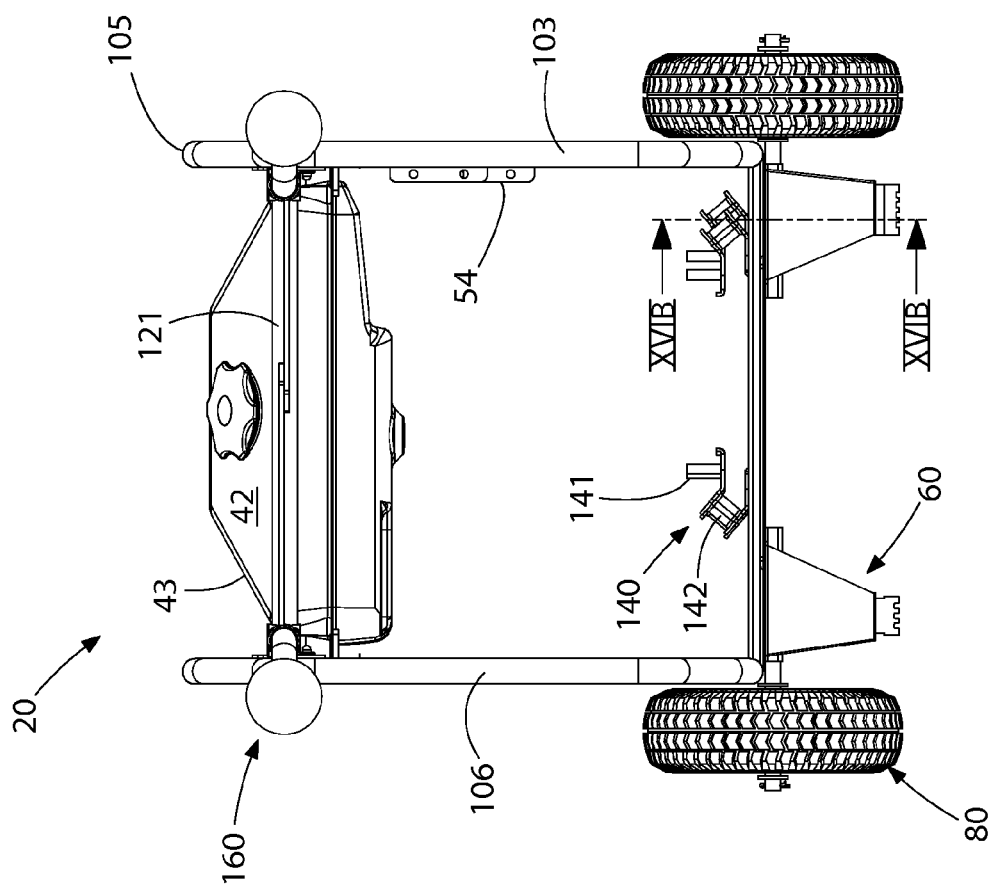
Figure 11:
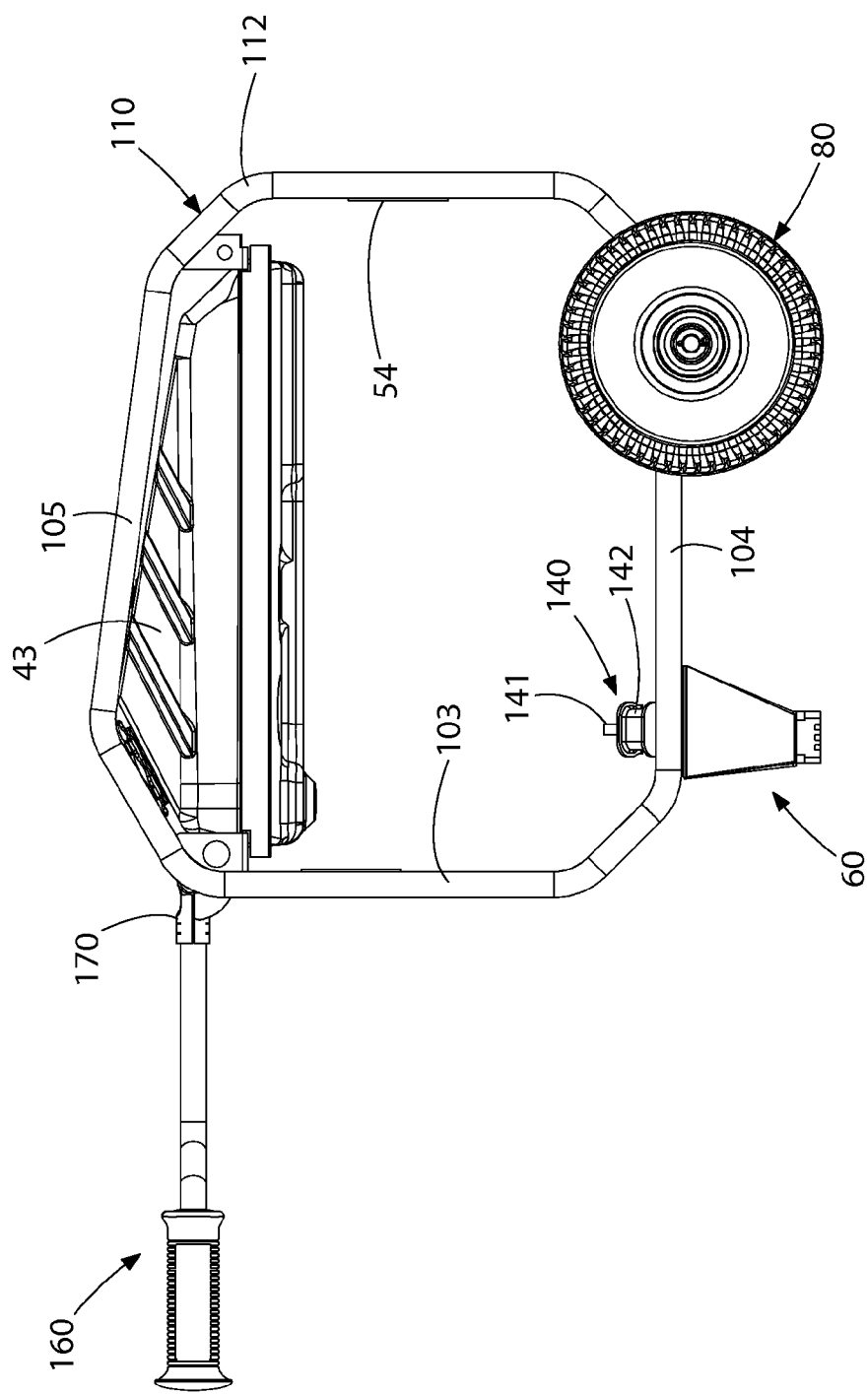
Figure 12:
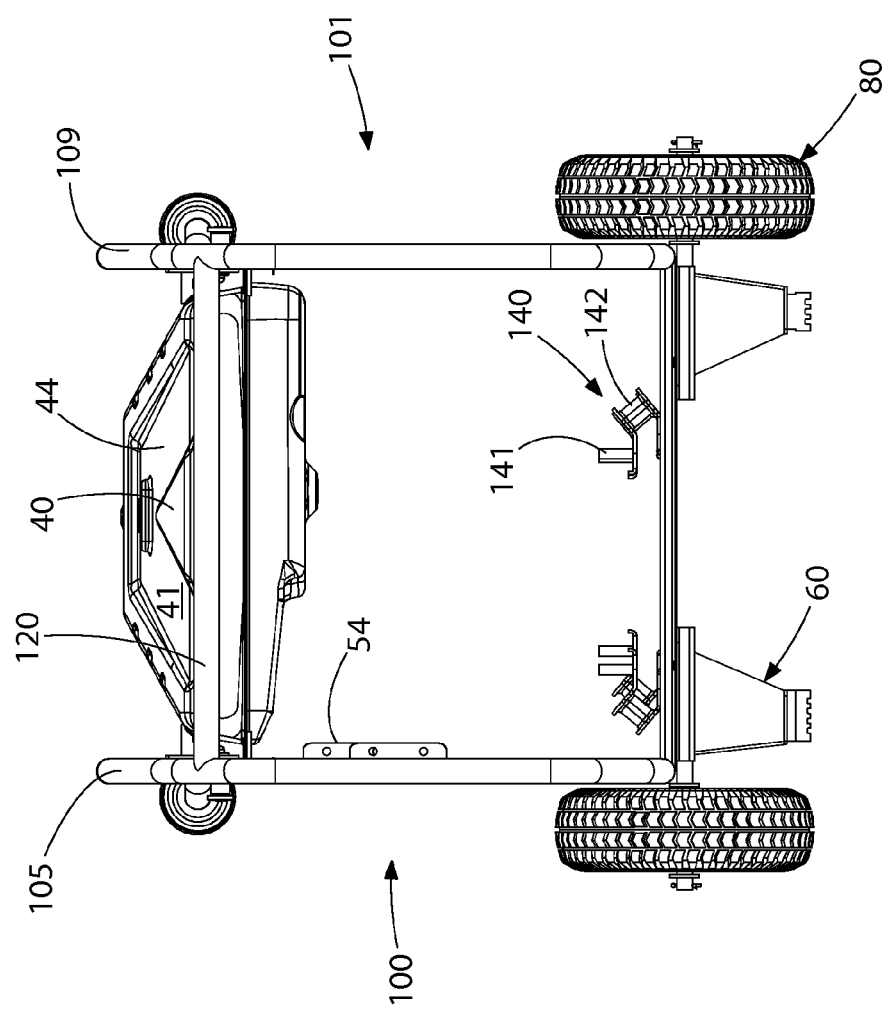

All drawings are schematic and not necessarily to scale.

DETAILED DESCRIPTION OF EXAMPLES

The features and benefits of apparatuses, systems, methods, and other innovations disclosed are illustrated and described herein by reference to non-limiting examples. This description of examples is intended to be read in connection with the accompanying drawings, which are to be considered part of the entire written description. Accordingly, the present disclosure expressly should not be limited to such examples illustrating some possible non-limiting combination of features that may exist alone or in other combinations of features; the scope of protection being defined by the claims appended hereto.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected,"

"interconnected," and the like refer to a relationship wherein structures are secured or attached to one another either directly or indirectly through intervening structures, as well as both movable or rigid attachments or relationships, unless expressly described otherwise.

FIGS. 1-7 illustrate a non-limiting example of a portable generator 20 according to the present disclosure. The generator 20 may include an engine 30. The engine 30 may be an internal combustion engine, or various other engines or motors which may produce mechanical energy. The engine 30 may be powered by a fuel or resource, such as natural gas, diesel fuel, propane, gasoline, or various other fuels.

The generator 20 may additionally or alternatively include an alternator 32. The alternator 32 may be an electromechanical device in mechanical communication and operably coupled with the engine 30. The alternator 32 may include or use a rotating magnetic field with a stationary armature, a rotating armature with a stationary magnetic field, or a linear alternator. For example, the engine 30 may produce mechanical energy when operated which the alternator 32 may convert into electrical energy, such as without limitation alternating current.

Generator 20 may further include an onboard fuel tank 40 configured to store fuel which is supplied to the engine 30 by a fluid coupling such as without limitation a tube or hose. Generator 20 further includes a control panel 50 for operating and monitoring the generator, and to provide an electrical connection interface for power generated by the generating unit. The foregoing components of the generator 20 are mounted to a support structure such as frame 28.

For convenience of further description, without limitation, generator 20 may be considered to have a front 21, rear 22, first and second lateral sides 23 and 24, a top 25, and bottom 26 (see, e.g. FIG. 1). These designations are defined with generator 20 resting in a normal upright operating position on a horizontal support surface as shown. Generator 20 defines a longitudinal axis LA extending from front 21 to rear 22 along a centerline of the frame 28.

Various examples of generator 20 may further include floor supports to raise and space frame 28 above the floor. The floor supports may comprise one or more sets of support legs 60 and/or wheel assemblies 80 for transporting the generator. In some frames, one or more pairs of handlebars 160 may further be provided to further facilitate transport of the generator 20. These features will be further described herein.

Control panel 50 may be mounted on one of the lateral sides 23, 24 of the frame 28 by brackets 54 (see, e.g. FIG. 13) or other similar methods. The control panel may alternatively be located in other mounted positions. The control panel may include a plurality of controls 51 such as switches and indicators 51, power outlets 52 which are electrically connected to alternator 32 and/or a power distribution panel, key start 53, and other usual appurtenances.

FIGS. 8-14 show generator 20 with the fuel tank 40. Engine 30 is not shown in these figures to more clearly show the frame construction.

The fuel tank 40 may include a top 44, bottom 45, and opposing lateral sides 43. In one non-limiting example, top 44 of fuel tank 40 defines a forward sloping surface 41 and rearward sloping surface 42. Both sloping surfaces 41, 42 assist with shedding water to minimize accumulation and prevent ingress of water into the tank such as during refueling. The front and rear sloping surfaces 41, 42 intersect linearly along a laterally extending peak 45 on the top of the fuel tank which defines the highest point on the tank. In some fuel tanks 40, lateral sides 43 may also be sloped outwardly towards the sides 25 and 26 of the generator 20 to shed water.

In one example, a removable fuel cap 48 which operably covers a fill spout 47 may be disposed on one of the sloping surfaces 41 or 42 to facilitate filling the fuel tank 40. In one example, the fuel cap may be located on rear sloping surface 42. Locating the fuel cap 48 and spout 47 on a sloping surface creates better access and convenience for refueling to minimize spills as the user has to reach less far with a fuel can in contrast to flat topped fuel tanks with the fuel cap and fill spout located thereon. However, a flat topped fuel tank 40 may alternatively be provided in some configurations. The fuel cap 48 and fill spout 47 may be mutually threaded to provide a screwed arrangement, but is not limited to such configurations.

Fuel tank 40 may be supported independently by frame 28 via support flanges 49. In other systems, the tank 40 may be supported by the engine-alternator assembly 30-32.

The frame 28 may be configured and comprised of a first lateral side frame 100 and an opposing second lateral side frame 101 spaced laterally apart from side frame 100. In one construction, without limitation, frame 28 may be a substantially generally tubular frame formed of tube or pipe having a circular cross section. Accordingly, in one example, lateral side frames 100, 101 may be cylindrically tubular in construction and configuration as shown. In other possible constructions, frame 28 may be formed of square or rectangular tubes having a rectilinear cross sectional shape.

Lateral side frame 100 generally includes a front vertical member 102, top horizontal member 105, rear vertical member 103, and bottom vertical member 104 which may be formed as a unitary structure or joined together by any suitable means to form a continuous structure. Similarly, lateral side frame 101 generally includes a front vertical member 107, top horizontal member 109, rear vertical member 106, and bottom horizontal member 108 which may be formed as a unitary structure or joined together by any suitable means to form a continuous structure.

In some constructions, the horizontal and vertical members of lateral side frames 100, 101 may be multiple separate pieces joined together by welding or brazing. In other constructions, the lateral side frames may be formed of a single tube having two ends and which is first bent to shape and then joined at the ends after forming a loop.

The vertical and horizontal members of lateral side frames 100, 101 may intersect at four corner sections 110 which preferably are rounded or angled as shown in some examples to preclude catching the frame on various object when generator 20 is being transported. Each corner section 110 in one example may include a short straight section of tube 112 of various lengths disposed between two elbows 1111. In one example, the elbows 112 may be less than 90 degrees to avoid a squared corner section 110. However, in other suitable but less preferred examples, some or all of the corners 110 may be square in configuration.

Figure 24:
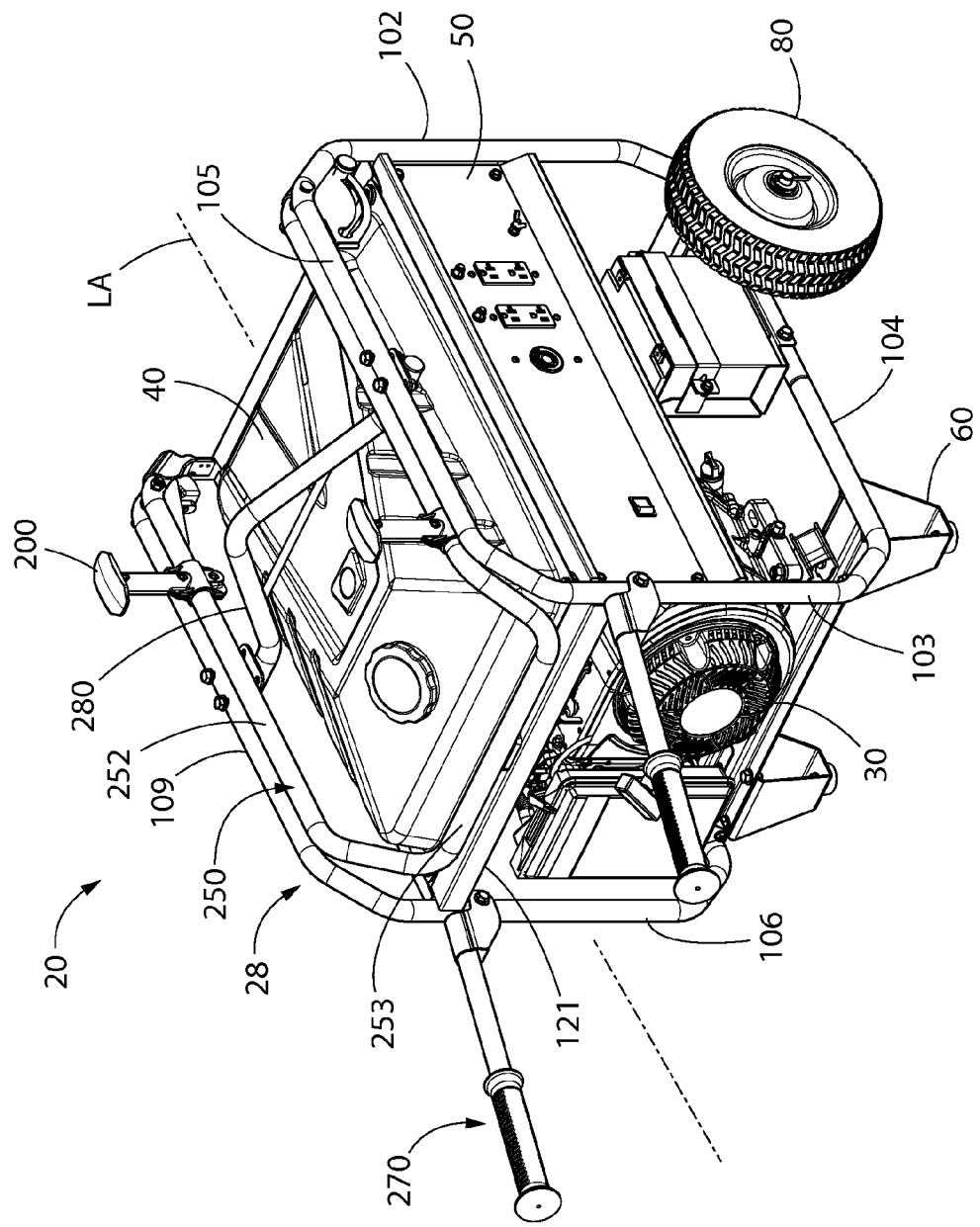
FIGS. 24 and 25 are rear and front perspective views respectively of an alternative configuration of the generator frame, showing a U-shaped pivotable/foldable front handlebar, alternative pivotable/foldable rear handlebars, and a laterally extending lifting bar attached to a top of the generator frame.
Figure 25:
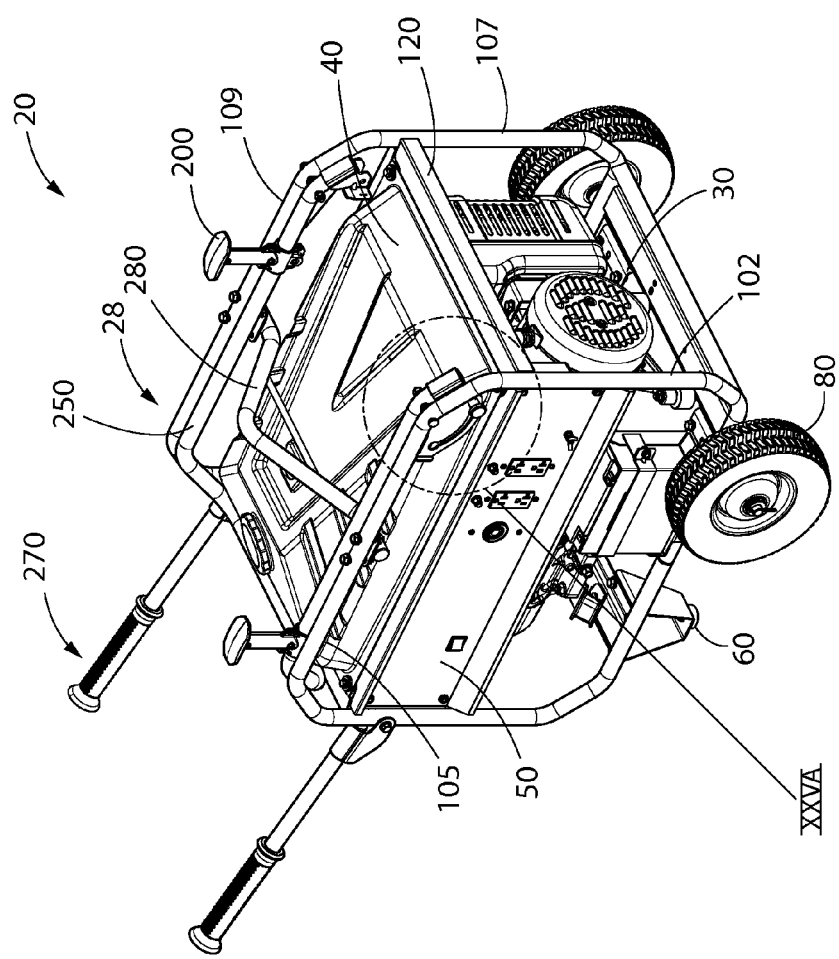
Figure 25A:
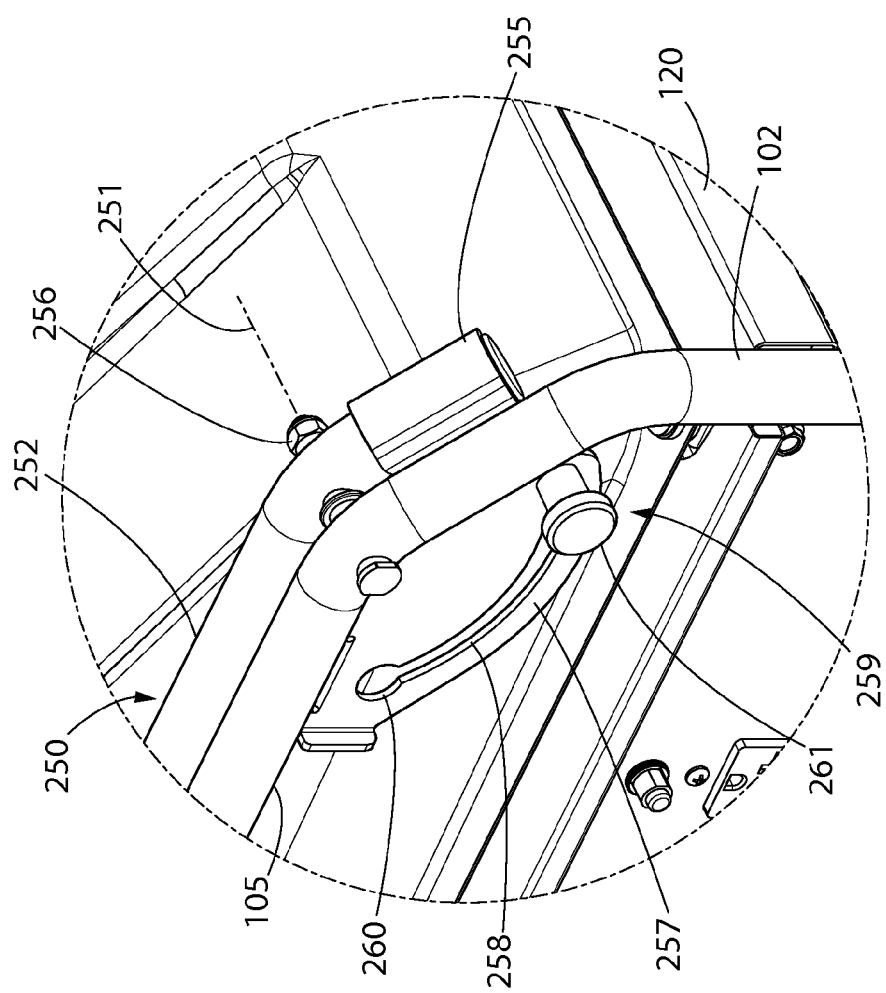
FIG. 25A is a detail from FIG. 25 showing the pivotable front handlebar mounting assembly for a U-shaped handlebar.
Figure 26:
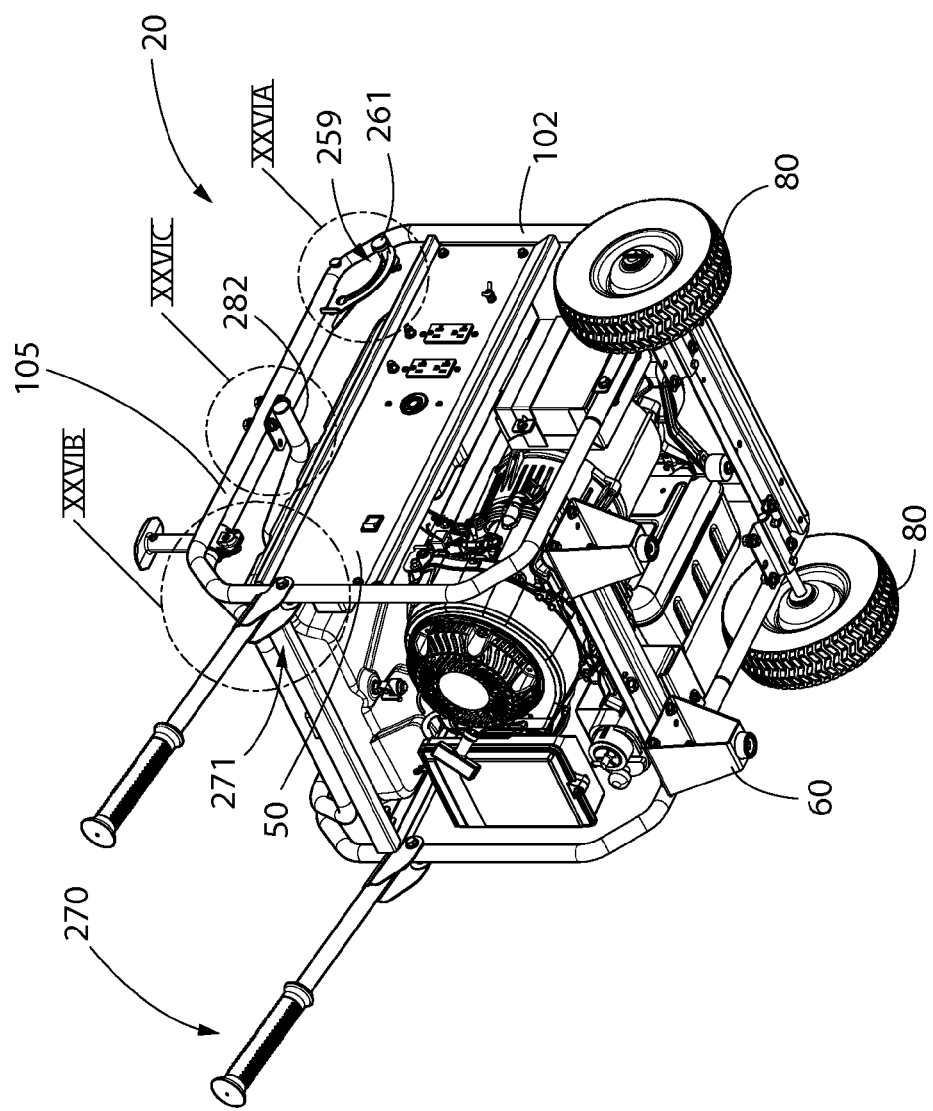
FIG. 26 is a bottom rear perspective view of the alternative generator frame.
Figure 26A:
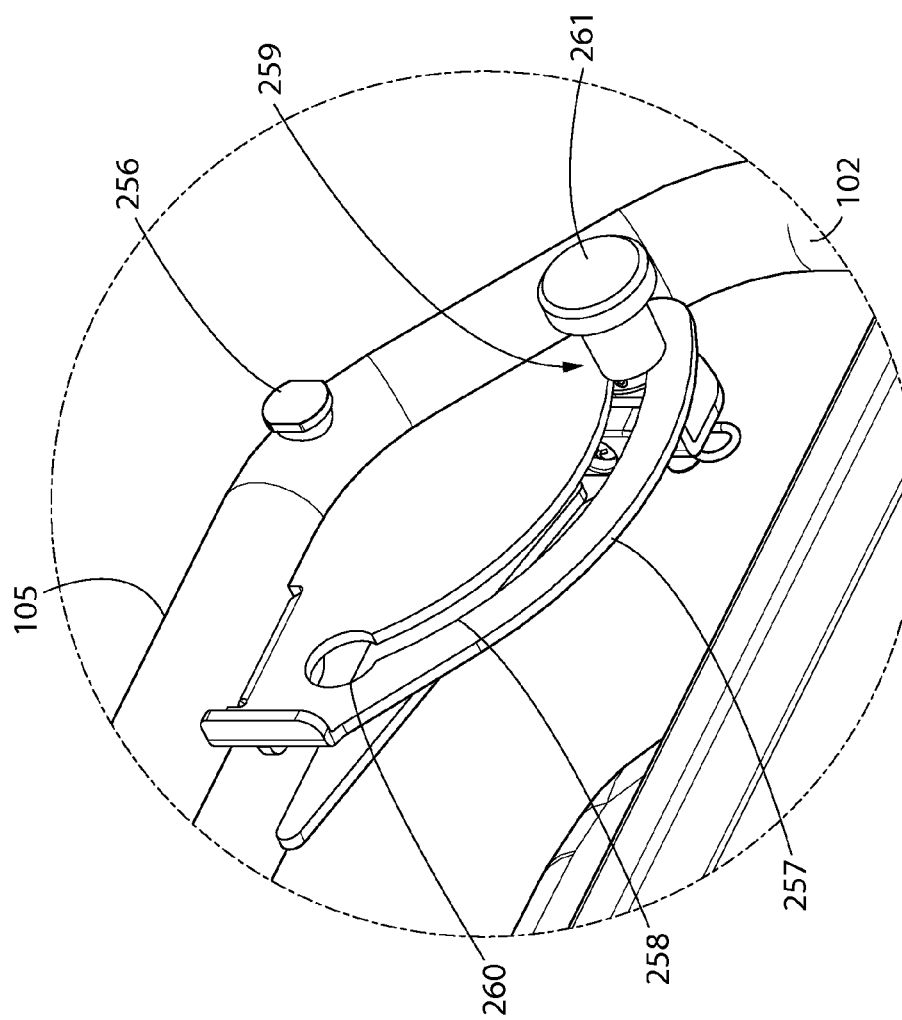
FIG. 26A is a detail from FIG. 26 showing the pivotable front handlebar mounting assembly for the U-shaped handlebar.
Figure 26B:
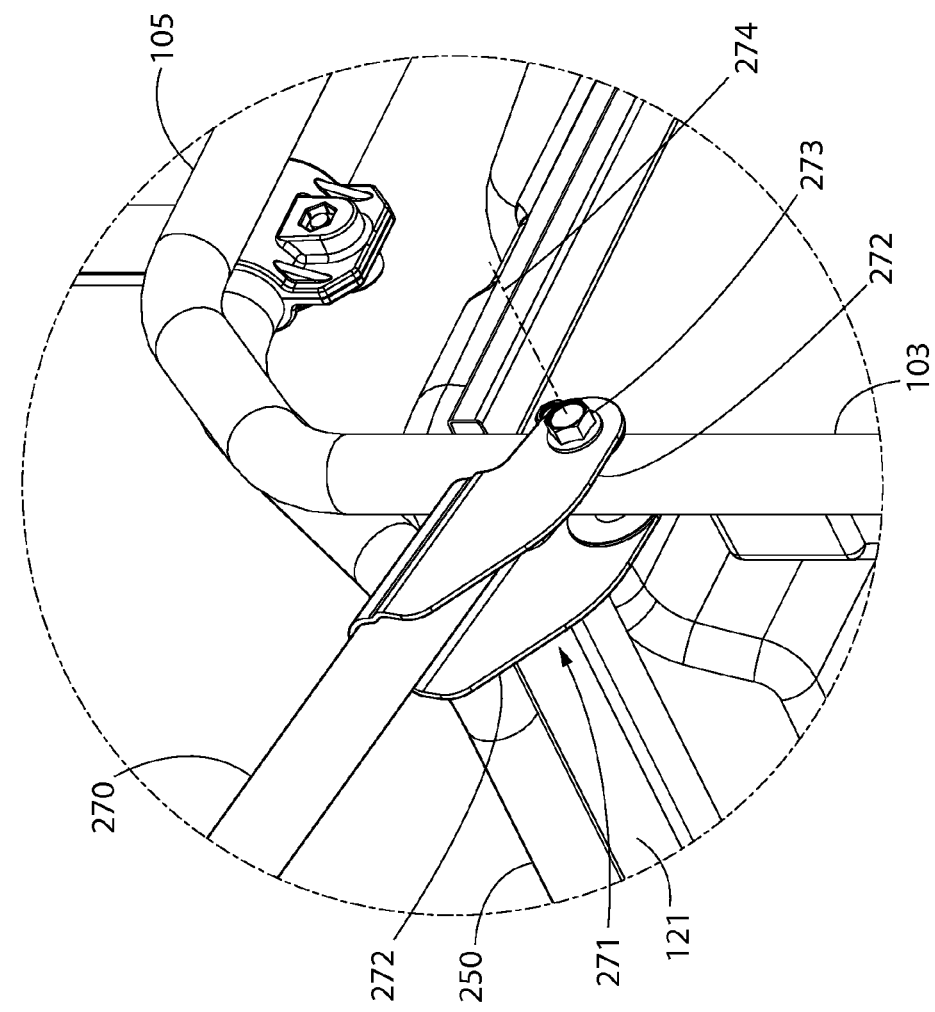
FIG. 26B is a detail from FIG. 26 showing the alternative pivotable rear handlebar mounting assembly.
Figure 26C:
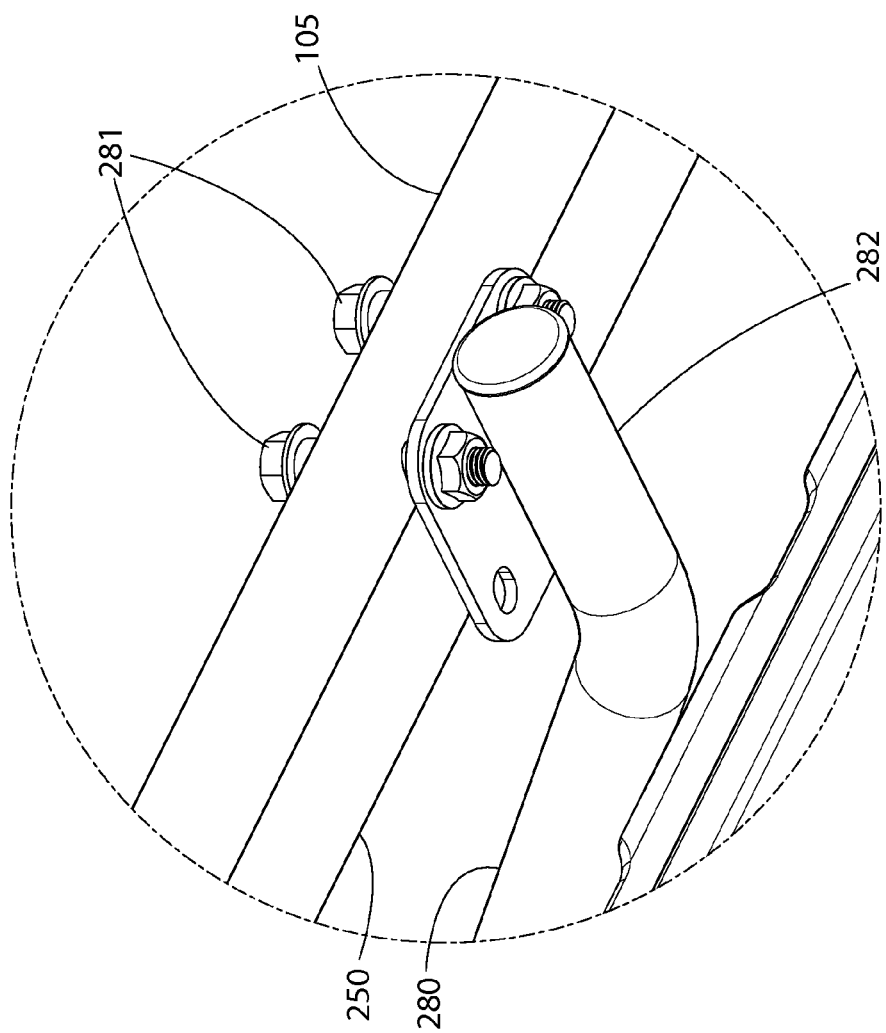
FIG. 26C is a detail from FIG. 26 showing the mounting assembly for the lifting bar attached to the top of the generator frame.
Figure 27:
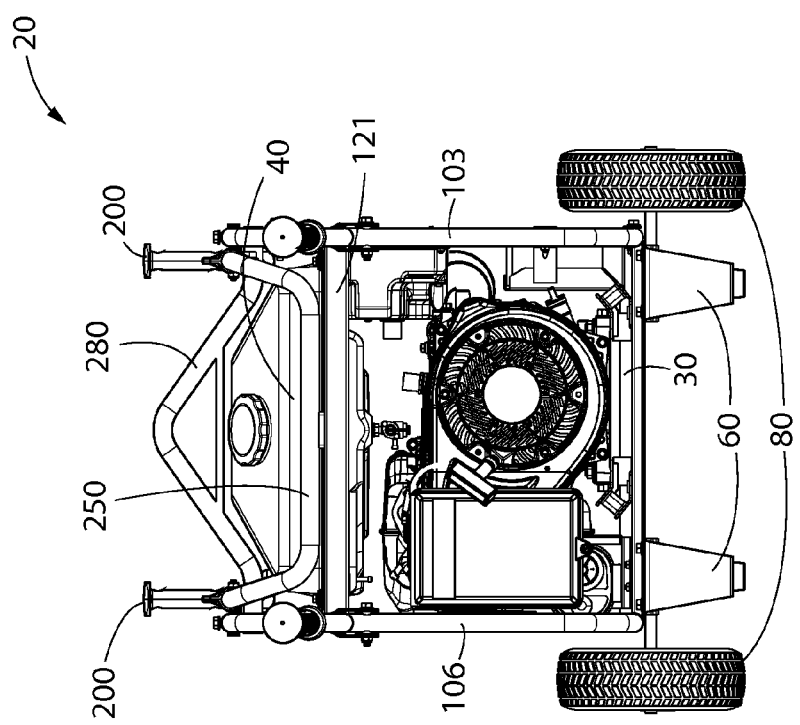
FIGS. 27 and 28 show rear and front elevation views of the alternative generator frame.
Figure 28:
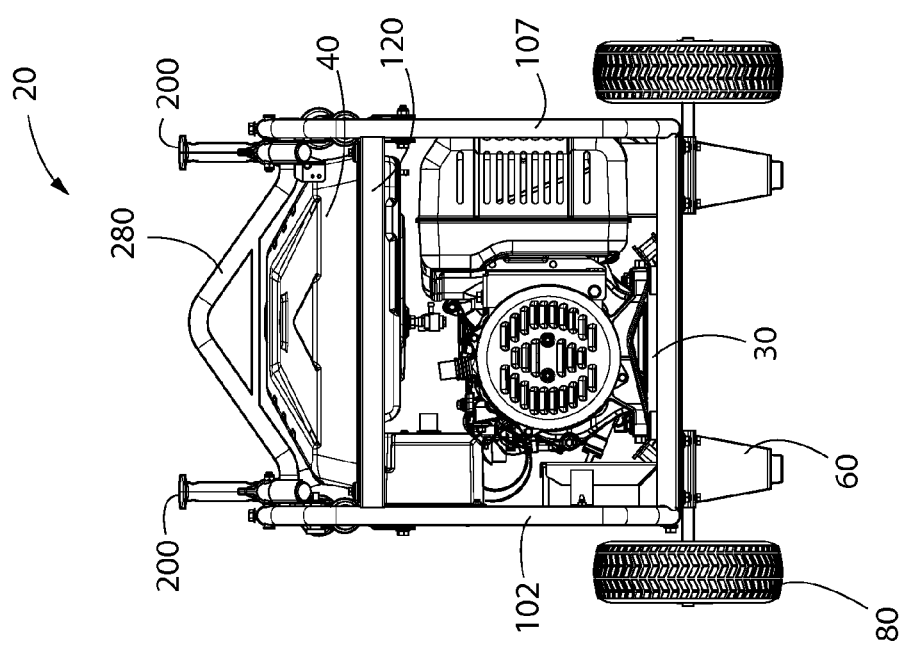

In one system, top horizontal members 105 and 109 may be angled between front vertical members 102, 107 and rear vertical members 103, 106 respectively to complement the shape of fuel tank 40. This may be provided for not only aesthetic reasons, but also to help protect the fuel tank. Accordingly, when seen in side elevation view as in FIGS. 9 and 11, lateral side frames 100 and 101 may have a generally asymmetric shape. In alternative configurations, top horizontal members 105, 109 may have a straight or flat horizontal shape between the front vertical members 102, 107 and rear vertical members 103, 106 as shown for example in FIGS. 24 and 25.

The lateral side frames 100 and 101 may be structurally connected together by a front cross-piece 120 and a rear cross-piece 121 disposed proximate to the top 25 of generator 20. Cross pieces 120, 121 are longitudinally spaced apart along the longitudinal axis LA from front to rear, and extend laterally between the side frames 100, 101 to assist with laterally stiffening the upper portion of frame 28. In one example, the cross-pieces 120, 121 may connected to corner sections 110 of each lateral side frame 100, 101 by any suitable means such as without limitation welding or brazing. It will be appreciated that cross-pieces 120, 121 may be coupled to other portions of each lateral side frame 100, 101 in other examples. The cross-pieces 120, 121 may be arranged substantially parallel to each other and perpendicular to lateral side frames 100, 101. In a certain construction, cross-pieces 120, 121 are tubular in configuration having a round cross-section similar to the lateral side frames 100, 101. However, the cross-pieces 120, 121 are not limited to circular tubular constructions and may have rectilinear tubular cross sectional shapes such as square or rectangular.

To help laterally stiffen the lower portion of frame 28, a pair of longitudinally spaced apart cross-struts 130, 132 may be provided that extend laterally between lateral side frames 100 and 101. In one example, cross-struts 130 may be connected to bottom horizontal members 104 and 108 of the lateral side frames 100, 101. The cross-struts 130, 132 may be arranged substantially parallel to each other and perpendicular to lateral side frames 100, 101. Cross-struts 130, 132 may further be arranged substantially parallel to cross-pieces 120, 121. In one configuration cross-struts 130, 132 may have a different cross-sectional configuration than the cross-pieces 120, 121 such as without limitation rectilinear as further described herein for reasons which will become apparent. Cross-struts 130, 132 may be connected to lateral side frames 100, 101 by any suitable means including welding, brazing, mechanical fasteners, or other methods used in the art.

The frame 28 including lateral side frames 100, 101, cross-pieces 120, 121, cross-struts 130, 132, and some other structural brackets, accessories, or appurtenances attached or coupled to the frame may be made of any suitable material including metal or polymer. In one construction, the frame is made of steel and/or aluminum. Any suitable coating, finish, or topical treatment and texture may be provided.

In some systems, the frame 28 may be configured to provide a common interface configured and arranged to removably and interchangeably mount either legs 60 and/or wheel assemblies 80 to frame 28 for transport and raising the frame 28 above the floor. This provides a floor support system for generator frame 28 that is configurable and customizable to meet the preferences and needs of each user. For example, a user may elect four wheel assemblies 80 (see, e.g. FIG. 19E), four legs 60 (see, e.g. FIG. 19F), or a combination of legs and wheel assemblies mounted on either of the cross-struts 130, 132. As further described herein, both the legs and wheel assemblies have a common mounting arrangement and configuration advantageously allowing either wheel assemblies 80 or legs 60 to be interchangeably used at any of the four mounting locations on the cross-struts.

As shown in FIGS. 13, 16A-B, 22, and 23, cross-struts 130, 132 in one arrangment are configured to provide four mounting locations on frame 28 for structurally supporting and attaching the wheel assemblies 80 or legs 60. In addition, cross-struts 130, 132 may further be configured for mounting and structurally supporting engine-alternator assembly 30-32 of the generator unit and associated appurtenances, as further described elsewhere herein.

Cross-struts 130, 132 may have a non-tubular rectilinear cross-sectional shape. In one configuration, cross-struts 130, 132 may each have the shape of a flanged structural C-channel including a U-shaped central section comprised of an axially extending web 134, pair of legs 133 extending generally downwards and perpendicular from the web, and pair of lateral side flanges 131 extending generally outwards and perpendicular from the legs. Other suitable structural shapes, however, may be used.

Figure 22:
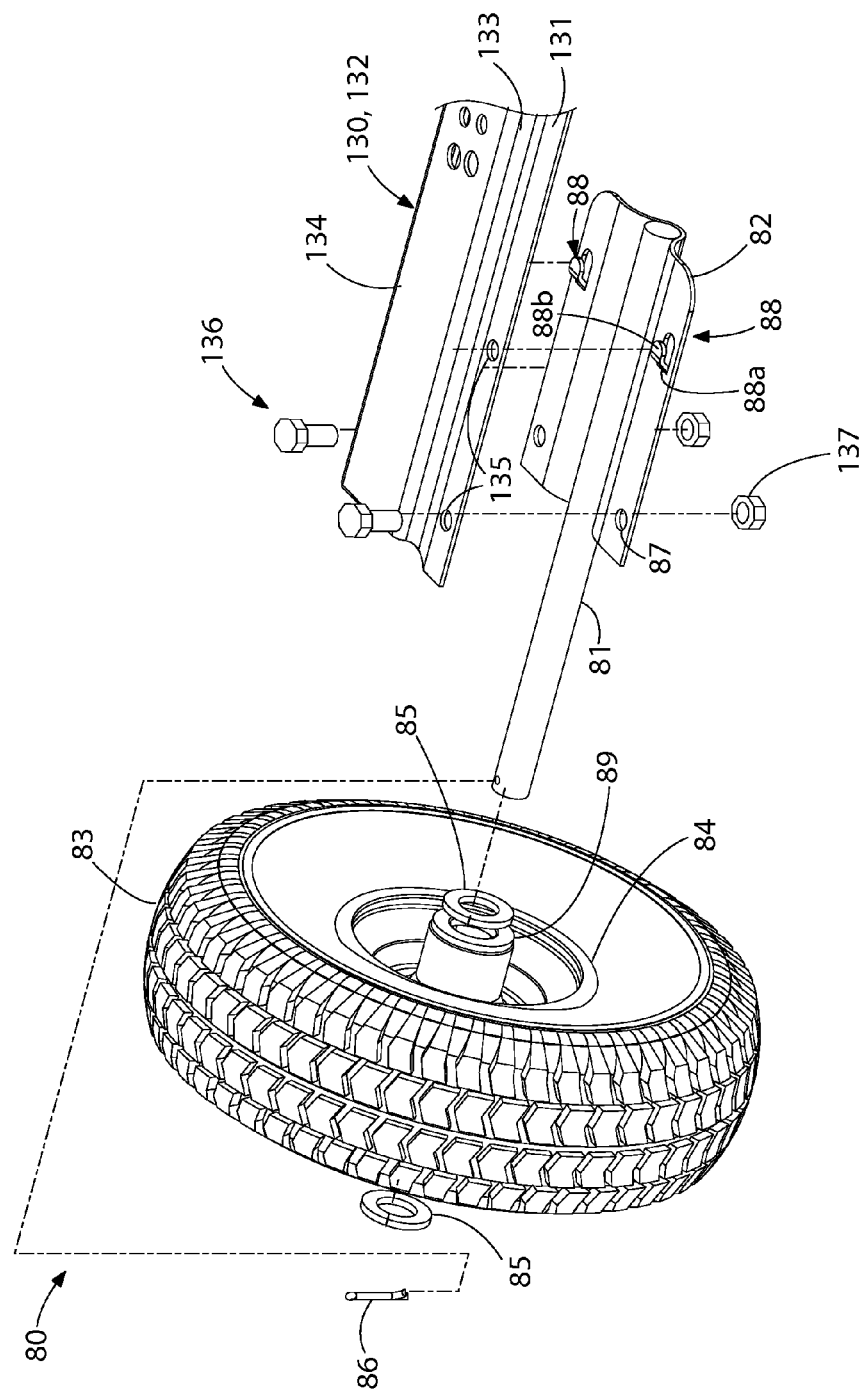
FIG. 22 is an exploded view of the wheel assembly and mounting interface with the frame.
Figure 23:
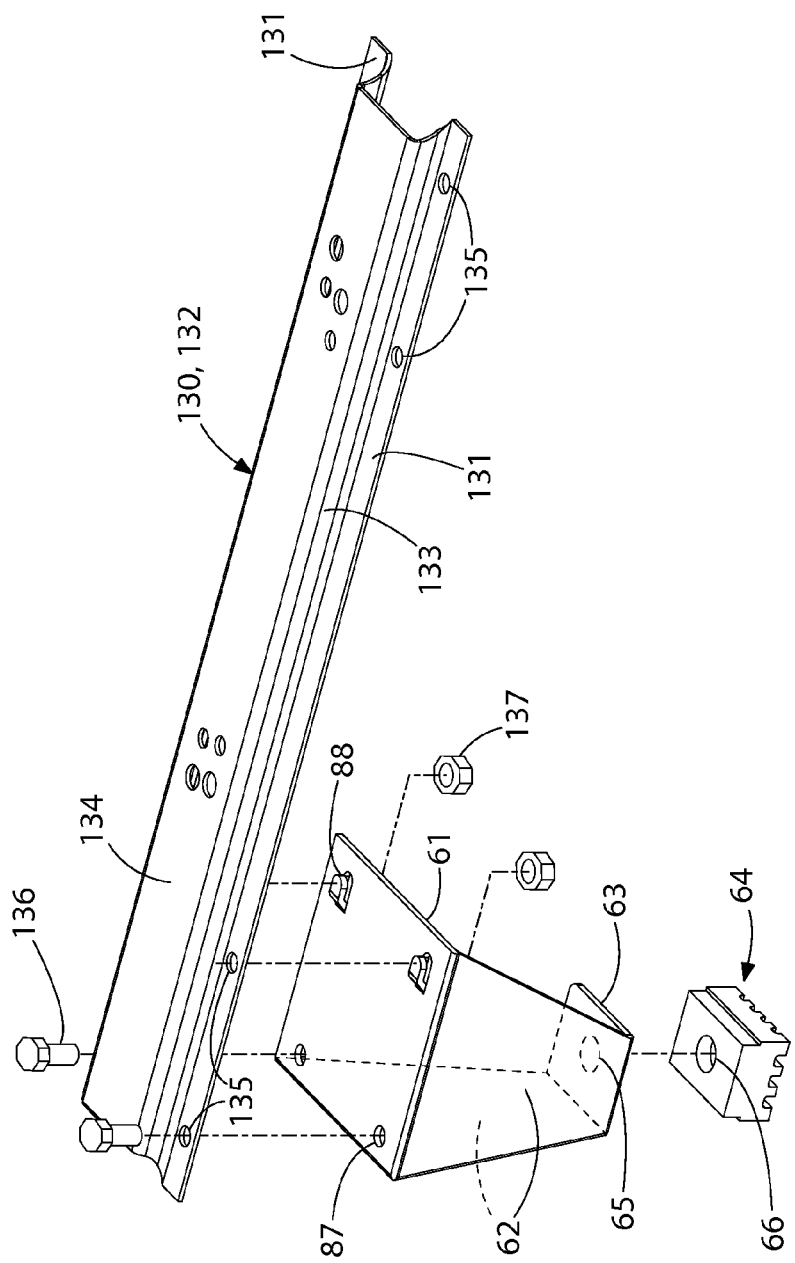
FIG. 23 is an exploded view of the support leg and mounting interface with the frame.

FIG. 22 is a detailed exploded view of a wheel assembly 80 showing the mounting system interface with cross-struts 130, 132. Each wheel assembly 80 includes an axle 81 rigidly attached to a mounting plate 82 such as by welding, brazing, or other suitable means, a tire 83 having a hub 84 and wheel bearing 89 defining a through opening configured to receive a portion of the axle there through, washers 85, and a cotter pin 86. The tire 83 is mounted on one end of the axle 81 and mounting plate 82 is mounted on an opposing end. In one example, as shown, mounting plate 82 may have a central portion that is concavely shaped to complement the convex shape of axle 81.

In one non-limiting exemplary construction, the axle 81 may terminate at or near the mounting plate 82 and does not extend across the lateral width of the frame 28 from side 24 to side 26. Accordingly, each wheel may have its own separate axle 81 rather than an arrangement wherein two tires 83 may be mounted on opposing ends of a common axle. Advantageously, this provides two shorter and structurally more rigid axles 81 which helps prevent breakage rather than using a single long side-to-side axis. This may sometimes occur in instances where the generator 20 may be hoisted and transported via a forklift or other equipment.

With continuing reference to FIG. 22, mounting plate in one configuration includes a pair of mounting holes 87 and a pair of angled mounting tabs 88. Each pair of mounting holes 87 and tabs 88 are spaced apart across axle 81 as shown and arranged such that a mounting tab and hole are disposed on each side of the axle. Mounting tabs 88, which may protrude upwards from the top of mounting plate 82, have a somewhat L-shaped configuration with a substantially vertical leg 88a attached to mounting plate 82 and a substantially horizontal free leg 88b extending at an angle to the vertical leg. Mounting tabs 88 are configured to produce an interlocked relationship with cross-struts 130, 132 when the wheel assemblies are mounted to the frame 28. Accordingly, cross-struts 130, 132 may each include a pair of spaced apart mounting holes 135 configured and arranged to be substantially aligned with mounting holes 87 and mounting tabs 88 when each wheel assembly 80 is aligned with and mounted on the cross-struts. Mounting holes 135 may be preferably located in flange 131 of cross-struts 130, 132. Mounting holes 135 are configured and dimensioned to receive mounting tabs.

To mount a wheel assembly 80 onto frame 28, the mounting plate 82 is first positioned below a cross-strut 130 or 132 with the mounting tabs 88 vertically aligned with their corresponding mounting holes 135 in the cross-strut on each side of the axle 81. It should be noted that the distance between each tab 88 and its respective companion mounting hole 87 on each side of axle 81 in the mounting plate 82 is slightly larger than the distance between each pair of corresponding mounting holes 135 on each flange 131 of cross-struts 130, 132. Accordingly, when the mounting tabs 88 are aligned with their corresponding mounting holes 135 in the cross-strut 130 or 132, the companion mounting hole 87 (i.e. on the same side of axle 81) for each tab will be intentionally slightly offset from and not perfectly concentrically aligned with the remaining mounting hole 135 on the cross-strut, for reasons which will become apparent.

Figure 16A:
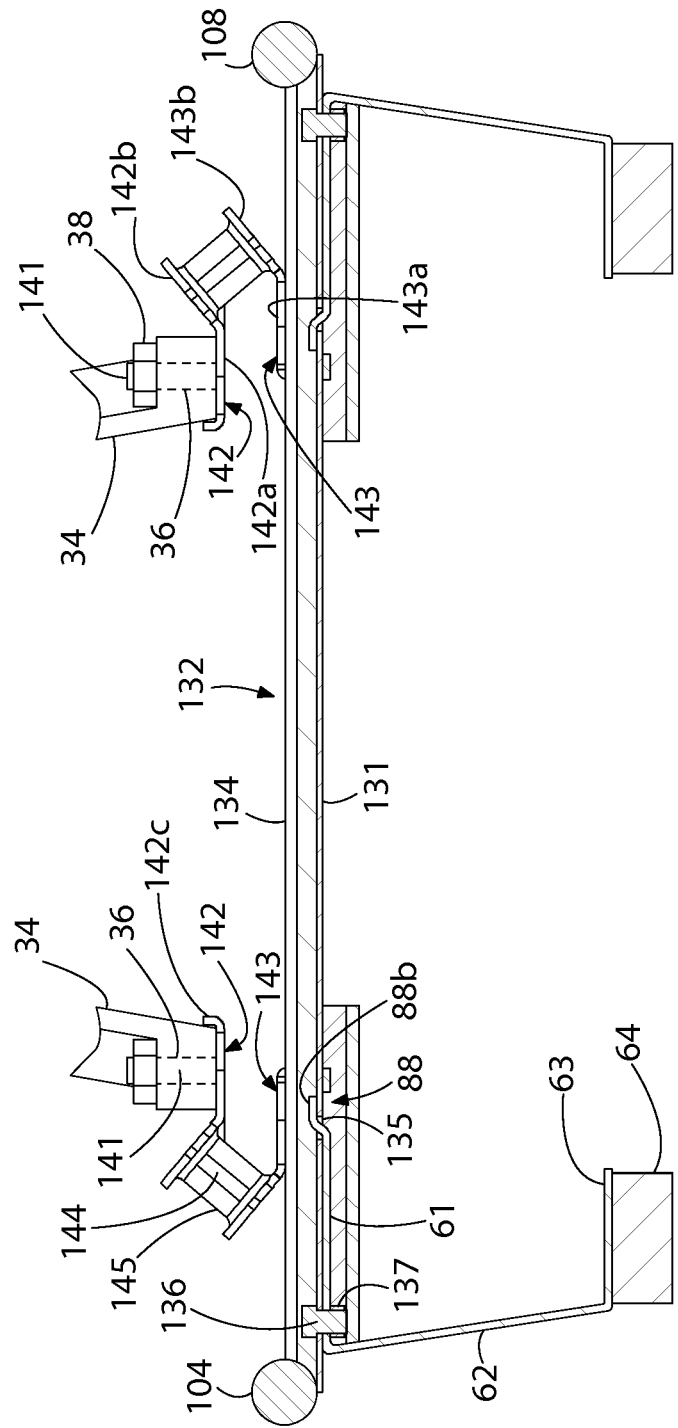
FIG. 16A is a longitudinal cross-sectional view of a support leg assembly and the frame.
Figure 17:
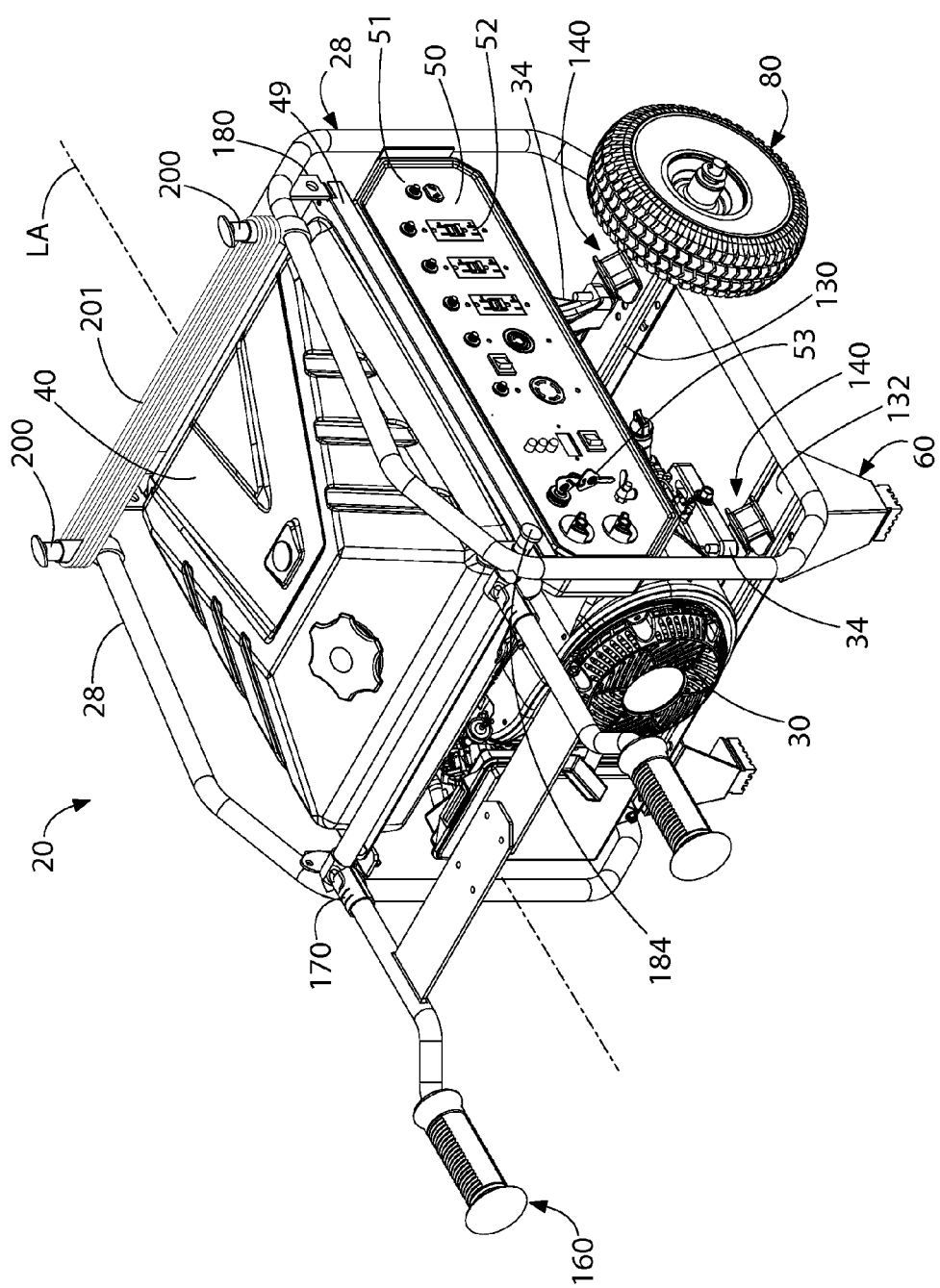
FIGS. 17, 18A, and 18B show a power cord management system and a detail thereof respectively.
Figure 18A:
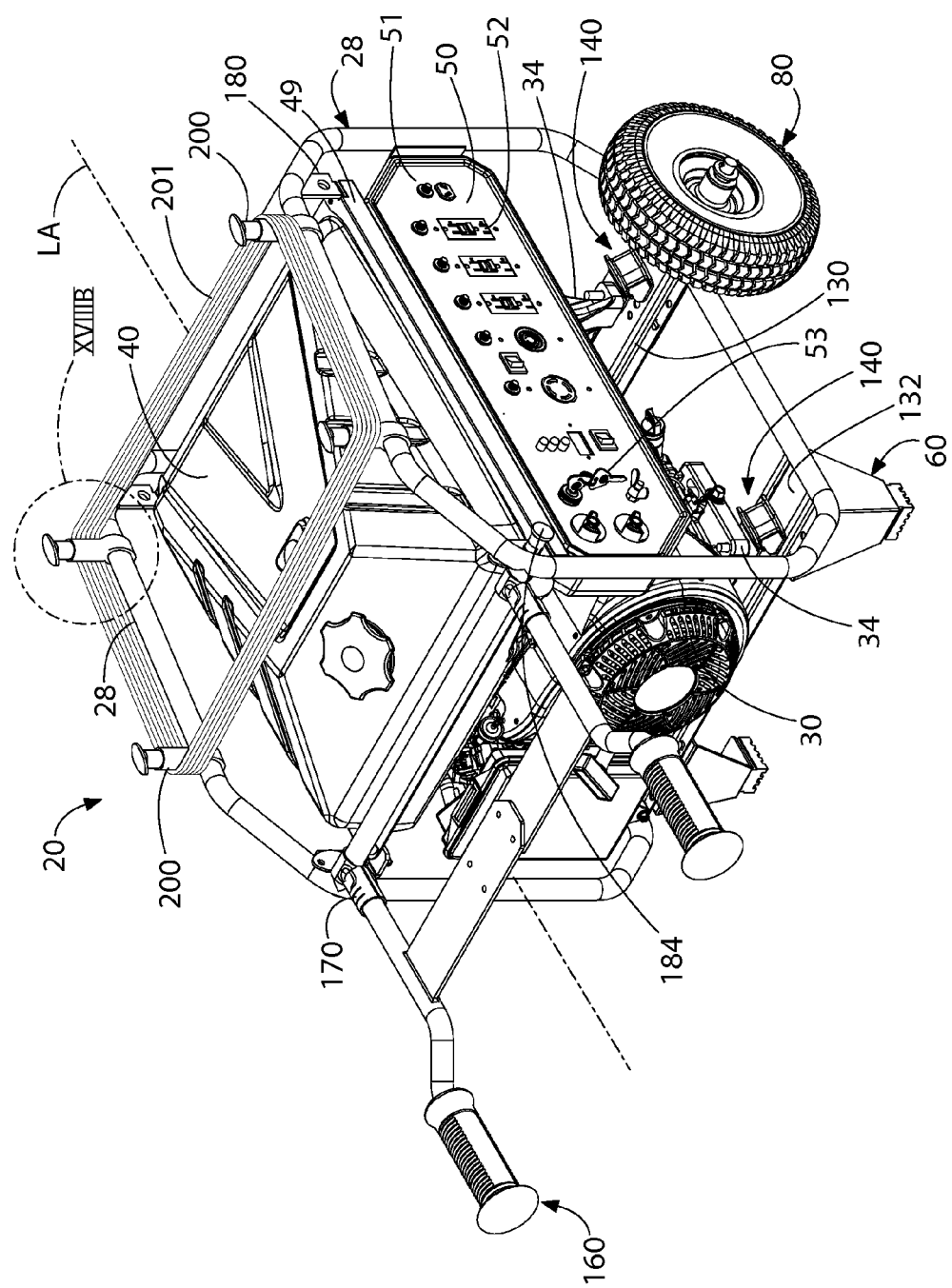
Figure 18B:
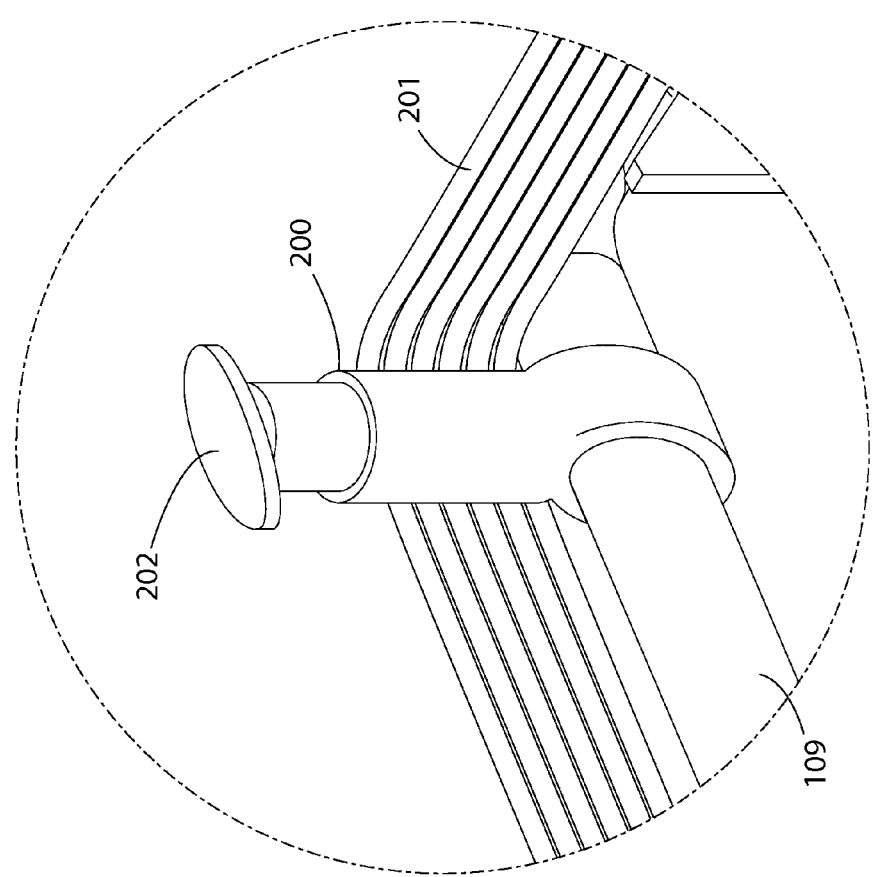

Once the angled mounting tabs 88 are each aligned with their corresponding mounting holes 135, the tabs are inserted upwards through the mounting holes (e.g., the inner mounting holes 135 on cross-strut 130 or 132) to abuttingly contact the top of the mounting plate 82 with the bottom of the cross-struts 130, 132. The mounting plate 82 with attached axle 81 and tire 83 is then slid inwards in an axial direction along the cross-struts 130 or 132 to interlock the mounting tabs 88 with each opposed flange 131 on the cross-strut. This engages each mounting tab 88 with the cross-strut at the holes 135 such that the horizontal leg 88b of the tab slides over the top of flange 131 of the cross-strut thereby trapping the flange in the gap formed below the horizontal leg 88b and top of the mounting plate 82. FIG. 16A shows an analogous arrangement of an angled mounting tab 88 seated with cross-strut 130 or 132.

Upon engaging the angled mounting tabs 88 with the cross-strut 130 or 132, the remaining holes 135 in the cross-strut will now each become concentrically aligned with its corresponding mounting hole 87 in wheel assembly mounting plate 82. A threaded fastener 136 is then inserted through each pair of aligned holes 135, 87 and tightened with a threaded nut 137 to finish securing the wheel assembly 80 to the cross-struts 130 or 132 and frame 28. Each tire 83 is mounted outboard of frame 28 when wheel assembly 80 is mounted on cross-struts 130, 132.

Since the wheel assembly 80 are detachably mounted to frame 28, the foregoing assembly steps are simply reversed to remove the wheel assembly.

Legs 60 in one arrangement may have an identical mounting interface arrangement with frame 28 and cross-struts 130, 132 as wheel assemblies 80 described above. Since the mounting holes 135 in cross-struts 130, 132 are all identical in size, location, and arrangement as part of an interchangeable frame support system, a user may elect to interchangeably mount either wheel assemblies 80 or legs 60 at any of the four mounting locations on cross-struts 130, 132 thereby providing an opportunity for customization.

Each support leg 60 may be formed of angled metal plate which is bent and/or welded or brazed together. In one construction, the leg may be steel or aluminum. Legs 60 may have any suitable configuration, but preferably should be shaped and constructed with sufficient strength and stiffness to support the generator 20. In one configuration, leg 60 includes a substantially flat top mounting plate 61 which is oriented horizontally, two side plates 62 disposed at about 90 degrees to each other and attached to plate 61, and a flat bottom plate 63 attached to side plates 62. Plates 61 and 63 may be substantially parallel to each other. Side plates 62 may taper inwards from top to bottom to provide a wide support platform at top for engaging cross-struts 130, 132, and a narrower footprint at bottom for engaging the floor or other horizontal support surface.

In one construction, a pad 64 may be attached to leg 60 at bottom plate 63 and formed of a resilient material such as rubber or another elastomeric material to provide surface grip and vibration dampening. Holes 65 and 66 may be provided in bottom plate 63 and pad 64 respectively in some examples to receive a mounting fastener there through (not shown). Pad 64 engages the mounting floor or other surface on which the generator 20 will be located.

With continuing reference to the foregoing figures, legs 60 include angled mounting tabs 88 and mounting holes 87 which are configured, dimensioned, and arranged no mounting plate 61 to have the same spatial relationship as in mounting plate 82 of wheel assembly 80 as already described herein. This permits the legs 60 to be interchangeable with wheel assemblies 80.

Legs 60 are mounted to cross-struts 130, 132 in the same manner as wheel assemblies 80 described above; the mounting process not being repeated herein for sake of brevity. FIGS. 16A and 16B show legs 60 fully mounted and fastened to cross-struts 130, 132. Locking tab 88 appears protruding upwards through and above flange 131 of the cross-struts in the interlocked position.

In some systems, the frame 28 may be configured to provide a universal engine mount system that allows engines 30 having different characteristics to be interchangeably mounted to a single configuration and size generator frame. The different engine characteristics may include, without limitation, electrical output capacity (e.g. measure in Watts or KW), engine type (e.g. two-stroke, four-stroke), fuel type (e.g. gasoline, diesel), auxiliary equipment, and others. In one exemplary arrangement, without limitation, a common engine mount arrangement is provided which includes four frame engine mounts 140 fixedly attached to cross-struts 130, 132. A pair of laterally spaced apart engine mounts 140 are mounted on each of the cross-struts 130, 132. The engine mounts 140 are preferably each configured and arranged identically to provide a common interface with four mating commonly configured and arranged engine mount brackets 34 (see, e.g. FIGS. 1-7 and 16A) that are provided on a plurality of engines 30 having at least one different engine characteristic. Preferably, without limitation, the spatial relationship between the engine mount brackets 34 are common to each of the plurality of different engines 30 to allow interchangeable use of the engines with a single frame 28 setup.

FIG. 16A shows the frame engine mounts 140 and engine mount brackets 34 in greater detail. Each frame engine mount 140 includes a top plate such as angled top plate 142 configured for engaging an engine mount bracket 34 on the engine 30 and a bottom plate such as an angled bottom plate 143 configured for attachment to cross-struts 130, 132. Top plate 142 includes a substantially horizontal flat section 142a and a conjoined angled flat section 142b disposed at an angle to the horizontal section. The horizontal top section 142a may include an upward turned lip 142c to assist with placing and locating the engine mount bracket 34 on top plate 142.

Bottom plate 143 of frame engine mount 140 may have a similar configuration as top plate 142 as shown in FIG. 16A having a horizontal flat section 143a and angled flat section 143b. Bottom plate 143 may be spaced vertically below the top plate 142 in one arrangement. The horizontal section 143a of bottom plate 143 may be attached to cross-struts 130, 132 while the angled section 143b is free and projects upwards from the cross-strut at an angle thereto as shown. In one construction, without limitation, top plate 142 and bottom plate 143 may each be made from a single metal plate that is bent to shape to produce the horizontal and angled sections.

With continuing reference to FIG. 16A, the top plate 142 may be connected to bottom plate 143 by a connecting rod 144 extending between the angled sections of each plate 142 and 143. In one arrangement, only the connecting rod 144 supports the top plate 142 from the mounting plate 143 and cross-struts 130, 132 in turn. This arrangement advantageously provides a flexible mount which assists with dampening engine vibrations transmitted between the engine and frame 28. A motor mount bushing or spacer 145, which in some constructions can be metal, may be mounted around rod 144 between top and bottom plates 142, 143 for additional support.

Figure 13:
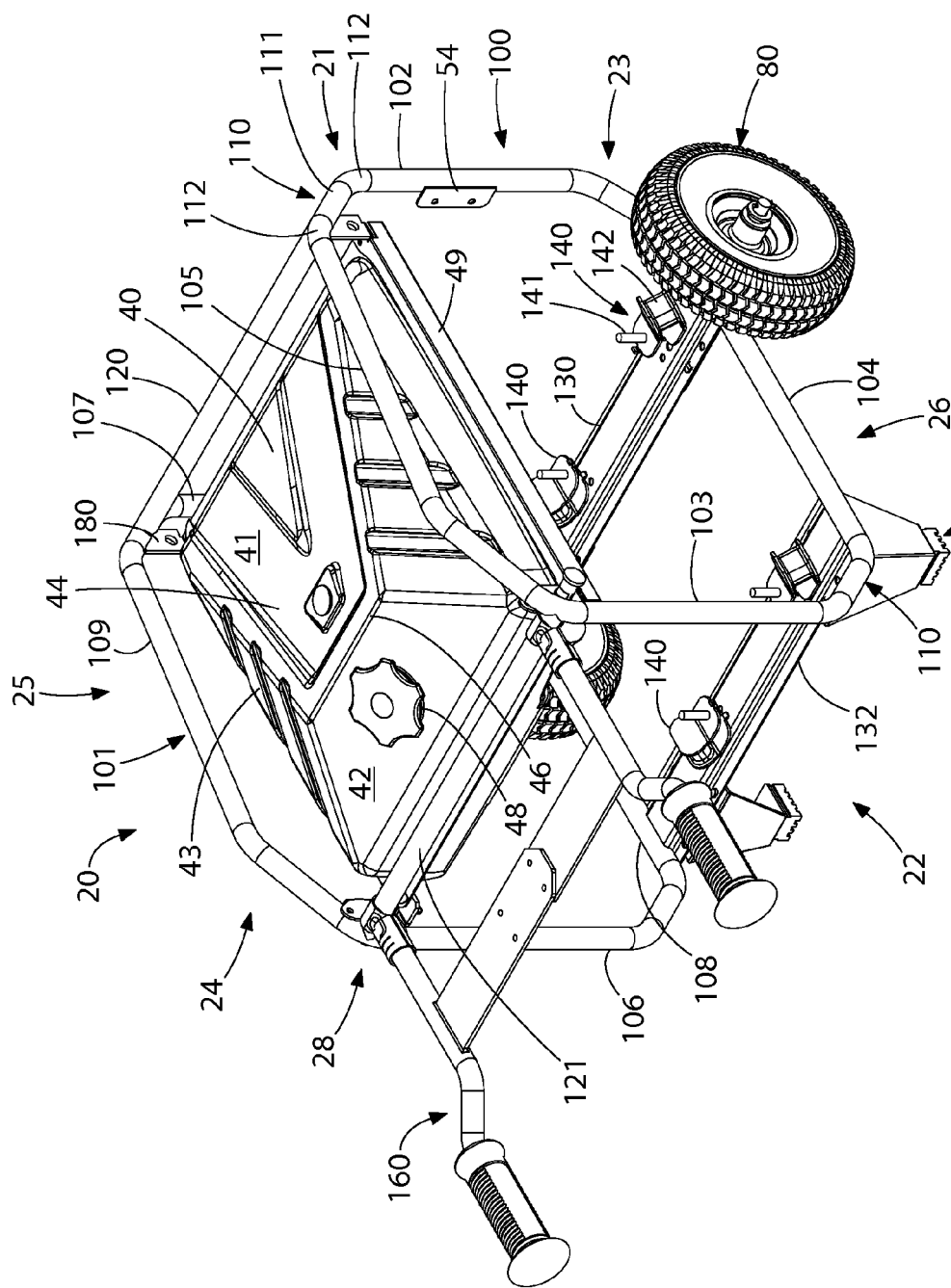

Referring to FIG. 13 and particularly 16A, frame engine mounts 140 may be pedestal-style engine mounts and include a threaded stud bolt 141 projecting upwards from top plate 142 of the engine mount. Stud bolt 141 is configured and dimensioned for insertion through a mating mounting hole 36 provided in engine mount bracket 34. Stud bolt 141 may be vertically oriented in some examples as shown, or be disposed at an angle with respect to vertical. The orientation of stud bolt 141 will depend on the corresponding orientation of the mounting hole 36 in the engine mount brackets 34 and is not limited to any particular orientation or arrangement so long as the engine 30 may be securely mounted to the frame engine mounts 140.

After the engine mount brackets 34 is slipped over the bolt 141, a threaded nut is used to securely fasten the bracket to the top plate 142. This process is repeated at all four motor mounting locations on frame 28 to complete installation of the engine 30 on the frame. In some constructions, to further provide additional engine vibration dampening and isolation, a resilient spring or bushing 145 (not shown) such as without limitation rubber or an elastomer may optionally be mounted between the top plate 142 and engine mount bracket 34 around rod 144. Such engine vibration dampening devices are well known in the art without further elaboration.

It will be appreciated that engine mount bracket 34 may have numerous suitable configurations so long as the bracket structure includes a mounting hole 36 for receiving the engine mount stud bolts 141 on the frame 28. Similarly, frame engine mounts 140 may have other suitable configurations. Accordingly, the systems are not limited by the exemplary engine mount brackets 34 or frame engine mounts 140 disclosed herein.

The frame 28 may be configured to provide a handlebar mounting system that is configurable and customizable to meet the preferences and needs of each user. For example, a user may elect a single handlebar 160 mounted horizontally to frame 28 in a wheelbarrow-type arrangement (see, e.g. FIG. 19A), two horizontally mounted handlebars 160 (see, e.g. FIG. 19D), a single handlebar 160 mounted vertically to frame 28 in a hand truck type arrangement (see, e.g. FIG. 19C), or any combination thereof. As further described herein, the frame 28 and handlebar 160 are cooperative configured with an interface that provides both horizontal and vertical mounting options and multiple simultaneous handlebar mounting arrangements.

The handlebar 160 may include a first handle assembly 161 (e.g. left in referenced figures) and second handle assembly 162 (e.g. right in referenced figures) joined together by a laterally extending and elongated tie piece such as without limitation tie bar 166. Tie bar 166 is preferably rigid in construction and have any suitable configuration such as a substantially flat bar as shown, tubular, and others. Preferably, the tie bar 166 is made metal such as without limitation steel or aluminum. Other suitable metals or other materials may be used to provide the intended structural functionality. Tie bar 166 is fixedly attached to the handle assemblies 161, 162 such as by welding, brazing, or mechanical means to provide a stiff connection between the handle assemblies. In some configurations, tie bar 166 may be provided such as when each handle assembly 161 or 162 have sufficient lateral stiffness to avoid undue deflection and movement.

Each handle assembly 161, 162 includes an elongated handle 163 having a proximal grasping end 164 and opposing distal mounting end 165 for connection to generator frame 28. In one construction, handle 163 may be tubular having a generally round cross-section. However, other suitable configurations and cross-sectional shapes may be used such as handles having a rectilinear cross-sectional shape, solid round bars, etc. Preferably, handle 163 is constructed of a material having sufficient strength and thickness to allow a user to lift the generator 20 without bending or deforming the handlebar. In one example, handle 163 is preferably made of metal such as without limitation steel or aluminum. Other suitable metals or other materials may be used to provide the intended functionality.

Figure 20A:
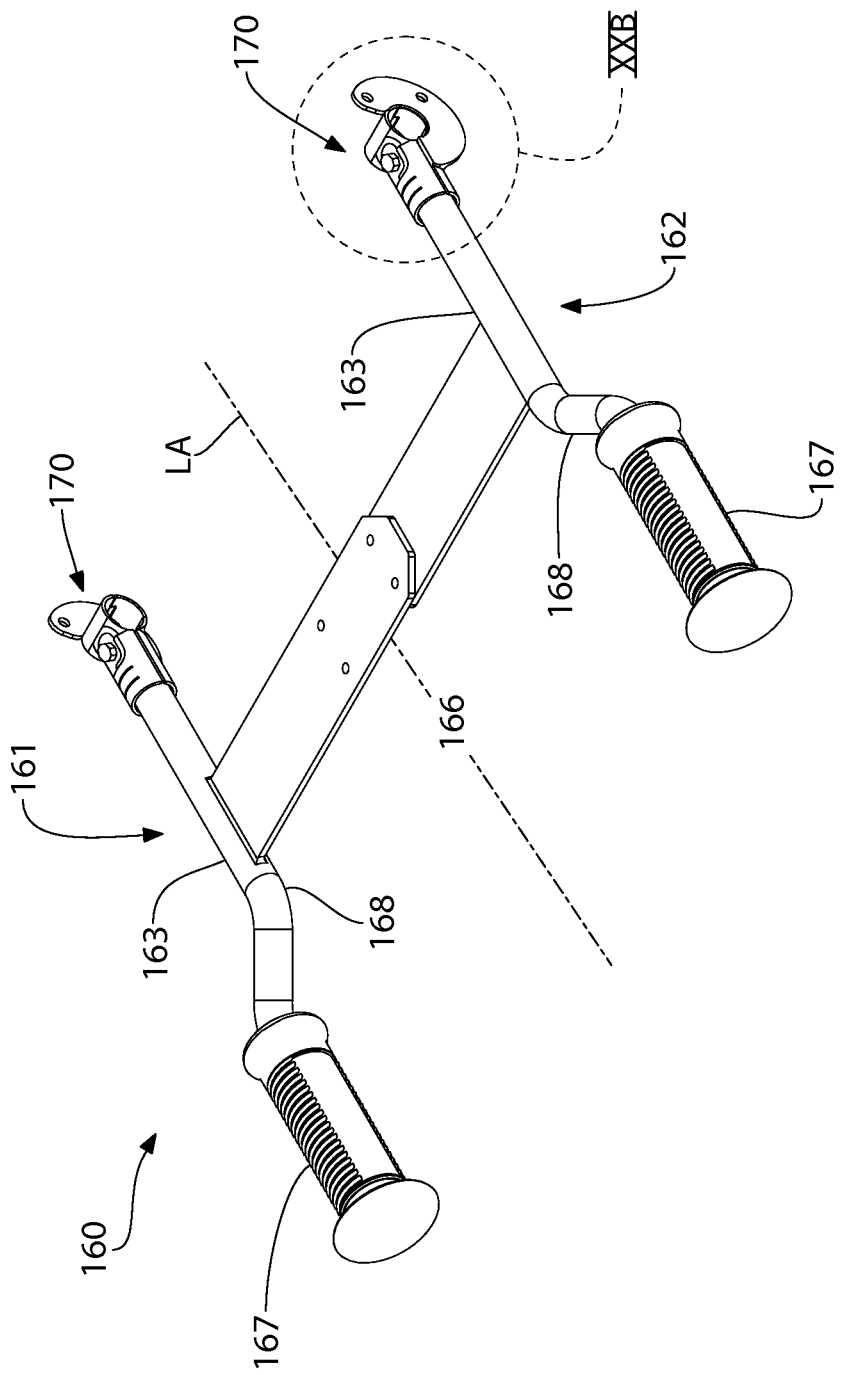
FIG. 20A is a perspective view of the handlebar assembly mountable to the frame.
Figure 21:
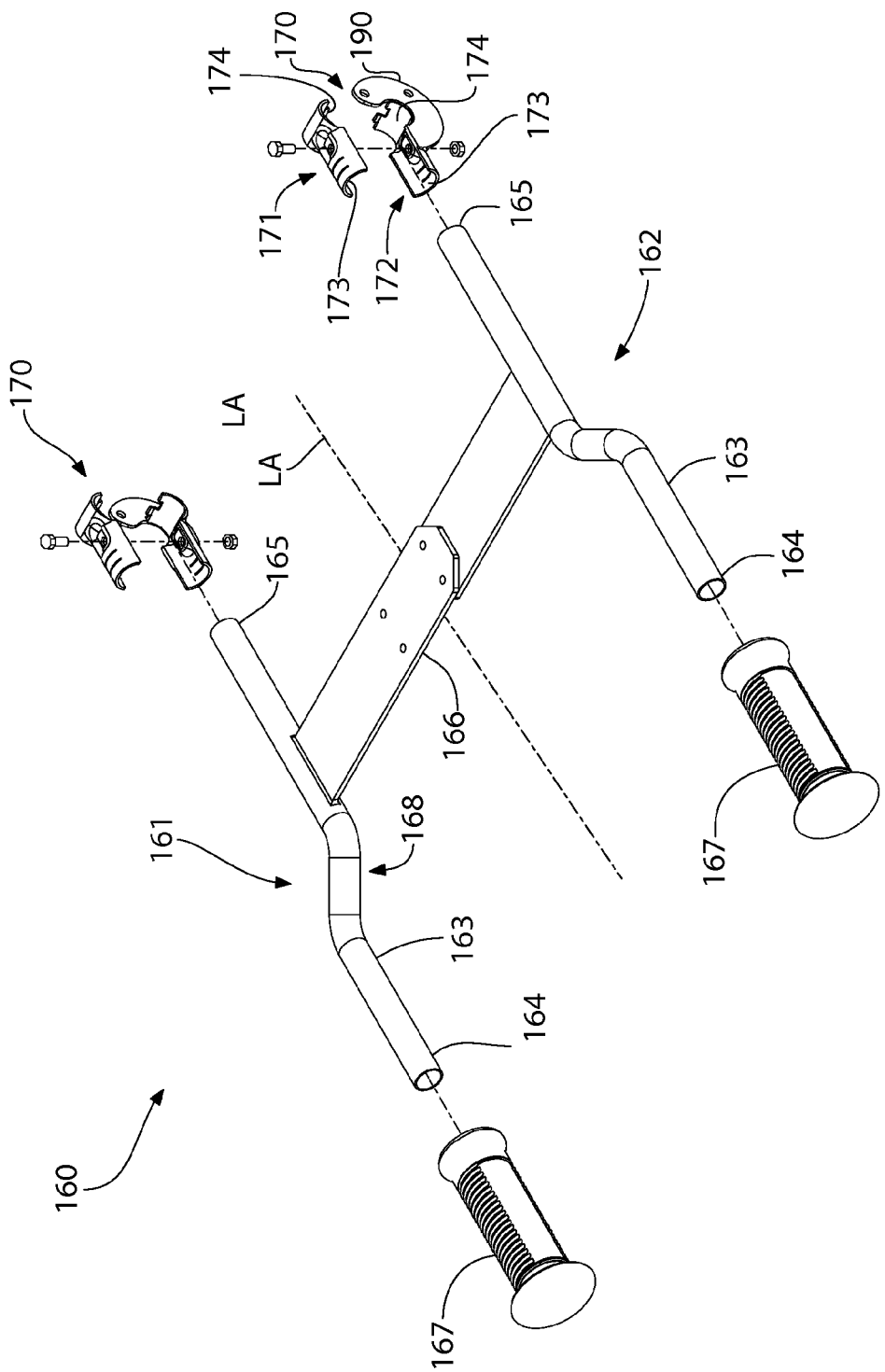
FIG. 21 is an exploded view of the handlebar assembly of FIG. 20A.

In some configurations, handle 163 may include an angled section 168 to produce an axial offset between the grasping and mounting ends 164, 165 as shown in FIGS. 20A and 21. This provides wider lateral spacing between the grasping ends 164 of the handle for a user. In other examples, handle 163 may be substantially straight between grasping and mounting ends 164, 165.

A grip 167 may be mounted on grasping end 164 of handle 163 to provide a comfortable grasping surface for a user. Grip 167 may have any suitable ergonomic configuration and be made of any type material including resilient polymeric materials to facilitate gripping. The surface of the grip 167 may be textured and/or include features such as ribbing, stippling, nubs, etc. to further facilitate comfort and grip.

Referring to FIGS. 14B, 19B, 20A, 20B, and 21, mounting end 165 of handle 163 is configured to engage a clamp 170 mutually configured with and operable for attachment to generator frame 28. In one example, clamp 170 may be horizontally spilt collar including a top half section 171 and bottom half section 172. In one example, each half section has a half-tubular concave surface 173 with an arcuate curvature oriented transverse to longitudinal axis LA and a half-tubular concave surface 174 with an arcuate curvature oriented parallel to the longitudinal axis LA. The top and bottom half sections 171, 172 together form a first split collar aligned with handle 163 which includes concave surfaces 173 and a second split collar aligned with a front or rear cross-piece 120, 121 which includes concave surfaces 174; the second collar being oriented perpendicular to the first split collar.

When the two half sections 171 and 172 are joined together, both concave surfaces 173 collectively define a tubular shape that defines a circular rear facing opening 175 or socket which is configured and dimensioned for receiving mounting end 165 of a handle 163. When the two half sections 171 and 172 are joined together, both concave surfaces 174 collectively define a tubular shape that defines a circular laterally facing opening 174 or socket (e.g. left or right) which is configured and dimensioned for receiving a portion of front cross-piece 120 or a rear cross-piece 121 of frame 28. The rear and lateral facing openings or sockets may have other configurations to match and receive handles or frames having other non-circular cross sectional shapes.

Referring again to FIGS. 14B and 20B, top and bottom half sections 171, 172 of clamp 170 may be removably connected together in one example by any suitable means. A threaded fastener 169a (e.g. bolt/screw) and mating nut 169b may be used as a non-limiting example. To facilitate aligning the top and bottom half sections 171, 172 for assembly, a tab 182 and slot 183 may be provided on each half section which fit together and interlock when the half sections are joined. It will be apparent that the tab 182 and slot 183 will alternate in relative position on the top and bottom half sections 171, 172 for insertion of a tab in a slot and vice-versa. In one example, as shown in the referenced figures, the tab 182 and slot 183 may be formed in a peripheral edge portion of concave surfaces 174 closest to frame front cross-piece 120 or rear cross-piece 121. Other suitable arrangements are possible.

Figure 14B:
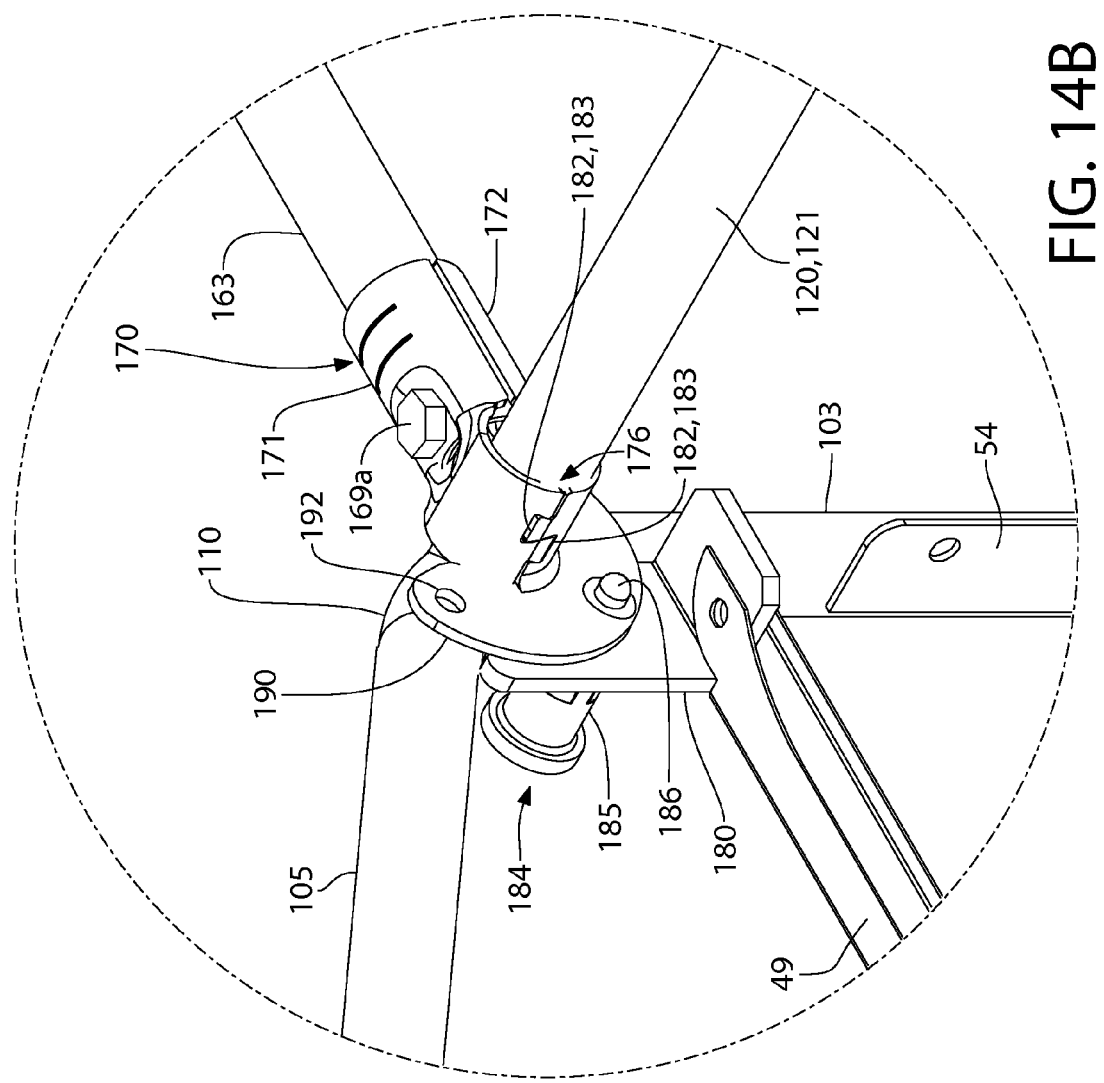
FIG. 14B is a detail of the frame with handlebar attachment taken from FIG. 14A.
Figure 15:
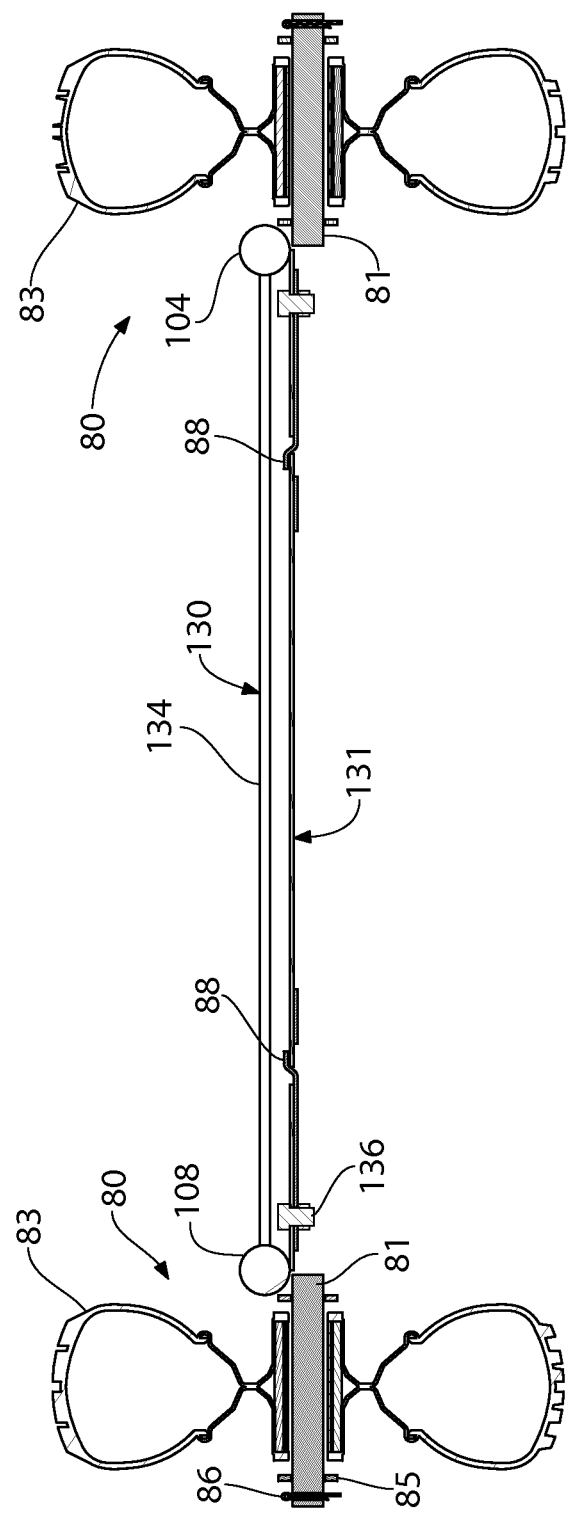
FIG. 15 is a cross-sectional view of a wheel assembly and the frame.

Referring to FIGS. 14B and 20B, bottom half section 172 may include a positioning flange 190 including two arcuately spaced apart holes 191 and 192. Holes 191 and 192 are preferably separated by an arc distance of 90 degrees apart. In one configuration, the positioning flange 190 forms a segment of or partial annularly shaped flange that extends around and is disposed at one end of concave surface 174 on the bottom half section 172 as shown. The flange 190 forms a substantially flat arcuate surface 193 which faces outwards towards on or the other of lateral side frames 100, 101. Flange 190 is rotatable in relation to and about front cross-piece 120 or a rear cross-piece 121 by rotating the handlebar 160. It should be noted that in other configurations, positioning flange may alternatively be formed on top half section 171. Either arrangement is suitable.

Figure 19A:
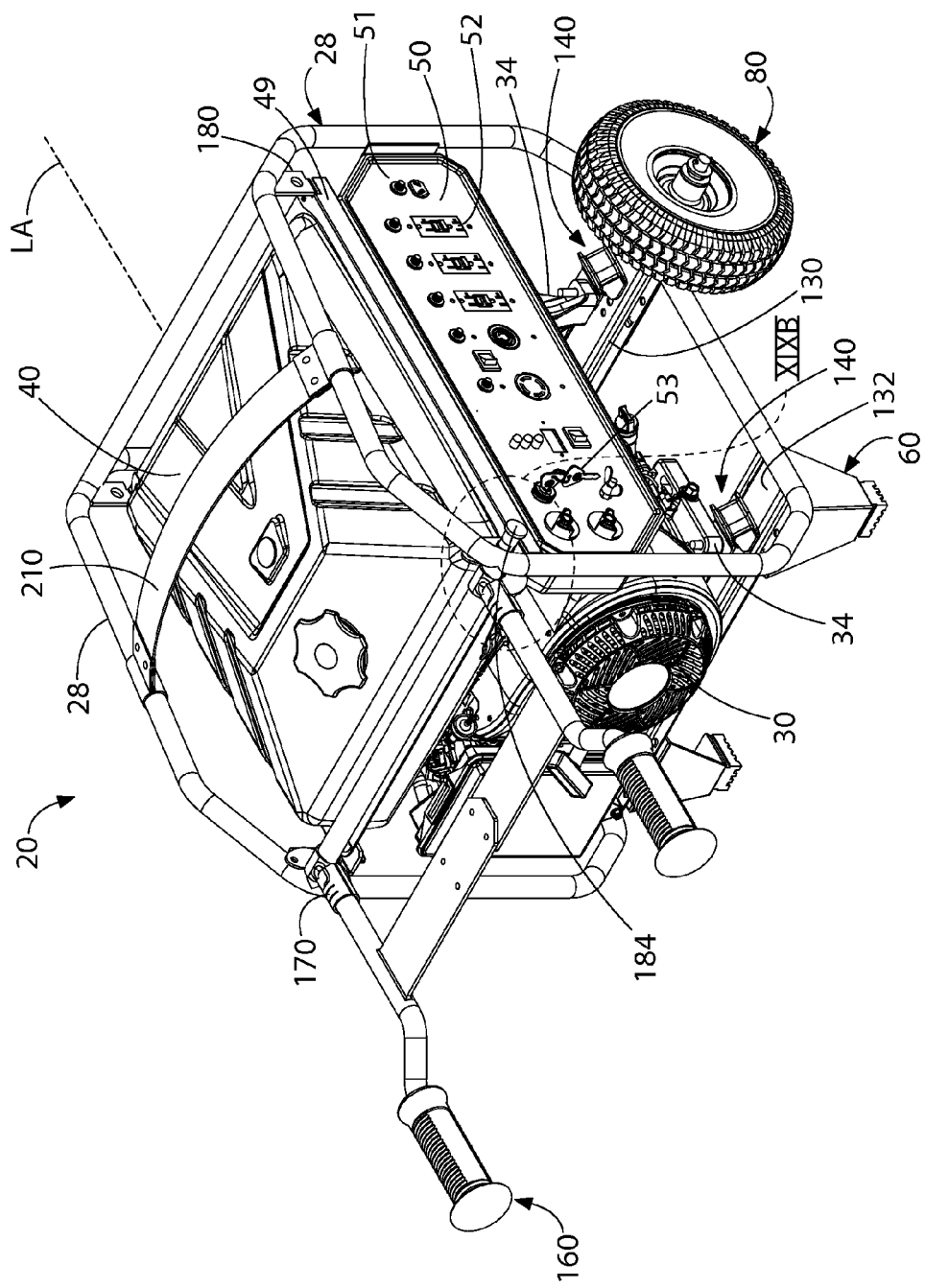
FIG. 19A shows a lifting member for transporting the generator.
Figure 19B:
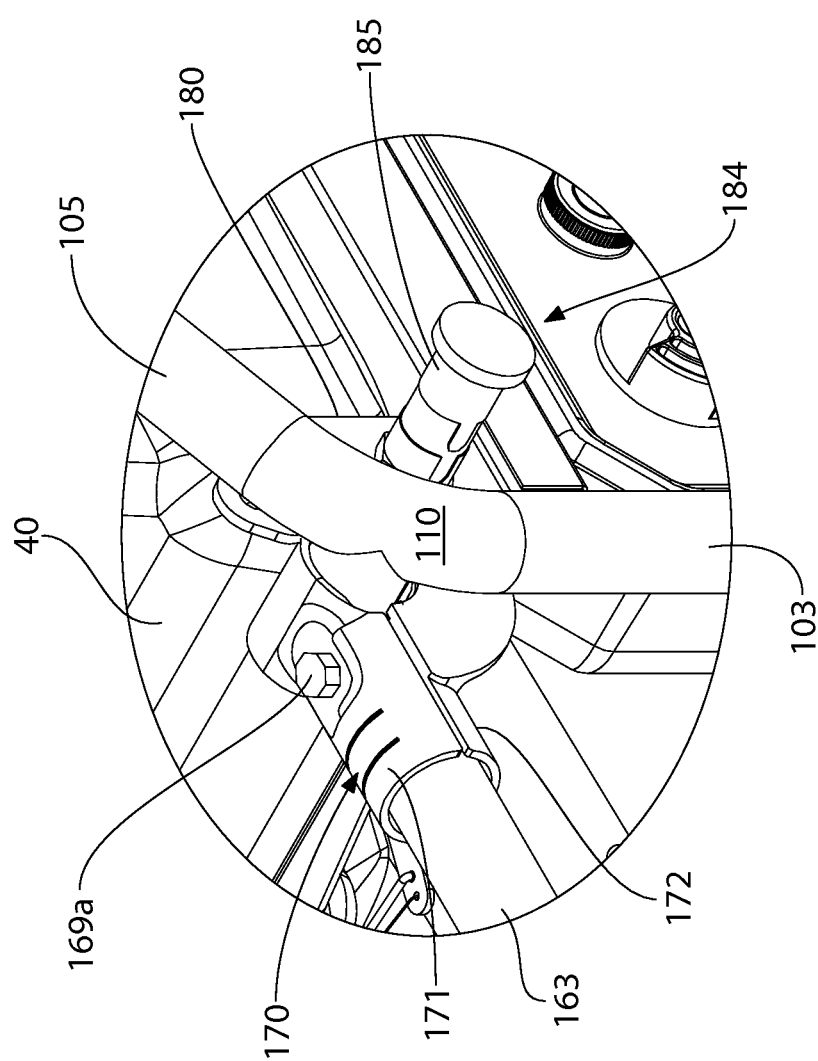
FIG. 19B is a detail of the frame with the handlebar assembly mounting arrangement taken from FIG. 19A.
Figure 19C:
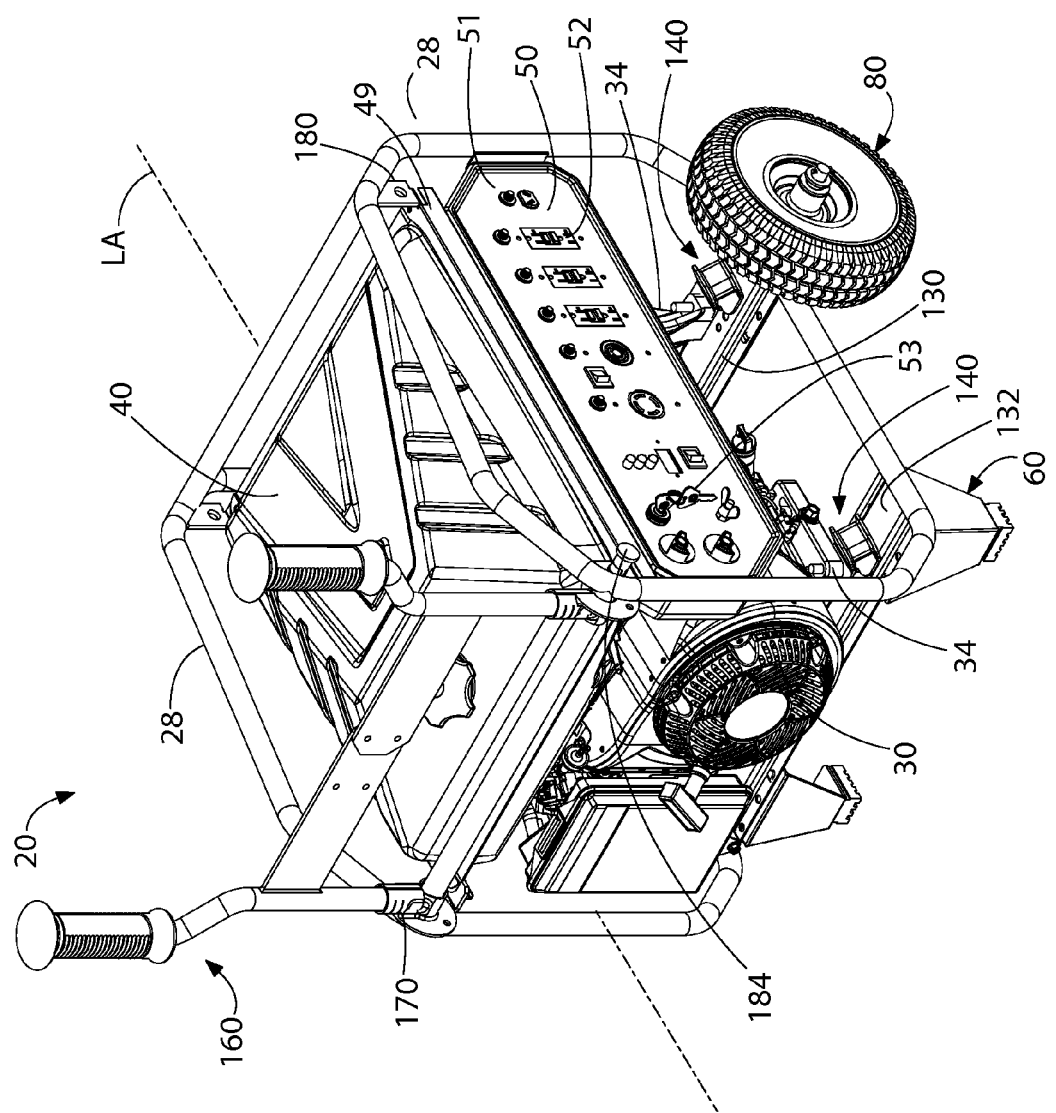
FIGS. 19C-F show various examples of the handlebar and wheel assembly/support leg mounting options and positions.
Figure 19D:
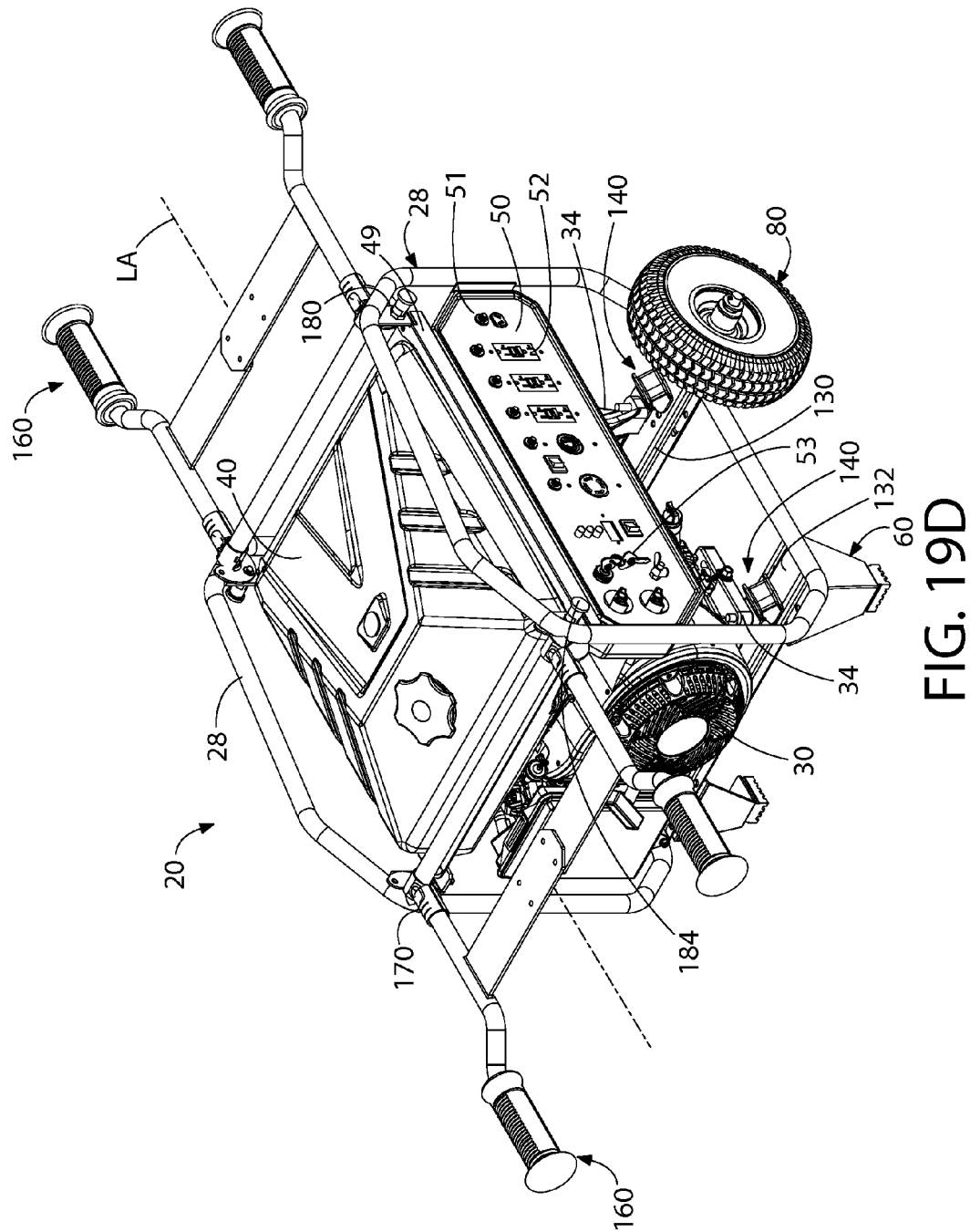
Figure 19E:
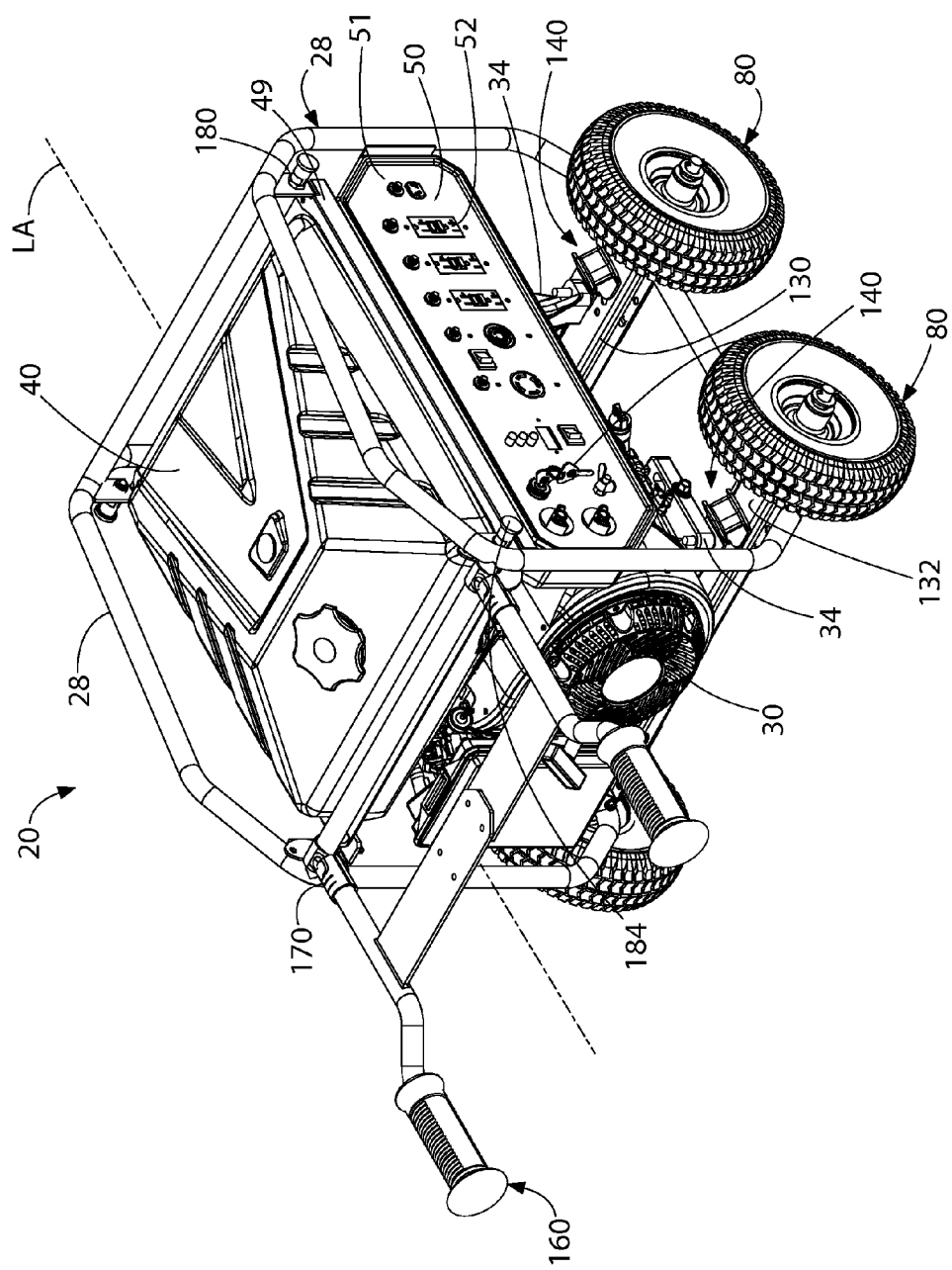
Figure 19F:
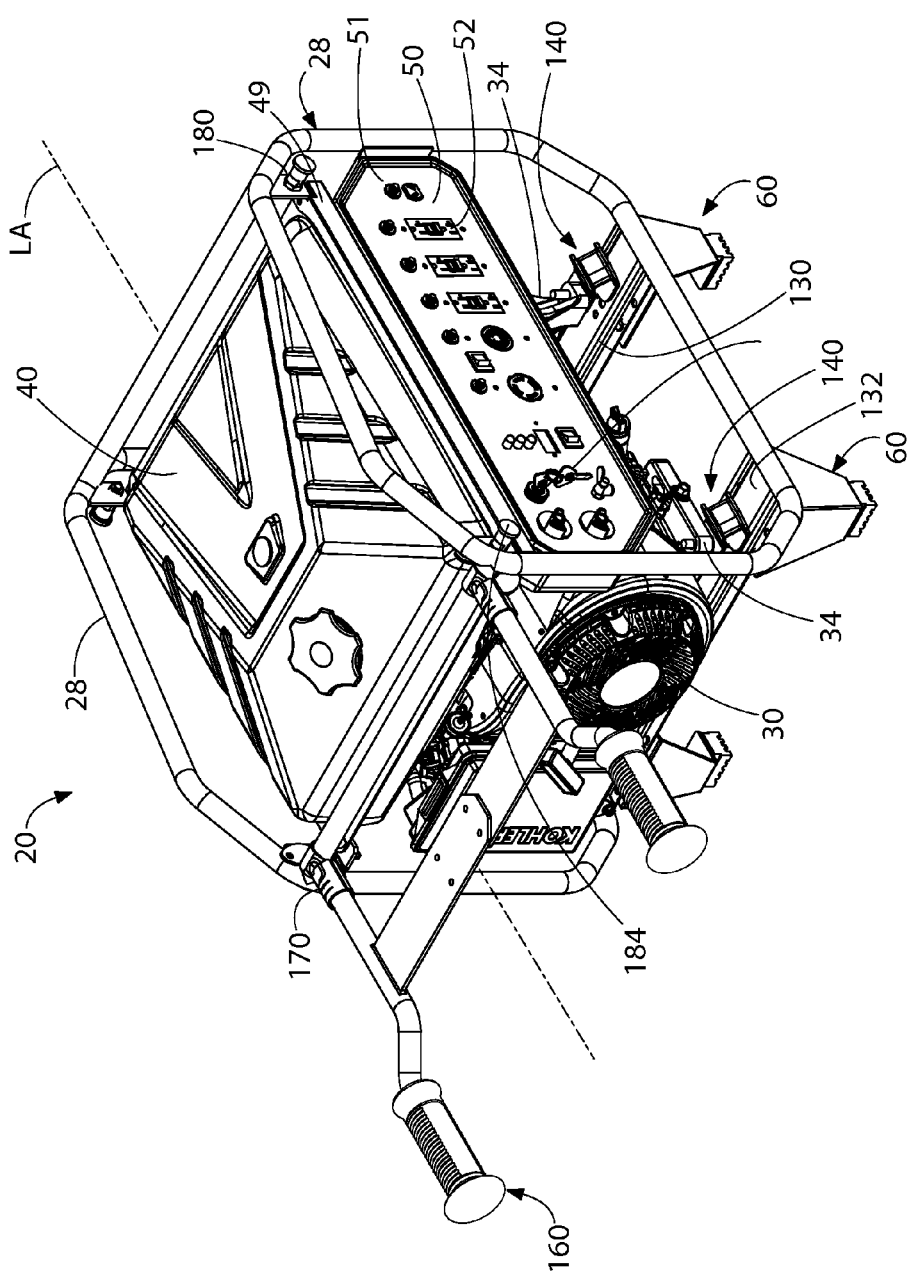

Frame 28 includes a locking flange 180 which cooperates with positioning flange 190 to lock the position of handlebar 160 in either a horizontal or upright vertical position (see, e.g. FIGS. 19A and 19C). In one example, a locking flange 180 may be positioned on frame 28 near each of four top corner sections 110 to provide flexibility for a user to mount handlebars 160 on either the front or rear end of the frame, or on both ends (see, e.g. FIG. 19D). Locking flange 180 includes a single hole 181 that is fixed in position in relation to generator frame 28. Hole 181 is selectively and concentrically alignable with either hole 191 or 192 of the positioning flange 190 by rotating the handlebar 160 between horizontal or vertical positions.

Referring to FIGS. 14B, 19B, and 20B, a locking pin assembly 184 may be provided which cooperates with locking flange 180 and positioning flange 190 to selectively lock the handlebar 160 in the horizontal or vertical position. The locking pin assembly 184 includes an cylindrical body 185 and a locking pin 186 at one end. Pin 186 is configured and dimensioned to be insertable through hole 181 in flange 180 and hole 191 or 192 in flange 190. Pin 186 is movable between a (1) locked position in which the pin projects inwards through holes 180 and 191/192, or (2) an unlocked position in which the pin is retracted outwards from holes 180 and 191/192.

An exemplary method for mounting a handlebar 160 on frame 28 will now be described with reference to 148, 20A, 20B, 21, and 19B. The top and bottom half sections 171, 172 of two clamps 170 are first positioned over and under one of the front or rear cross-pieces 120, 121, respectively. The clamps 170 are selected and arranged so that the positioning flange 190 of each clamp 170 is located towards a lateral side frames 100, 101 proximate to a locking flange 180. The top and bottom half sections 171, 172 are next brought together and engaged with the front or rear cross-piece 120, 121 selected. The tabs 182 and slots 183 are used to guide proper alignment and joining of the top and bottom half sections 171, 172. The front or rear cross-piece is trapped between the concave surfaces 172 in the top and bottom half sections 171, 172. Threaded fastener 169a is then inserted through the top and bottom half sections 171, 172 (see FIG. 208) and engaged with nut 169b which is partially tightened at this stage of assembly so that the clamp 170 will not slip off of the front or rear cross-piece 120, 121.

With continuing reference to the foregoing figures, the mounting ends 165 on each handle 163 are inserted into one of the clamps 170 through rear opening 175 and engaged with concave surfaces 173 on the top and bottom half sections 171, 172. Fastener 169a may then be further slightly tightened, but preferably not fully to lightly engage and hold handles 163 in the clamps 170 while still allowing the handlebar 160 to be rotated about the front or rear cross-piece 120, 121 for the desired position of the handlebar.

The handle bar 160 with attached clamps 170 are then rotationally adjusted in position about the front or rear cross-piece 120, 121 to concentrically align hole 181 in each locking flange 180 on the frame 28 (see FIG. 20B) with one of the holes 191 (for horizontal handlebar mounting position) or 192 (for vertical handlebar mounting position) in each of the handlebar positioning flanges 190. Once the holes are aligned, the locking pin 186 is inserted through the aligned holes to fix and lock the position of the handlebar 160. The fastener 169a may then be fully tightened with nut 160b to firmly engage the front or rear cross-piece 120, 121 and form a frictional fit between the clamps 170 and front or rear cross-piece.

It will be appreciated that the foregoing handlebar mounting process and sequence may be varied and still achieve the same result. Accordingly, equivalent mounting processes are possible and the systems are not limited to the foregoing sequence of steps described.

If the user desires to change the mounting position/orientation of the handlebar 160, the clamps 170 may be slightly loosened by partially unscrewing the fasteners 169a in each clamp and retracting the locking pins 186 from the holes 180 and 191/192 in the locking flanges and positioning flanges. The handlebar 160 will now be rotatable about the front or rear cross-piece 120, 121 to change the position of the handlebar from horizontal to vertical, or vice-versa.

FIGS. 24-30 illustrate an alternative configuration and features of a generator 20 and frame 28. The generator 20, frame 28, support legs 60, and wheel assemblies 80 may be essentially the same as already described herein for generator 20 and frame 28 with reference to FIGS. 1-24. Instead of or in addition to handlebars 160 described herein, handlebars having an alternative configuration, construction, and functionality are provided.

The generator 28 includes a pivotably mounted front handlebar assembly comprising a handlebar 250 movably coupled to frame 28 near the front 21. Handlebar 250 may have a generally U-shaped tubular body including two mounting portions 252 arranged substantially parallel to each other along the longitudinal axis LA and a grasping portion 253 arranged substantially perpendicular to and spanning between the mounting portions at one end 254 of the handlebar. Grasping portion 253 may be vertically offset from and positioned below the mounting portions 252. In one arrangement, each mounting portion 252 may be mounted to one of the top horizontal frame members 105 or 109 about a pivot axis 251 oriented transversely to longitudinal axis LA. The mounting portions 252 may be mounted to the frame members about pivot axis 251 proximate to the free ends 255 of the handlebar 250, and in one configuration is spaced inwards from the free ends. In one assembly, the pivot axis 251 may be formed by transversely mounted pivot members 256 such as pins or fasteners extending through mounting portions 252 of handlebar 250 and top horizontal members 105 and 109. In one configuration, the handlebar 250 may be disposed inside the top horizontal members 105 and 109.

Figure 29:
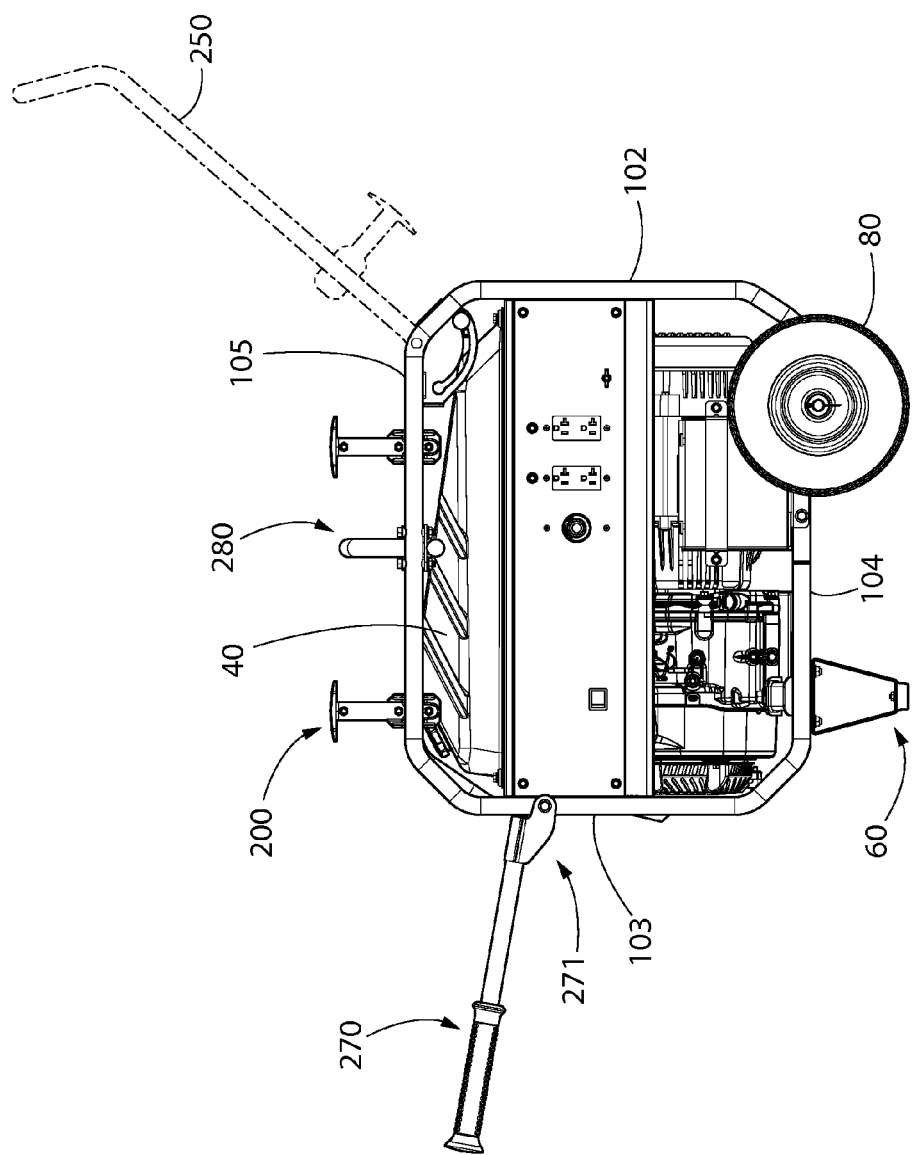
FIG. 29 is a side elevation view showing the U-shaped handlebar in the deployed operating position in dashed lines.
Figure 30:
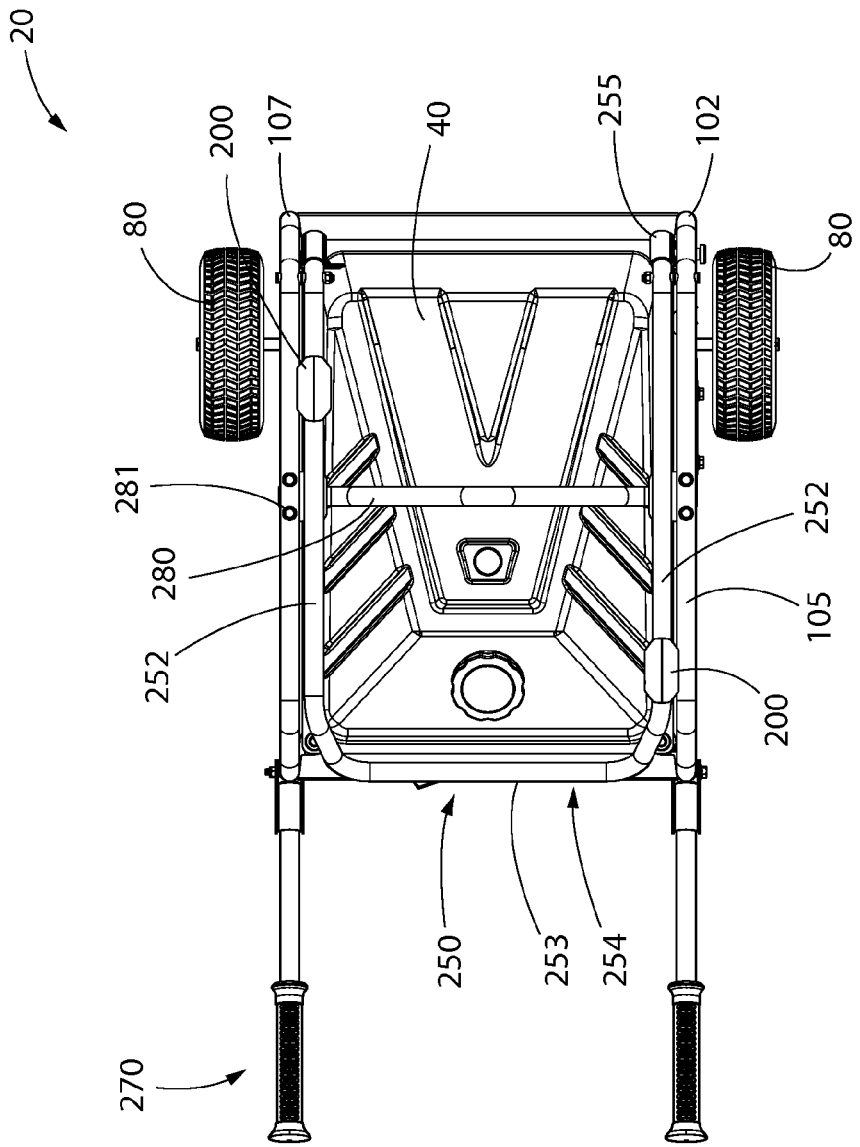
FIG. 30 is a top plan view showing the lifting bar and the U-shaped handlebar in the stowed position nested in the top of the generator frame.

Handlebar 250 is pivotably movable with respect to frame 28 between a folded stowed position (see, e.g. FIGS. 24 and 25) and an extended operating position (see, e.g. FIG. 29 shown by dashed lines). In the stowed position, handlebar 250 is nested in the top 25 of the frame between the longitudinally-extending top horizontal members 105 and 109. The mounting portions 252 are oriented substantially horizontal in position. In the operating position, the grasping portion 253 of handlebar 250 is rotated forward about the pivot axis 251 to raise and locate the mounting portions 252 in a non-horizontal position. The handlebar 250 protrudes outwards from the frame for transporting generator 20. In one configuration, the mounting portions 252 may be oriented in a generally upright position defined herein as being greater than 0 degrees (horizontal) and less than or equal to about and including 90 degrees (vertical). This arrangement allows the generator 20 to be transported in hand truck fashion with the handlebar 250 being upright and vertically or obliquely oriented with respect to the top horizontal members 105 and 109 of frame 28.

To guide and limit the pivotable range of motion of the handlebar 250, a flat guide plate 257 may be fixedly attached to one or both of each opposing top horizontal members 105 and 109. Guide plate 257 includes an arcuately-shaped open guide slot 258 extending 90 degrees between a first and second closed end of the track. A spring-loaded position pin 259 is fixedly connected through the guide plate 257 and guide slot 258 to the handlebar 250 at or near one of the free ends 255 of the handlebar. The position pin 259 is arcuately movable in guide slot 258 with free ends 255 by rotating the handlebar 250.

The ends 260 of the guide slot 258 may be diametrically enlarged and configured with the position pin 259 for mutual engagement to removably retain the pin 259 at either end location of the slot. The end 260 locations of guide slot 258 define the stowed and operating positions of handlebar 250. To enable position pin 259 to move in the guide slot 258, an enlarged operating end 261 of the pin may be moved and either pulled outwards (in the situation where pin 259 is biased inwards by the spring) or pushed inwards (in the situation where pin 259 is biased outwards). In one exemplary configuration, the pin 259 is inwards biased requiring an outward pull to release and move the pin. This releases the pin 259 from one of the ends 260 of the guide slot 258, thereby allowing the pin to be moved through the slot to the other end location. Accordingly, an interlock formed between ends 260 and position pin 259 allow the handlebar 250 to be removably locked in either the stowed or operating positions.

Referring to FIGS. 24-30, an alternative rear handlebar assembly including handlebars 270 is shown which is pivotably movable between a stowed position collapsed against the rear vertical members 103, 106 of frame 28 and an operating position extending approximately horizontally outwards to the rear of the generator 20. This allows generator 20 to be transported in wheelbarrow fashion. Each rear handlebar 270 includes a substantially U-shaped mounting clevis 271 on one end that may be movably mounted to rear vertical members 103, 106 of frame 28 about a transversely-oriented pivot axis 274. Each clevis 271 may include a pair of spaced apart ears 272 positioned on opposite sides of either vertical members 103 or 106. The ears 272 are mounted to the rear vertical members 103, 106 by a transversely mounted pivot member 273 such as a pin or fastener extending through the ears and vertical members as shown. In one configuration, the mounting clevis 271 and pivot members 273 are configured to retain the handlebars 270 in the stowed and operating positions via a frictional fit.

In one configuration shown in FIGS. 24-30, generator 20 may include a lifting bar 280 transversely mounted to top horizontal members 105 and 109 of generator frame 28. Each end 282 of the lifting bar 280 may be configured to engage a frame horizontal members 105 and 109, which may be secured thereto with mounting fasteners 281 such as without limitation threaded fasteners and nuts. Other suitable means may be used to mount the lifting bar 280 to frame 28, such as welding, soldering, rivets, etc. The lifting bar 270 extends under and is not operably connected to front handlebar 250 so as to not interfere with the pivotable movement of the handlebar. In one construction, lifting bar 280 may have a tubular metal construction for strength. Lifting bar 280 may be substantially V-shaped in one configuration forming an apex which is raised above than top horizontal members 105 and 109 of frame 28 for grasping manually or with lifting equipment.

In an alternative configuration shown in FIG. 19A, the lifting member may be a lifting strap 210 which is attachable to a top portion of the frame 28 and spans between the lateral side frames 100, 101. The lifting strap may be formed of any suitable material including metal, polymeric high strength fibers, etc.

The generator frame 28 may be configurable to provide a power cord management system. As shown in FIGS. 17, 18A, 188, and 24-30, two or more outwards projecting cord wrapping poles 200 may be provided which are mounted on generator frame 28 to allow a power cord 201 to be wrapped around the poles for convenient storage. In one arrangement, the poles 200 are preferably mounted on the top 24 of the frame 28 and project vertically upwards, and more preferably in some arrangements may be mounted on top horizontal members 105 and/or 109. Other suitable mounting positions of wrapping poles 200 and orientations (e.g. horizontal or vertical) may be used. The poles 200 may be configured for attachment to frame 28 by any suitable means including separately or in combination clamping, fasteners, rivets, adhesives, etc. In various exemplary configurations, the poles 200 may be mounted to top horizontal members 105 and 109 of frame 28 and/or front handlebar 250. A transversely oriented flanged end 202 may be provided having a width greater than the diameter of the poles 200 to prevent the power cord 201 from slipping off the poles. The poles 200 may be made of any suitable material including metal or polymers.

Figure 31:
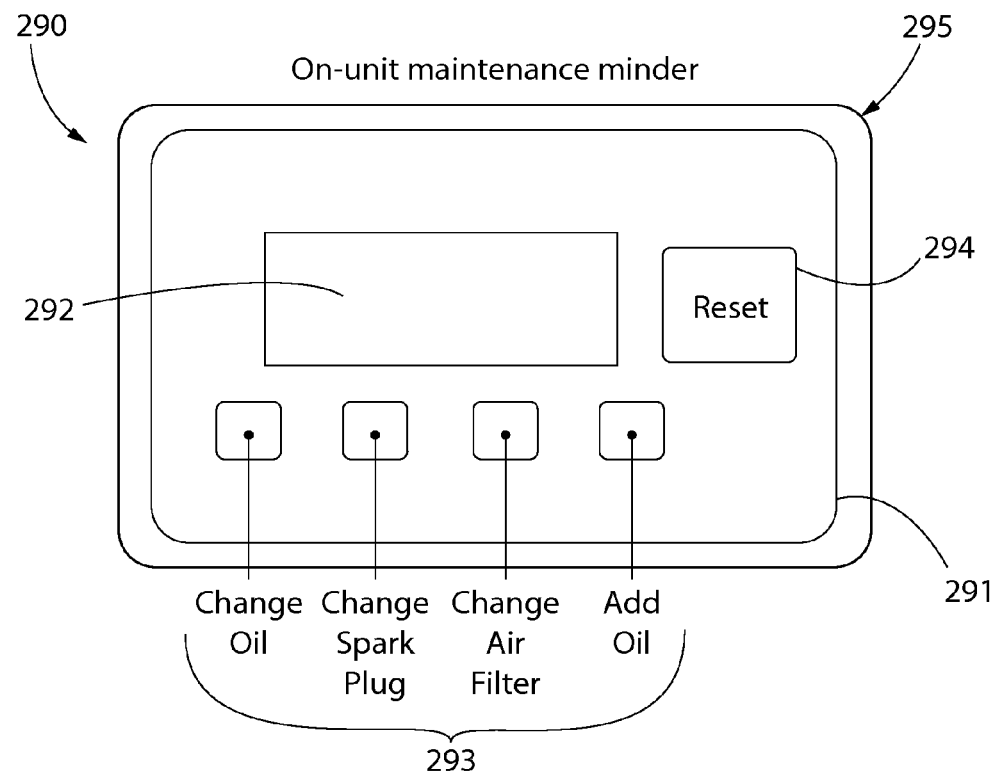
FIG. 31 is an elevation view of an engine maintenance reminder system control panel usable with the generator.
Figure 32:
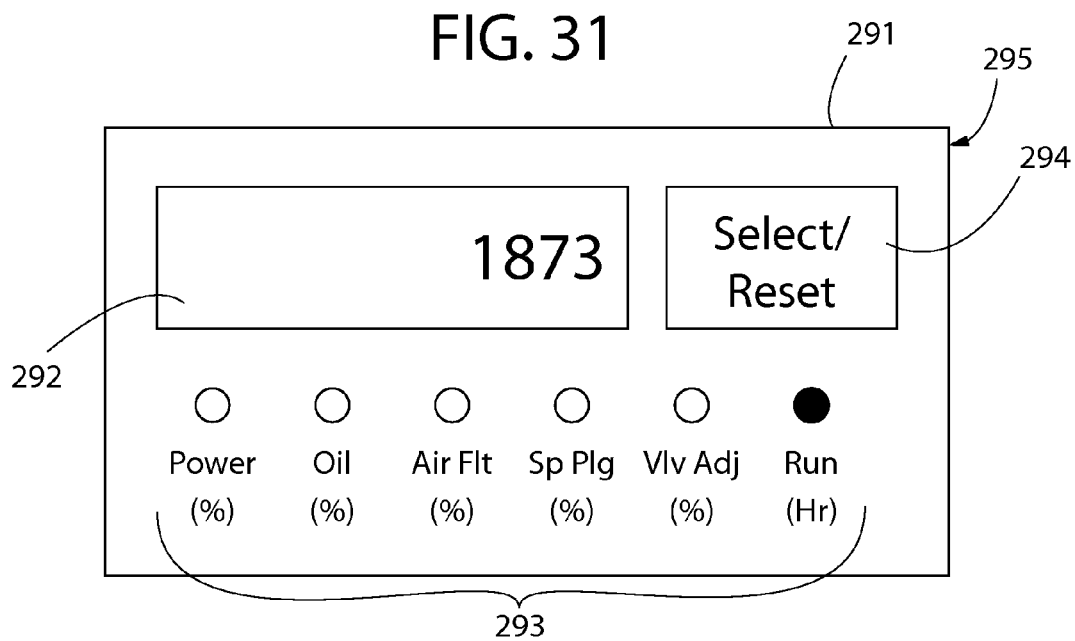
FIG. 32 is an elevation view of an alternative configuration of a engine maintenance reminder system control panel.

According to another aspect of the generator 20, a maintenance reminder kit including a maintenance reminder module 290 may be provided to track and alert an operator in real time to the maintenance related engine operating parameters requiring attention. This module 290 essentially takes the guesswork out of separately tracking when routine maintenance needs to be performed. FIGS. 31 and 32 show two exemplary configurations of a maintenance reminder module 290.

Maintenance reminder module 290 may comprise a microprocessor and appropriate electronic circuitry configured and operable to obtain, process, and display engine, electrical system, and/or auxiliary component maintenance-related operating information. In one configuration, maintenance reminder module 290 may communicate with the engine control system to download and process the desired operating parameter for extracting maintenance related data or information. In alternative or additional configurations, maintenance reminders may be initiated and based on engine run time and preprogrammed thresholds operating times or maintenance intervals for initiating each maintenance operation (e.g. change oil, air filter, etc.).

Module 290 may include a faceplate 291 including a display 292, a maintenance indicator array 293 comprised of one or more condition indicator lights, and an operating button 294. The faceplate 291 may be mounted proximate to and/or on an electronics housing 295 housing the electronic components of the maintenance reminder module 290, or the faceplate may alternatively be mounted on one part of the generator frame 28 and the electronics housing may be mounted on another different part of the frame distanced from and not mechanically coupled to the faceplate. Alternatively, the electronic components of the maintenance reminder module 290 may be incorporated and housed with the engine control system components and the faceplate 291 may be mounted on the frame at a suitable location, thereby eliminating a need for a separate electronics housing 295. The faceplate 291 may be mounted to generator frame 28 at any suitable location. In one non-limiting arrangement, the maintenance reminder module 290 may be mounted on control panel 50.

Referring to FIG. 31, the indicator lights of the maintenance indicator array 293 may be illuminated buttons, bulbs, LEDs, etc. that include such maintenance-related alerts as without limitation "Change Oil," "Change Spark Plug," "Change Air Filter," and "Add Oil" in this non-limiting example. When an engine operating condition associated with one of the foregoing maintenance parameters reaches a predetermined set point or level based on run time or actual monitoring of engine operation, the indicator will become illuminated until cancelled by pressing the operating button 294, which may function as a reset button. The display 292 may be an LCD, LED, or other suitable type illuminated display showing for example and providing a digital readout of the total running time of the generator 20 (e.g. service hours) from initial purchase and operation of the unit. The control circuitry may be configured so that the total running time cannot be reset with button 294. It will be appreciated that additional and/or other engine maintenance indicators may be used to alert an operator to a required maintenance condition.

FIG. 32 shows a maintenance reminder module 290 in which the display 292 may provide a real time digital readout of a selected engine-related maintenance parameter. As opposed to alerting an operator when maintenance work may be immediately required, an operator can to track the status of maintenance related engine operating parameters to plan maintenance work in advance. The operating button 294 may be configured (in circuitry) to function as both a maintenance parameter select and a reset button. Repeatedly pressing button 294 sequentially cycles the display 292 through each maintenance parameter in a predetermined order. The indicator light associated with the maintenance parameter or information being displayed will be illuminated.

In one non-limiting exemplary configuration, the maintenance parameter tracked and displayed on display 292 may include "Power %" (available electric power), "Oil %" (remaining oil life), "Air Filter %" (remaining air filter life), "Spark Plug %" (remaining spark plug life, "Valve Adjustment %" (remaining valve adjustment life, and "Run hours" (total running time or service hours of the generator 20 from initial purchase and operation of the unit). Other or additional parameters may be tracked.

In one mode of operating the maintenance reminder module 290 of FIG. 32, the maintenance parameter displayed may automatically change and loop through each parameter for predetermined period of time (e.g. 3 or more seconds). The maintenance parameter displayed may also be changed manually by repeatedly depressing the operating button 294. When maintenance is required, the circuitry may be configured to cause the associated indicator light to flash or blink repeatedly. In some configurations, the circuitry may be configured to initiate the blinking mode when about 10% or less life is remaining for the blinking parameter providing advance notice. The associated remaining life may be concurrently displayed for the blinking parameter. In one configuration, preferably after maintenance has been performed, the operating button 294 may be held for a predetermined period of time (e.g. 3 seconds or other) to reset the blinking parameter to 100% life. The operating button circuitry may be configured so that holding the operating button 294 may not reset the total operating hours or run time.

It will be appreciated that numerous variations of the maintenance indicator array 293, maintenance indicators provided, and programmed functionality are possible.

Modular Generator Frame System

Figure 33:
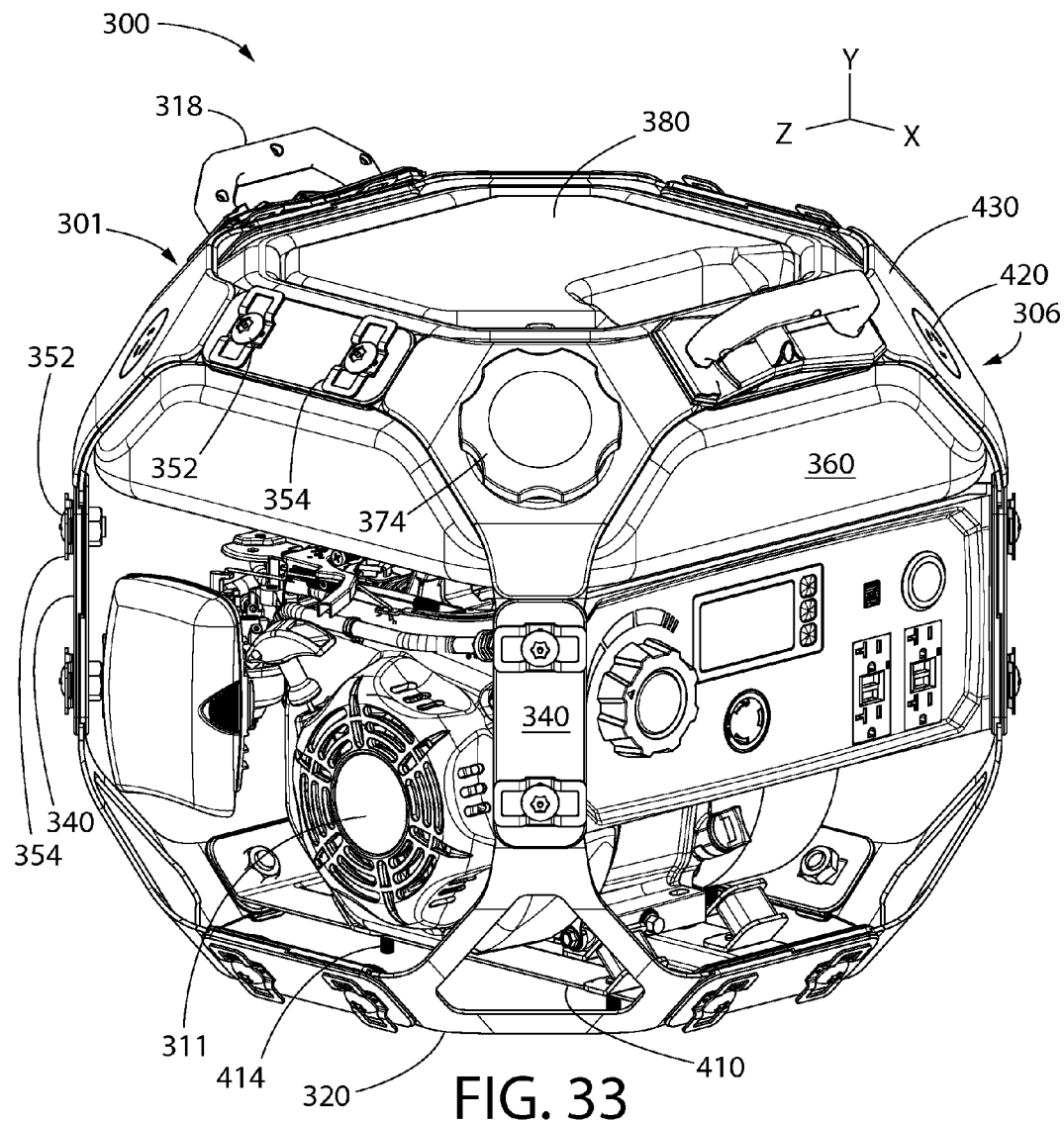
FIG. 33 is a top perspective view of a portable generator with modular frame design constructed of corner members and connector plates.
Figure 34:
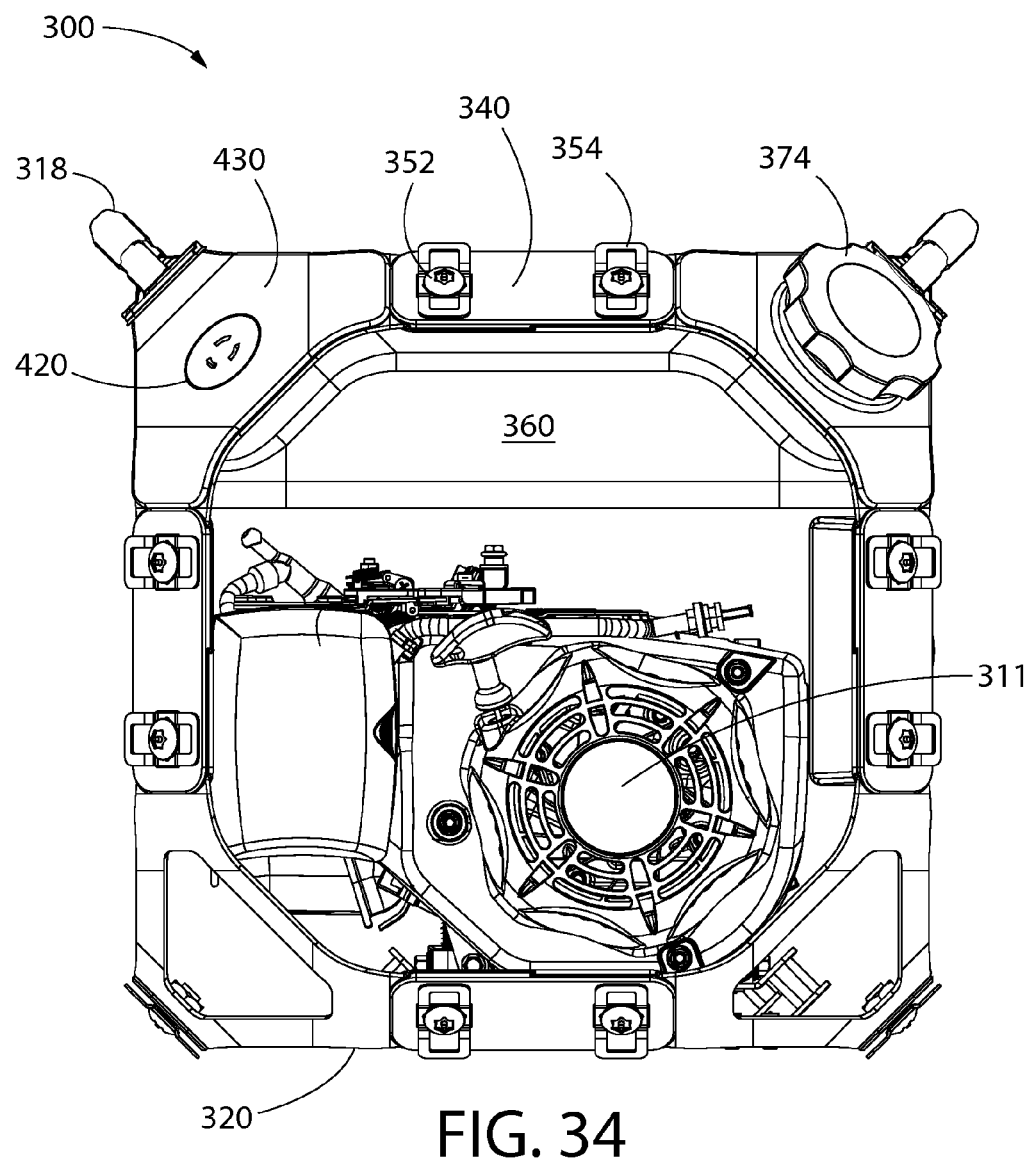
FIG. 34 is a first side elevation view thereof.
Figure 35:
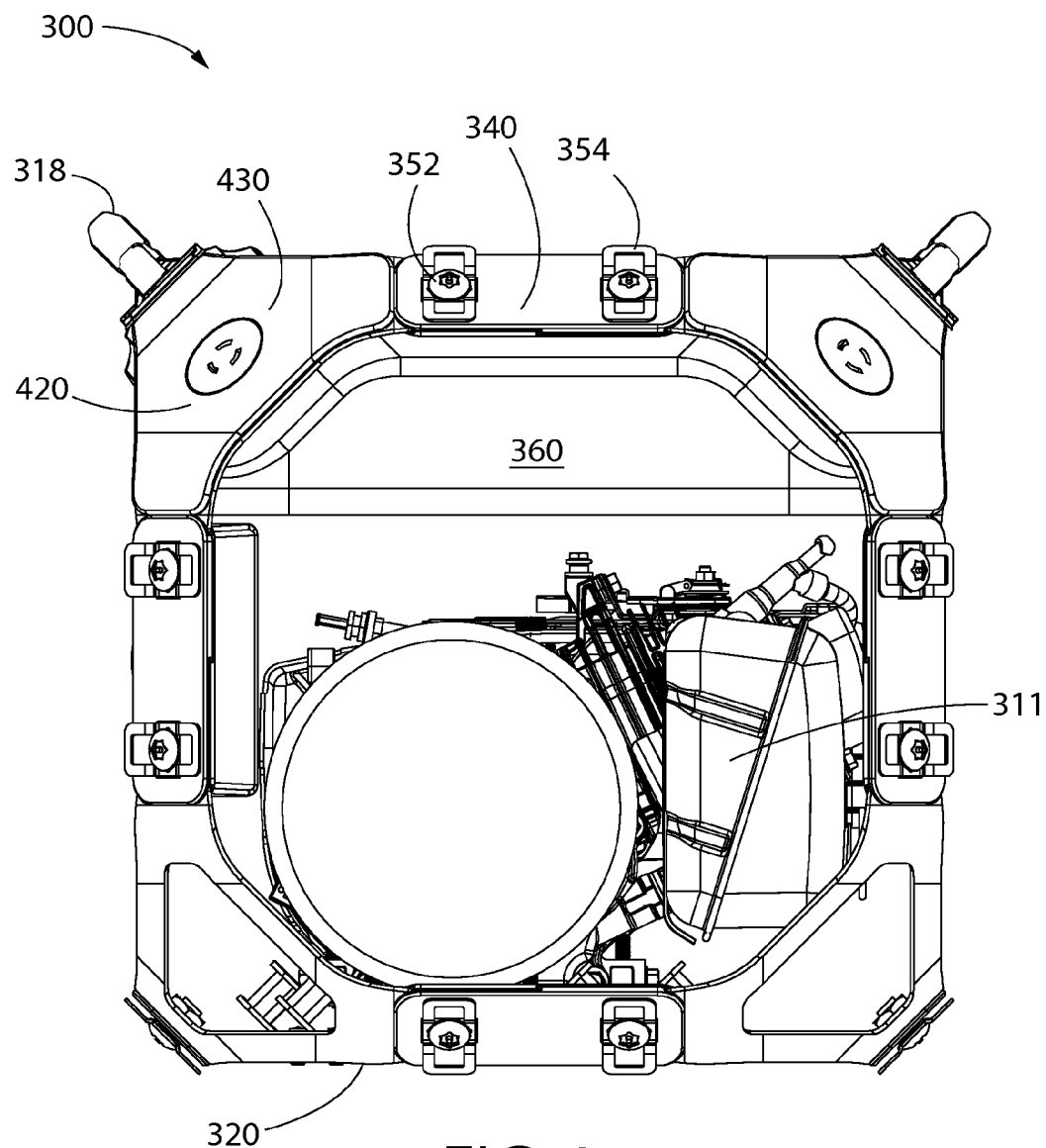
FIG. 35 is a second side elevation view thereof of the side opposite the first side.
Figure 103:
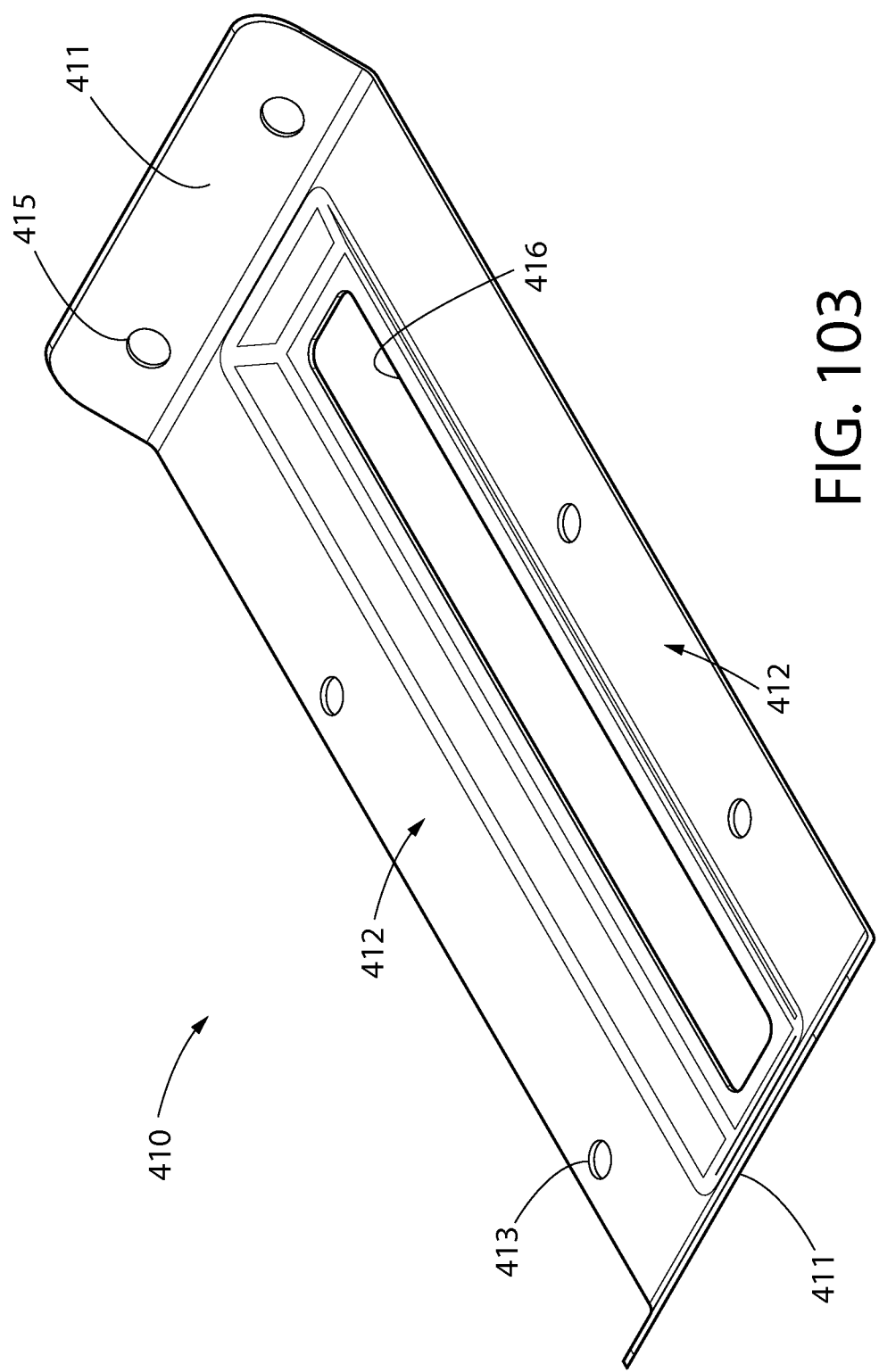
FIG. 103 is a perspective view of a motor mount bracket.

FIGS. 33-103 depict various views of a portable generator 398 with modular generator frame system 300. The frame system 300 may generally include a plurality of interconnected corner members 320 and connector plates 340 that collectively form an open space frame designated herein as generator frame 301. The generator frame 301 is configured for mounting various components of a power generator, appurtenances, and accessories. In one configuration, generator frame 301 may support a permanent fuel tank 360, a removable portable fuel tank 380, engine 311, handles 318 for lifting and maneuvering the generator, control panel 400, and others appurtenances and accessories (e.g. tool holders, fire extinguisher holders, power cord wrapping poles, etc.) for forming a fully functional generator. Any suitable type of engine and fuel source may be used, including for example without limitation liquid fuels or gaseous fuels such as propane.

Generator frame 301 may include four lateral sides 302, a top 303, opposing bottom 304 and an open interior space 305 for housing the fuel tank 360, engine 311, and other accessories or appurtenances. The four lateral sides 302 may be joined together by four vertically extending corners 306 at the top 303 and bottom 304 of the frame. In one configuration, corners 306 may be disposed at a diagonal and oblique angle to the two adjoining lateral sides 302 as shown. Other corner configurations are possible.

Generator frame 301 may be considered to generally have the shape of a cube wherein the lateral sides 302 have a substantially similar height and width. The corners 306 may have a truncated shape in appearance created by the diagonal configuration of the corners. Accordingly, in one configuration, the generator frame 301 may appear to have an identical profile when viewed from either of the sides, the top, or the bottom. The diagonal corners 306 provide a generally octagonal shape (in top plan or side view) for generator frame 301 in one configuration.

The corner members 320 and connector plates 340 will now be described in greater detail with general reference to FIGS. 51-66. Each corner member 320 may include a central body 321 and one or more outwardly and radially projecting mounting tangs 322 cooperatively configured to engage locking elements on the connector plates 340 for assembling a complete frame 301. Body 321 may be open in structure in one configuration defining a central opening 323 for weight reduction and to allow various appurtenances or accessories to be mounted and positioned therein and therethrough. The central opening 323 may have a complementary configuration to the perimeter shape of the central body 321, or alternatively a different shape.

In one non-limiting example, body 321 may be generally triangular shaped with truncated corners forming six integral short and long segments as shown defining a three-sided corner structural element. The short segments 324 may be disposed adjacent a connector plate 340 at each corner region and the long segments 325 having a longer length span between two short segments 324. The short and long segments 324, 325 may have any configuration including polygonal and/or non-polygonal shapes. The short segments 324 define mounting portions 341 which include radially extending mounting tangs 322 for coupling to a connector plate assembly comprising a pair of coupled connector plates 340, as further described herein. In one configuration, as shown, each corner member 320 includes three mounting portions 341 and mounting tangs 322 which may each be arranged approximately 120 degrees apart about a common center point 327 defined at the geometric center of the corner member body 321. Each mounting tang 322 defines a mounting axis 330 which intersect at the common center point 327 of body 321; the mounting tangs extending radially outwards from the center point along the mounting axis.

Mounting tangs 322 may have an elongated shape. The mounting tangs 322 include a free end 325 configured to lockingly engage a connector plate 340 and a fixed end 326 attached to or integrally formed with central body 321 of the corner member 320. In one construction, without limitation, mounting tangs 322 may be integrally formed with body 321 as part of a single unitary structural unit that may be bent or otherwise formed into the shape shown. In one arrangement, mounting tangs 322 are obliquely disposed at an angle A1 with respect to the corner member body 321. This allows the creation of angled corners for the generator frame 301 in which the central body 321 of corner members 320 are disposed at an angle A1 between 0 and 90 degrees to the connector plates 340 when mounted on the mounting tangs 322. In some non-limiting examples, A1 may be about 45 degrees.

Figure 36:
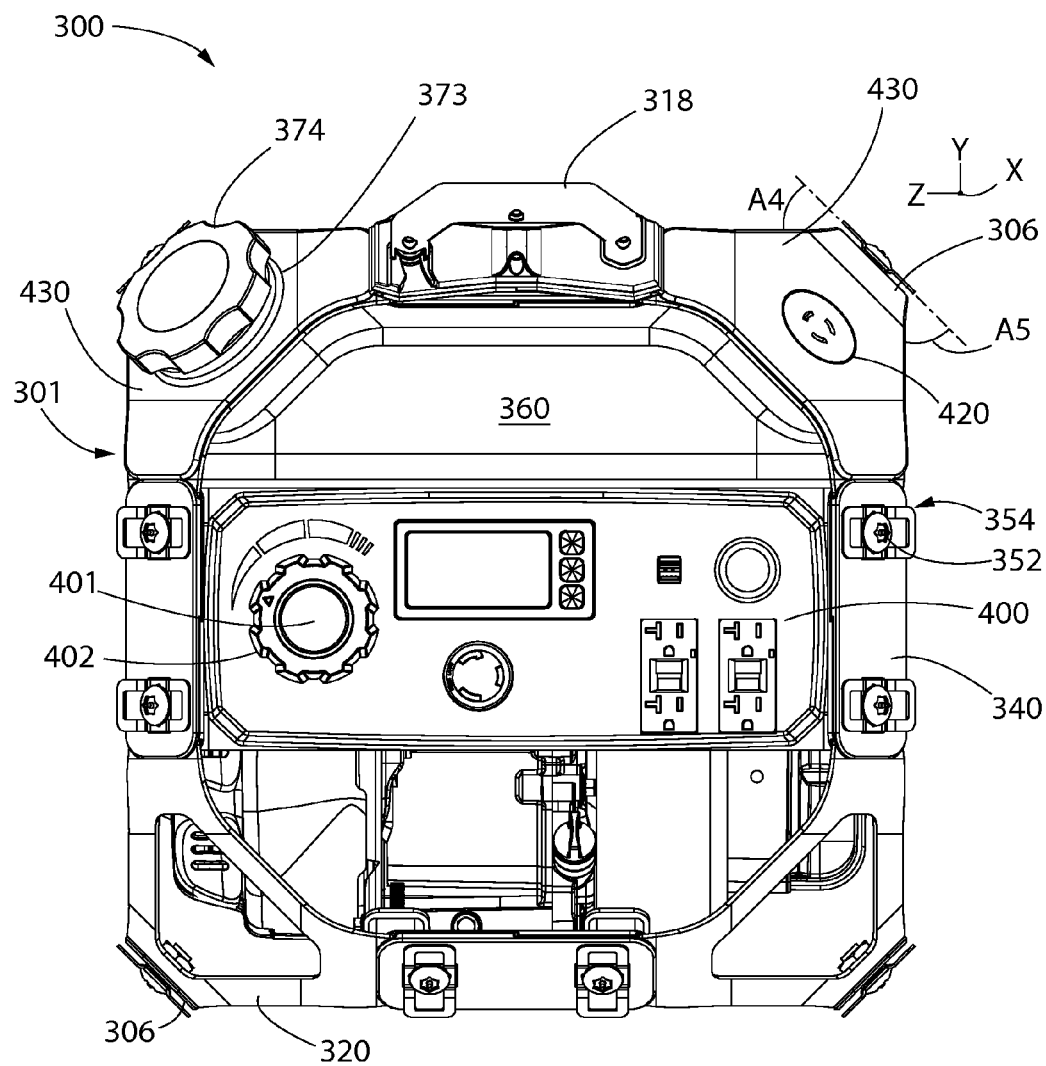
FIG. 36 is a third side elevation view thereof showing the control panel.
Figure 37:
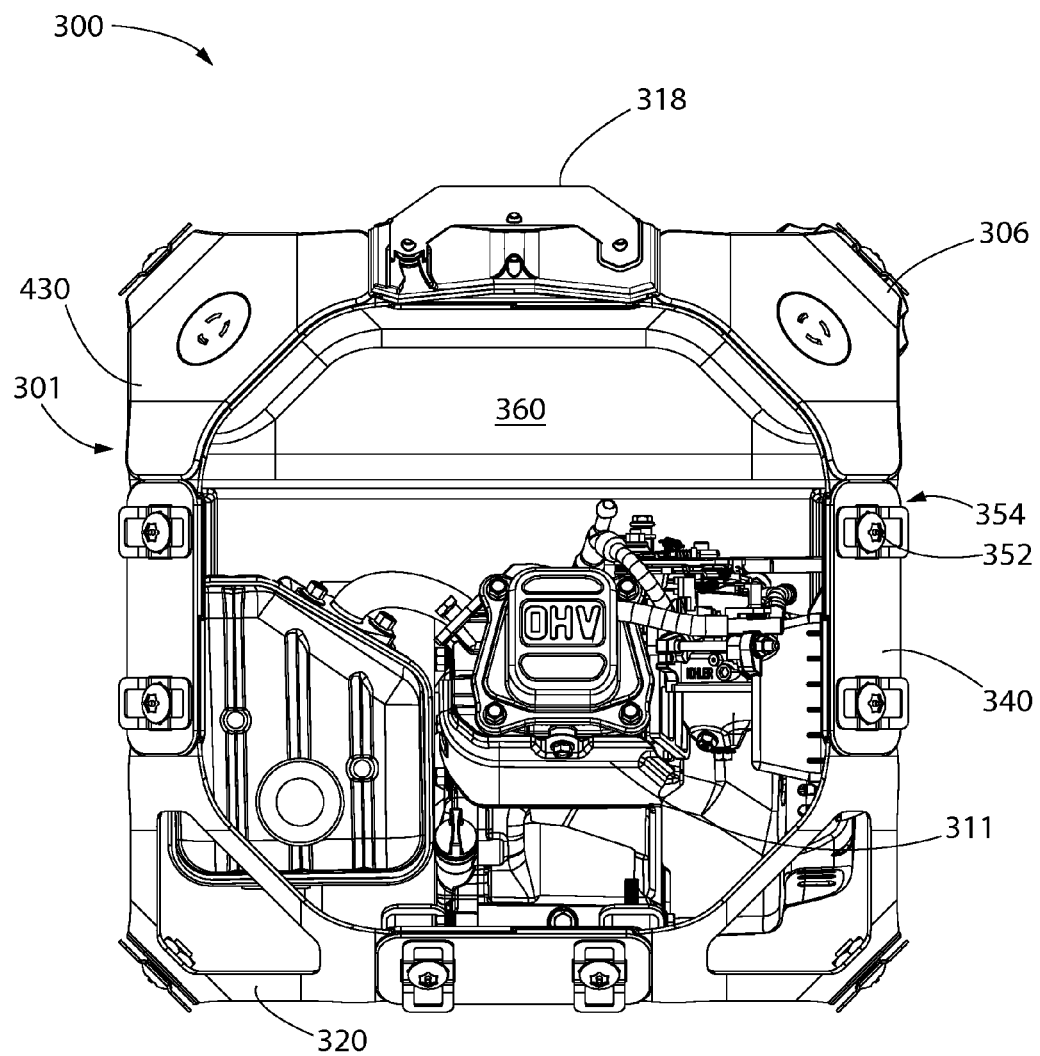
FIG. 37 is fourth side elevation view thereof of the side opposite the third side and showing the engine.
Figure 38:
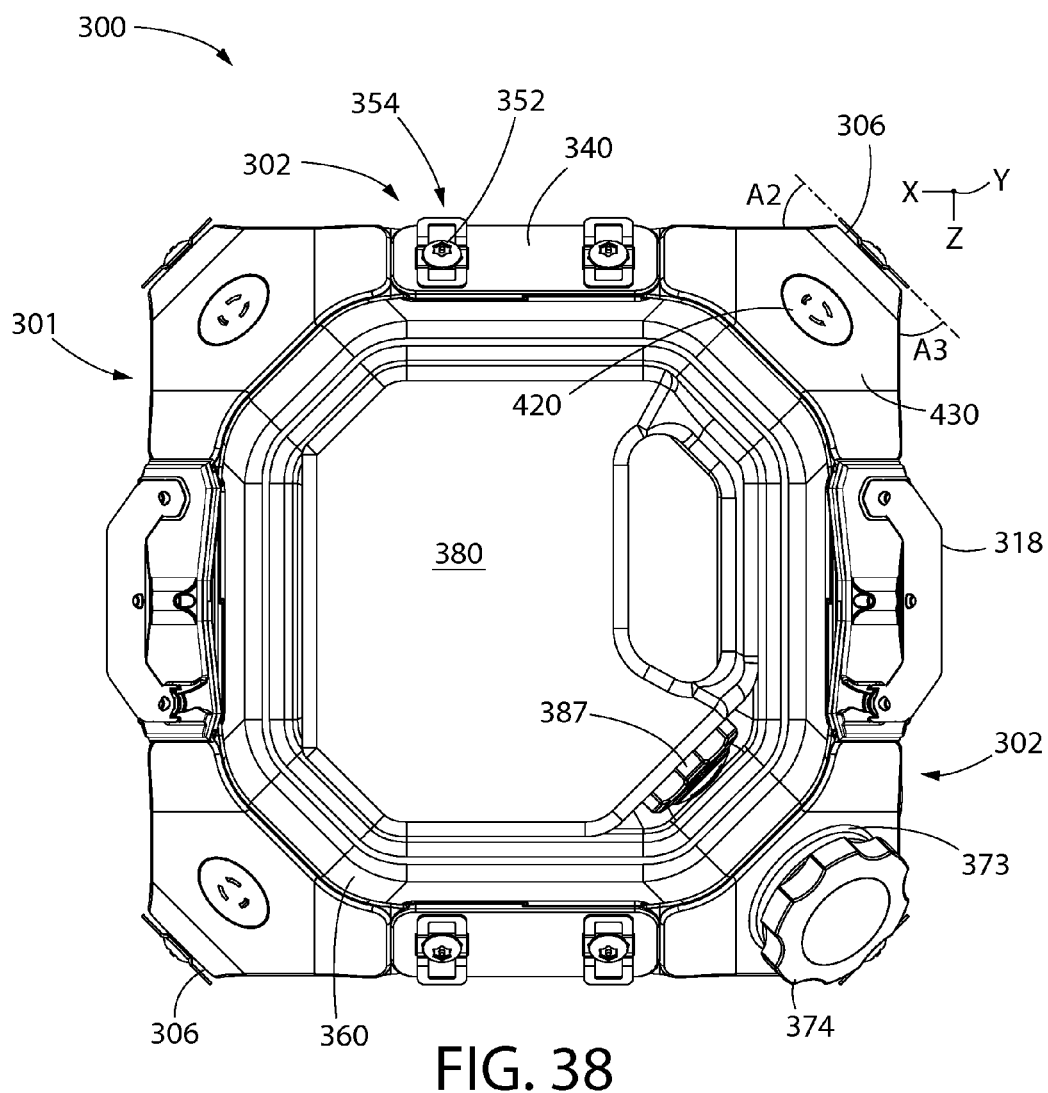
FIG. 38 is top plan view thereof.

For convenience of reference, the shape and features of generator frame 301 may be further described with respect to a three-dimensional X-Y-Z Cartesian coordinate reference system (see, e.g. FIGS. 33, 36, and 38). The reference system includes X, Y, and Z axes and defines an X-Y, X-Z, and Y-Z reference planes.

The central body 331 of the corner members 320 may form four generally flat diagonal corners 306 of generator frame 301 each laying in a plane P1 that may be disposed at angles A2 and A3 with respect to both the X-Y and Y-Z reference planes. In one non-limiting configuration, angles A2 and A3 may each be between 0 and 90 degrees. In some non-limiting examples, angles A2 and A3 may be about 45 degrees. In a similar manner, corner members 320 may further form four generally flat sloping top sides and corresponding bottom sides of generator frame 301 (extending in the X and Z directions) each laying in a plane P2 that may be disposed at angles A4 and A5 with respect to both the X-Y and X-Z reference planes. In one non-limiting configuration, angles A4 and A5 may each be between 0 and 90 degrees. In some non-limiting examples, angles A4 and A5 may be about 45 degrees.

In one exemplary construction, corner members 320 including central body 321 and mounting tangs 322 may be formed from a single generally flat plate or sheet. Corner member 320 may therefore comprise a single unitary structural component. The corner members 320 may be made of suitable metal material having sufficient mechanical/structural strength and thickness, such as without limitation aluminum, steel, or other metallic materials. In one example, without limitation, corner members 320 may be made of aluminum sheet material having a thickness ranging from about and including 0.125 inches to 0.625 inches. In one example, without limitation, the thickness without limitation is about 0.125 inches. Corner members 320 may be made by any suitable fabrication process or combination of processes, including for example without limitation die-stamping, bending, casting, forging, machining, milling, drilling, etc.

Referring to FIGS. 51-58, connector plates 340 may have an axially elongated and generally flat body including an axial centerline 348, an outer surface 348, inner surface 349, opposing ends 350, and opposing lateral sides 351. Axial centerline 348 aligns with mounting axis 330 defined by mounting tangs 322 when the corner members 320 and connector plates 340 are assembled. When assembled, a pair of connector plates 340 may be coupled together with opposing inward facing inner surfaces 349 covering opposing outer and inner surfaces 331, 332 of the mounting tangs of corner members 320. Connector plates 340 may have a lateral width W1 and axial length L1 larger than the width. The lateral sides 351 may have any shape (in top plan view), including straight, convex, concave, angled, and others.

The corner members 320 and connector plates 340 may each include mutually configured and mating mechanical interlock features to form a strong, mechanically coupled generator frame 301. The interlock features may include a lateral interlock feature and an axial interlock feature.

In one non-limiting example to form a lateral interlock feature, the connector plates 340 may include lateral locking tabs 343 configured to engage complementary configured lateral locking recesses 328 formed in lateral sides 333 of the mounting tangs 322 of each corner member 320. The locking tabs 343 may project inwardly on the connector plates 340 towards and in a direction transverse to an axial centerline 348 defined by the connector. In one configuration, two locking tabs 343 may be provided. Locking tabs 343 may be offset from axial centerline 348. In one configuration, locking tabs 343 may be integrally formed as unitary parts of opposing raised peripheral portions 347 formed on the inner surface 349 of connector plates 340. Each raised portion 347 projects above the inner surface and is axially elongated extending for a distance parallel to centerline 348. In one exemplary configuration, raised portions 347 may each extend axially from a point proximate to an end 350 of the connector plate 340 to a point proximate to the midline M1 of the connector plate 340 (M1 being defined as lying across a point midway between opposing ends 350 and dividing the connector into two halves). Accordingly, raised portions 347 may be arranged asymmetrically with respect to the midline M1 of the connector plate 340 being on either one half or the other.

In some examples, locking tabs 343 may be formed alone on connector plates 340 without raised peripheral portions 347. It will further be appreciated than in additional or alternative examples, the lateral locking tabs 343 may instead be formed on the lateral sides of the mounting tangs 322 and locking recesses 328 may instead be formed in raised portions 347 on connector plates 340 providing a reverse construction. In either construction described herein, these lateral locking features assist with preventing axial withdrawal of the mounting tangs 322 from the connector plates 340 without disassembly of the inner and outer connector plates 340.

The peripheral raised portions 347 and lateral locking tabs 343 collectively define a pair of inward facing and opposing bearing surfaces 342 engaged with mounting tangs 322. The bearing surfaces 342 may have a complementary configuration to the peripheral shape of corner member mounting tangs 322. This in turn further defines a mounting cavity 335 on the inner surface 349 of each connector plate 340 having a complementary configuration to the perimeter of mounting tangs 322. The mounting tangs 322 substantially fill the cavity 335 when mounted therein, thereby forming a mating and interlocked keyed fit between the connector plates 340 and corner members 320.

In one non-limiting example to form an axial interlock feature, the connector plates 340 may further include locking protrusions 345 arranged to engage complementary configured end locking recesses 329 formed on the mounting tangs 322. The locking recesses 329 may be disposed and formed in the free ends 325 of the mounting tangs 322 and face outwards away from body 321 and center point 327. In one arrangement, the locking protrusion 345 may be formed on inner surface 349 of connector plate 340 projecting outwards from and perpendicular to the inner surface in a direction transverse to the axial centerline 348. The locking protrusions 345 may be aligned on the axial centerline 348 of the connector plates 340 in one exemplary arrangement as shown. In other possible arrangements, the locking protrusions may be offset from the centerline 348.

Locking protrusions 345 may have a shape (in top plan view of inner surface 349 of connector plate 340) that is configured to help resist axial withdrawal of the corner member mounting tang 322 in cooperation with the complementary shape of the end locking recesses 329. In some examples, locking protrusion 345 may have a non-rectilinear polygonal shape. In one example, the locking protrusions 345 and locking recesses 329 may have a trapezoidal shape. In addition to preventing axial and sliding withdrawal of a mounting tang 322 from the connector plate 340, the locking protrusions 345 help maintain the mounting tangs in proper position on a first connector plate until the second connector plate may be mounted thereto using fasteners 352 as described herein. This keeps mounting holes 346 and 334 in concentric alignment to permit insertion of the fasteners through the mounting tangs 322 and both connector plates.

The connector plates 340 may extend between and be operable to mechanically couple a spaced apart pair of corner members 320 together on the frame 301. In one possible arrangement, a pair of connector plates 340 may be mounted back-to-back with the foregoing interlock features described herein on each connector facing inwards towards each other for linking the pair of corner members together. In one configuration, one of the connector plates 340 may be arranged opposite to and inverted 180 degrees in longitudinal orientation to its mating connector on the opposite side of corner member mounting tang 322. In these foregoing positions, therefore, one each of the connector plates 340 may be placed on opposite sides of the mounting tang 322 of the corner member 320, thereby trapping the mounting tang between the connector plates. It should be noted that the locking protrusion 345 on one connector plate 340 will actually be located between the raised portions 347 of the opposite connector plate 340, and vice-versa. The mounting tangs 322 may be considered to form a male fastening element and the two assembled connector plates 340 a female fastening element configured to receive the male element at least partially therein.

To secure each connector plate 340 together on the mounting tang 322 of corner member 320, one or more fasteners 352 may then be inserted through mounting holes 334 and 346 formed in the mounting tangs and connector plates, respectively. In one arrangement, each connector plate 340 includes two mounting holes 346 and each mounting tang 322 includes one mounting hole 334. These holes 334, 346 become concentrically aligned when the connector plates and tangs are positioned together on each side of the mounting tang 322. Any suitable fasteners 352 may be used, including as an example without limitation threaded fasteners (e.g. bolts, screws, etc.) with mating nuts for detachable securement thereby allowing the frame to be easily assembled and disassembled. In one arrangement, two fasteners 352 may be provided for each corner member mounting tang-connector assembly 322/340. One fastener 352 each may be located proximate to each end 350 of the connector plate 340. In other possible examples, the connector plates 340 may be more permanently joined together with the mounting tang 322 trapped between them such as with rivets, welding, soldering, etc.

The connector plates 340 may be made of any suitable material having sufficient strength, stiffness, and thickness to form a substantially rigid structural member which resists bending and deflection without the application of undue force. In some non-limiting examples, the connector plates 340 may each be made of metal, such as without limitation aluminum, steel, or other. In one non-limiting exemplary construction, the connector plates 340 may be made of die-cast aluminum. In one example, each connector plate 340 may have a thickness ranging from about and including 0.125 inches to 0.625 inches. In one example, without limitation, the thickness may be about 0.25 inches. Connector plates 340 may be made by any suitable fabrication process or combination of processes, including for example without limitation die-stamping, bending, casting, forging, machining, milling, drilling, etc.

Figure 65:
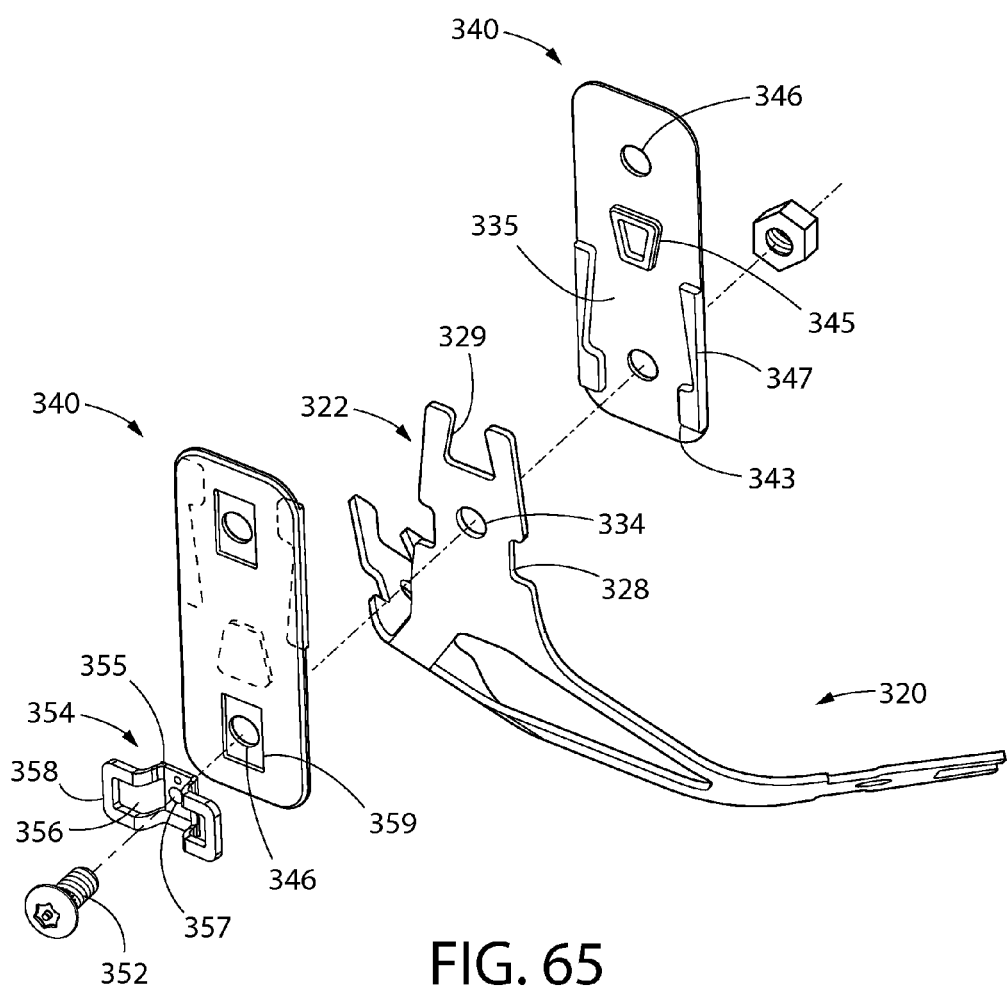
FIG. 65 is an exploded view of the corner member mounting tang and connector plate assembly including an accessory clip.
Figure 66:
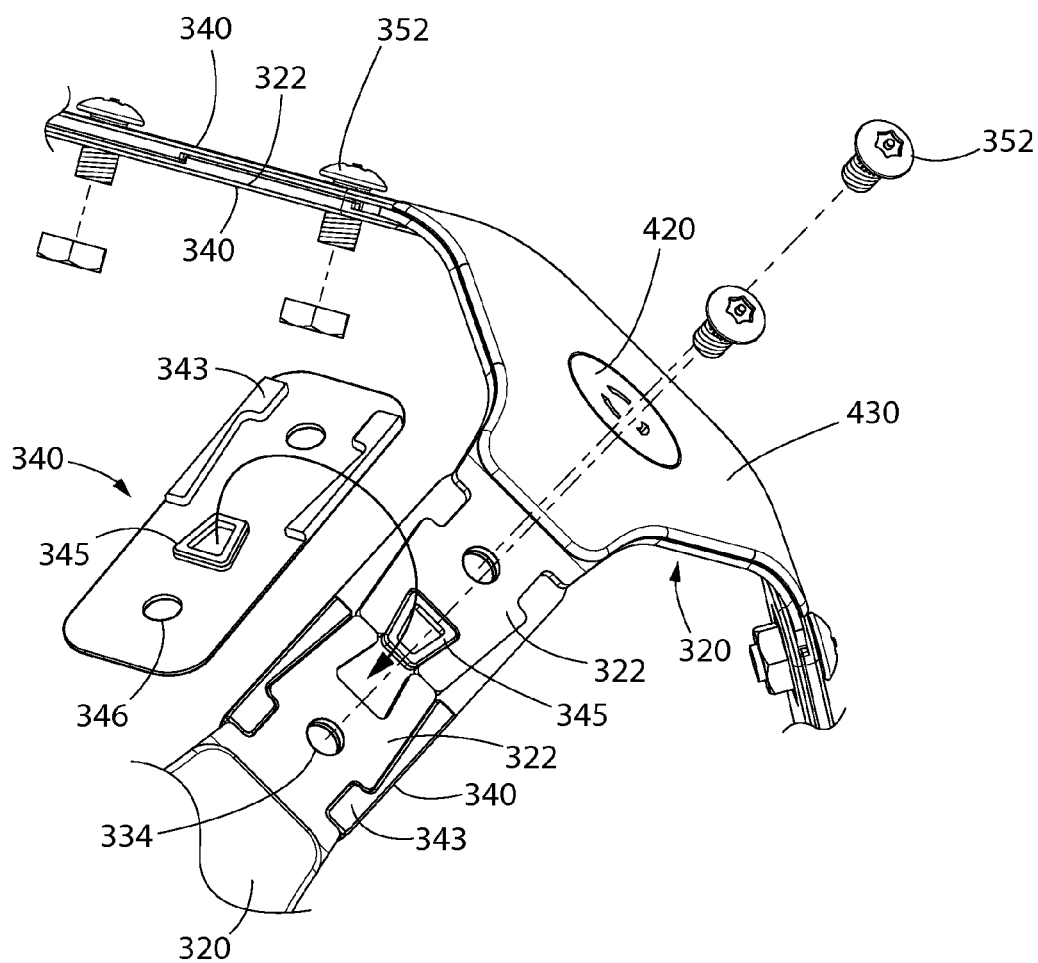
FIG. 66 is a partially assembled perspective view of two corner members being joined together by the mounting tangs via a pair of connector plates.
Figure 67:
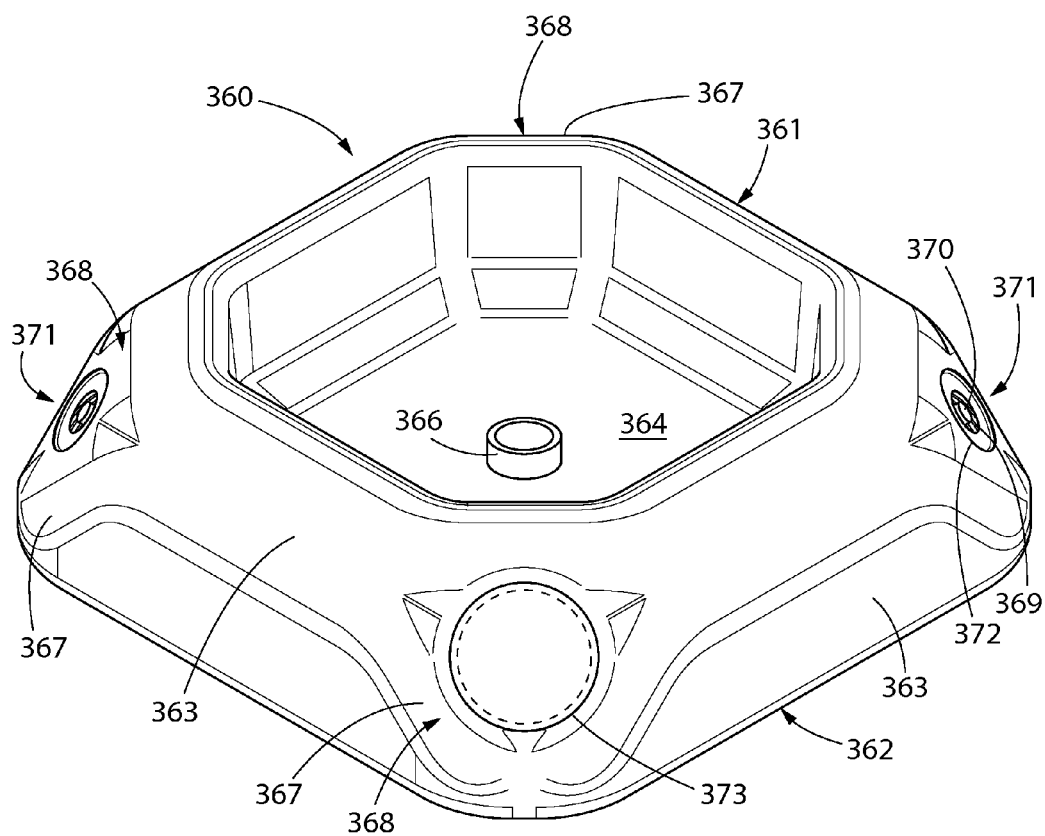
FIG. 67 is a top plan view of the permanent fuel tank of the portable generator with modular generator frame of FIG. 33.
Figure 68:
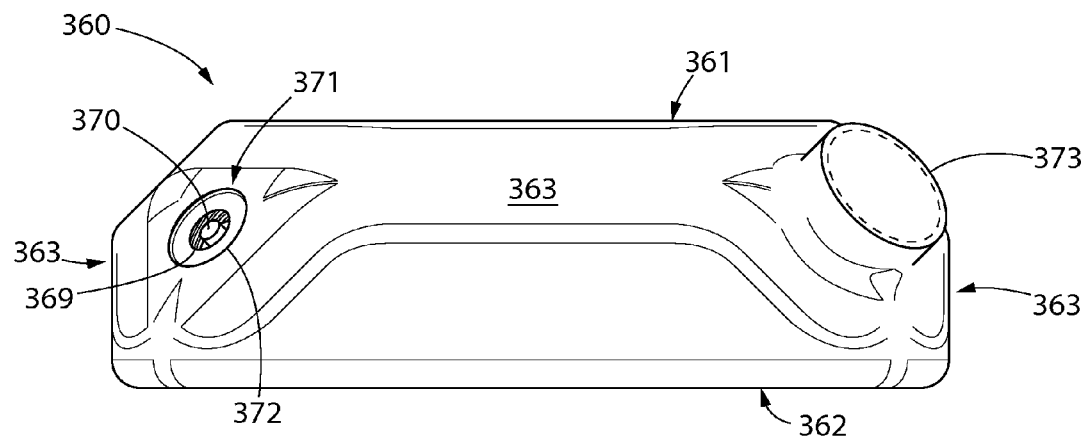
FIGS. 68-71 are side elevation views thereof.
Figure 69:
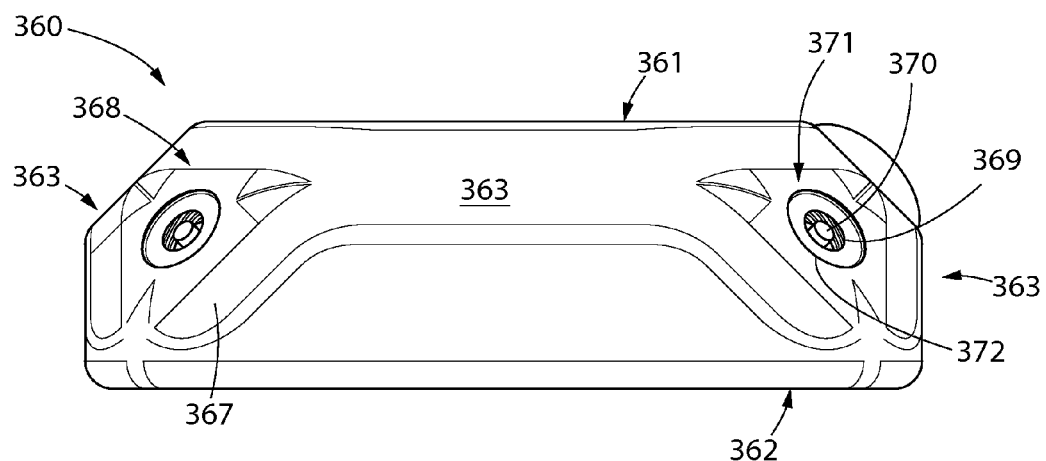
Figure 70:
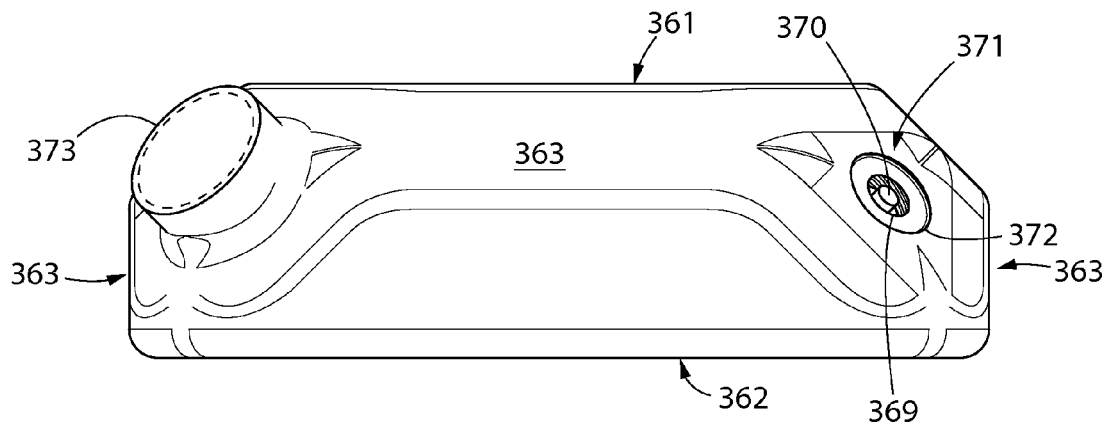
Figure 71:
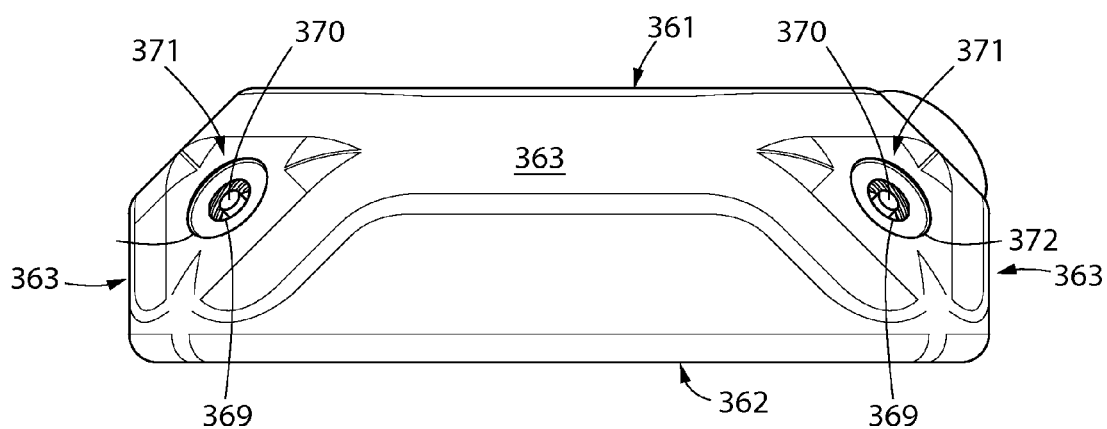
Figure 72:
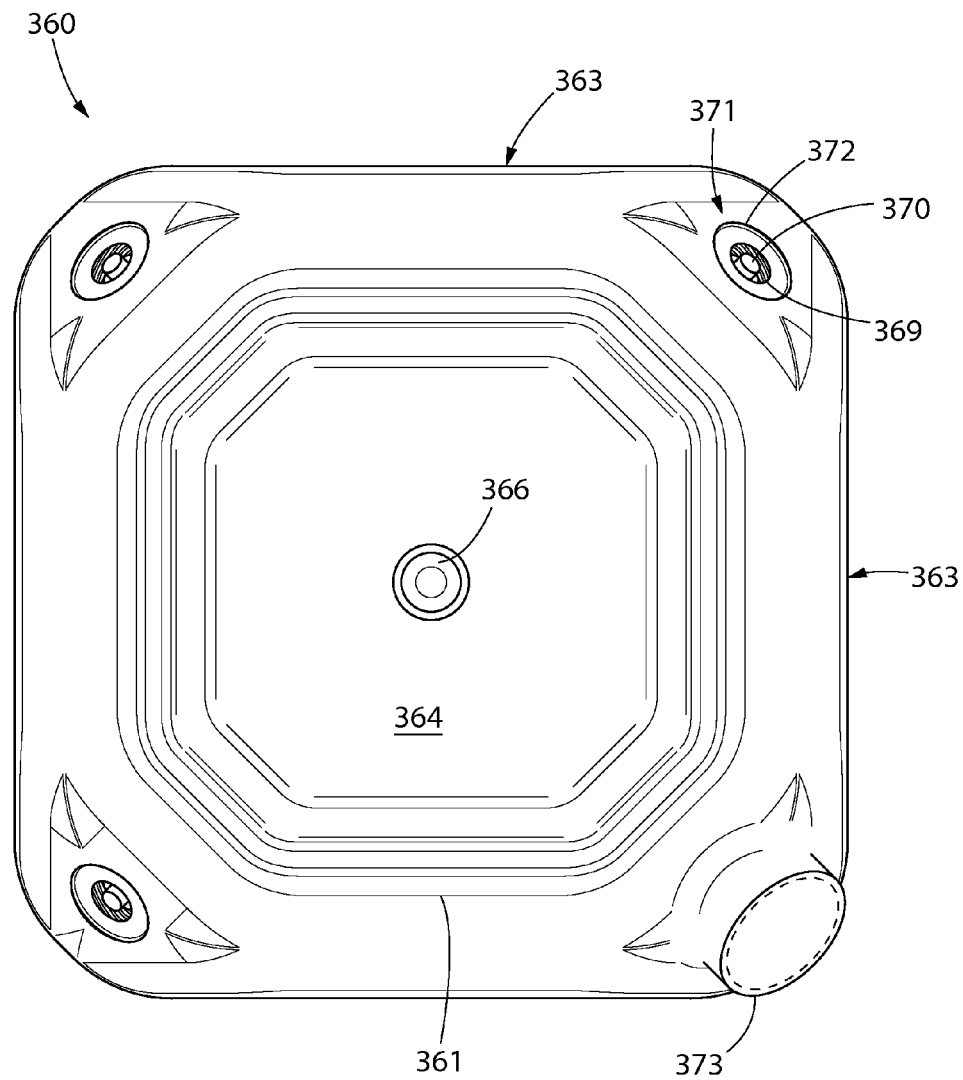
FIG. 72 is a top plan view thereof.
Figure 73:
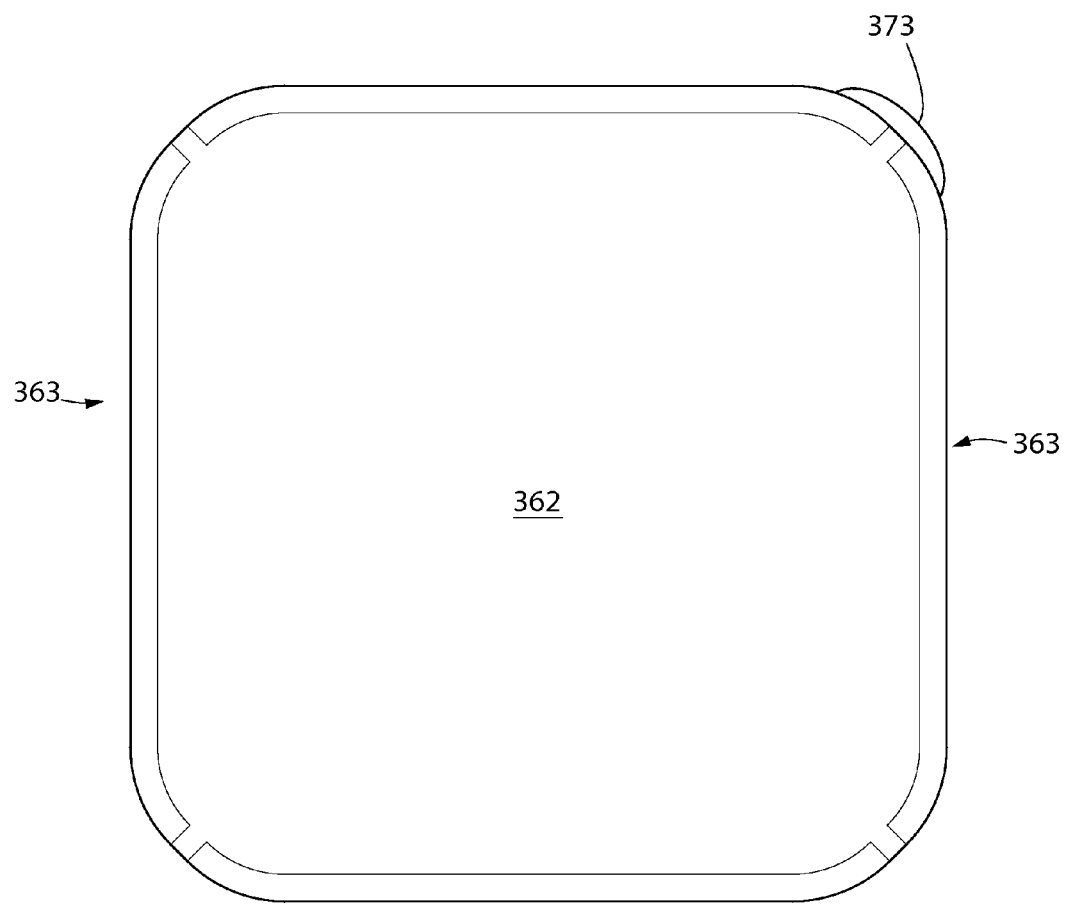
FIG. 73 is a bottom plan view thereof.
Figure 74:
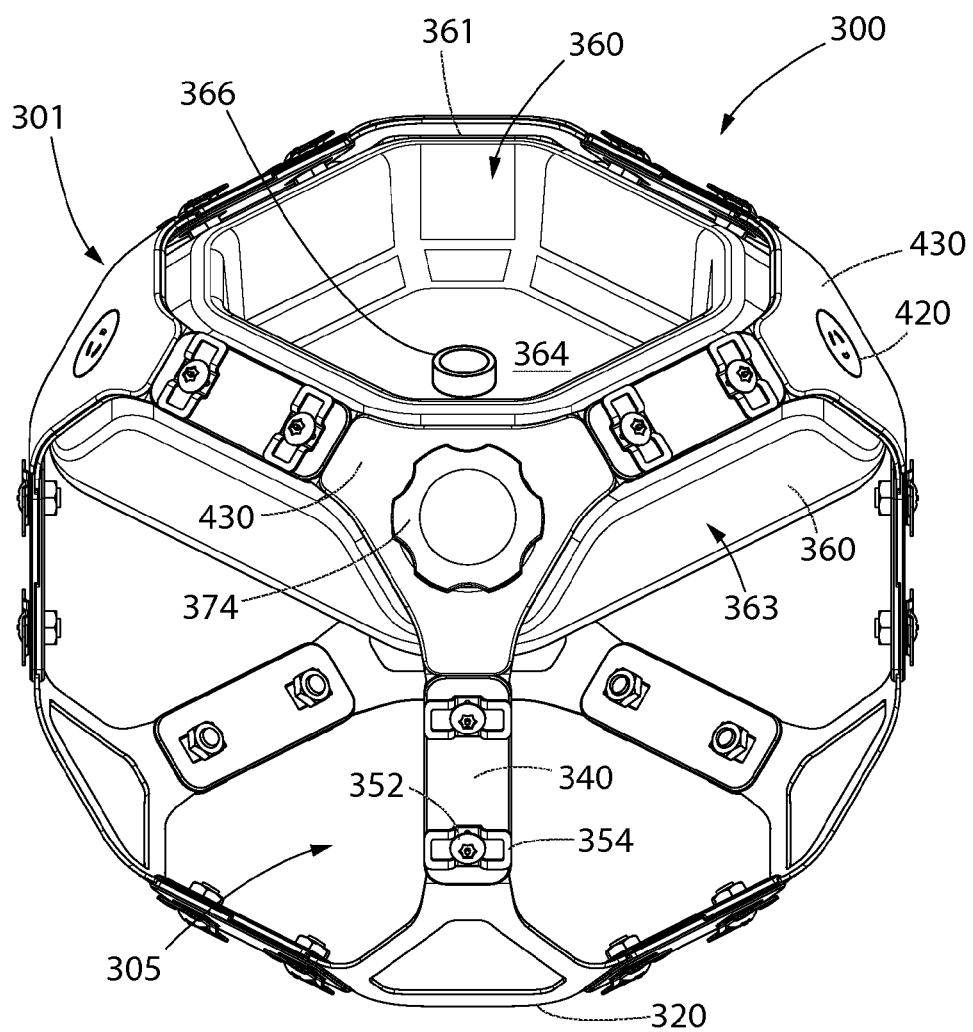
FIGS. 74-81 show various views of the permanent fuel tank mounted in the modular generator frame.
Figure 75:
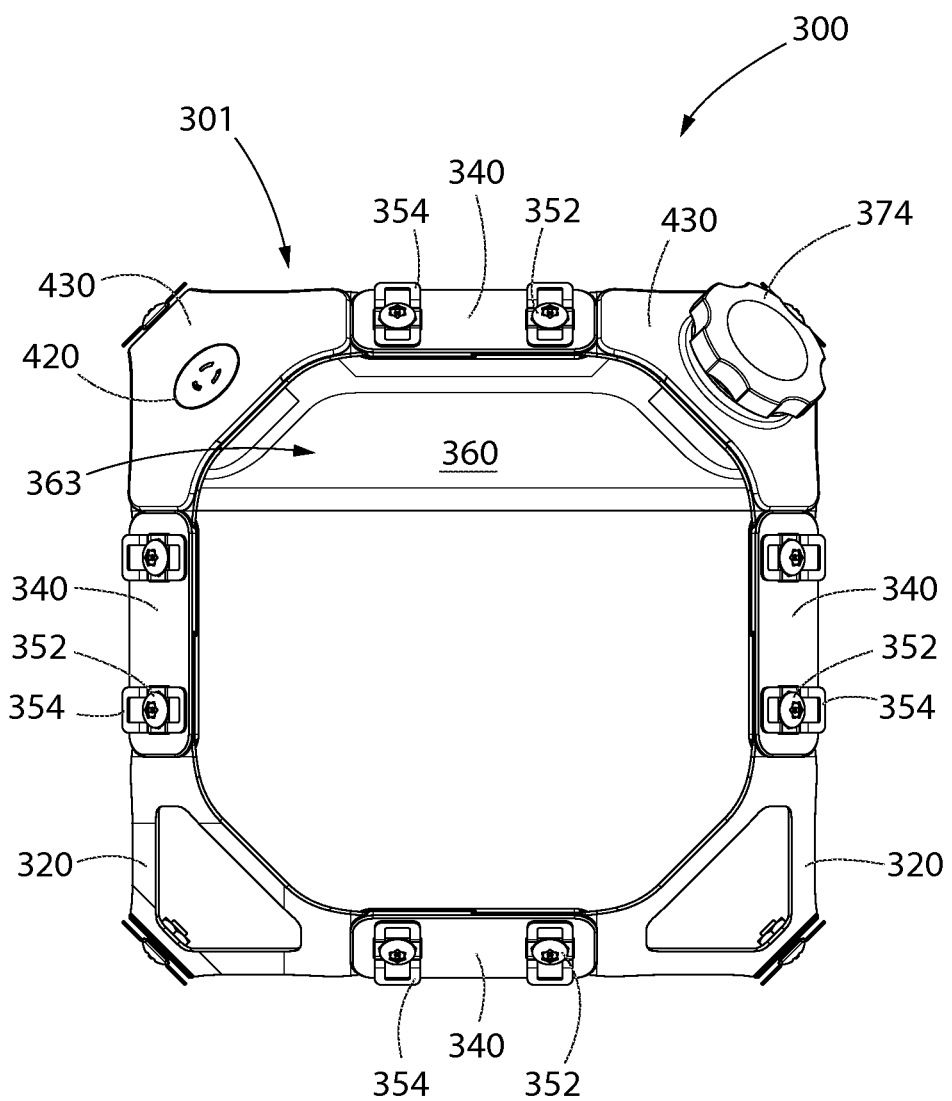
Figure 76:
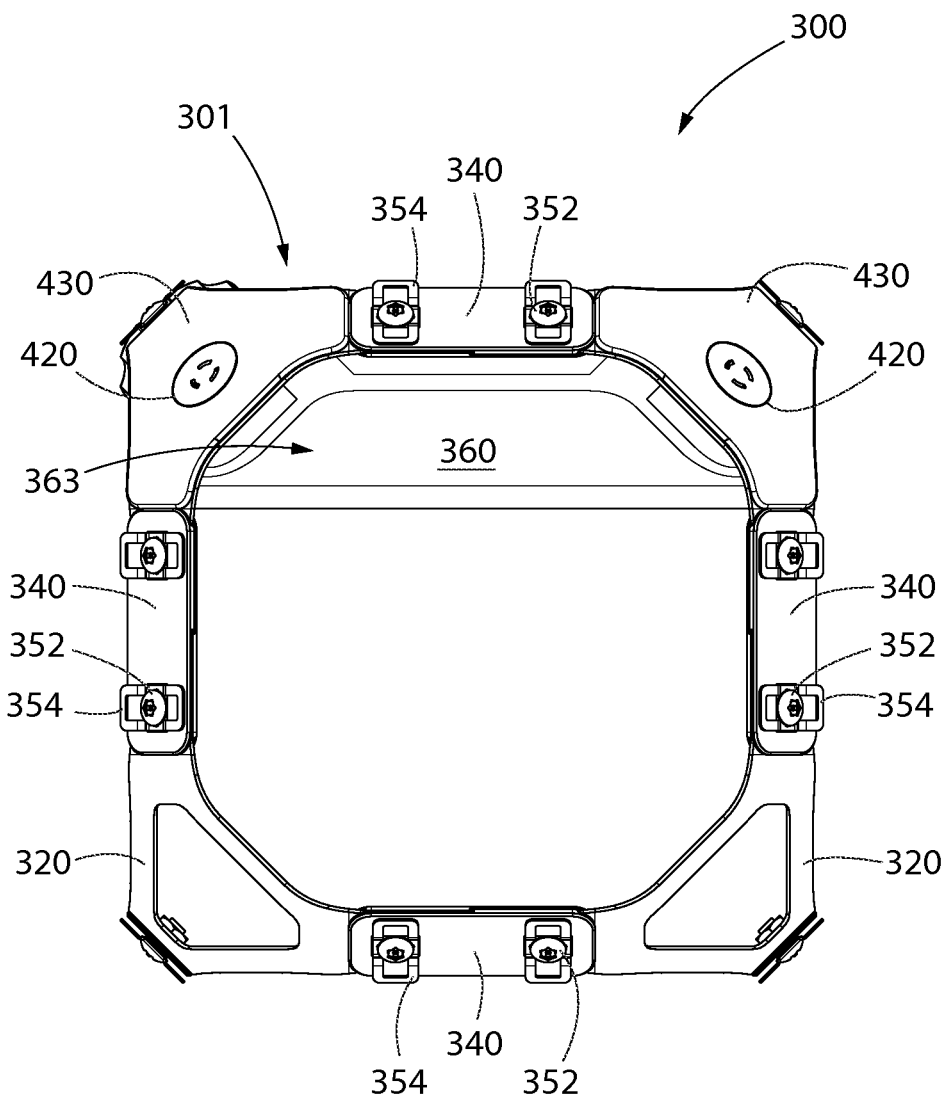
Figure 77:
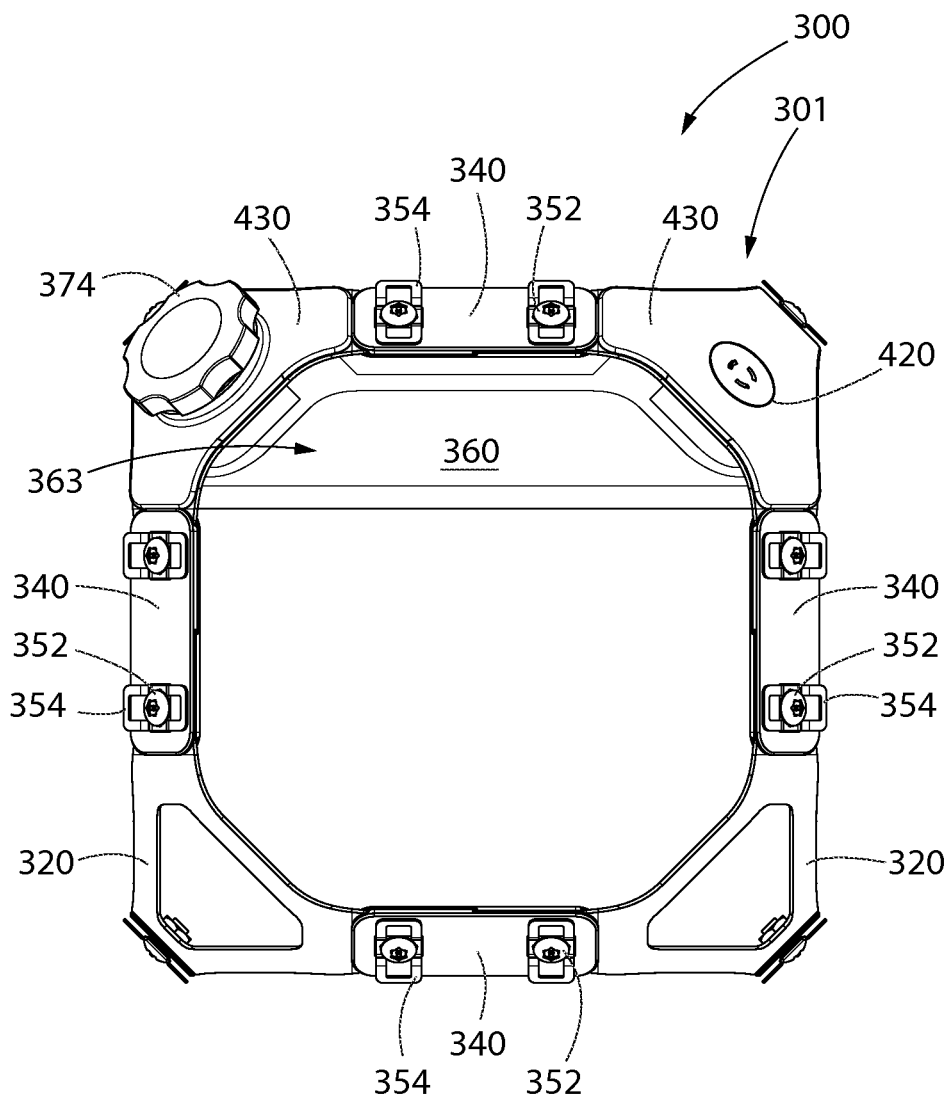
Figure 78:
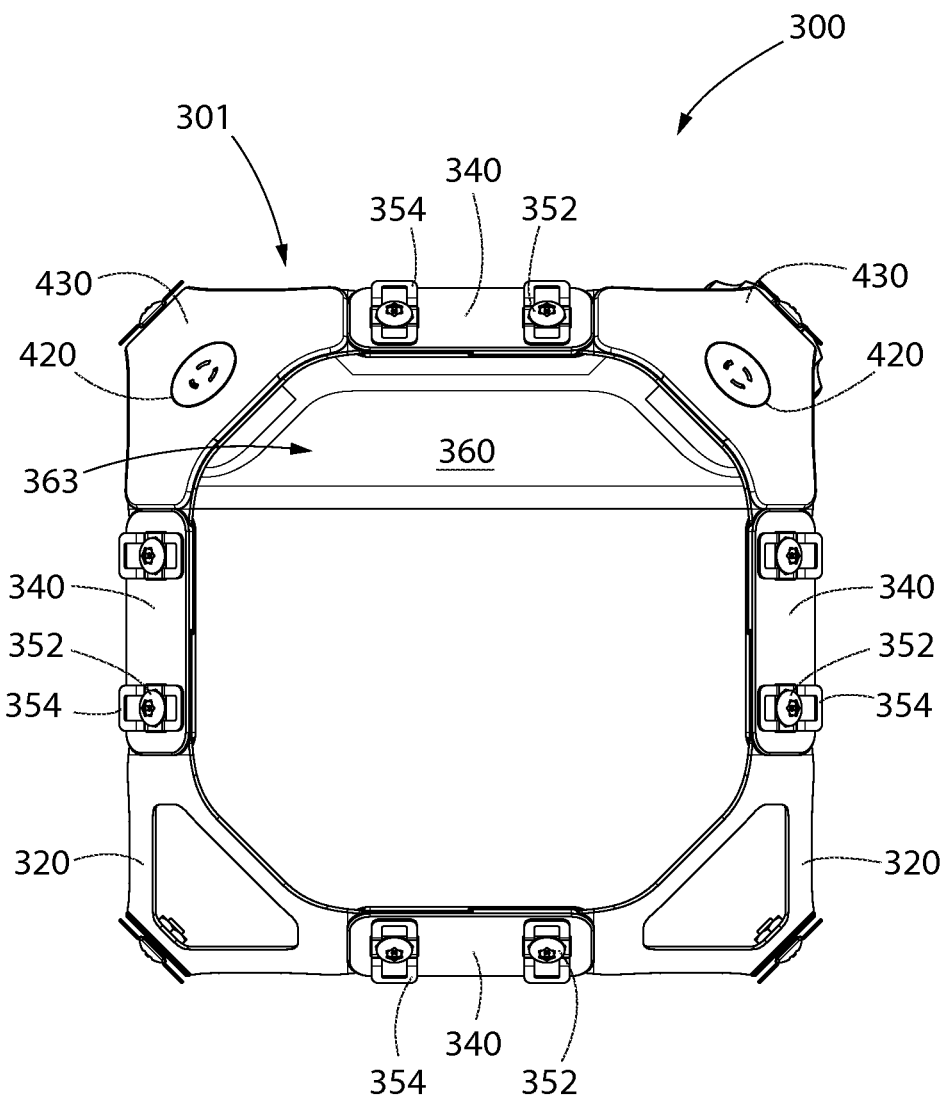
Figure 79:
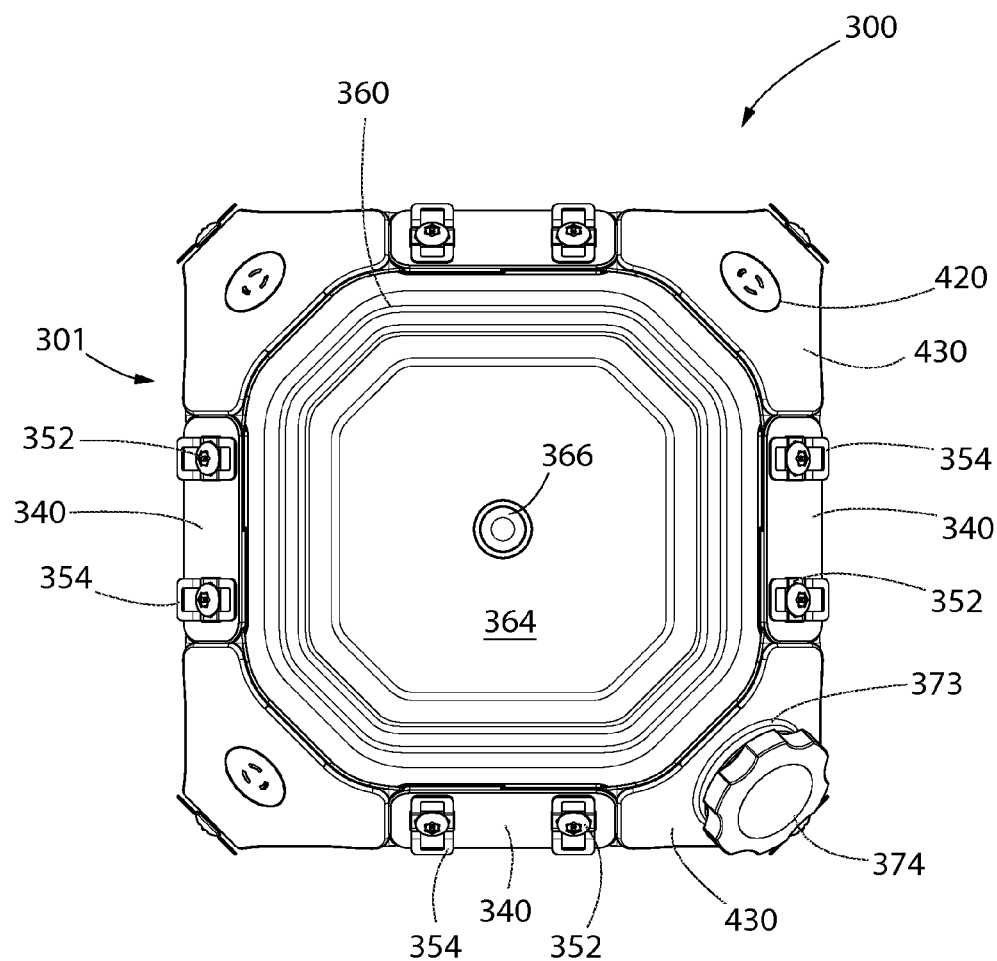
Figure 80:
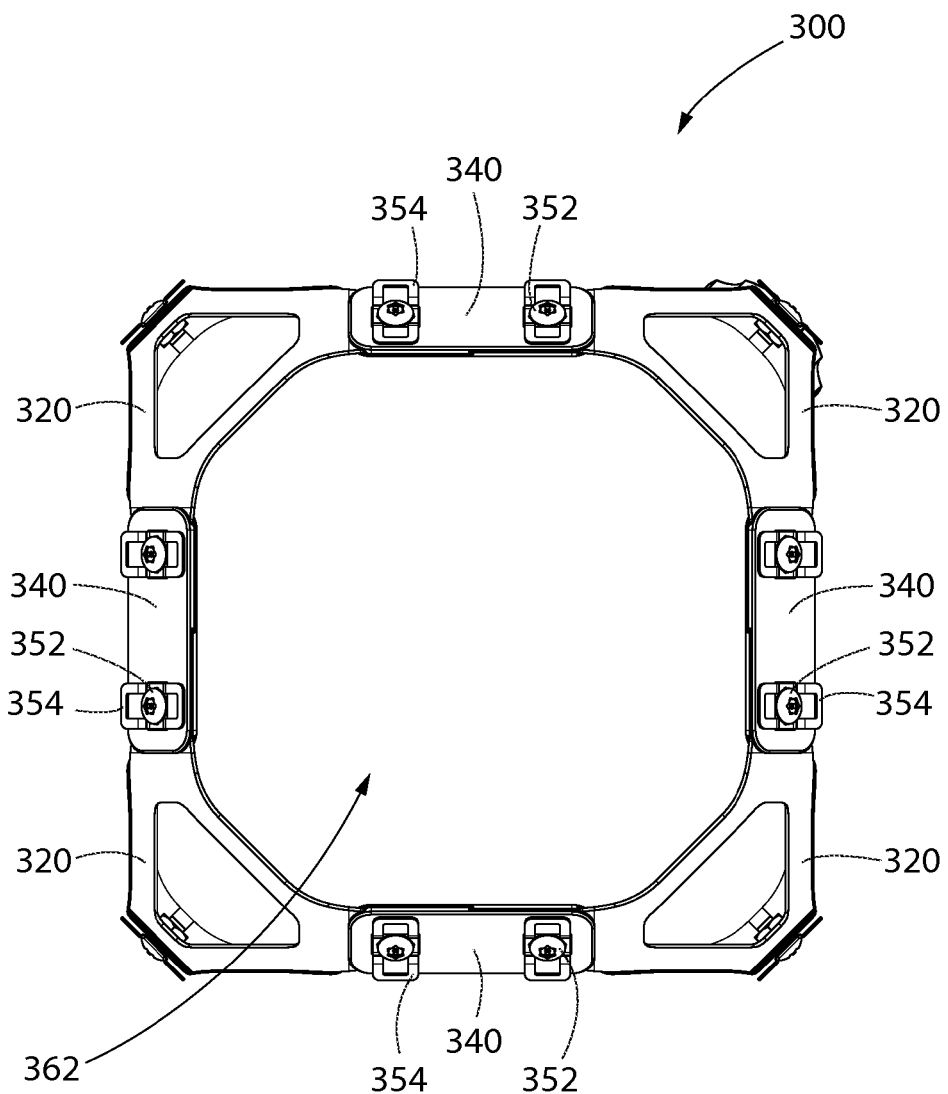
Figure 81:
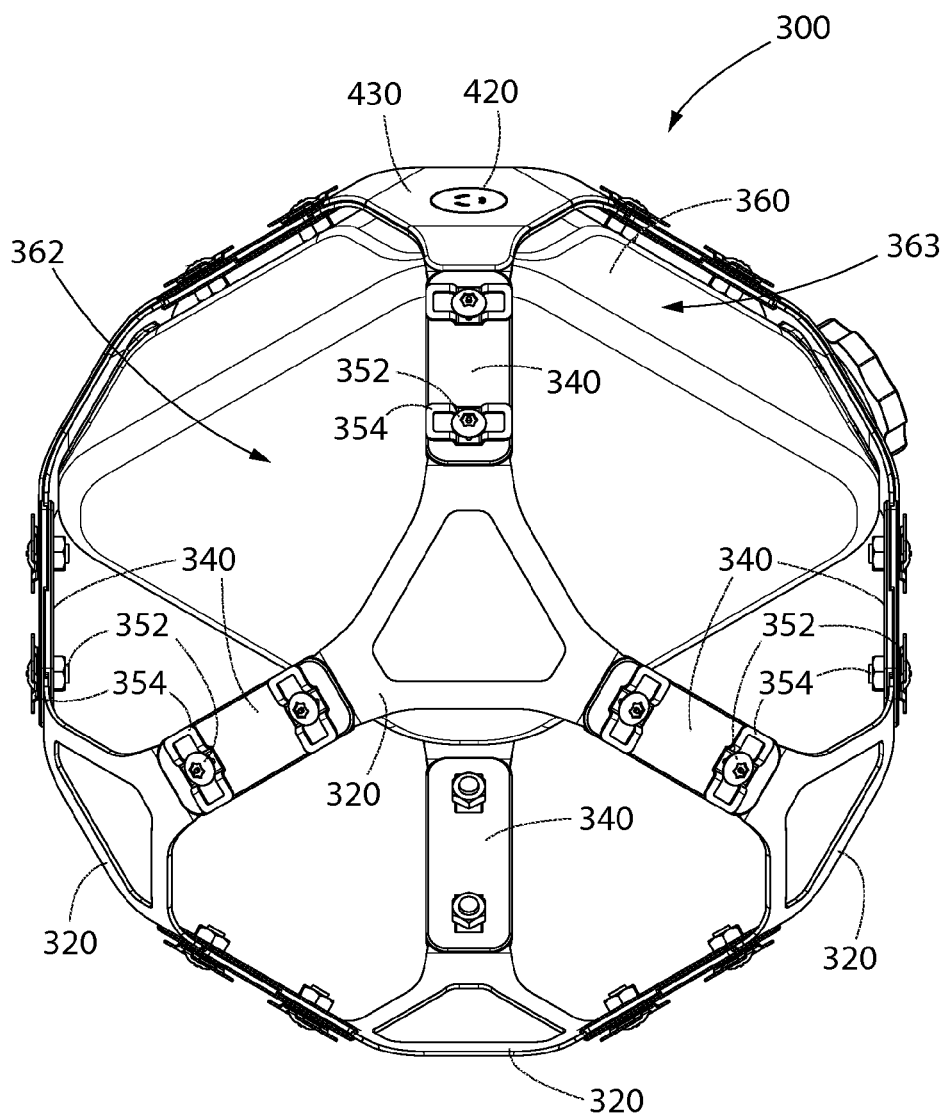
Figure 82:
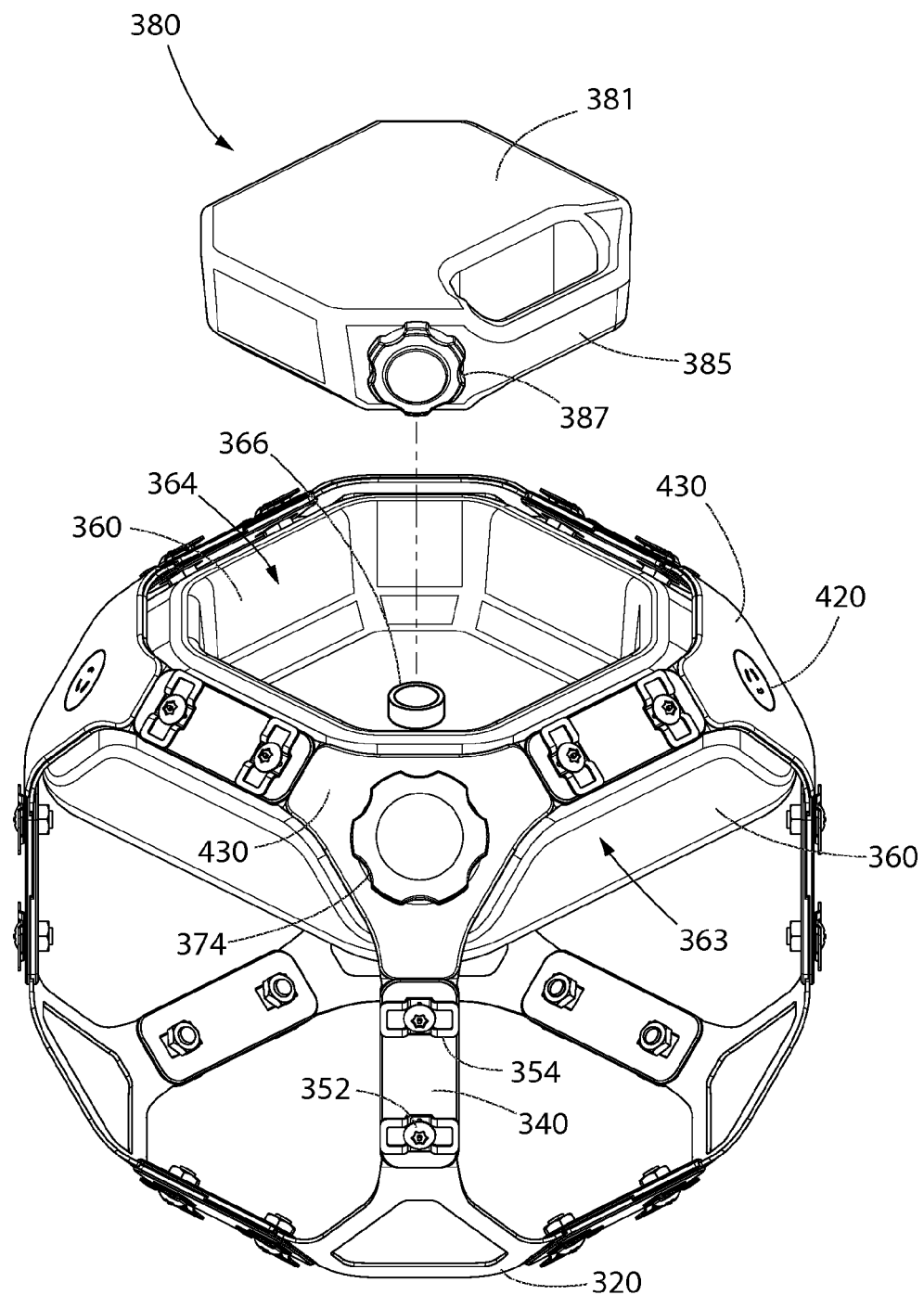
FIG. 82 is an exploded view showing a removable portable fuel tank insertably mountable into the top of the permanent fuel tank.
Figure 83:
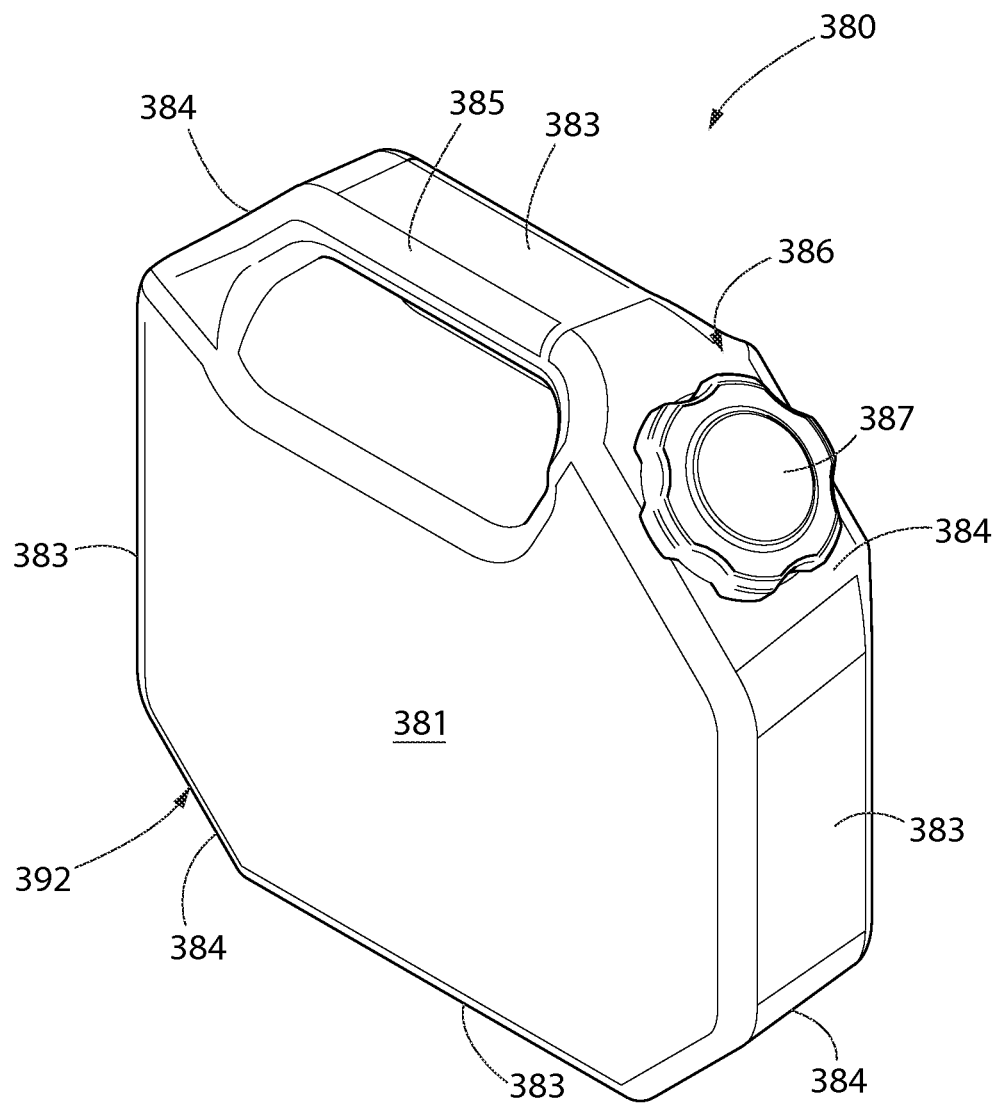
FIG. 83 is a top perspective view of the portable fuel tank of FIG. 82.
Figure 84:
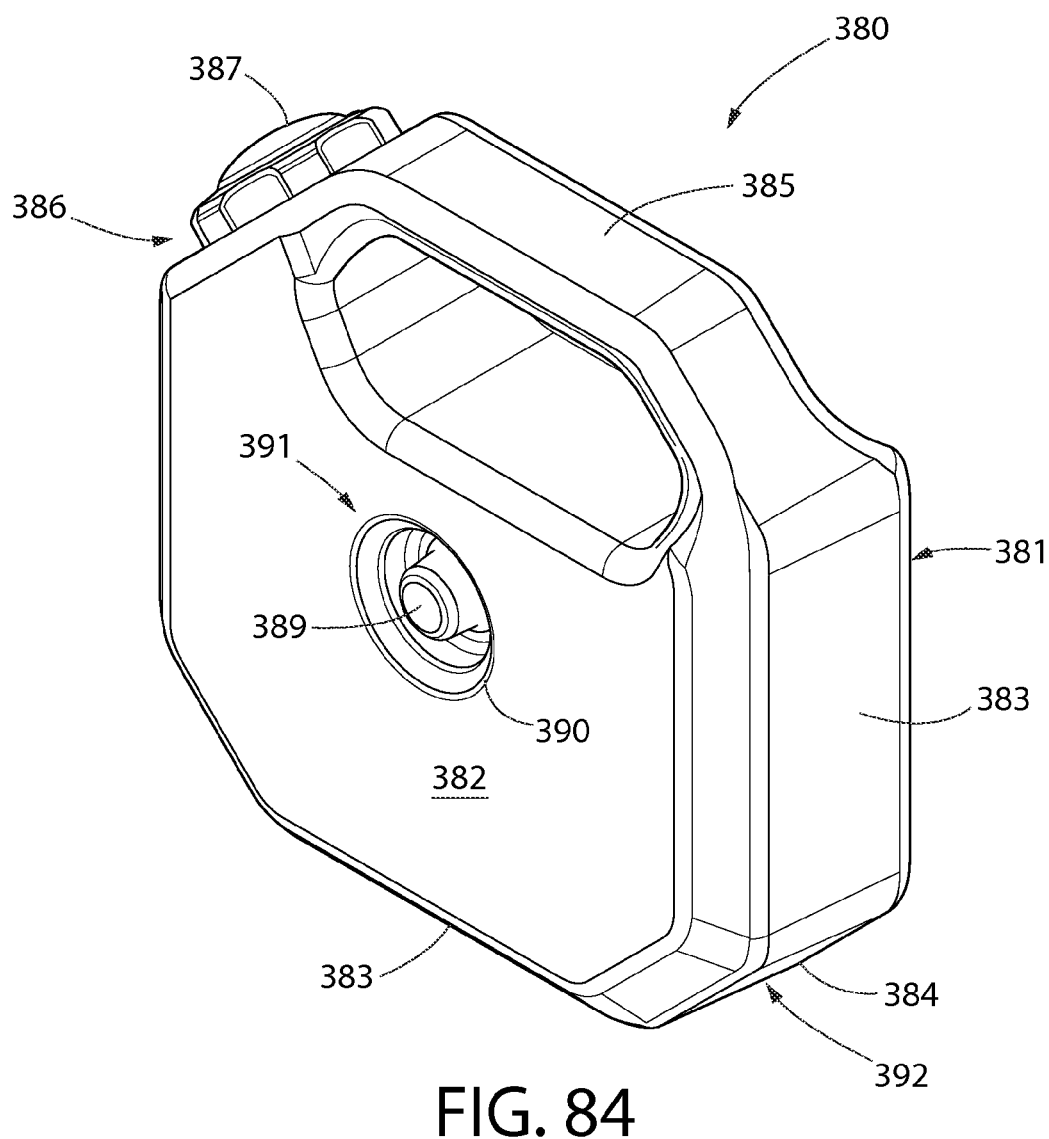
FIG. 84 is a bottom perspective view thereof showing the fluid outlet coupling for fluid connection to the permanent fuel tank.
Figure 85:
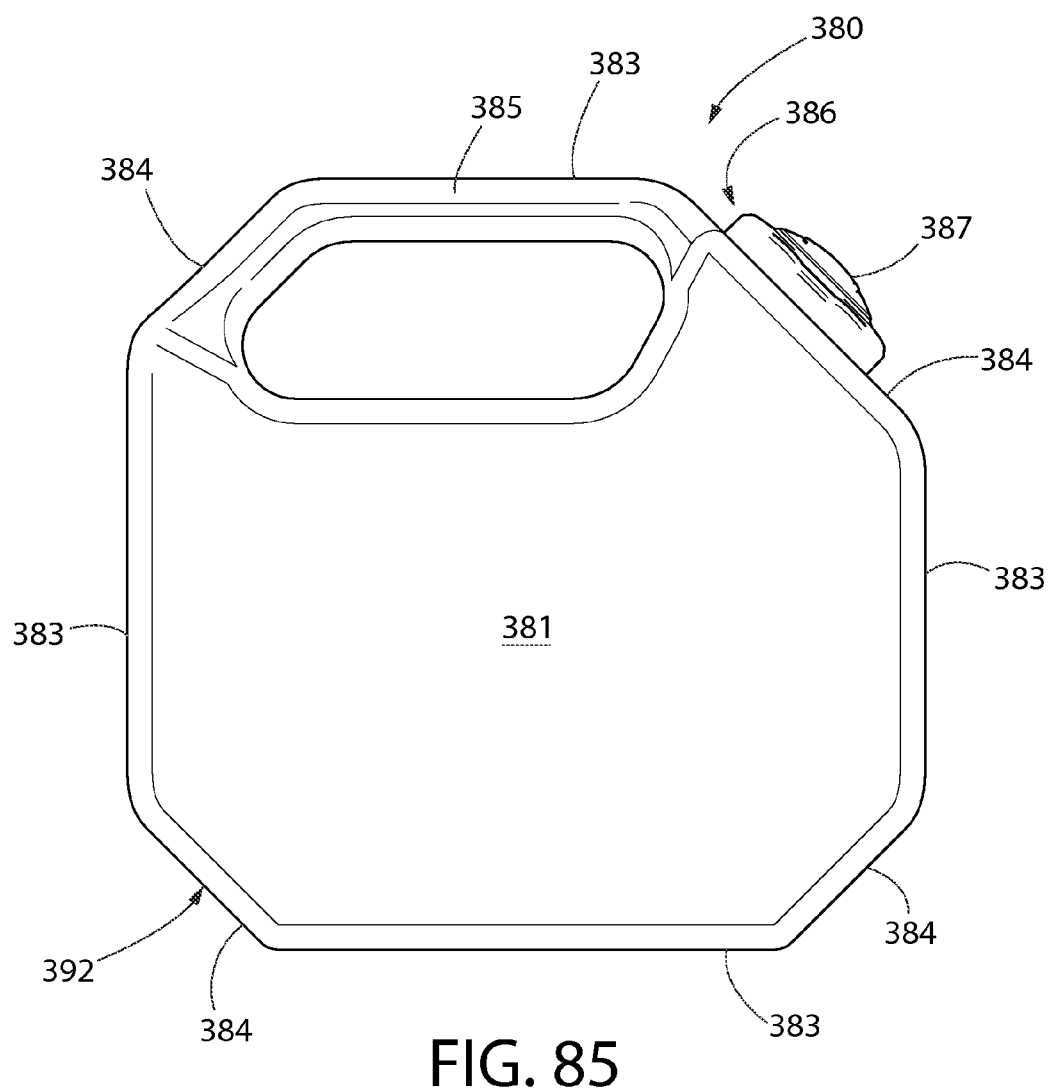
FIG. 85 is a top plan view thereof.
Figure 86:
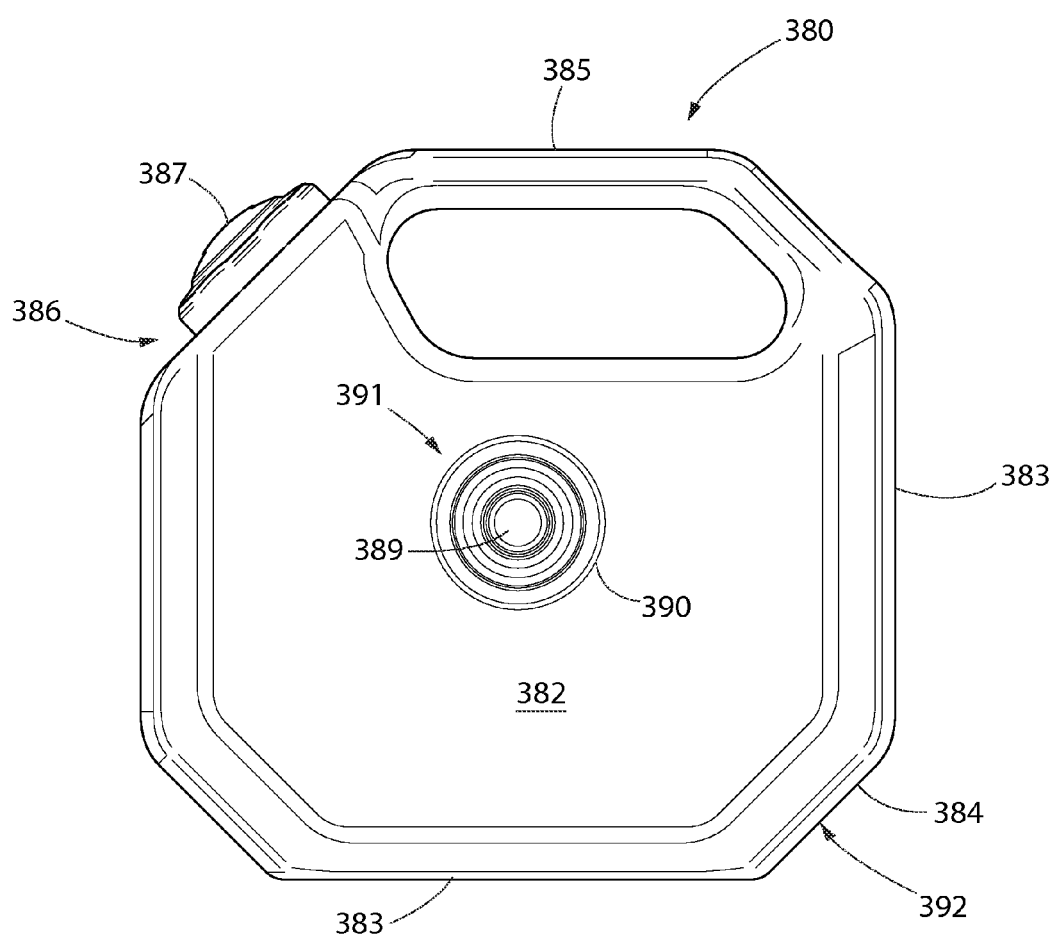
FIG. 86 is a bottom plan view thereof.
Figure 87:
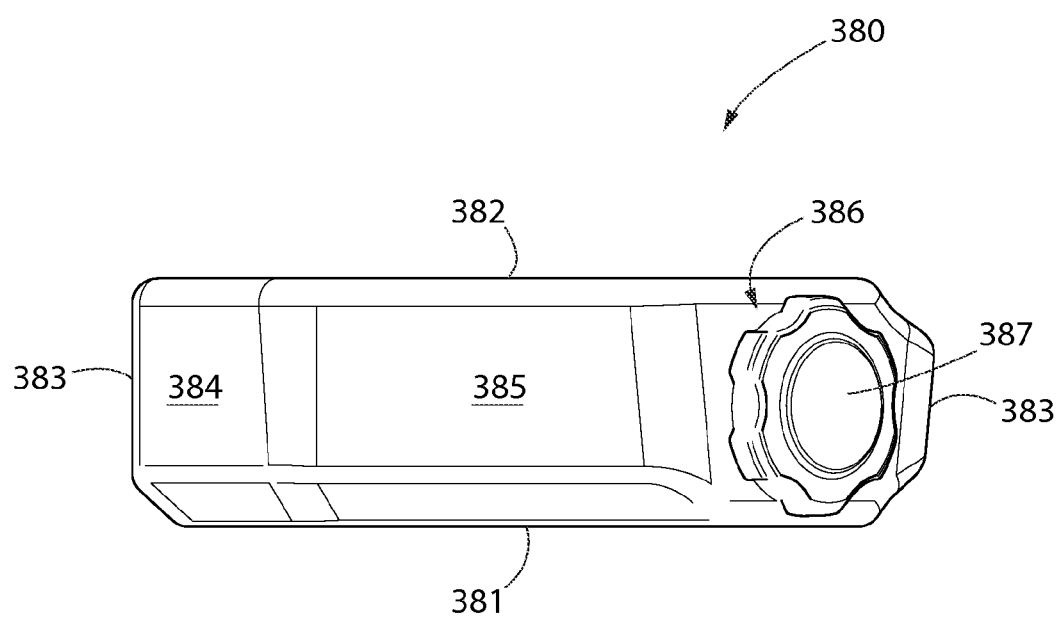
FIGS. 87-88 are side views thereof.
Figure 88:
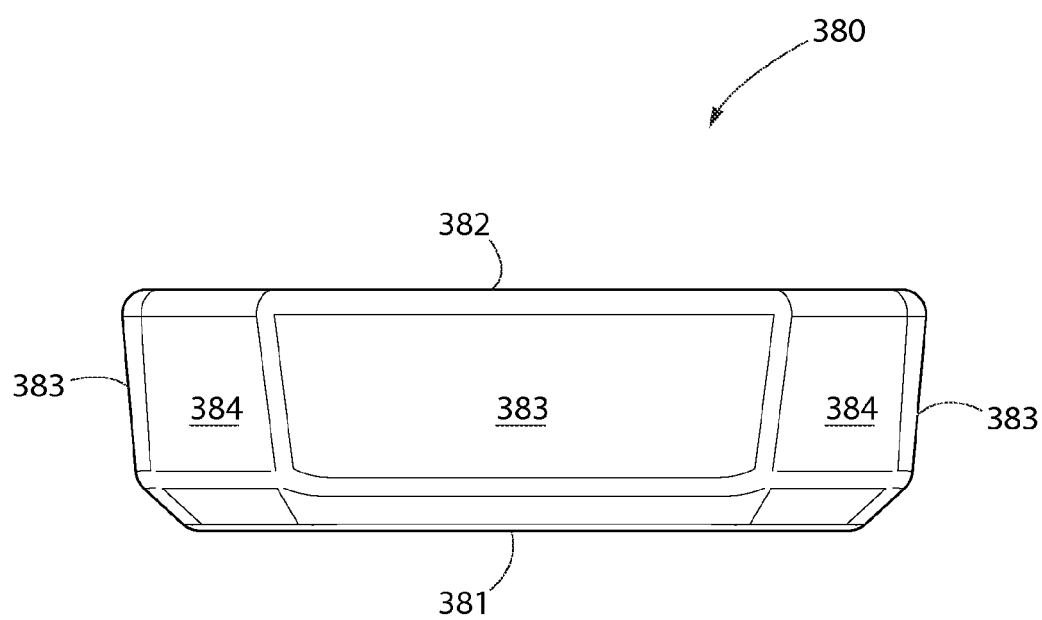
Figure 89:
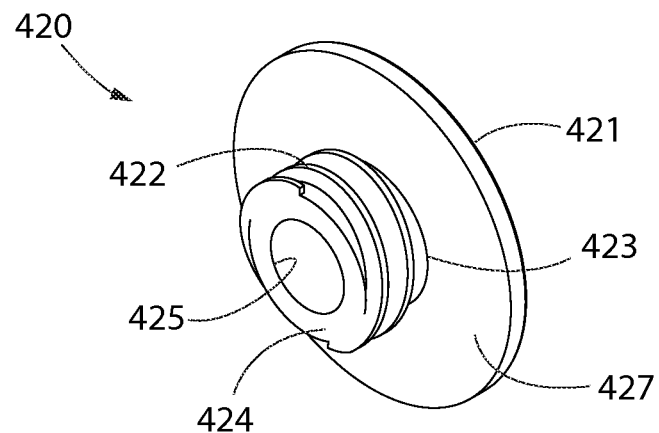
FIGS. 89 and 90 are rear and front perspective views respectively of a fuel tank fastener.
Figure 90:
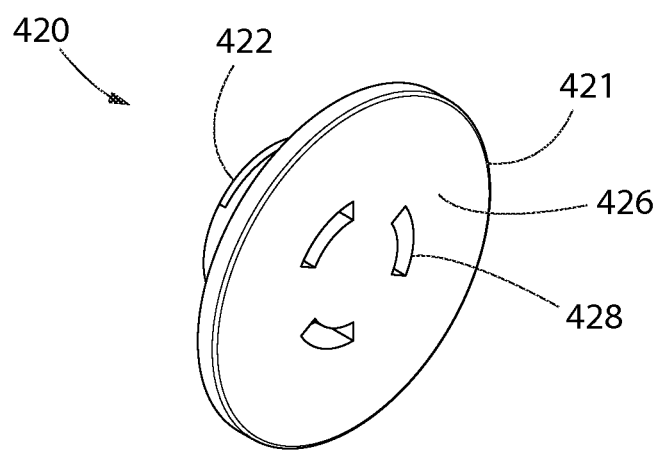
Figure 91:
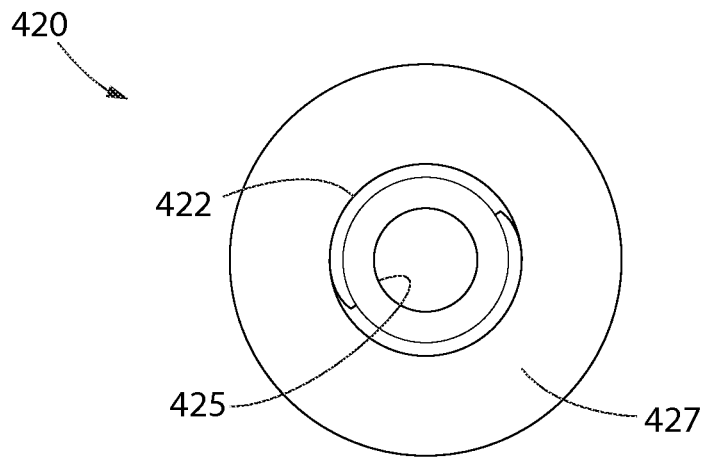
FIGS. 91, 92, and 93 are rear plan, front plan, and side views respectively thereof.
Figure 92:
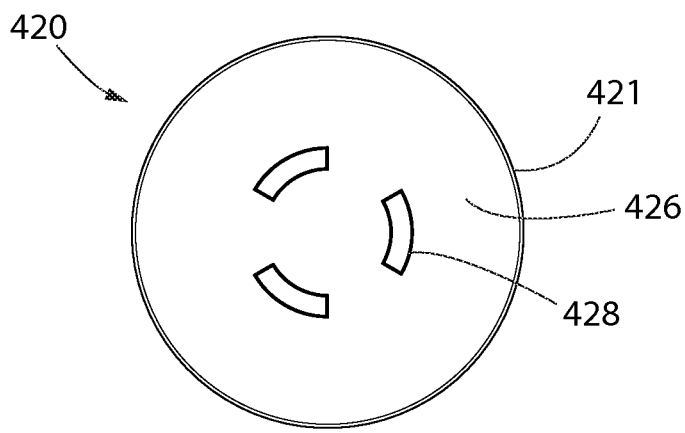
Figure 93:
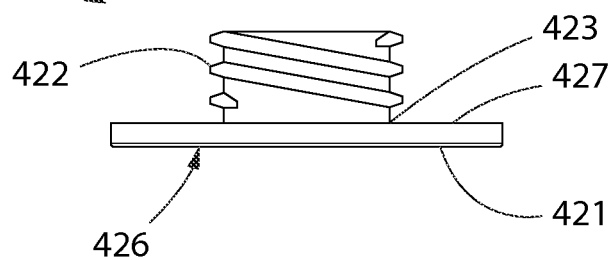
Figure 94:
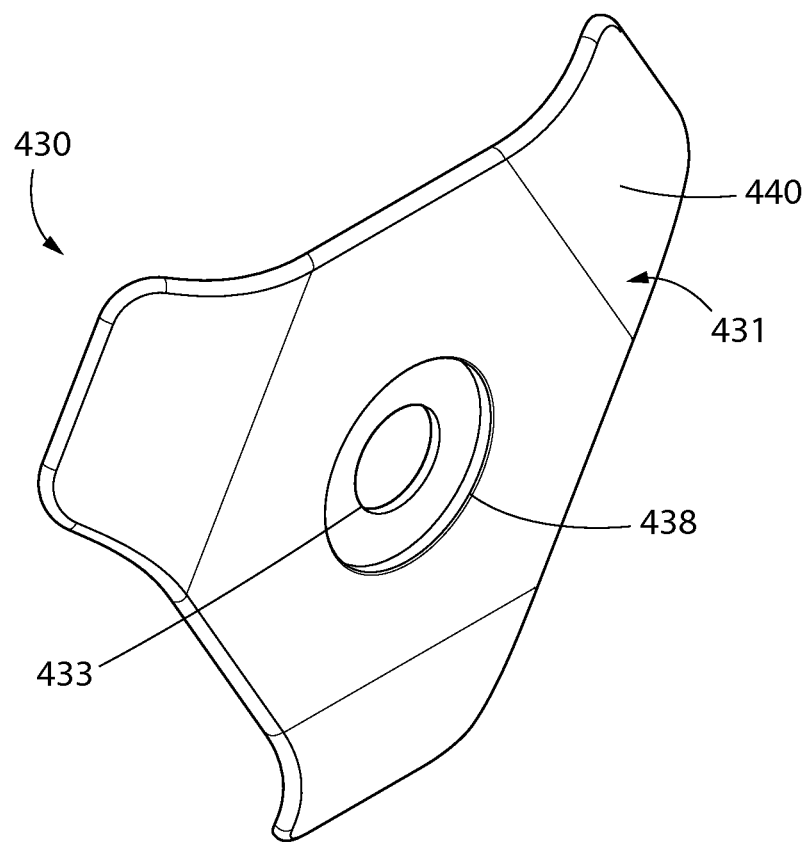
FIG. 94 is a front (exterior) perspective view of a corner cap attachable to the corner members of the generator frame.
Figure 95:
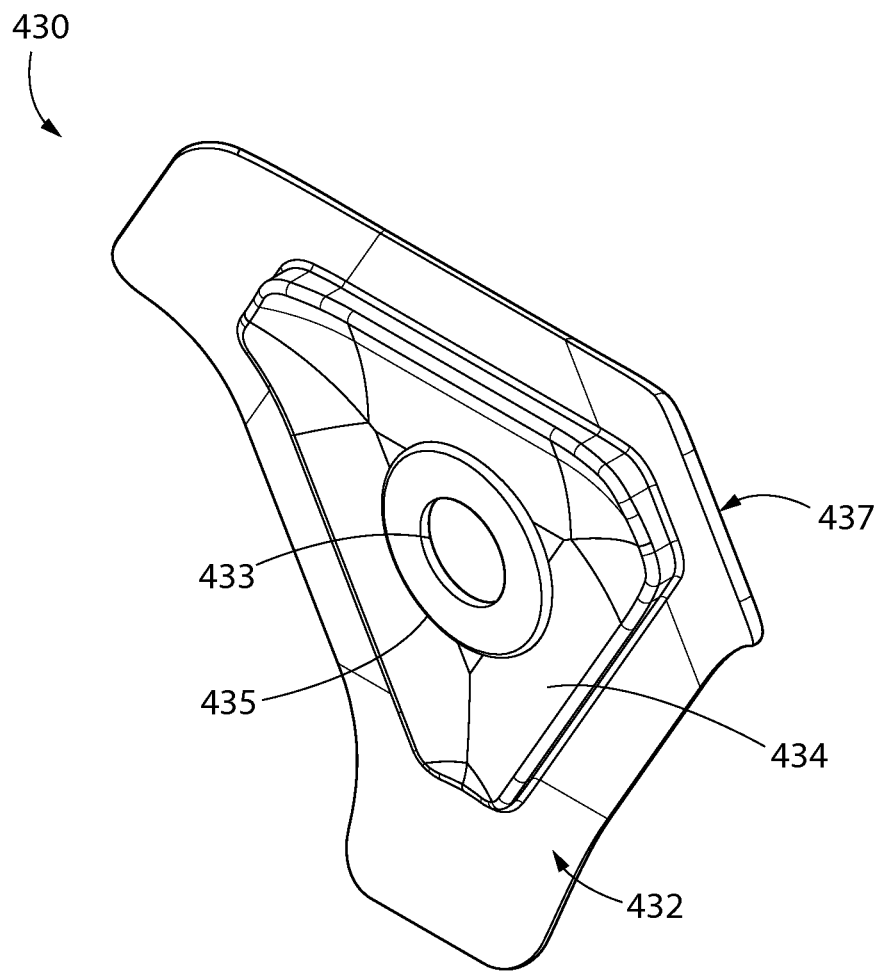
FIG. 95 is a rear (interior) perspective view thereof.
Figure 96:
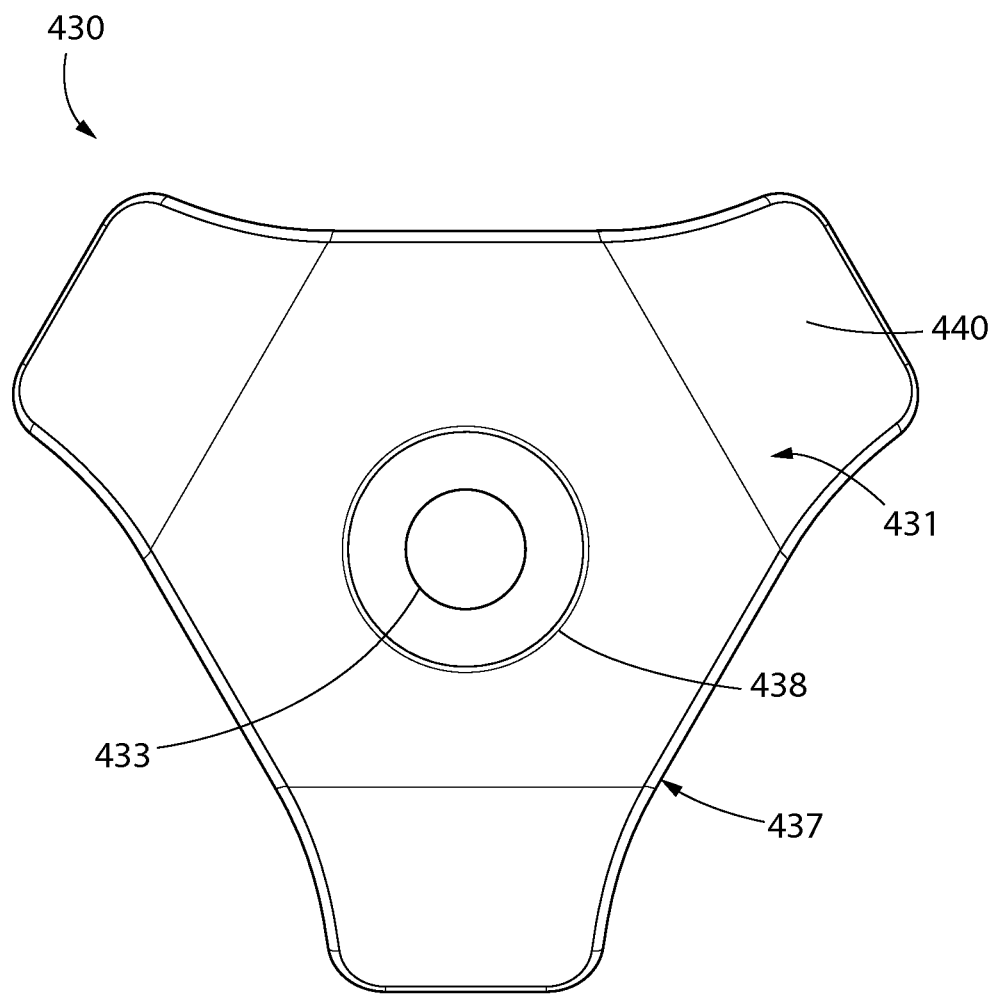
FIGS. 96 and 97 are front and rear plan views thereof.
Figure 97:
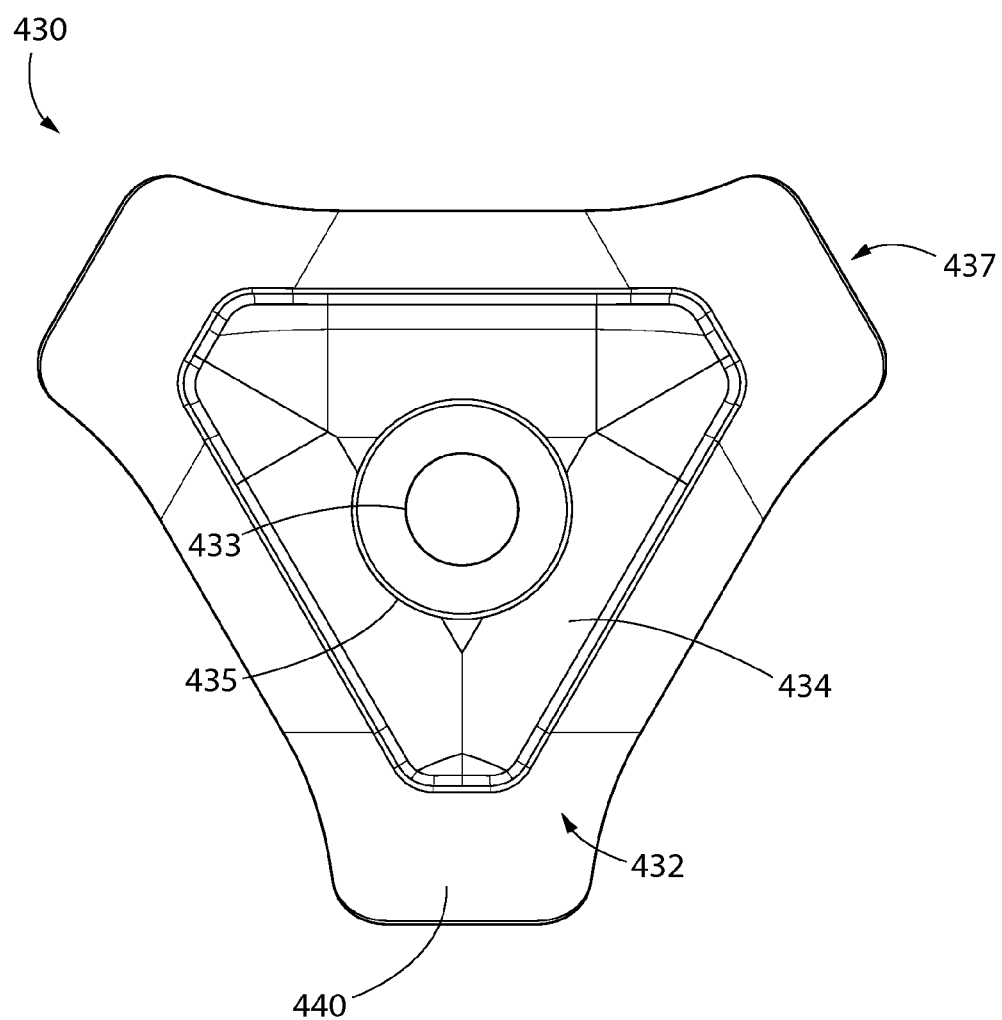
Figures 98, 99:
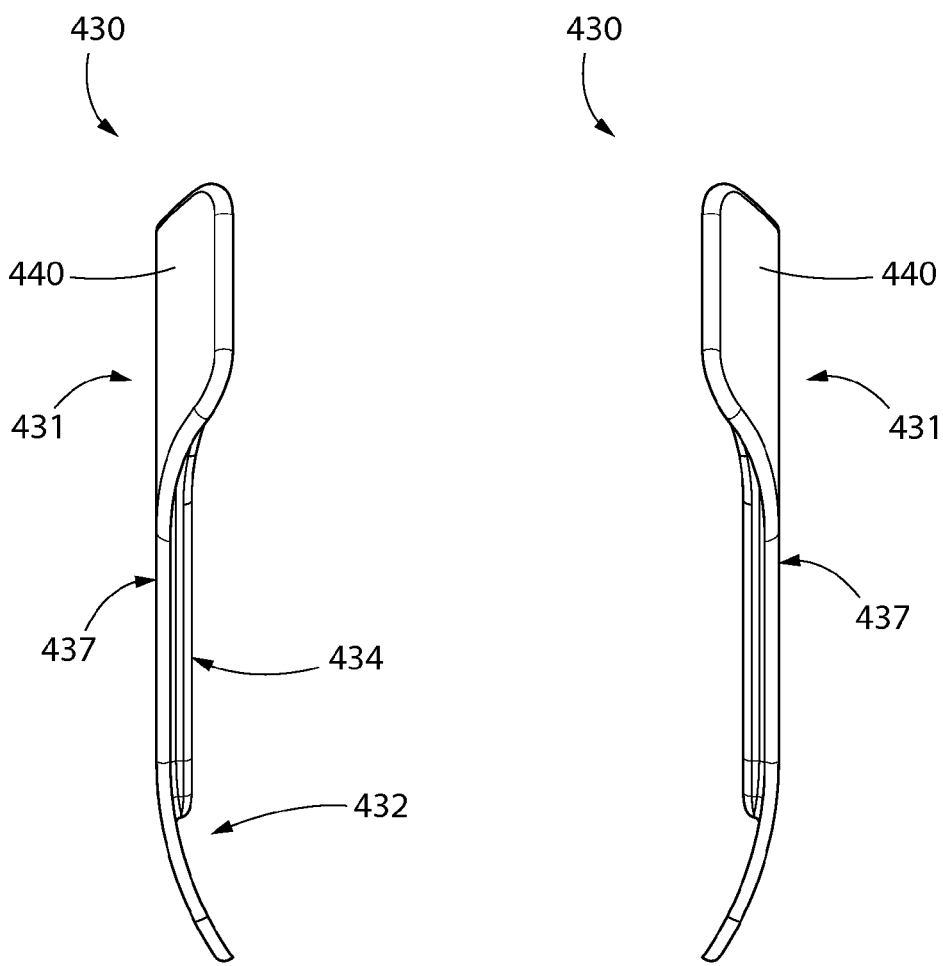
FIGS. 98-101 are side views thereof from different perspectives.
Figure 100:
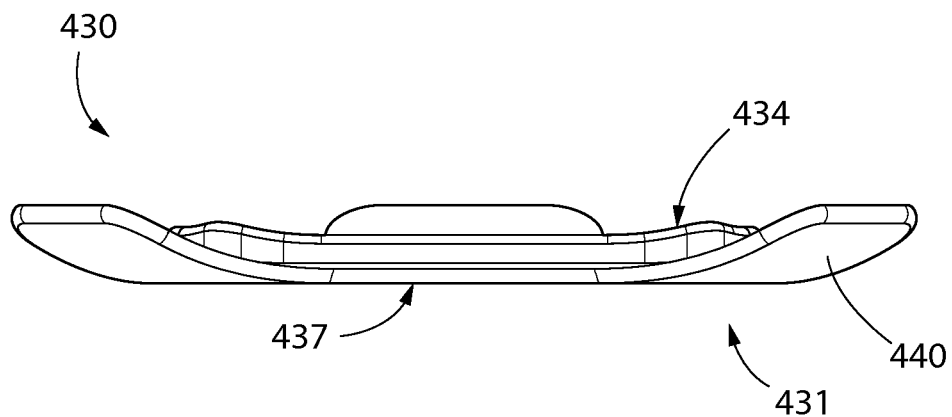
Figure 101:
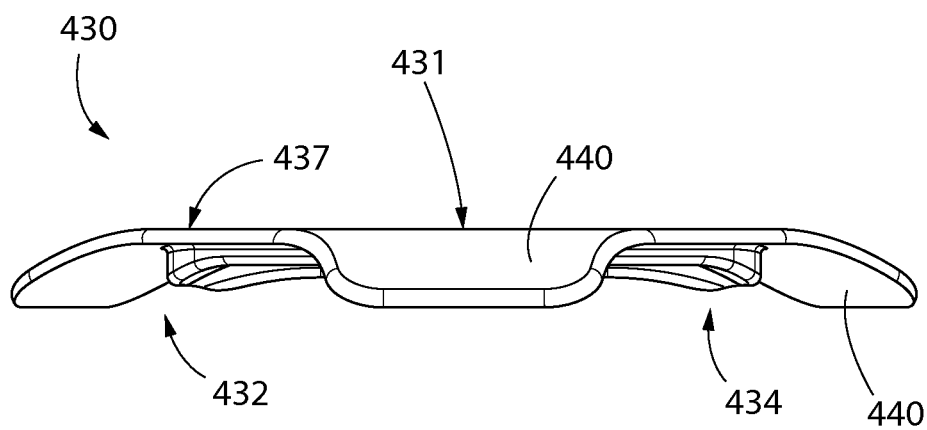
Figure 102:
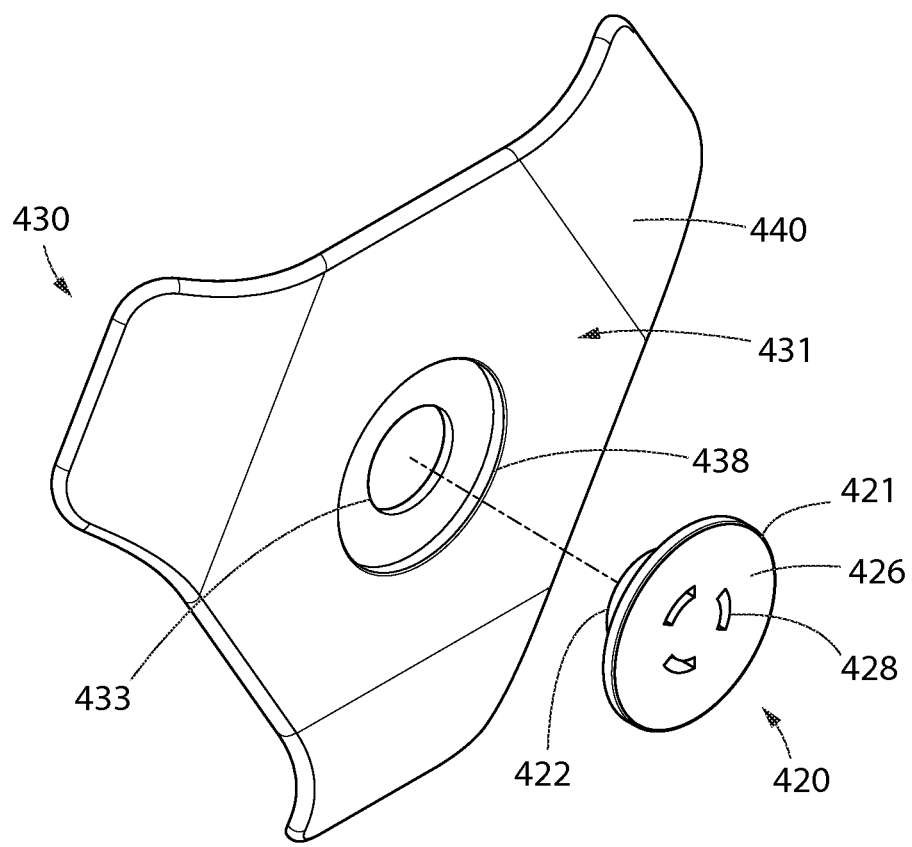
FIG. 102 is an exploded view showing the corner cap and fuel tank fastener assembly.

In one configuration, the outer surface 348 of the connector plates 340 may include an anti-rotation element 353 which cooperates with an accessory clip 354 attachable to the plate. Referring to FIG. 65, the anti-rotation element 353 may be a rectilinear recess 359 in one configuration which engages a mating rectilinear mounting protrusion 355 formed on the clip 354 to prevent rotation of the clip with respect to the connector plate 340. The clip protrusion 355 engages the walls formed around the recess to prevent twisting of the clip. The recess 359 may be disposed and formed around the mounting holes 346 on the connector plate 340 such that the holes extend through plate into the recess. In one exemplary configuration therefore, the accessory clips 354 may detachably retained on the connector plates 340 by the same fastener 352 used to secure the plates to the mounting tangs 322 of the corner members 320 via a through holes 357 formed in the clip.

In one possible configuration, the accessory clip 354 may include a pair of lateral extensions 358 each containing attachment apertures 356 of any suitable shape configured to engage a mounting feature of the accessory (e.g. straps, clips, fasteners, etc.). The lateral extensions 358 may be oriented 180 degrees apart and project laterally in opposing directions from the clip mounting protrusion 355 and fastener 352 in one arrangement. The accessory clip 354 may be formed of metal such as aluminum, steel, titanium, etc. as some non-limiting examples for strength. It will be appreciated that the accessory clips 354 and attachment apertures 356 may have numerous possible configurations and shapes depending the design of the accessory to be attached.

The corner members 320 and connector plates 340 advantageously allow a light-weight generator frame to be shipped in an unassembled "knock down" condition to reduce packaging size requirements and shipping costs. The frame may then be assembled at the final destination which may be a point of sale, job site, or other. In addition, the modular frame system disclosed herein provides the opportunity to customize the frame and generator system in various ways to meet the end user's preferences.

An exemplary method for assembling a generator frame will now be described. The method may begin by providing a kit including a plurality of corner members 320 each having three mounting tangs 322, connector plates 340, and fasteners such as threaded fasteners 352. Two corner members 320 and two connector plates 340 may first be selected from the kit, or alternatively may be selected separately later during the assembly process. A mounting tang 322 of a first corner member 320 may be positioned on and abuttingly engaged with the inner surface 349 of a first connector plate 340. More particularly, the mounting tang 322 may be positioned and inserted into the complementary configured mounting cavity 335 of the selected first connector plate 340. The first connector plate 340 may be located on a flat work surface to facilitate assembly.

A mounting tang 322 of a second corner member 320 may then be positioned on and abuttingly engaged with the inner surface 349 of the first connector plate 340 opposite the half having the mounting cavity 335 and mounting tang 322 of the first corner member 320 already in position. The locking protrusion 345 of the first connector plate 340 may be inserted into the end locking recess 329 in the mounting tang 322 of the second corner member 320 during placement of the tang.

With mounting tangs 322 of the first and second corner members 320 positioned on the first connector plate 340, the second connector plate 340 is selected and positioned over the first connector with the inner surface 349 facing the inner surface 349 of the first connector. The second connector is rotated and inverted in orientation with respect to the first connector so that the mounting cavity 335 lies on an opposite half of the second connector than on the first connector. While maintaining this position, the second connector plate 340 is placed against the mounting tangs 322 of both the first and second corner members 320 already engaged with the first connector plate 340 as described above. The mounting tang 322 of the second corner member 320 may be positioned on and abuttingly engaged with the inner surface 349 of the second connector plate 340. More particularly, the mounting tang 322 may be positioned and inserted into the complementary configured mounting cavity 335 of the second connector plate 340.

The mounting tang 322 of a first corner member 320 (already inserted in the mounting cavity 335 of the first connector plate 340) may be positioned on and abuttingly engaged with the inner surface 349 of the second connector plate 340 opposite the half having the mounting cavity 335. The locking protrusion 345 of the second connector plate 340 (facing inwards) may be inserted into the end locking recess 329 in the mounting tang 322 of the first corner member 320 during placement of the tang. The mounting tangs 322 of the first and second corner members 320 are now clamped and trapped between the first and second connector plates 340 positioned on opposite sides or faces of the mounting tangs. To complete the connection, a fastener 352 is inserted through each of the two mounting holes 342 in the first and second connector plates 340 and through the mounting holes 334 of the first and second corner member mounting tangs 322 and secured with a threaded nut. The first and second corner members 320 are now mechanically coupled together.

To complete assembly of a full generator frame 301, additional corner members 320 are then mechanically connector to each of the remaining two mounting tangs 322 of the first and second corner members in a similar manner to that described above. The foregoing process is repeated until a total of eight corner members 320 are interconnected using additional connector plates 340 and fasteners 352. The completed and assembled frame is shown for example in FIG. 41-50 depicting the completed frame only (without engine and appurtenances) for clarity.

It will be appreciated that generator frame 301 may partially assembled during the assembly process to provide greater access for mounting individual components thereon. For example, the bottom half of the generator frame 301 may be assembled and then the motor mounted on the motor support. The top half of the generator frame 301 may be assembled separately and then the permanent fuel tank 360, control panel 400, etc. can be mounted. The bottom and top halves may then be joined together via the four vertical connector plates 340. Numerous assembly variations are possible to maximize access and speed for assembling the complete generator. Advantageously, an assembled generator frame may be readily dismantled partially or completely to replace engine or other components, or to add accessories by simply removing fasteners 352 from the appropriate connector plates 340.

Referring to FIGS. 67-82, the permanent fuel tank 360 includes a top 361, bottom 362, lateral sides 363 extending between the top and bottom, and corners 367 extending between adjacent sides. The upper portions of lateral sides 363 may be downwardly sloping or angled in one configuration to complement the orientation of the connector plate 340 assemblies disposed laterally adjacent to the sides in the generator frame 301. In some configurations, adjoining lower portions of lateral sides 363 below the sloped upper portion may be vertically oriented. Corners 367 extend between adjacent lateral sides 363 and may be configured to complement the orientation of corner members 320 disposed laterally adjacent to the fuel tank corners 367 in the generator frame 301. Corners 367 may be may be arranged on a diagonal (i.e. angled between 0 and 90 degrees) with respect to the adjacent lateral sides 363. In one configuration, fuel tank corners 367 may be downwardly sloping or angled defining an outward and upward facing flat diagonal surface 368. Fuel tank 360 may have a shape selected to maximize volumetric storage capacity while conforming at least part to the angular or sloping shaped parts of the generator frame 301 where the fuel tank is mounted. In one non-limiting configuration, fuel tank 360 may have an octagonal shape in top plan view. Other suitable shapes may be used.

The permanent fuel tank 360 may further include a fill spout 373 disposed on one of the four corners 367 and a removable closure cap 374. Cap 374 may be configured to threadably engage the spout 373 which may be externally threaded.

In one configuration, fuel tank 360 may include a recessed well 364 formed in the top 361 of the fuel tank for removable storage of a portable fuel tank 380. The well 362 may be complementary configured with the shape of the portable fuel tank 380 (in top plan view) to form a nested fuel tank arrangement. The portable fuel tank 380 and cooperative mounting with permanent fuel tank 360 is further described herein.

Fuel tank 360 may be made of any suitable material approved for the storage of liquid fuel. In example, the fuel tank 360 may be made of a fuel-grade molded plastic material. Other suitable materials including metal may be used.

Fuel tank 360 may be mounted to any suitable part of generator frame 310. In one arrangement, the fuel tank 360 may be mounted near the top 303 of generator frame 301 and extends horizontally across the frame between all four lateral sides 302 substantially filling the upper third of the interior space 305 of the frame. The fuel tank 360 may extend from a location inside of and proximate to each of the four horizontal connector plates 340 that form the top half of the generator frame 301. In one arrangement, the top 361 of fuel tank 360 may be flush with or slightly recessed below the top 303 of the generator frame 301 for protection. Accordingly, the fuel tank 360 may not protrude substantially above generator frame 301, if at all in some configurations.

In one arrangement, permanent fuel tank 360 may be mounted to and suspended from generator frame 301 at the corner locations of the generator frame 301, and more particularly near the top portions of the corners 306 at top corner members 320. The flat diagonal surface 368 at corners 367 may include a mounting element 371 comprised of a threaded recess 369 and centrally-located cylindrical protrusion 370 disposed therein. Recess 369 and protrusion 370 may each be circular in one configuration. A circular depression 372 may be formed in corner 367 around recess 369 in some configurations, for reasons described elsewhere herein.

To mount the permanent fuel tank 360, a fuel tank mounting assembly comprised of a corner cap 430 and fuel tank fastener 420 may be provided. Referring to FIGS. 89-102, the corner cap 430 of the assembly may have a generally truncated triangular shaped body comprising three radially extending wings 440 to complement the shape of corner members 420 to which the cap may be attached. The wings 440 may further be slightly arcuately shaped in an inwards direction to complement the contour of the corner members 320 to which they are mounted. Corner cap 430 includes an outer surface 431, opposing inner surface 432, lateral sides 437, raised plateau protuberance 434 disposed on the inner surface, and a centrally located through hole 433. In one configuration, protuberance 434 has a peripheral shape selected to complement the peripheral shape of central opening 323 and is insertable into the opening for securing the corner cap 430 to the corner member 320. Protuberance 434 and central opening 323 may therefore have a generally triangular shape. The protuberance 434 prevents the cap 430 from rotating with respect to corner member 320 via mutual engagement between the polygonal-shaped sides of the protuberance with mating surfaces surrounding the central opening 323 of the corner member. The hole 433 may be configured to insert the shank of fastener 420 therethrough for engaging a mounting element 371 on fuel tank 360, as further described herein. A diametrically enlarged and inwardly protruding boss 433 may be formed around the hole 433 on the raised plateau-shaped protuberance 434 which may be configured for insertion into the depression 372 formed on the fuel tank corners 367. The interaction and engagement of the boss 433 with depression 372 helps align and center the corner cap 430 on the corner member 320 to align hole 433 with threaded recess 369 to facilitate proper insertion of fastener 420.

The fuel tank fastener 420 may include a head 421 and threaded shank 422. In one configuration, shank 422 may be generally cylindrical in shape having one end 423 adjoining head 421 and a substantially flat terminal end 424 to preclude the possibility of puncturing fuel tank 360. In one arrangement, terminal end 424 may include an open circular socket 425 configured for receiving cylindrical protrusion 370 of the fuel tank mounting element 371 when the tank is mounted to the generator frame 301. It will be appreciated that in alternative examples, both socket 425 and protrusion 370 may be omitted wherein the threaded shank is solid and engages mating threaded recess 369 on the fuel tank 360.

The exposed outer surface 426 of head 421 may include an operating feature 428 configured for engaging a mutually configured working end of a tool or key used to rotate the fuel tank fastener 420. Any suitably shaped operating feature 428 and tool may be used.

The process for mounting the permanent fuel tank 360 to generator frame 301 will now be briefly described. In one example, without limitation, the fuel tank 360 may be mounted to the generator frame 301 using mounting element 371 at three corner members 320 to prevent twisting of the tank with respect to the generator frame. It will be noted that the remaining corner member 420 includes provisions for the fuel tank spout 373 and cap 374. Fuel tank 360 is positioned inside the top 303 of frame 301, as shown for example in FIG. 74. At one corner, the corner cap 430 may be positioned on the corner member 320 to insert protuberance 434 into central opening 323 of the corner member. Boss 433 on the inside of cap 430 is inserted into depression 368 on the fuel tank 360. Hole 433 in cap 430 is concentrically aligned with threaded recess 369 on fuel tank 360. Fuel tank fastener 420 is inserted through corner cap 430 (i.e. hole 433) and rotated to engage threaded shank 422 with mating threaded recess 369 on the fuel tank. The fastener 420 is rotated and tightened which draws the tank 360 and cap 430 together along the centerline axis of the fastener shank 422 with the corner member 320 being interspersed in between. The cap 430 is compressed against the outer surface of the corner member 420 between the head 421 of fastener 420 and corner member and the fuel tank corner 367 on the interior of the generator frame 301. In one configuration, without limitation, the outer surface 431 of the corner cap 430 may include a recess 438 formed around hole 433 and the fastener head 421 may be seated in the recess and substantially flush with the outer surface 431. In other configurations, the fastener head 421 may protrude above the outer surface 431 of the corner cap 430 either with or without a recess 438 if provided.

In one example, corner cap 430 and fuel tank fastener 420 may be formed of a suitable strength plastic material in addition to the fuel tank 360 and corner mounting elements 371. Accordingly, a metal-free fuel tank mounting system may therefore be provided. This arrangement advantageously reduces weight and minimizes or eliminates interaction of the plastic fuel tank with metal edges to reduce wear or puncture of the tank.

Referring to FIGS. 41, 42, 46, and 48, the corner cap 430 associated with the fill spout 373 and closure cap 374 of the permanent fuel tank 360 may include a diametrically enlarged circular fill spout opening 439 configured to receive the fill spout. The fill spout 373 may project outwards through the opening 439 and the closure cap 374 is attached to the fill spout 373 at the exterior of the corner cap 374. In one configuration, the fill spout 373 may be configured to engage and retain the corner cap 430 in position on the generator frame 301. In one non-limiting example, the fill spout 373 may include secondary external threading to attach the corner cap 430. It will be appreciated that the fuel spout corner cap 430 may be configured similarly to the corner caps 430 described above associated with mounting the permanent fuel tank 360 with exception of the larger central fill spout opening 439 in lieu of the smaller fastener hole 433 and boss 435.

According to another aspect of the generator 398, a removable portable fuel tank may optionally be provided that is configured for detachable mounting in the modular generator frame system 300. The portable fuel tank 380 advantageously extends the volumetric capacity and runtime of generator 398. The fuel tank 380 may be configured for detachable coupling to the generator 398 so that the fuel tank 380 may be dismounted and removed without undoing fasteners or other mechanical coupling devices. This allows rapid change-out of portable fuel tanks in the modular generator frame system 300. In one configuration, as described below, the portable fuel tank 380 may be configured for mounting directly to and is supported by the permanent fuel tank 360.

Referring to FIGS. 83-88, the portable fuel tank 380 includes a top 381, bottom 382, lateral sides 383 extending between the top and bottom, and corners 384 extending between adjacent sides. In one configuration, the sides 383 may be substantially flat. Corners 384 may be may be arranged on a diagonal (i.e. angled between 0 and 90 degrees) with respect to the adjacent lateral sides 383 defining a flat diagonal surface 392. Fuel tank 380 may further include a compact handle 385 formed integrally with the body of the tank. In one example, a lateral portion of the handle may form one of the four lateral sides 383 of the fuel tank and an angled portion may form at least in part one of the corners 384. This arrangement provides a handle without substantially altering the octagonal configuration or size of the fuel tank 380.

The removable portable fuel tank 380 may further include a fill spout 386 for refilling the tank and a closure cap 387 threadably engaged with the spout. In one configuration, the fill spout 386 may be disposed on one of the four corners 384 of the fuel tank 380. The corner 384 having the fill spout 386 may be configured and dimensioned such that the fill spout and cap 387 when in place do not extend laterally beyond either adjacent lateral side 383 to maintain a substantially uniform perimeter dimension and profile for insertion into the well 364 of the permanent fuel tank 360.

Portable removable fuel tank 380 may further include a fluid coupling 391 allowing the tank to be fluidly connected to the permanent fuel tank 360. Advantageously, the provides the permanent fuel tank 360 with two potential refueling connections and options. In one configuration, the fluid coupling may include an assembly comprising a tubular outlet nozzle 389 fluidly connected to a one-way valve 388. Valve 388 may be configured to allow liquid fuel to flow outwards from the portable fuel tank 380 to permanent fuel tank 360, but not to re-enter in a reverse direction back through the nozzle 389. The nozzle 389 and valve 389 may be disposed in the bottom surface on the bottom 383 of the portable fuel tank 380. In one arrangement, nozzle 389 may be located in the geometric center of the portable fuel tank 380. To protect the nozzle 389 from damage during transport and refilling, the nozzle may be disposed in a recess 390 formed in the bottom 383 of the fuel tank 380. Nozzle 389 may therefore be configured to not protrude above the bottom surface on the bottom 382 of the fuel tank 380. The recess 390 may be circular in shape in one non-limiting configuration; however, other shapes may be used. Nozzle 389 and valve 388 may be formed of plastic in one construction or a combination of plastic and metal.

The outlet nozzle 389 of portable fuel tank 380 may be configured and operable to engage a mating fluid coupling 365 formed in the top 361 of the permanent fuel tank 360 to place the two tanks in fluid communication for transferring fuel from the portable tank to the permanent tank. In one configuration, fluid coupling 365 may comprise a raised tubular inlet coupling 366 which projects upwards from the recessed flat surface portion of the top 361 of fuel tank 360 inside the well 364. Coupling 366 may be tubular shape. The coupling 366 and outlet nozzle 389 of the portable fuel tank 380 may be cooperatively configured and arranged so that the nozzle 389 may be inserted into the coupling. Accordingly, the inlet sleeve 366 may have an internal diameter sized slightly larger than the outer diameter of the outlet nozzle 389. In one configuration, outlet nozzle 389 and inlet sleeve 366 are cooperatively configured to allow the nozzle to be axially and slidably inserted into the sleeve. In operation accordingly, the portable fuel tank 380 may be axially inserted downwards into the open top well 364 of the permanent fuel tank 360. This motion would slidably insert outlet nozzle 389 into inlet sleeve 366 thereby fluidly coupling the portable and permanent fuel tanks 380 and 360 together. This allows the contents of portable fiel tank 380 to be transferred via gravity to the permanent fuel tank 360. Advantageously, the total volumetric fuel capacity of generator 398 is therefore increased by providing one or more portable fuel tanks 380 which can be interchanged.

The portable fuel tank 380 may have a volumetric capacity of at least 10% of the permanent fuel tank 360. For example, in one representative non-limiting example, the permanent fuel tank 360 may have a capacity of about 11 gallons and the removable portable fuel tank 380 may have a capacity of about 2 gallons. Any suitable permanent and portable fuel tank capacities may be used.

Figure 40:
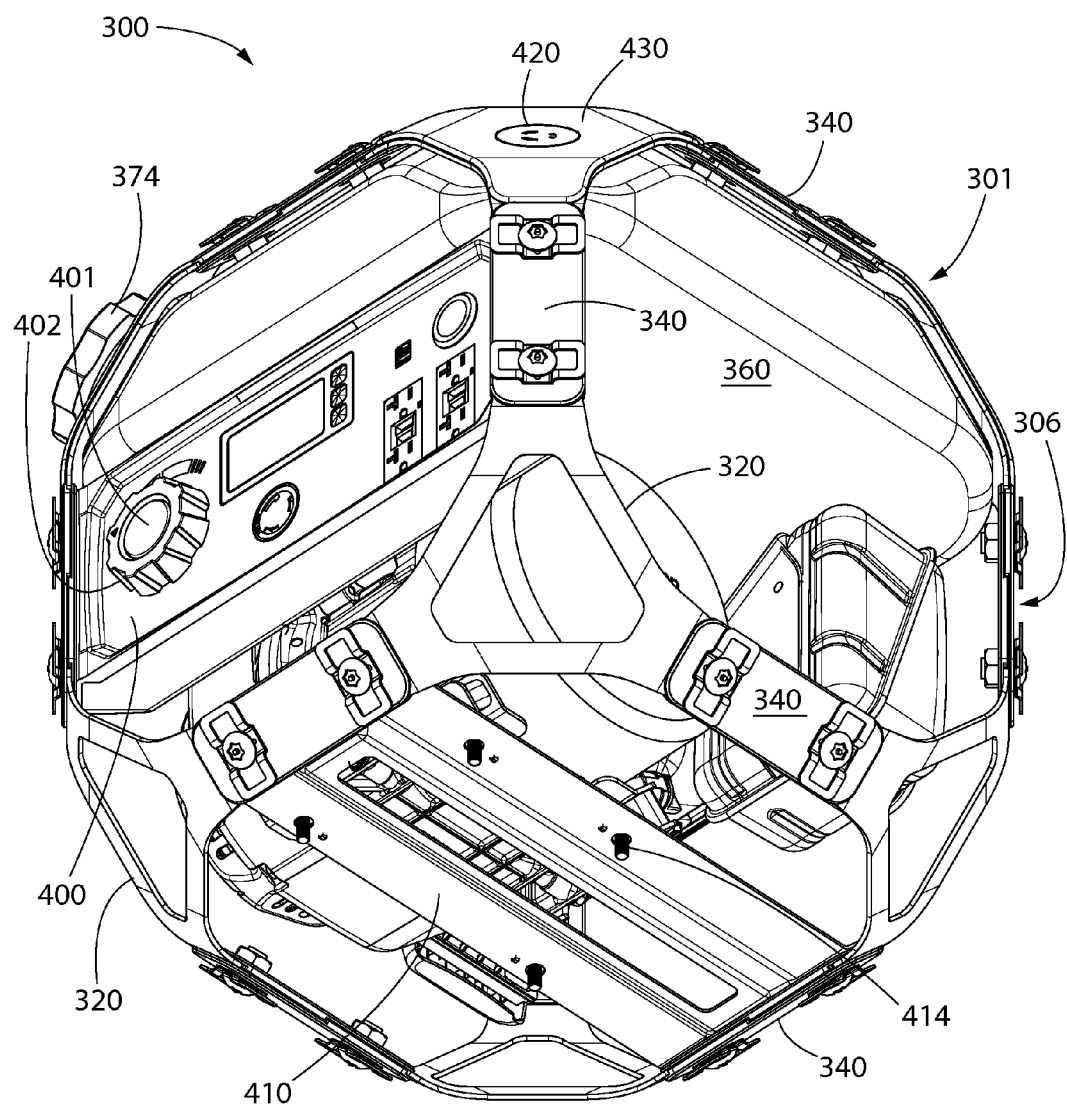
FIG. 40 is a bottom perspective view thereof.
Figure 41:
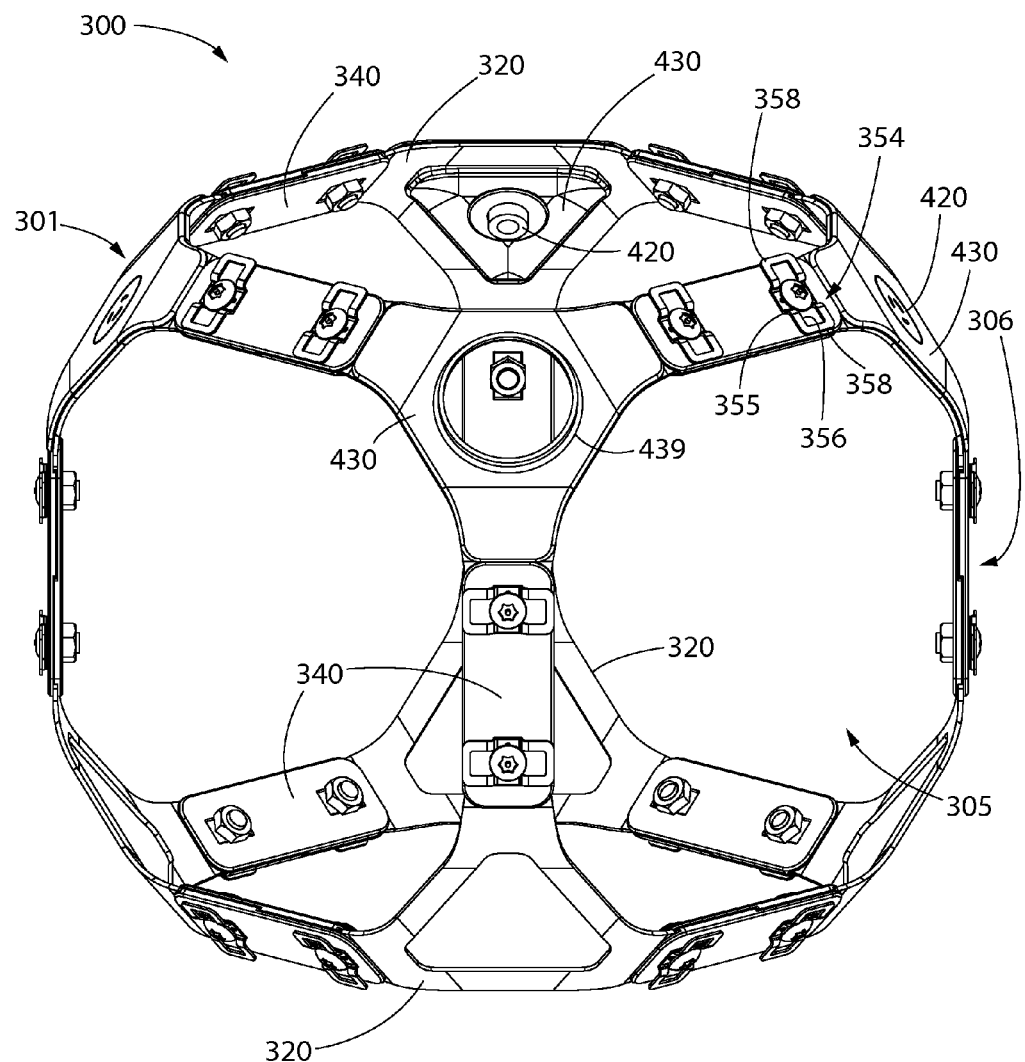
FIG. 41 is top perspective view of the modular frame design showing only the frame for clarity.
Figure 42:
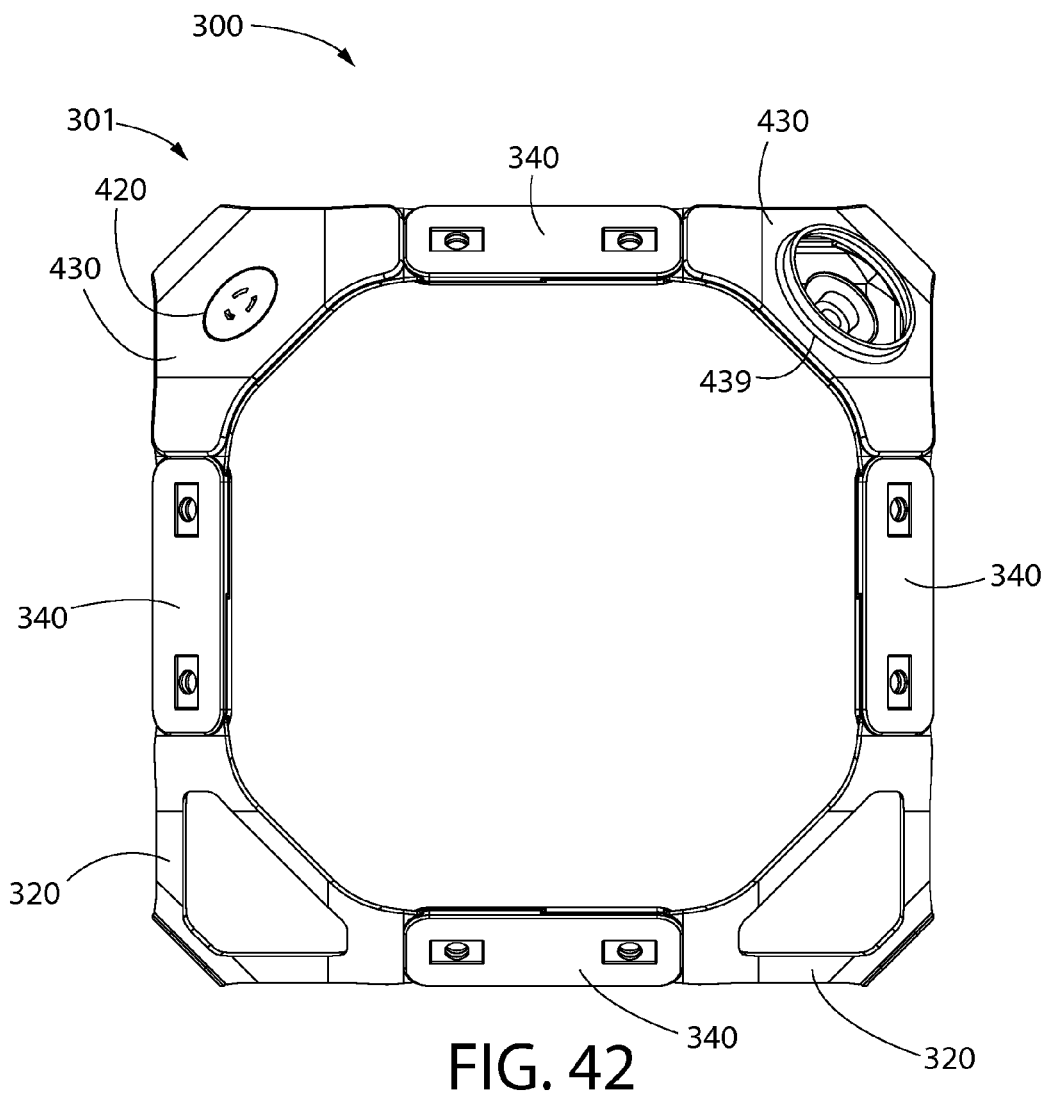
FIGS. 42-45 are side elevation views thereof.
Figure 43:
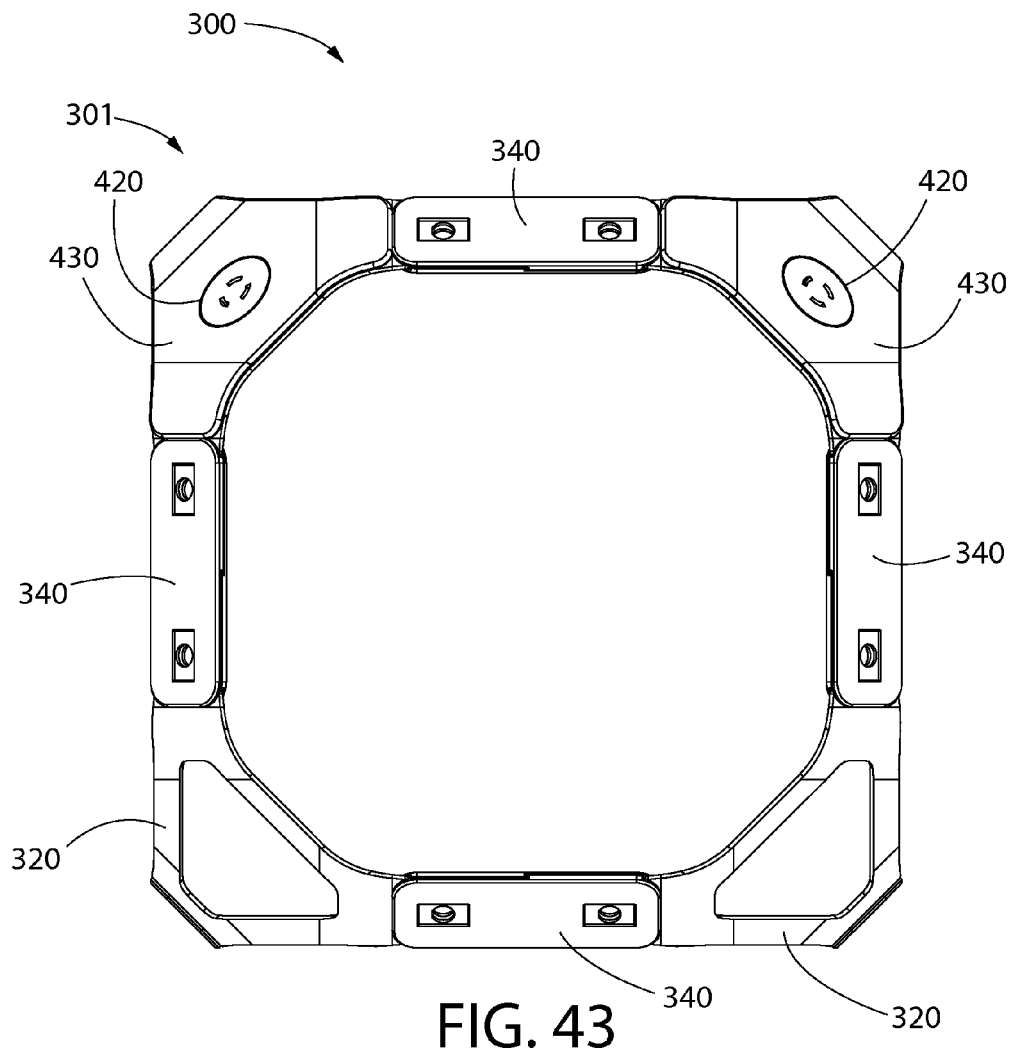
Figure 44:
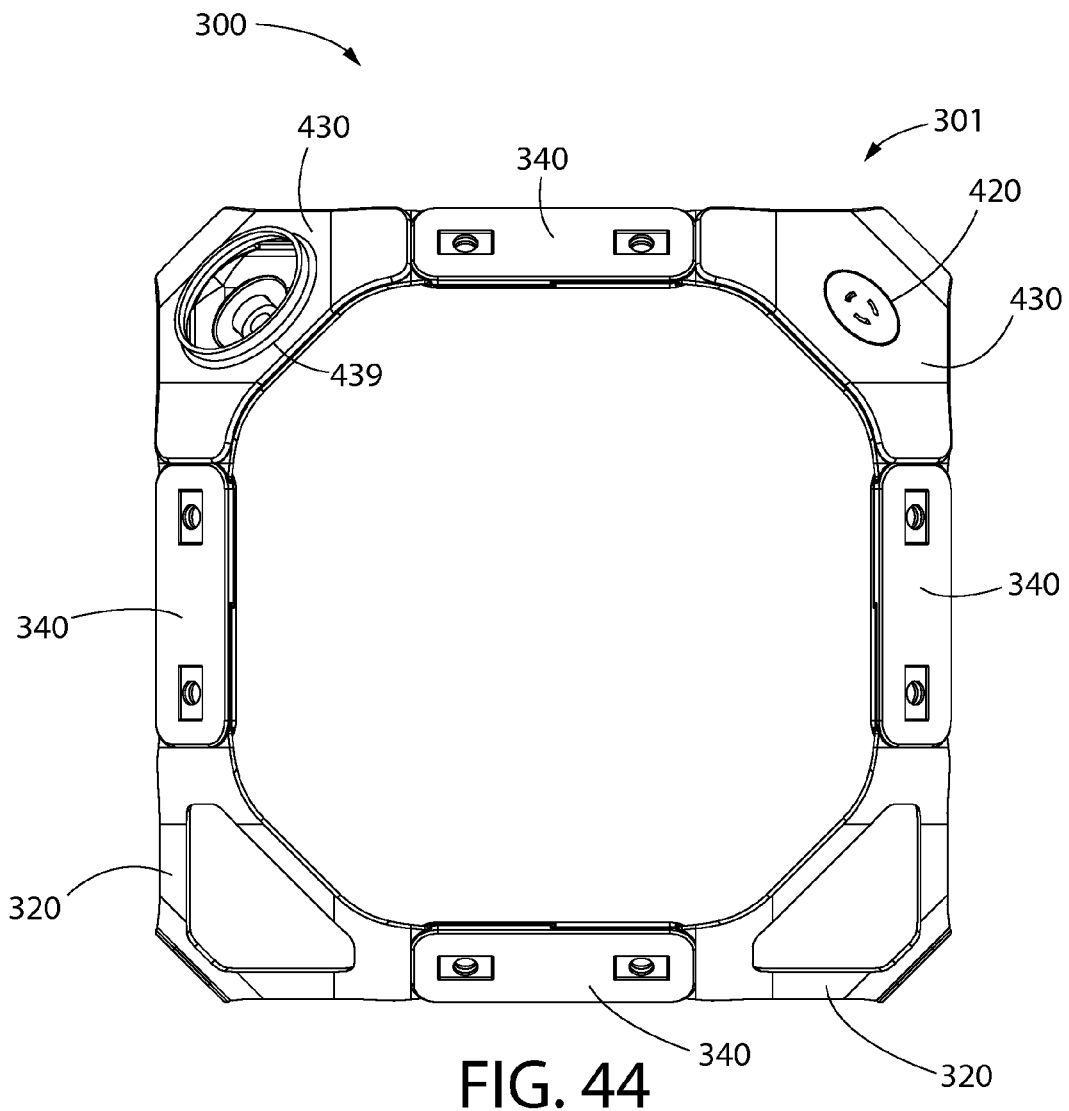
Figure 45:
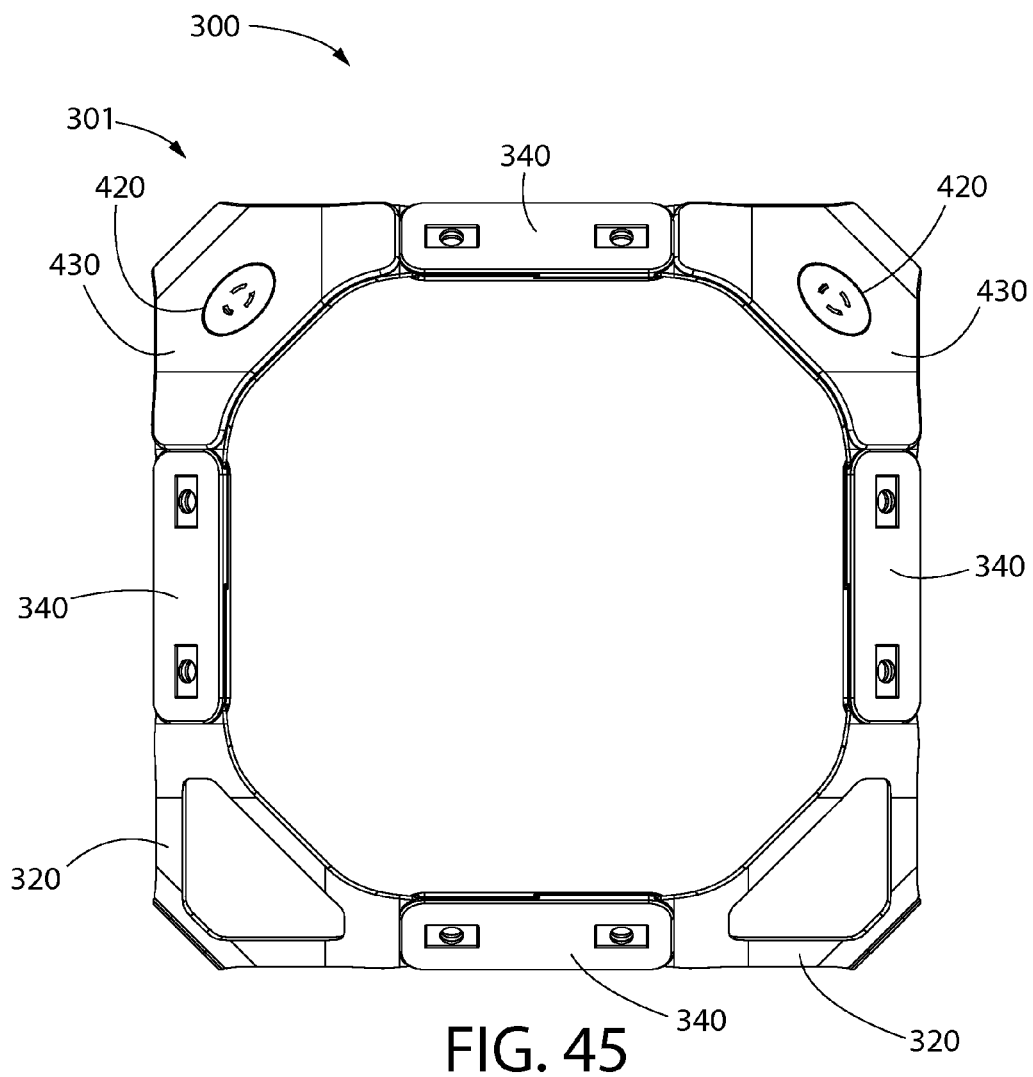
Figure 46:
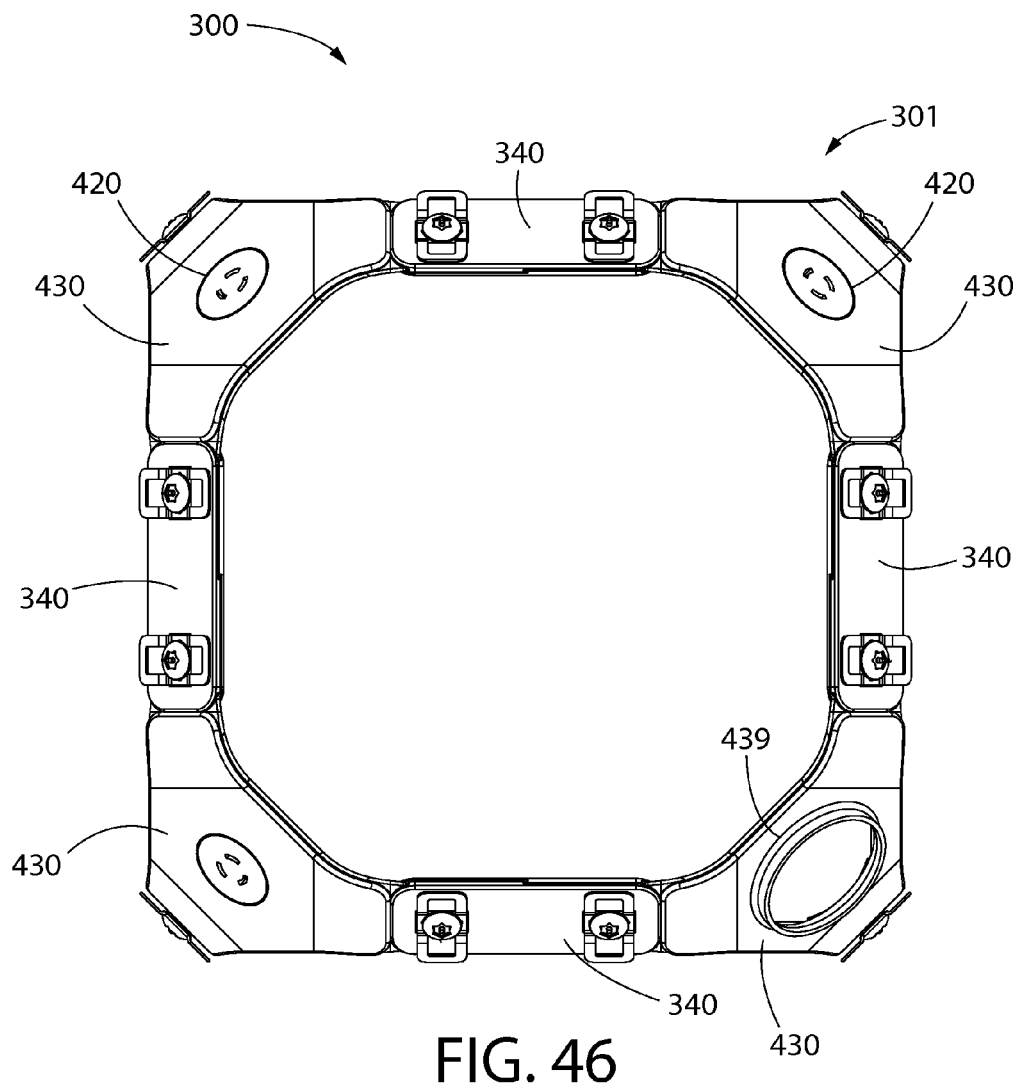
FIG. 46 is a top plan view thereof.
Figure 47:
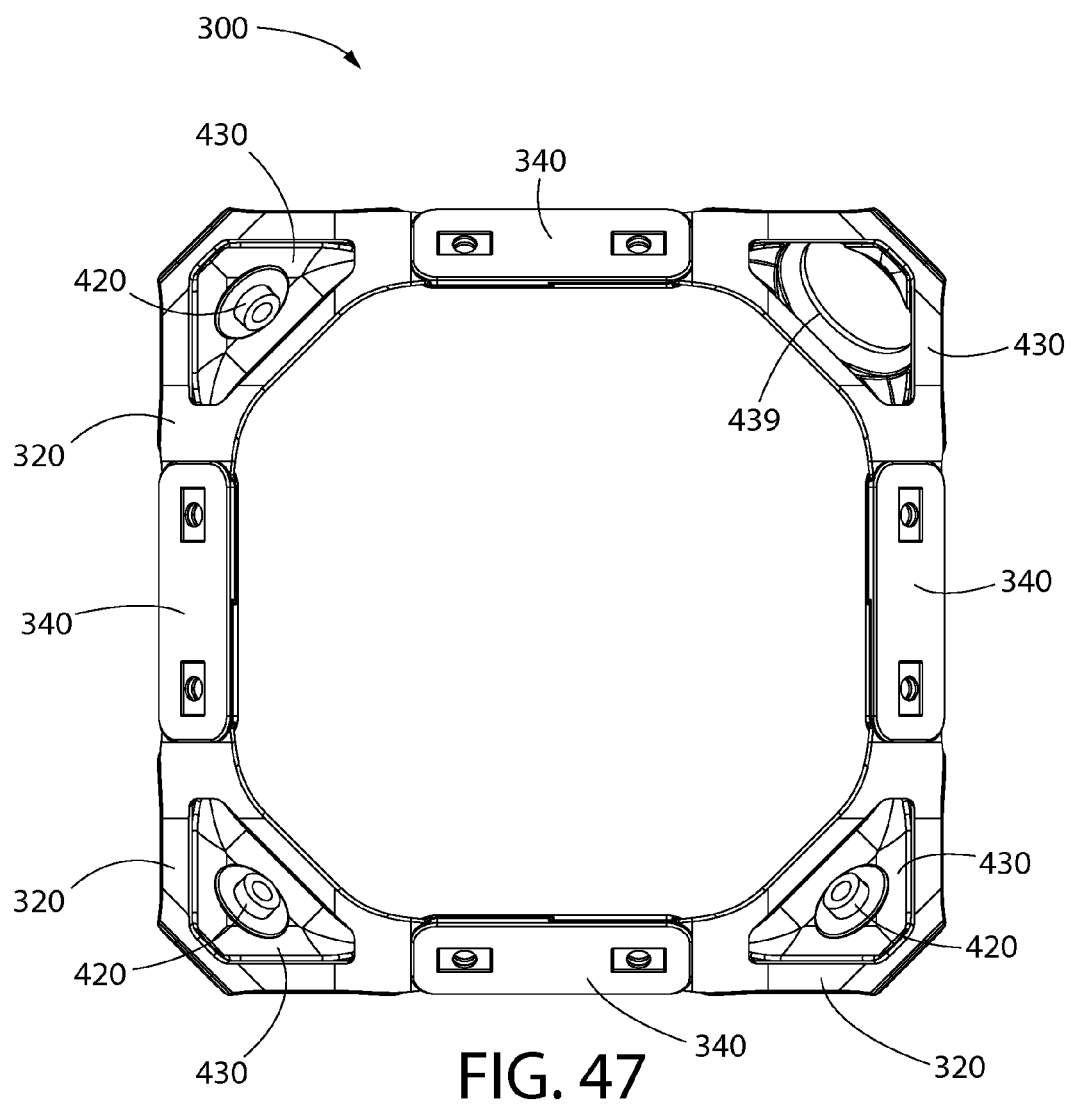
FIG. 47 is a bottom plan view thereof.
Figure 48:
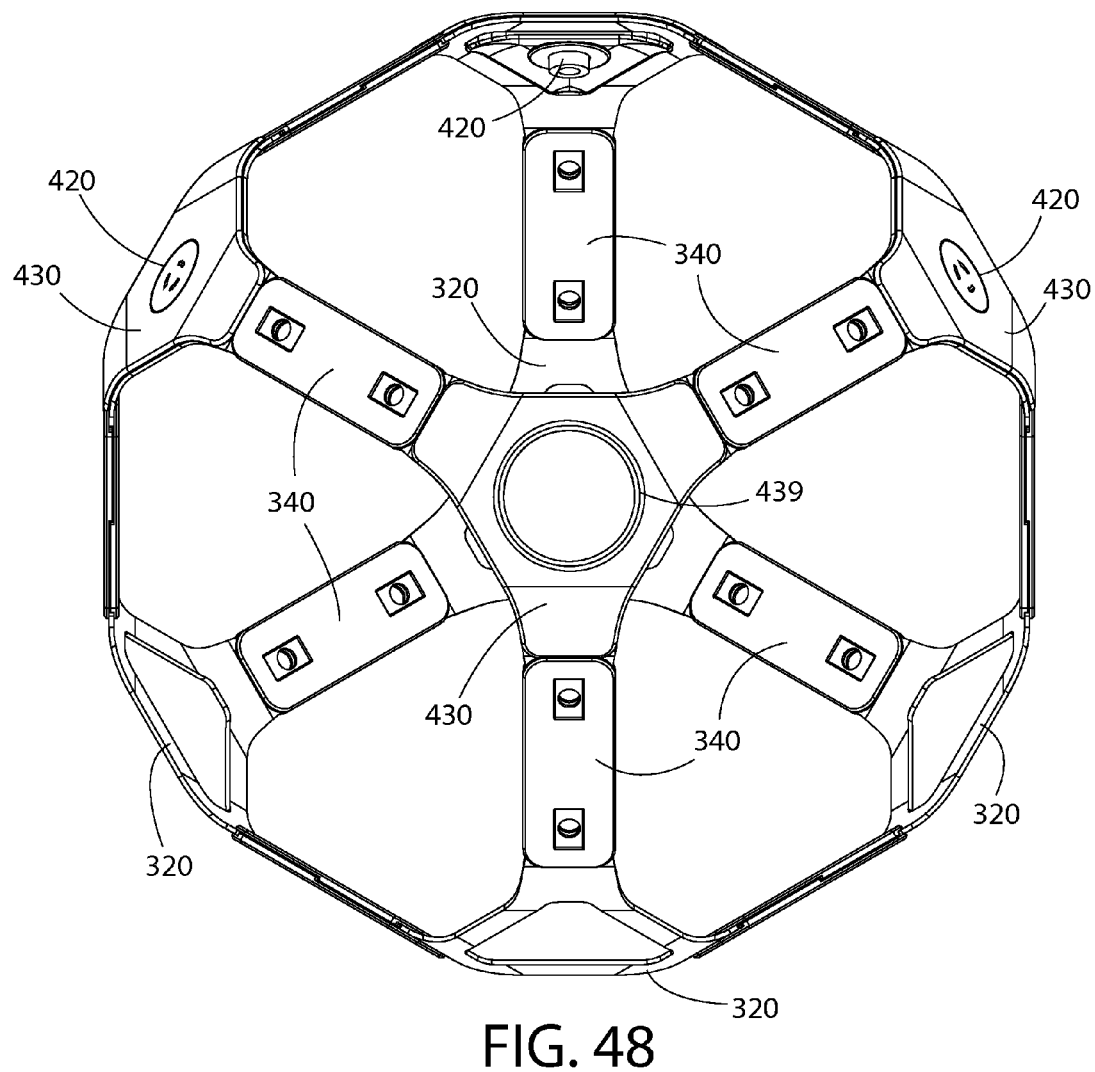
FIG. 48 is a top corner perspective view thereof looking downwards through a top coner to a diagonal bottom corner.
Figure 49:
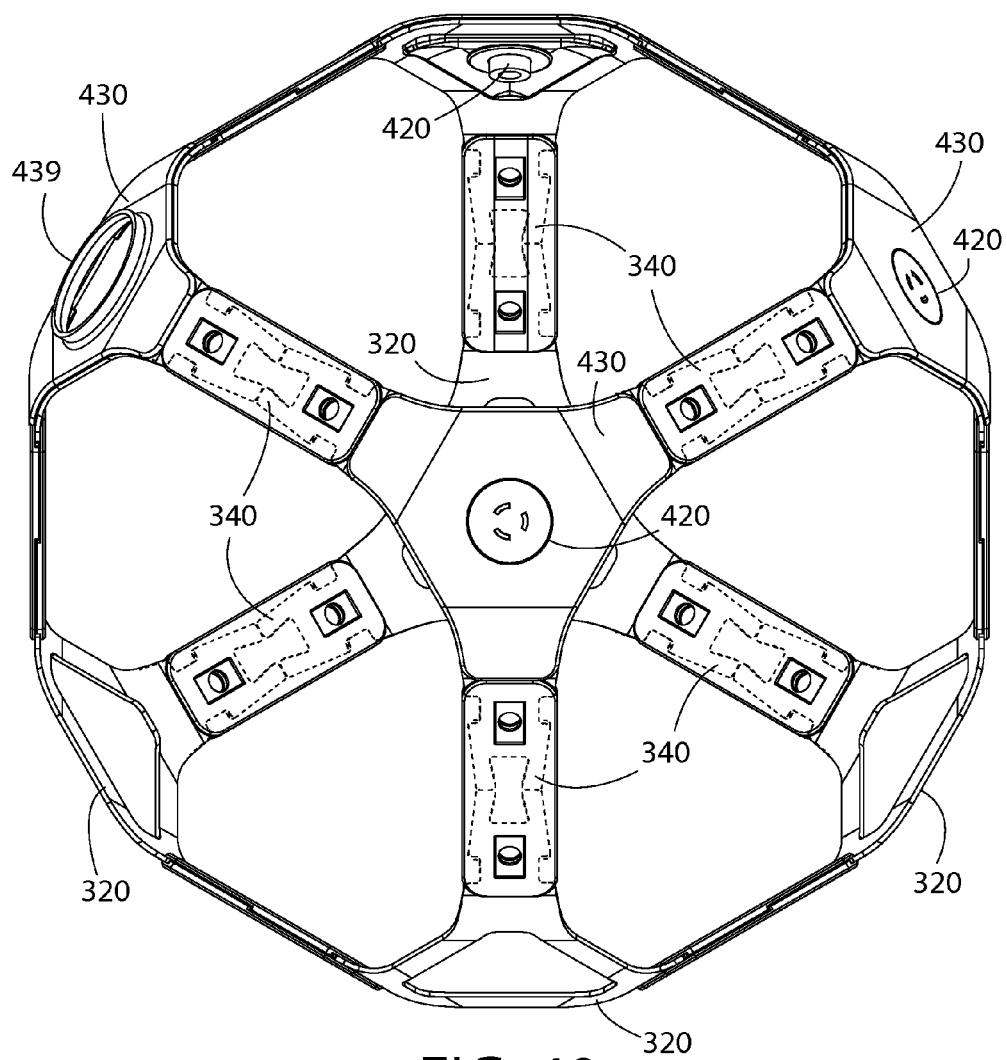
FIG. 49 is a top corner perspective view thereof looking downwards through a different top corner to a diagonal bottom corner.
Figure 50:
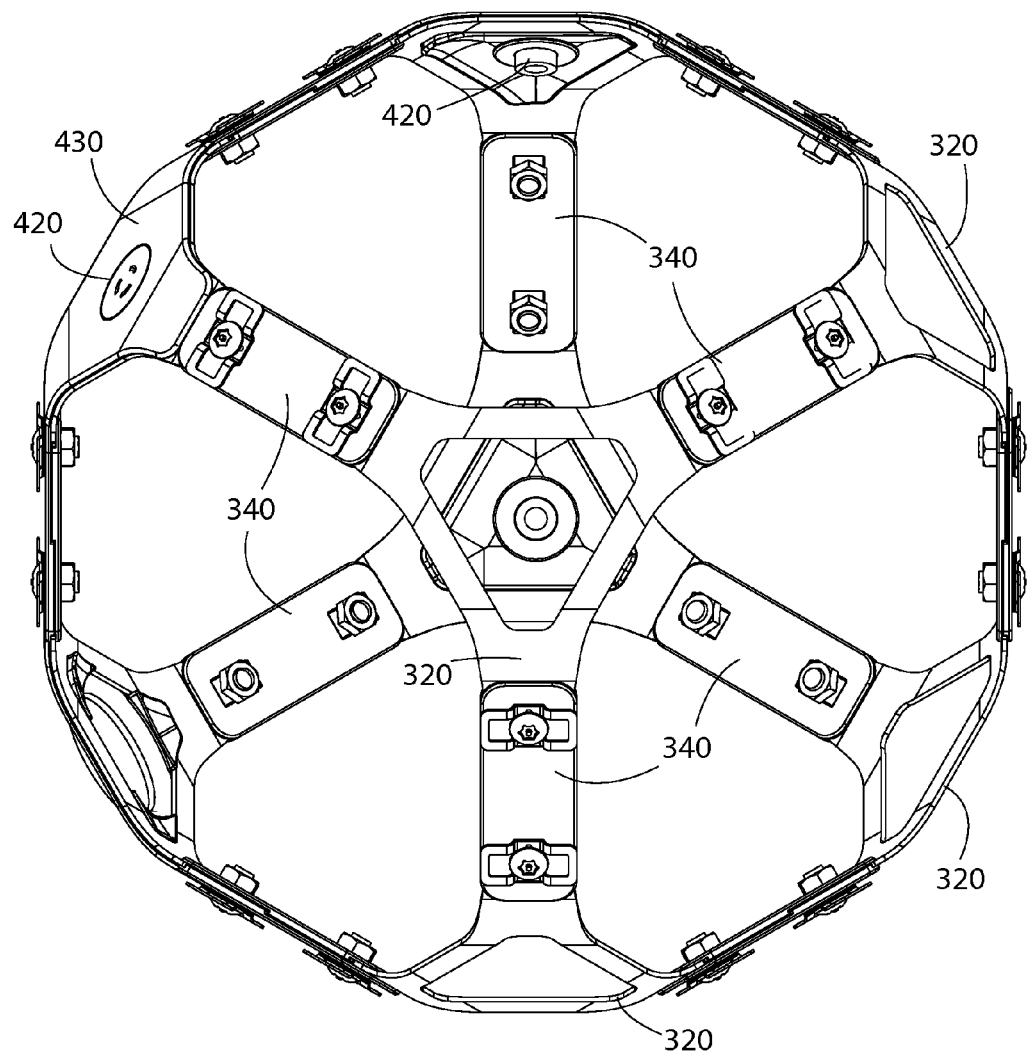
FIG. 50 is a bottom corner perspective view thereof looking upwards through a bottom corner to a diagonal top corner.
Figure 51:
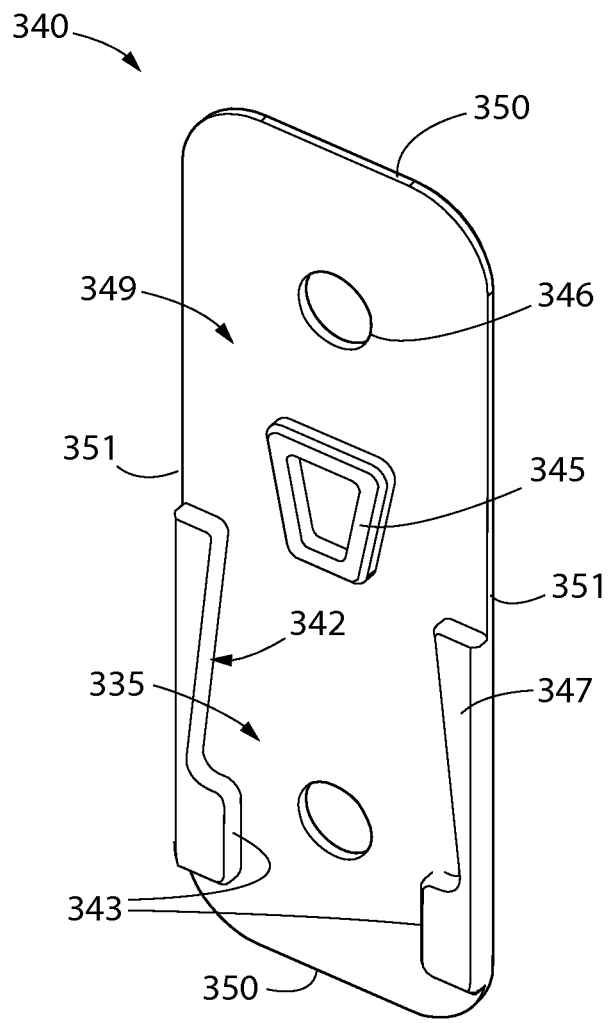
Figure 52:
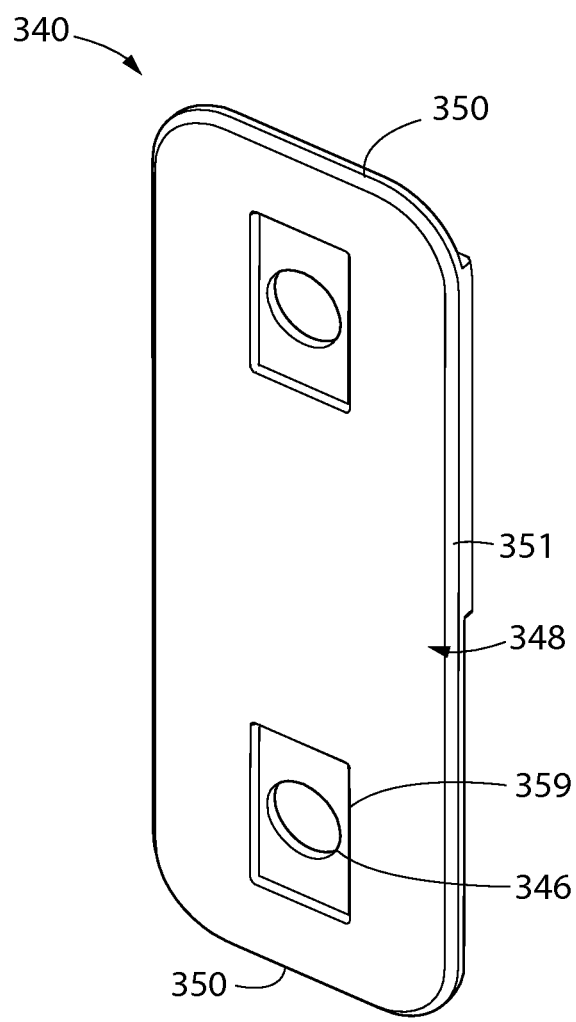
Figure 55:
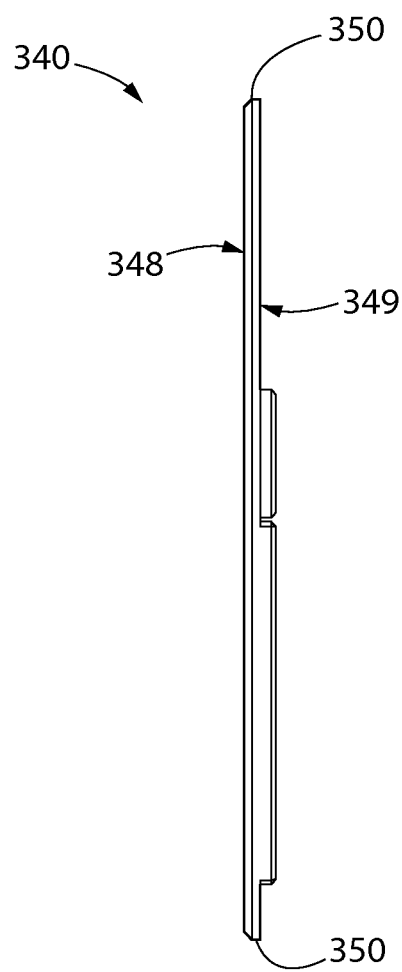
Figure 56:
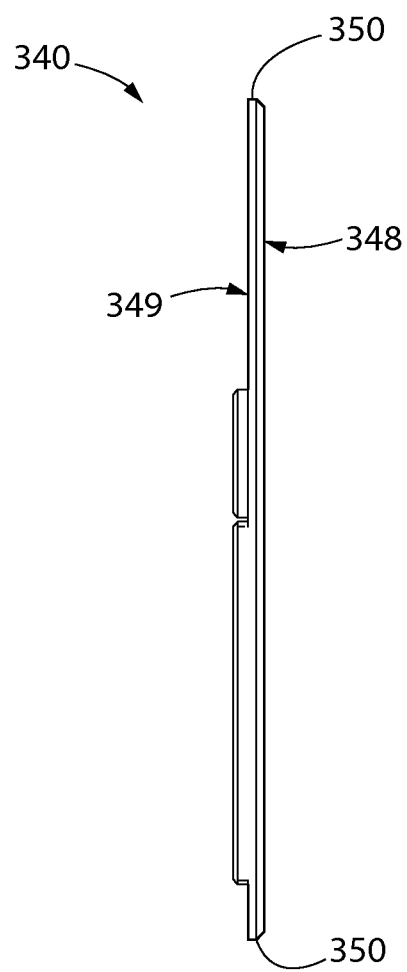
Figure 57:
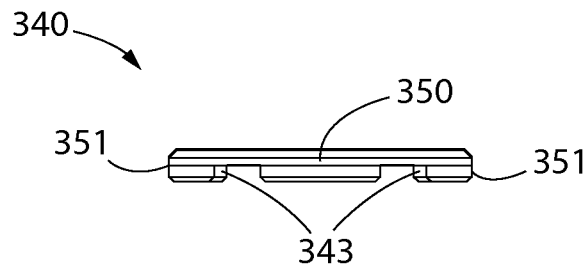
Figure 58:
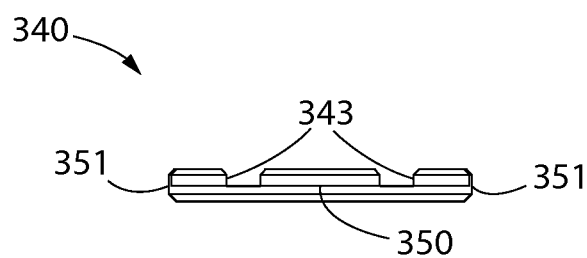
Figure 59:
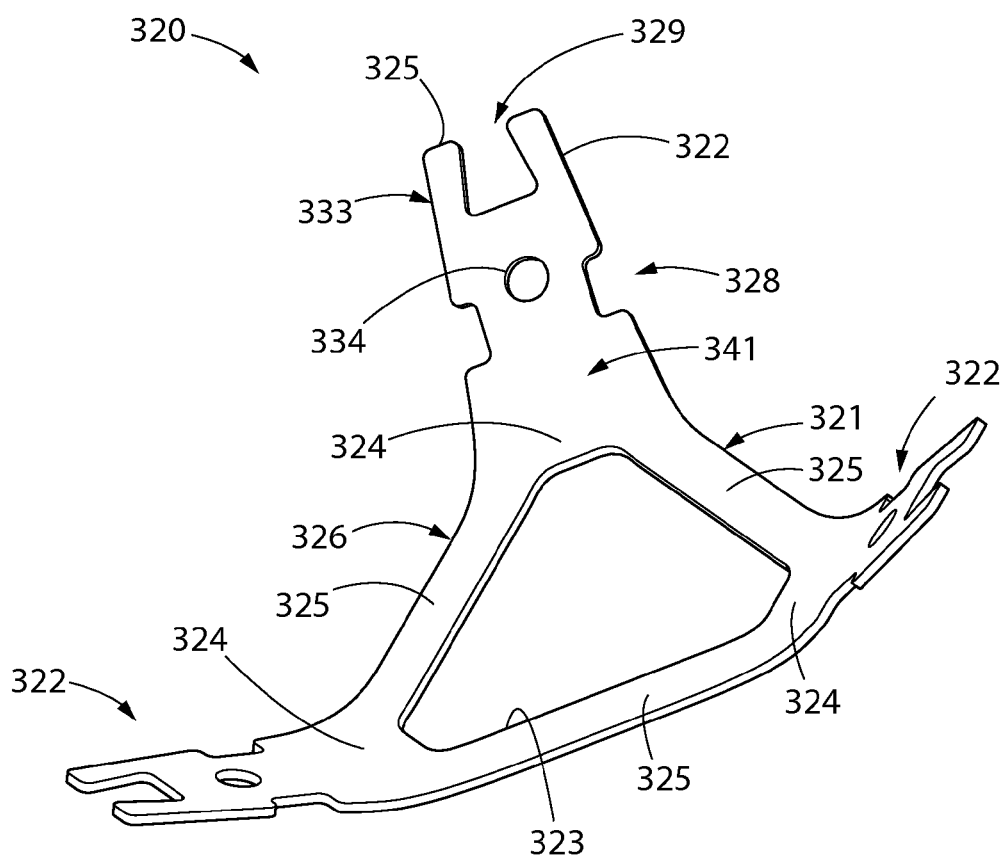
FIGS. 59-63 are various views showing the corner members.
Figure 60:
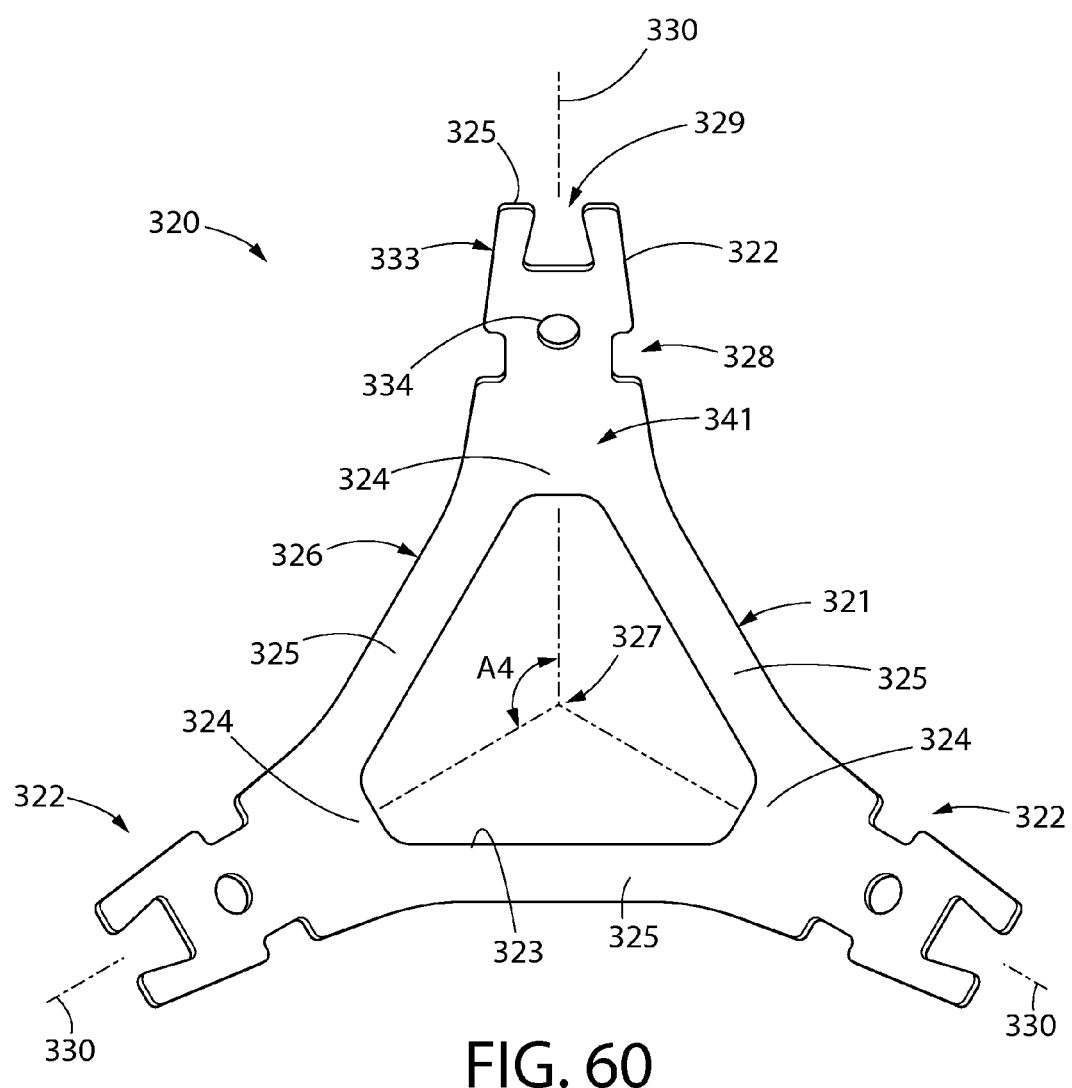
Figure 61:
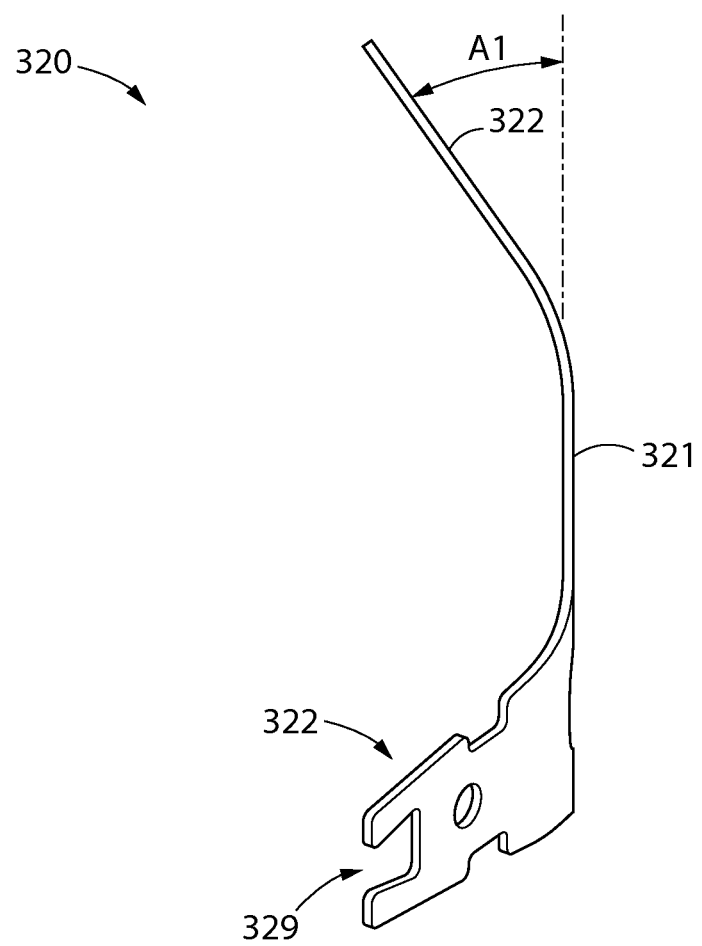
Figure 62:
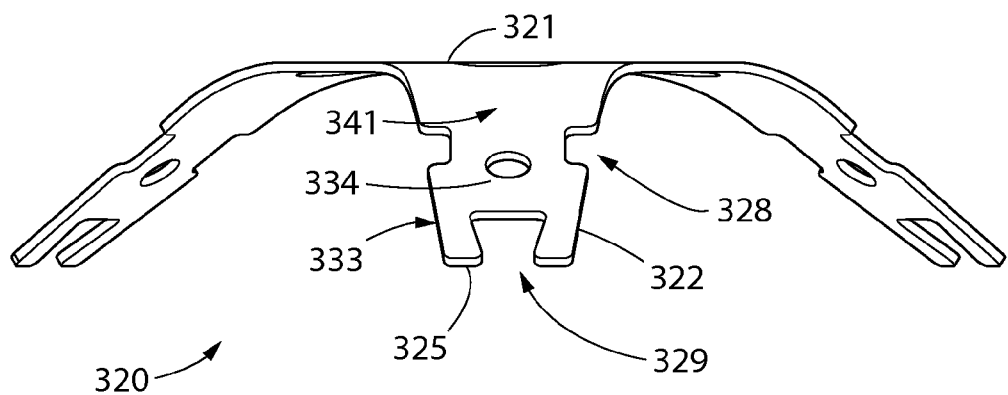
Figure 63:
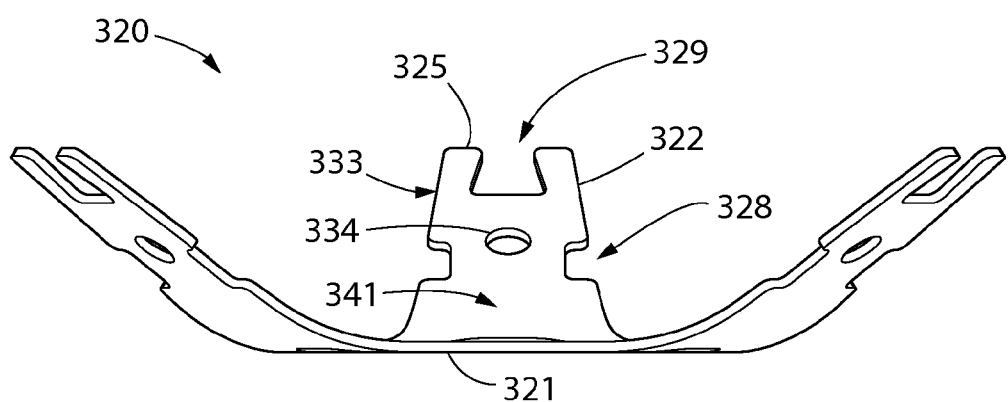
Figure 64:
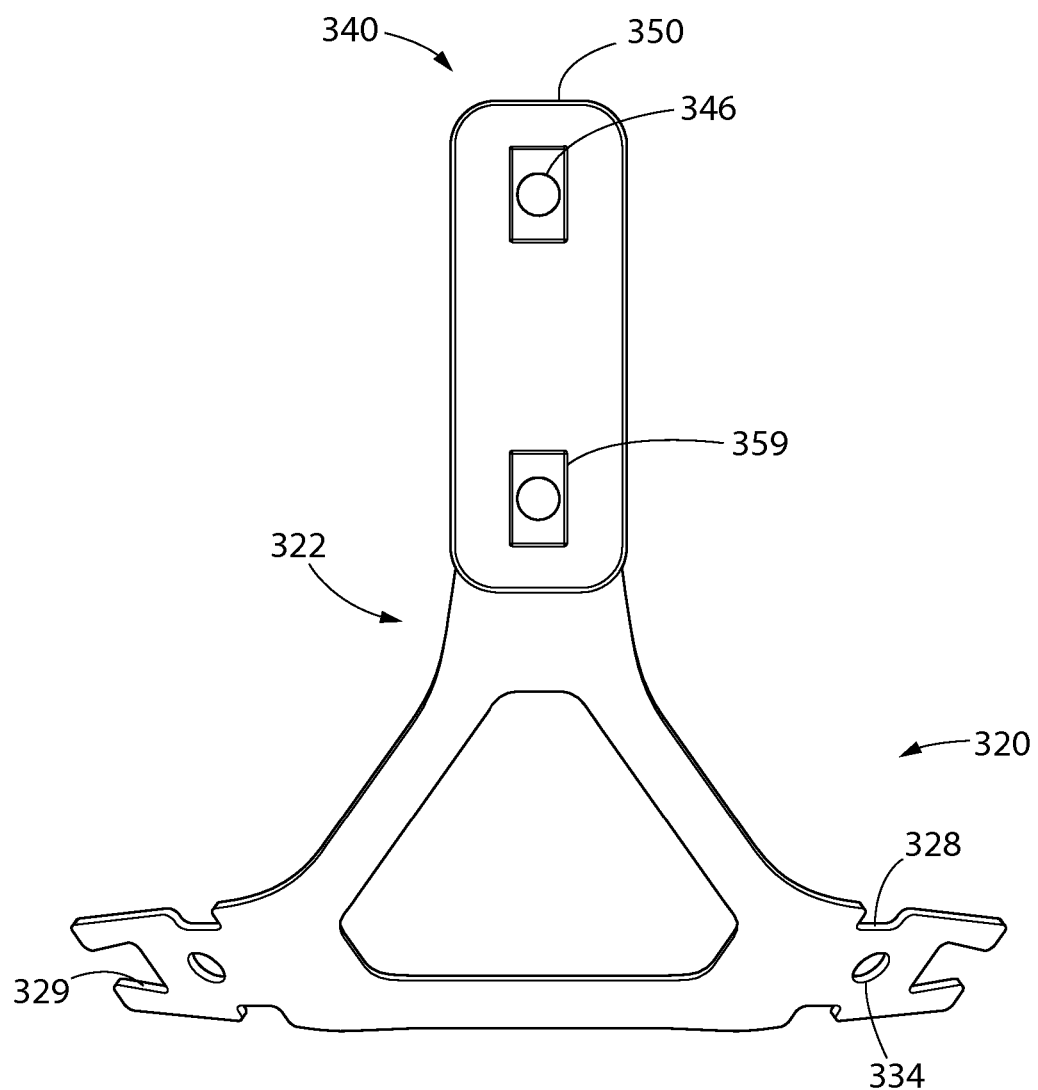
FIG. 64 shows an assembled pair of connector plates positioned on a mounting tang of a corner member.

Referring to FIGS. 36 and 40, the generator control panel 400 may include an emergency stop push button 401 which functions as a single readily accessible kill switch to stop the engine. In one example, the stop button 401 may be generally circular in shape. In one arrangement, the stop button 401 may be disposed in the center of a rotary operating dial 402 configured and operable to change the operating state of the motor (e.g. fuel, choke, run, start, etc.) to simplify the starting sequence. The push button 401 is actuated by depressing the button inwards towards the control panel 400.

Figure 39:
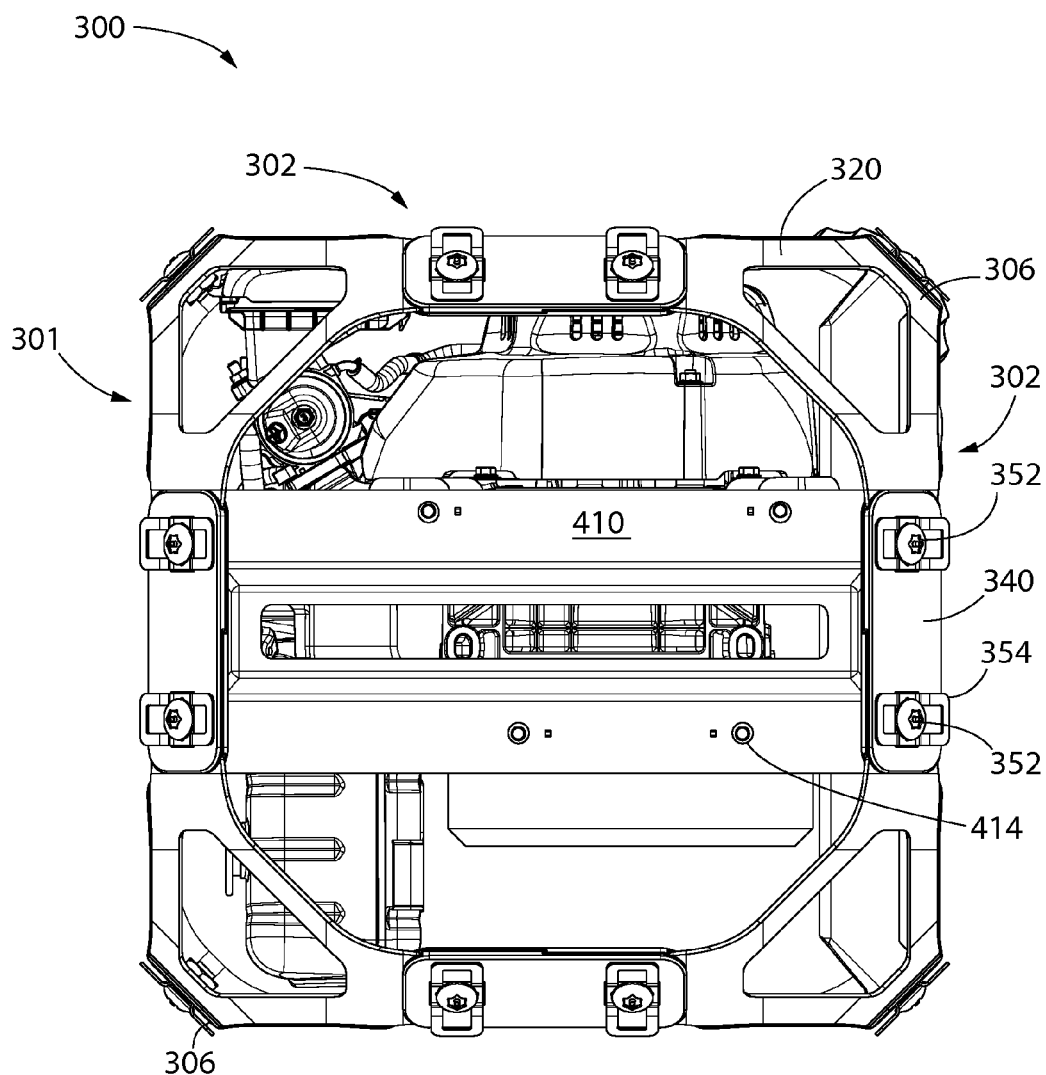
FIG. 39 is a bottom plan view thereof.

Referring to FIGS. 39, 40 and 103, the generator frame 301 may include a motor mount bracket 410 configured for attaching the motor mounts 414 of engine 311. In one configuration, the motor mount bracket 410 may be an elongated and structurally stiff element formed of a suitable metal having two opposing mounting ends 411 configured for attachment to opposing connector plates 340 on the bottom of the generator frame. Bracket 410 may include a center section 412 extending between the ends 411 having a substantially horizontal position when attached to generator frame 301 for positioning and mounting the engine 311 thereon. The center section 412 may include spaced apart mounting holes 413 (e.g. two, four, etc.) configured for receiving threaded motor mounts of engine 311 therethrough having a matching layout pattern.

The mounting ends 411 of bracket 410 may be configured to engage the connector plates 340 and the same fasteners 352 used to connect each pair of connector plates together. Accordingly, in one arrangement the ends 411 may each include two attachment holes 415 for engaging both fasteners 352 of each opposing connector plate assembly. The ends 411 may have a substantially flattened shape and be upturned at an angle or slope complementary to the angular or sloped orientation of the connector plates 340 to which the bracket 410 is attached. The bracket 410 may bridge or span between the connector plates 340 without any interim supports. In one configuration, the center section 412 of the motor mount bracket 410 may have an elongated opening 416 for weight reduction. The bracket 410 may have any suitable cross-sectional structural shape which may be uniform or varied between the mounting ends 411. In non-limiting exemplary constructions, the motor mount bracket 410 may be made of aluminum or steel.

Gaseous Fuel Power Generators

FIGS. 104-108 illustrate some non-limiting examples of portable generators for producing electric power which may be fueled by one or more gas canisters or cylinders containing a compressed liquid fuel, which changes to gaseous phase when released from the containers. In one non-limiting example, the fuel source may be propane. The canisters or cylinders may be interchangeably/replaceable in design or permanent refillable type gas containers in various examples. The generators shown may include an engine configured to operate on a gaseous fuel source and include all related appurtenances and accessories necessary for a fully functional generator system (e.g. alternator, electrical system, pressure regulators, relief valves, controls, electrical outlets, etc.).

Figure 104:
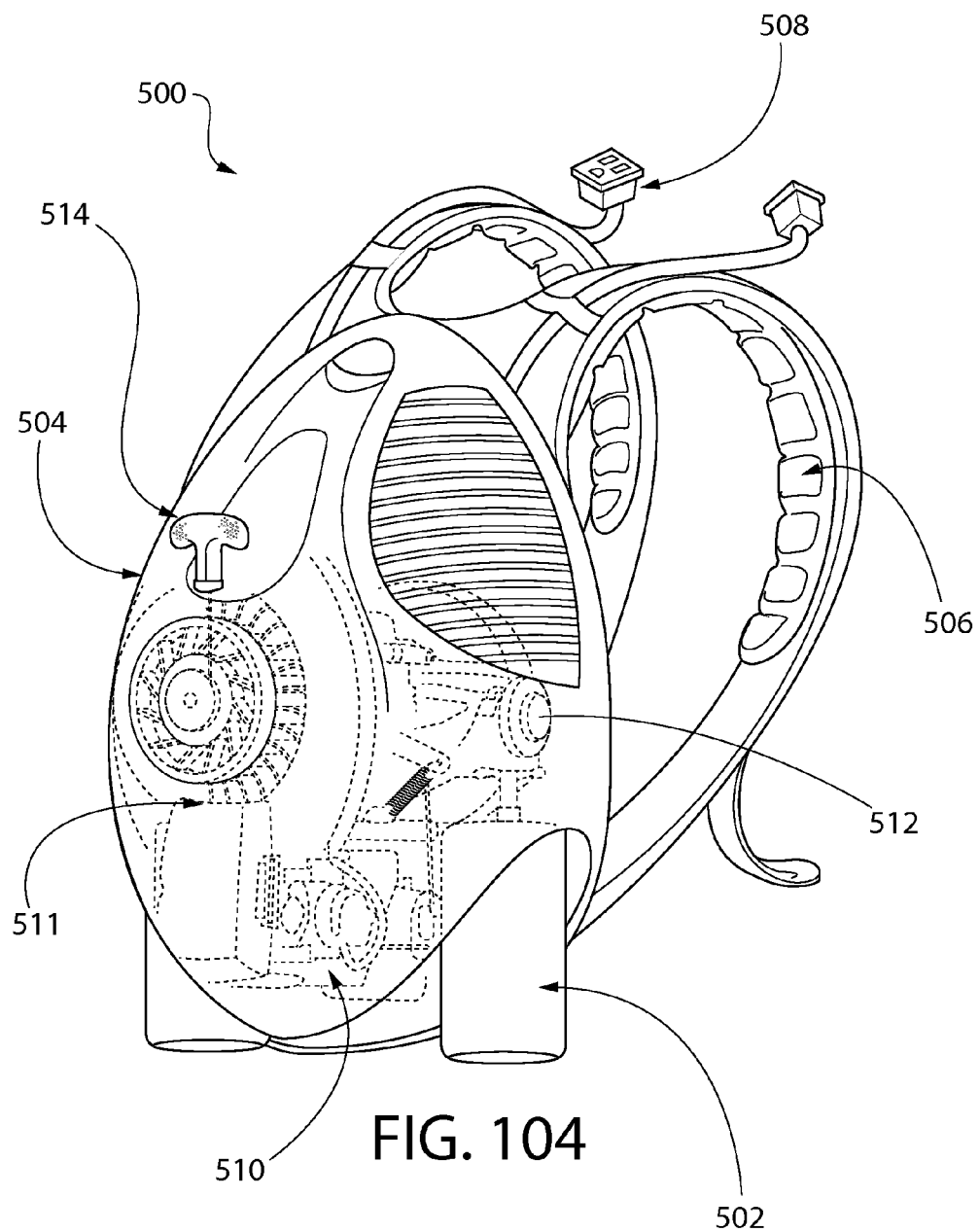
FIG. 104 is a perspective view of a portable generator in the form of a backpack.
Figure 105:
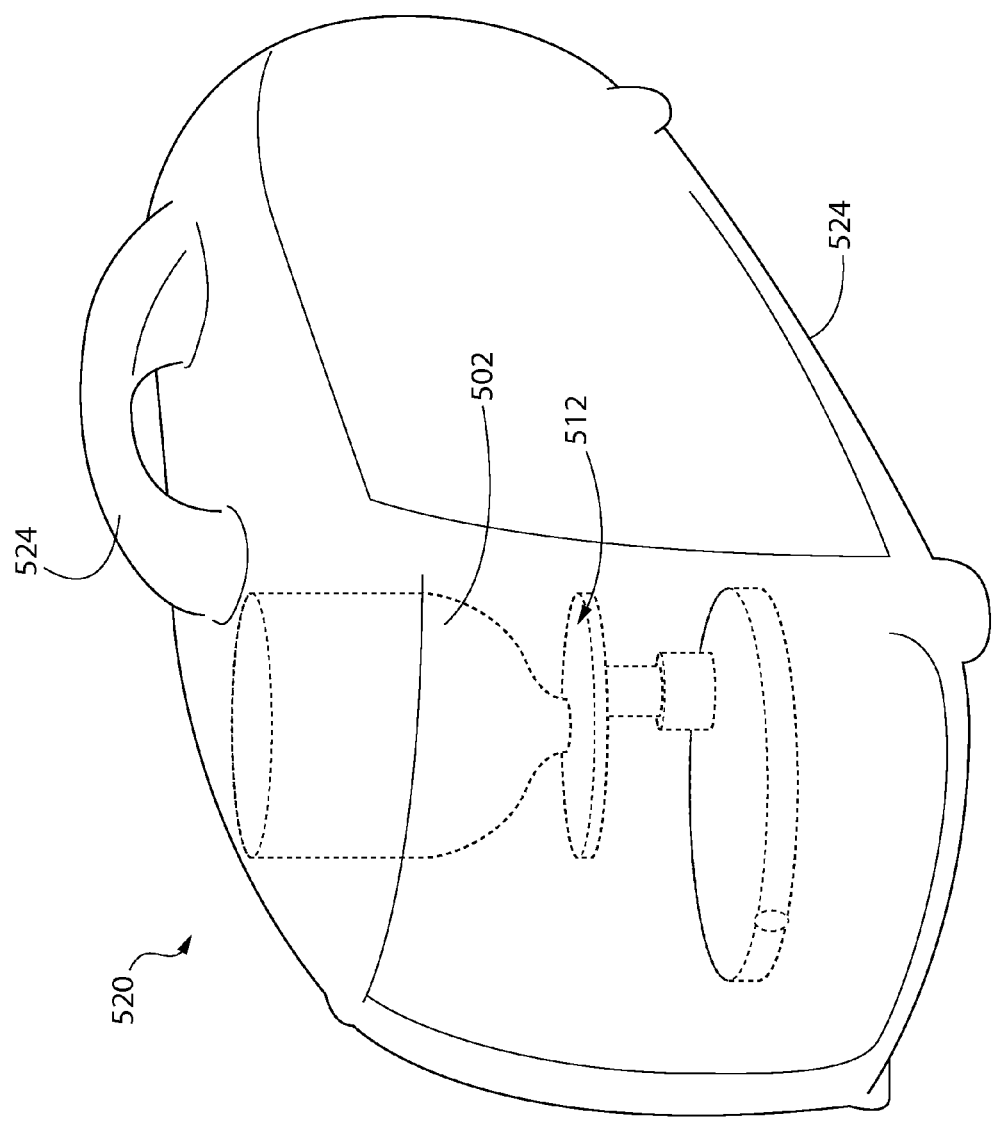
FIGS. 105-108 are perspective views of a portable generator fueled by compressed gas canisters or cylinders.
Figure 106:
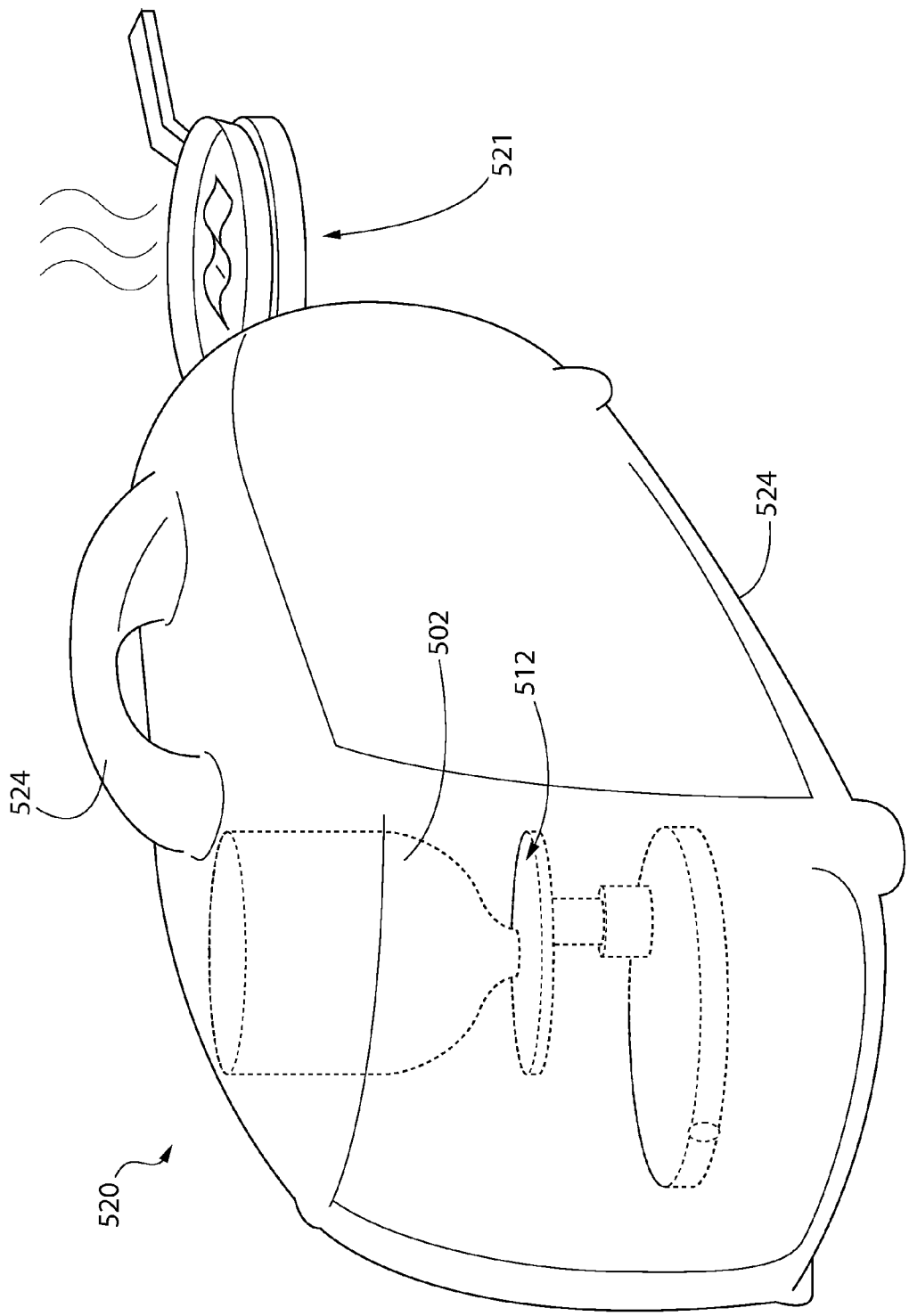
Figure 107:
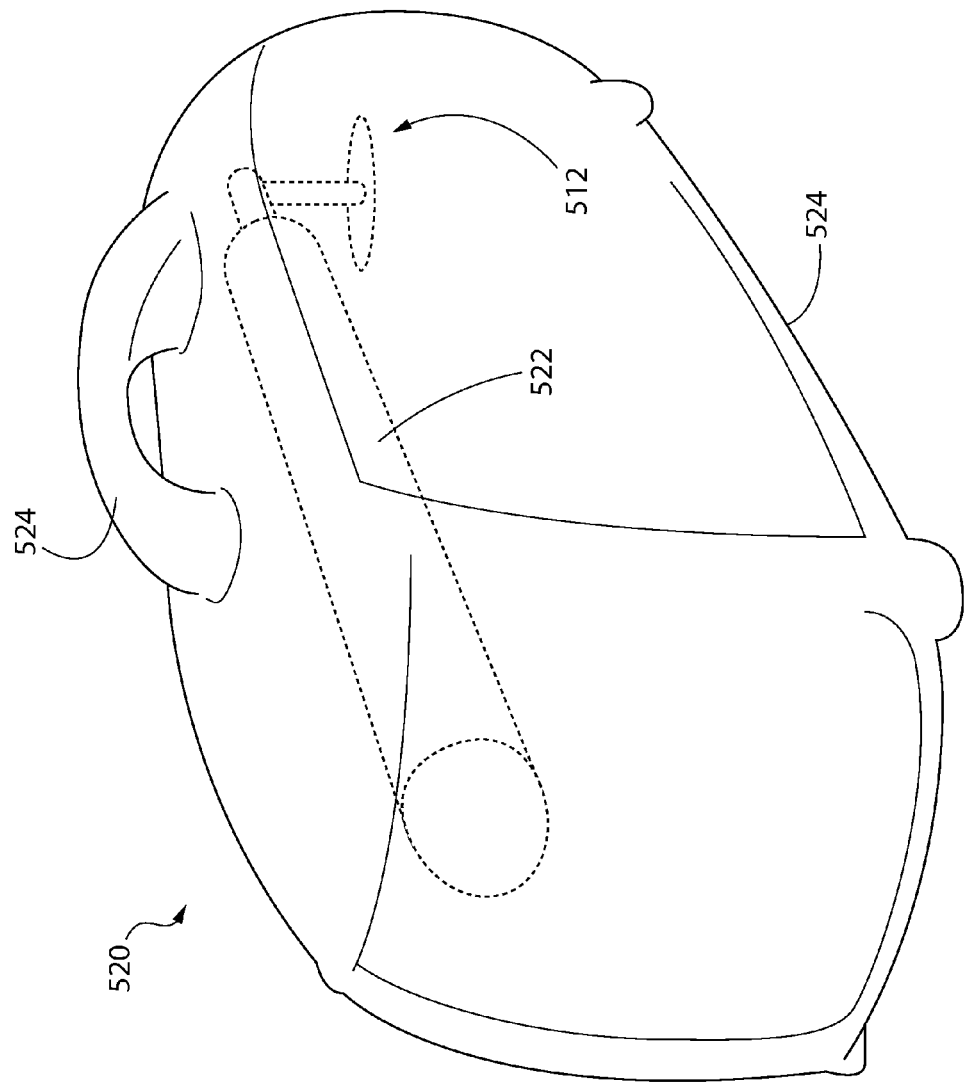
Figure 108:
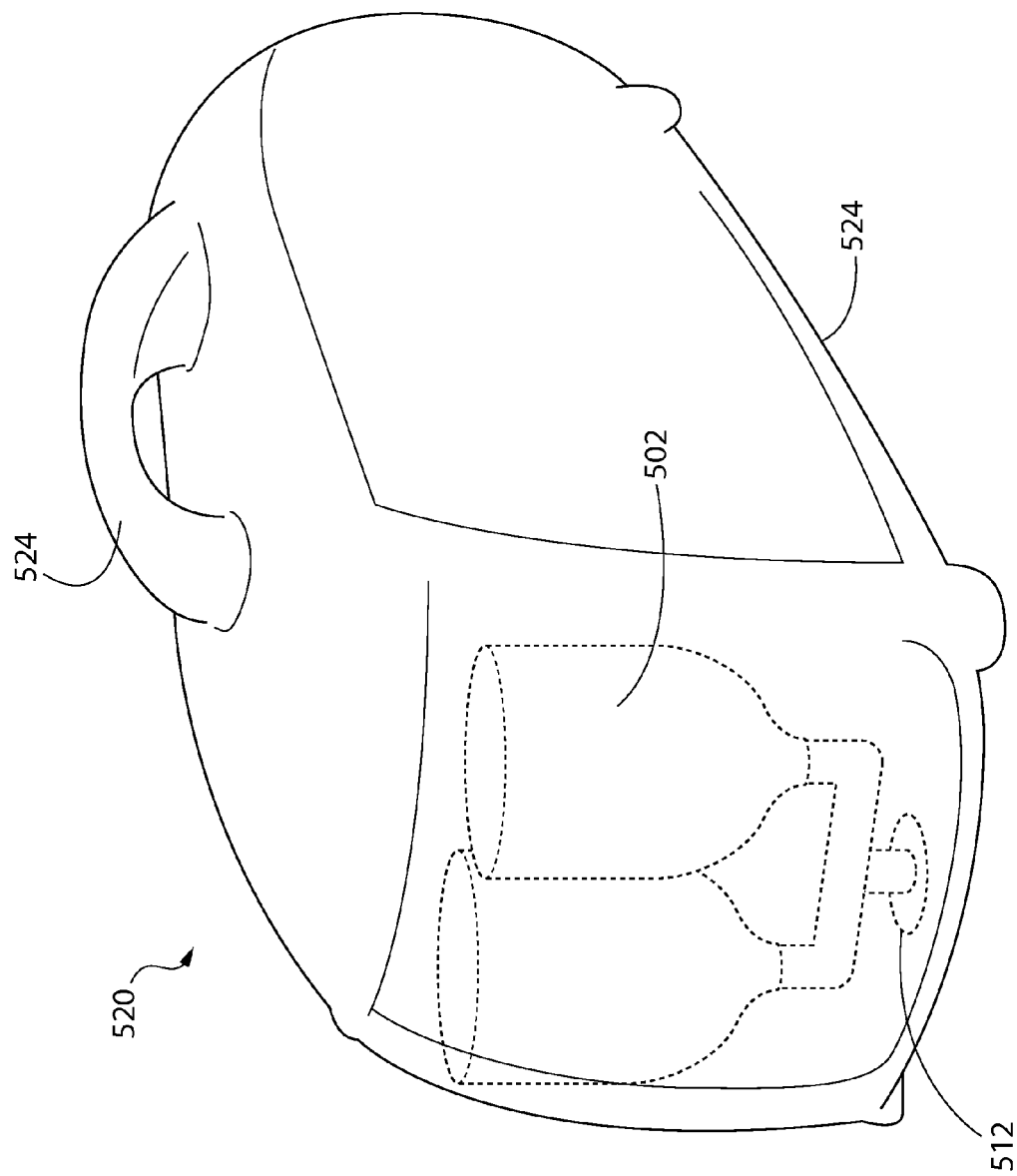

FIG. 104 depicts a non-limiting example of a portable generator configured in the form of a backpack. In one configuration, without limitation, the backpack generator 500 may be fueled by one or more gas replaceable gas canisters 502. The canisters 502 may be standard 16 ounce propane canisters in one example. The external housing 504 of the backpack generator may be formed at least in part from a soft cover material in one configuration made from NFPA rated fire resistant materials (e.g. fabric, etc.), and may have any suitable shape. In some constructions, the housing 504 may be formed from hard materials such as plastic or a combination of soft and hard materials. The backpack generator 500 may include two padded shoulder straps 506, one or more electrical outlets 508, engine 510 configured and designed to operate on gaseous fuel, alternator 511, pressure regulators 512, recoil manual start mechanism 514, and other appurtenances and accessories for a fully functional generator system.

FIGS. 105-108 depict various non-limiting examples of "suitcase" style compact portable generators 520 fueled by one or more gas canisters or cylinders containing a compressed liquid fuel such as propane. Multiple gas canisters 502 or larger cylinders 522 can be used to extend the run time of the generators. The gas canisters 502 may be standard 16 ounce replaceable propane canisters. In one non-limiting example shown in FIG. 107, a single larger replaceable or permanent refillable gas cylinder 522 (e.g. 5 pound or other) may be used. The gas canisters 502 or cylinder(s) 522 may be partially or completed contained in an outer case 524 which may include a carrying handle 526 in some examples. One or more pressure regulators 512 may be provided for each generator. The generator 520 shown in FIG. 106 may include a gas-fueled folding pivotable cooking range 521 which can be deployed to provide the ability to both cook with gas and produce electric power. The range 521 may be fueled by the gas canister(s) 502 or cylinder(s) 522.

The compact generators 520 each include an engine (not shown) configured to operate on gaseous fuel which may be mounted inside the outer case 524. The engine may be similar to the engine 510 shown in FIG. 104 or different.

In various configurations of the liquid or gaseous fueled generators disclosed herein, it will be appreciated that the power generation units may be configured as either a conventional generator (i.e. drawing AC electric power directly off the wire coil) or an inverter generator (i.e. transforming electric power off the coil into DC power and then back into AC).

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants and examples of the invention, which may be made by those skilled in the art without departing from the scope and range of equivalents of the invention.

What is claimed is:
1. A kit for assembling a portable generator unit, the kit comprising:
 a frame having a plurality of equipment mounting interfaces;
 a plurality of engines having at least one different characteristic, each engine including at least one commonly configured first engine mounting interface configured to mate with a corresponding second engine mounting interface on the frame;
 a plurality of wheel assemblies, each of the wheel assemblies including a first frame support mounting interface configured to mate with a corresponding floor support system mounting interface on the frame; and
 a plurality of support legs, each support leg including a second floor support mounting interface configured the same as the first floor support mounting interface to mate with the floor support system mounting interface on the frame;
 wherein the first and second frame mounting interfaces each comprise a pair of spaced apart mounting holes and a pair of spaced apart mounting tabs, the mounting tabs being insertable into mating holes of the floor support system mounting interface on the frame.

2. The kit of claim 1, wherein one of the plurality of engines is mounted on the frame by the first engine mounting interface and the second engine mounting interface on the frame.

3. The kit of claim 1, wherein the different engine characteristic is electric output capacity or fuel type.

4. The kit of claim 1, wherein at least one of the plurality of wheel assemblies and support legs is mounted on the frame by the first frame support mounting interface and the floor support system mounting interface on the frame.

5. The kit of claim 1, further comprising at least one handlebar configured for mounting to the frame.

6. The kit of claim 5, wherein the handlebar is configured for mounting to the frame in one of a horizontal position and vertical position.

7. The kit of claim 1, further comprising a power cord management system.

8. A method for assembling a customizable portable generator unit using the kit according to claim 1, the method comprising:
selecting an engine;
mounting the engine on the frame by coupling the first engine mounting interface on the engine to the second engine mounting interface on the frame;
selecting a first wheel assembly or support leg; and
mounting the selected first wheel assembly or support leg on the frame by coupling the first frame support mounting interface on the selected first wheel assembly or support leg to the floor support system mounting interface on the frame.

9. The method of claim 8, further comprising:
selecting a second wheel assembly or support leg; and
mounting the selected second wheel assembly or support leg on the frame by coupling the first frame support mounting interface on the selected second wheel assembly or support leg to a second floor support system mounting interface on the frame.

10. The method of claim 9, wherein the generator unit includes two wheel assemblies.

11. The method of claim 9, wherein the generator unit includes a wheel assembly and a support leg.

12. The method of claim 9, wherein the generator unit includes two support legs.

13. The method of claim 8, wherein the kit includes at least one handlebar configured for mounting to the frame, and the method further comprises mounting the handlebar to the frame in one of a horizontal position and vertical position.

14. The method of claim 13, wherein the kit includes a second handlebar configured for mounting to the frame, and the method further comprises mounting the second handlebar to the frame in one of a horizontal position and vertical position.

15. A portable generator system comprising:
a frame including a plurality of equipment mounting interfaces;
at least one first engine mounting interface disposed on the frame and configured to mate with a corresponding commonly configured second engine mounting interface disposed on one of a plurality of engines each having at least one different characteristic, the plurality of engines each having the same commonly configured second engine mounting interface for interchangeable mounting of any one of the plurality of engines to the frame;
at least one first floor support mounting interface disposed on the frame being configured to mate with a corresponding commonly configured second floor support interface disposed on a plurality of wheel assemblies and a plurality of support legs, the wheel assemblies and support legs being interchangeably mountable to the frame via the commonly configured second floor support interface;
wherein the second floor support interface comprises a pair of spaced apart mounting holes and a pair of spaced apart mounting tabs, the mounting tabs being insertable into mating holes of the first floor support mounting interface on the frame.

16. The system of claim 15, further comprising at least one handlebar configured for mounting to the frame.

17. The system of claim 15, wherein the handlebar is configured for mounting to the frame in one of a horizontal position and vertical position.

18. The system of claim 16, wherein the handlebar is pivotably mounted to the frame.

19. The system of claim 18, wherein the handlebar is U-shaped.

20. The system of claim 15, further comprising a power cord management system.

* * * * *